US012735167B2

(12) United States Patent
Sankrithi

(10) Patent No.: US 12,735,167 B2
(45) Date of Patent: Sep. 15, 2026

(54) PARTIALLY AEROSTATICALLY SUPPORTED RAM AIR CUSHION SHIP

(71) Applicant: Mithra Sankrithi, Bremerton, WA (US)

(72) Inventor: Mithra Sankrithi, Bremerton, WA (US)

(73) Assignee: RIC Enterprises, Bremerton, WA (US)

(*) Notice: Subject to any disclaimer, the term of this patent is extended or adjusted under 35 U.S.C. 154(b) by 380 days.

(21) Appl. No.: 18/440,898

(22) Filed: Feb. 13, 2024

(65) Prior Publication Data

US 2025/0256828 A1 Aug. 14, 2025

(51) Int. Cl.

| | |
|---|---|
| ***B64B 1/30*** | (2006.01) |
| ***B60V 3/06*** | (2006.01) |
| ***B63B 27/30*** | (2006.01) |
| ***B64B 1/58*** | (2006.01) |
| ***B64B 1/68*** | (2006.01) |
| ***B64B 1/70*** | (2006.01) |
| ***B64F 1/31*** | (2006.01) |

(52) U.S. Cl.

CPC .................. *B64B 1/30* (2013.01); *B60V 3/06* (2013.01); *B63B 27/30* (2013.01); *B64B 1/58* (2013.01); *B64B 1/68* (2013.01); *B64B 1/70* (2013.01); *B64F 1/31* (2013.01)

(58) Field of Classification Search

CPC .... B64B 1/30; B64B 1/58; B64B 1/68; B64B 1/70; B60V 3/06; B63B 27/30; B64F 1/31

See application file for complete search history.

(56) References Cited

U.S. PATENT DOCUMENTS

| | | | | |
|---|---|---|---|---|
| 4,457,554 A * | 7/1984 | Fuisz | B64F 1/31 | 244/137.1 |
| 7,487,935 B2 * | 2/2009 | Winston | B64C 3/385 | 244/12.3 |
| 2007/0007389 A1 * | 1/2007 | McCoskey | B64F 1/305 | 244/118.5 |

(Continued)

FOREIGN PATENT DOCUMENTS

| | | | |
|---|---|---|---|
| CA | 2216360 A1 * | 4/1998 | B63B 35/50 |
| CH | 298362 A * | 4/1954 | B64F 1/31 |

(Continued)

*Primary Examiner* — Drew J Brown

(57) ABSTRACT

The invention provides a new class of transportation with a partially aerostatically supported ram air cushion ship (PASRACS) that can provide safe, fast, efficient global transport services with extraordinary comfort, luxury and amenities. The PASRACS employs inventive synergistic combinations of lift from aerostatic, aerodynamic, hydrostatic and hydrodynamic forces for different modes of operation ranging from a stationary floating configuration on a water surface, to flight in ground effect at high speed. A propulsion system can utilize hydrogen as an energy source driving fluid-dynamic thrusters, to enable zero carbon emissions operations. A transition method is provided for a PASRACS to transition from a floating mode to a takeoff mode to a flight in ground-effect mode in an inventive optimized manner. A transport method for multimodally transporting payload is provided with PASRACS vehicles and systems, with quick turn time operations enabled by the use of payload transfer transport modules and transfer vehicles.

5 Claims, 67 Drawing Sheets

(56) References Cited

U.S. PATENT DOCUMENTS

| | | | | |
|---|---|---|---|---|
| 2008/0217475 A1* | 9/2008 | Allison | .................. | B64D 11/00<br>244/103 S |

FOREIGN PATENT DOCUMENTS

| | | | | | |
|---|---|---|---|---|---|
| CH | 374292 | A | * | 12/1963 | ................ B64F 1/31 |
| CN | 109050866 | A | * | 12/2018 | ............... B64B 1/58 |
| CN | 111634374 | A | * | 9/2020 | ............. B63B 27/30 |
| CN | 113788113 | A | * | 12/2021 | ............. B63B 27/30 |
| CN | 117382823 | A | * | 1/2024 | ............. B63B 27/30 |
| DE | 2030926 | A1 | * | 4/1970 | |
| GB | 2569002 | A | * | 6/2019 | ............... B64B 1/12 |
| RU | 2264315 | C2 | * | 11/2005 | ............. B64B 1/005 |
| WO | WO-2018198126 | A1 | * | 11/2018 | ............. B64C 27/50 |

* cited by examiner 118L
84
88V
4WS
8
4SC
4SS
4ST
4SL
4SW
4SR
4SZ
4SK
4S
4
150
148
149
14
160
73
157
5P
38P
38
2C
143
143E
143F
154
151F
153
142M
143S
152
150A
142H
144
84R
90F
151
144A
142K
142A
143R
155P
142B
84L
61R
156
61L
61T
142P
142N
142L
144F
26
146
145
31C
127
1
2
3

49
35
1 2
62
61
21
28
62M
141
50
1 2
18
21
10
8
9
33
36S
51
1 2
21
55
26
36
20
141

49
35
1 2
62
61
21
28
62M
141
50
1 2
18
21
10
8
9
33
36S
51
1 2
55
20
141

50
1 2
18
21
10
8
9E
9
4
54
17
36S
33
54
17
51
1 2
18
56
10
8
25
21
28
52
9
58
59
55
26
36
57H
57
20
33
57
57A
141
49
35W
62
1
115S
18
21
21
23
35
62
3
10
8
25
9
61
28
62M
33
20
21
141
35
51D
1 2
3
10
8
25
9
26R
26
90D
62
61
62M
33
20
141
21
49L
50
1 2
18
10
8
21
9E
9
4
54
17
36S
33
54
17
51L
1 2
18
56D
10
8
25
21
28R
52
9
58
59
55
26
36
57H
57
20
33
57
57A
141

49
50
1 2 3
10
8
9
18
21
28T
26
51
90S
57A
33
55
35
25
90S
28T
55
20
33

49
90S
88V
88H
4
88V
57A
163
90R
90L
90F
90B

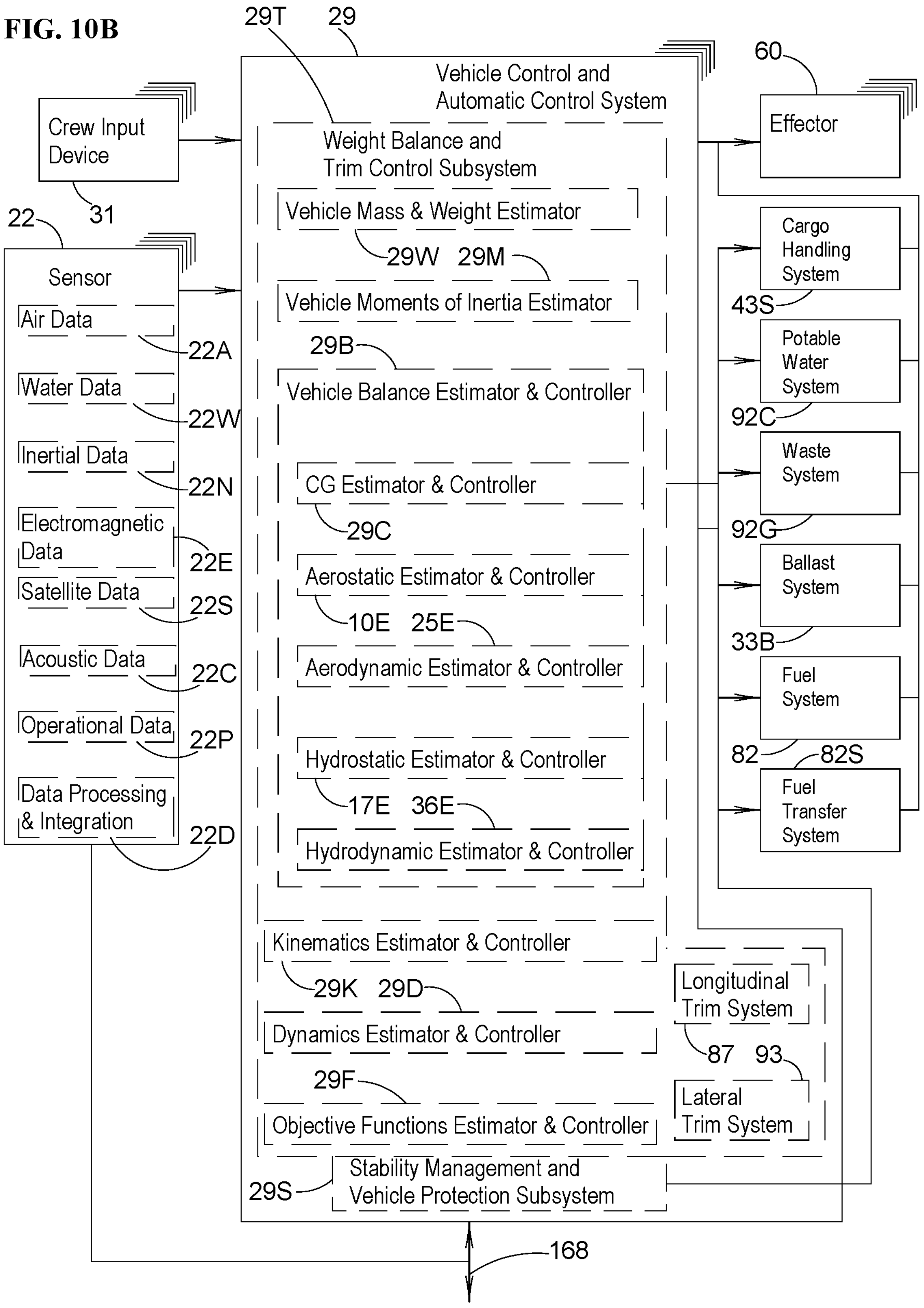

FIG. 10B
29T
29
Vehicle Control and Automatic Control System
60
Effector
Crew Input Device
31
Weight Balance and Trim Control Subsystem
Vehicle Mass & Weight Estimator
29W
29M
Vehicle Moments of Inertia Estimator
29B
Vehicle Balance Estimator & Controller
CG Estimator & Controller
29C
Aerostatic Estimator & Controller
10E
25E
Aerodynamic Estimator & Controller
Hydrostatic Estimator & Controller
17E
36E
Hydrodynamic Estimator & Controller
Kinematics Estimator & Controller
29K
29D
Dynamics Estimator & Controller
29F
Objective Functions Estimator & Controller
Longitudinal Trim System
87
93
Lateral Trim System
29S
Stability Management and Vehicle Protection Subsystem
22
Sensor
Air Data
22A
Water Data
22W
Inertial Data
22N
Electromagnetic Data
22E
Satellite Data
22S
Acoustic Data
22C
Operational Data
22P
Data Processing & Integration
22D
Cargo Handling System
43S
Potable Water System
92C
Waste System
92G
Ballast System
33B
Fuel System
82
82S
Fuel Transfer System
168

KEY:

⊞ - Lifting Gas Volume cu.ft.

▲ - Nominal Maximum Takeoff Weight MTOW = Aerostatic + Aerodynamic Lift @ Liftoff Speed, lb ▼ - Operational Empty Weight OEW, lb ⊗ - Aerodynamic Lift at Liftoff Speed, lb ✦ - Aerostatic Lift at Sea Level nominal, lb 92H
26A
88V
90R
5P
118L
177
7
43B
43C
4S
4
42
43
43A
38
5F
5C
5P
92C
6
5
47
143
14
144A
175PC
144
92G
92F
92E
92S
92A
92C
92B
2P
143
8
178S
47
144F
47E
144
47
1L
1
2
3
2FC
92C
92B
177
31C
175PC

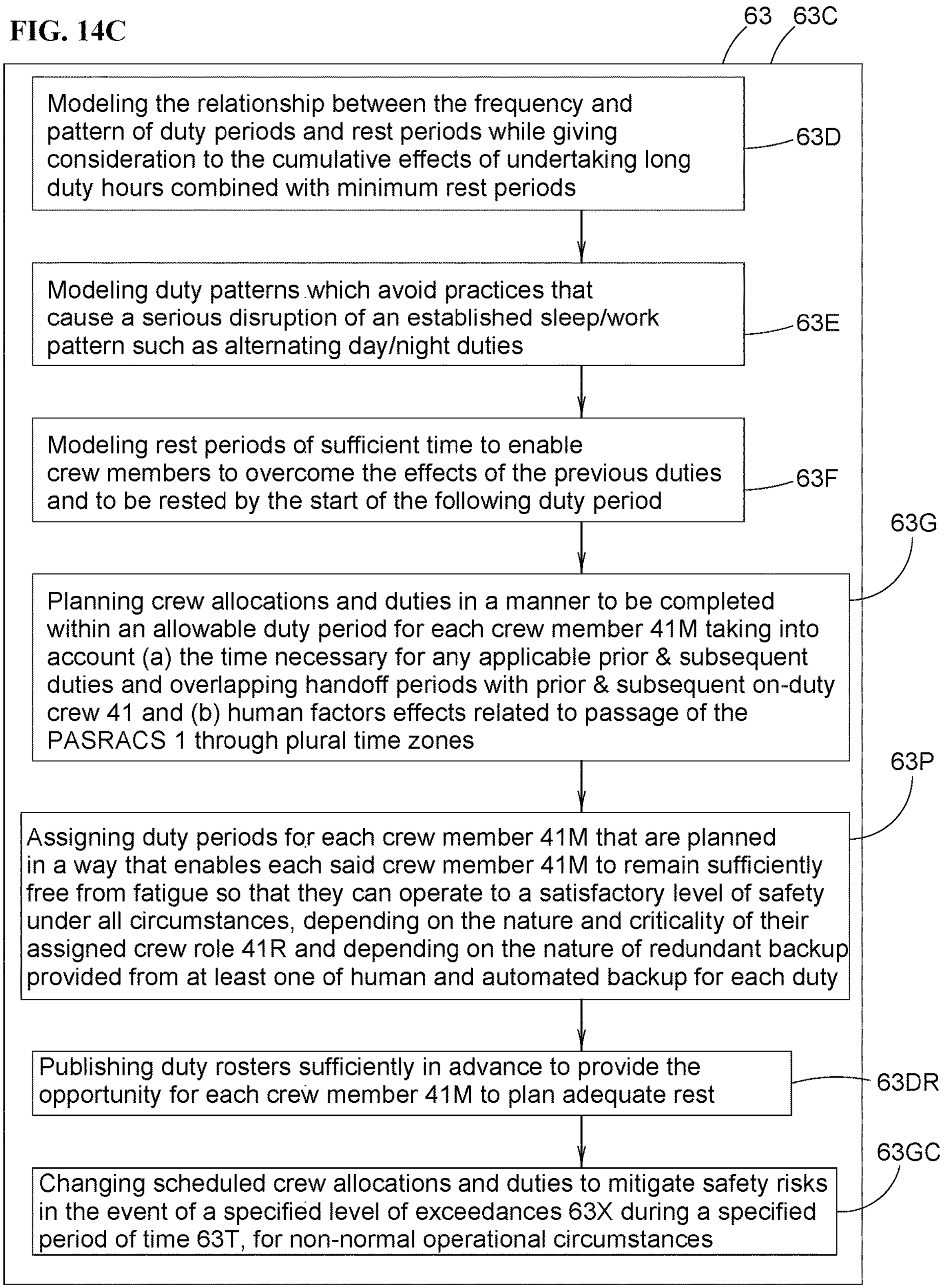

FIG. 14C
63
63C
Modeling the relationship between the frequency and pattern of duty periods and rest periods while giving consideration to the cumulative effects of undertaking long duty hours combined with minimum rest periods
63D
Modeling duty patterns which avoid practices that cause a serious disruption of an established sleep/work pattern such as alternating day/night duties
63E
Modeling rest periods of sufficient time to enable crew members to overcome the effects of the previous duties and to be rested by the start of the following duty period
63F
Planning crew allocations and duties in a manner to be completed within an allowable duty period for each crew member 41M taking into account (a) the time necessary for any applicable prior & subsequent duties and overlapping handoff periods with prior & subsequent on-duty crew 41 and (b) human factors effects related to passage of the PASRACS 1 through plural time zones
63G
Assigning duty periods for each crew member 41M that are planned in a way that enables each said crew member 41M to remain sufficiently free from fatigue so that they can operate to a satisfactory level of safety under all circumstances, depending on the nature and criticality of their assigned crew role 41R and depending on the nature of redundant backup provided from at least one of human and automated backup for each duty
63P
Publishing duty rosters sufficiently in advance to provide the opportunity for each crew member 41M to plan adequate rest
63DR
Changing scheduled crew allocations and duties to mitigate safety risks in the event of a specified level of exceedances 63X during a specified period of time 63T, for non-normal operational circumstances
63GC 208S
196D
196
196W
166V
88H
88V
115U
208S
196A
9E
54
208
18
21S
21G
206H
C
196
196P
21
C
196H
115V
61
3
204
205
115T
26
54
31C
114
196S
1
196DD
18
115T
115U
115V
206H 196W
208S
196D
196
196R
206A
115U
166V
88H
88V
208S
1
208
9E
54
206
196A
21
196H
196P
196
18
21S
21G
206H
C
C
61
3
115V
205
204
115T
26
54
31C
206
206H
196R
196C
206A
196
196W
114
196S
1
196DD
18

PARTIALLY AEROSTATICALLY SUPPORTED RAM AIR CUSHION SHIP

BACKGROUND OF THE INVENTION

As the World's human population grows and as the global economy grows, it is anticipated that demand for transport (including international and intercontinental transport) of both passengers and cargo will also experience very substantial growth in the 21$^{st}$ Century. Current state of the art airliners such as versions of the Boeing 787 and 777 and 747 and Airbus A330 and A350 and A380 wide-body aircraft (Ref. 1), can typically accommodate in the range of 200 to 600 passengers; while dedicated air freighter versions of wide-body aircraft can typically accommodate cargo corresponding to an equivalent cargo volume of 10 to 30 TEUs (Twenty-Foot Equivalent Units with reference to a 20 foot standard container such as a high-cube container having internal volume of approximately 37 cubic meters or 1300 cubic feet) and corresponding revenue cargo weight of approximately 40 to 120 tonnes (metric tons). It is well-understood in the art of air transportation that payload-denominated aircraft cost metrics such as cash operating cost (CAROC) per passenger-kilometer for passenger payload, or cash operating cost (CAROC) per tonne-kilometer for revenue cargo payload, generally reduce with increasing aircraft size. However, airport limitations such as runway-to-taxiway separations limit the development of aircraft with significantly larger capacities than the wide-body airliners noted above. Current container ships have enormous cargo capacities reaching over 24,000 TEU (Ref. 2) or roughly a thousand times the capacity of a large air freighter, and offer much lower cash operating cost per tonne-kilometer. However, container ship cruise speed is less than 5% that of typical jet air freighters. In a similar manner, cruise ships can accommodate around ten times the number of passengers as large airliners (Ref. 3) while offering much greater luxury & a large portfolio of passenger amenities; but in this case again cruise ships are extremely slow relative to airliners and hence capture a completely negligible market share of international and intercontinental passenger travel, such as traffic volume as in revenue-passenger-kilometers or RPK.

In view of anticipated continued strong global demand growth for both passenger and cargo transport over the coming decades, and in view of the significant size limitations on conventional jetliners and significant speed limitations of conventional ships, it logically follows that there should be a very large market opportunity if a new class of transport vehicles could offer safe, efficient and economical transport with parameter attributes capturing the best aspects of ships and planes, such as order-of-magnitude payload capacities between 500 and 500,000 passengers and/or between 20 and 20,000 TEU (Twenty-Foot-Equivalent volume) of revenue cargo, without limitation, and economical cruise speeds between 75 km/hr (Mach 0.06 near sea level) and 750 km/hr (Mach 0.6 near sea level), with these order-of-magnitude exemplary ranges of numbers cited without limiting the spirit and scope of the invention as described hereinafter. The innovative class of Partially Aerostatically Supported Ram Air Cushion Ships or PASRACs that are described and claimed herein, are intended to serve and satisfy this very large opportunity to serve humankind's strongly growing transport needs by leveraging innovation to enable parameters that synergistically optimize several of the best vehicle attributes and aspects of current ships and current aircraft. It is widely recognized that the transport and tourism sectors significantly help enable human happiness and well-being and cross-cultural understanding and respect, and the inventor humbly prays that this PASRACS invention may serve the cause of human betterment and well-being, and not be used for purposes of serving as an instrument of death or suffering.

BRIEF SUMMARY OF THE INVENTION

In summary, this invention provides a partially aerostatically supported ram air cushion ship (PASRACS), a transport vehicle capable of flying in ground effect over an Earth surface such as an ocean surface, while being supported above said Earth surface by forces including a combination of aerostatic lift through use of a lifting gas compartment, on the first hand, and a ram air cushion between said Earth surface on the first hand and a lower surface of the vehicle on the second hand. Flaps can be used to control pressurization of regions of the ram air cushion, and the ram air cushion can in certain embodiments be a power-augmented ram air cushion that is at least partially pressurized by energized flow from a fluid dynamic propulsor. The lifting gas compartment can hold helium or hydrogen lifting gas in certain preferred embodiments. Multiple decks can be used to accommodate passenger and cargo payload. PASRACS will preferably have propulsion and stability and control and trim systems and also be fitted with life-preservation apparatus for passengers and crew. PASRACS will be capable of flight in ground effect over ocean surfaces as well as over land surfaces such as over land corridors as needed, for example and without limitation such as a crossing from the Red Sea to the Mediterranean Sea on a track close to the Suez Canal, and a crossing on a defined land corridor across Central America from the Caribbean Sea to the Pacific Ocean. PASRACS can utilize at least one of hydrostatic and hydrodynamic forces to contribute lift during a landing on a water surface. PASRACS can be used with a transition method to transition from a substantially static floating mode on a water surface to a water takeoff mode with supplemental fluid dynamic support and then to a flight in ground-effect mode above an Earth surface. Detachable payload modules can be employed to enable quicker turn time operations at a port of destination. PASRACS can provide a transport method for multimodally transporting payload from an origin location to a destination location employing a transfer vehicle that serves as the aforesaid detachable payload module. This new class of vehicle architecture and configuration design combined with appropriate aerodynamic and structural optimization can enable a very large vehicle capable of providing intercontinental (and intracontinental) transport for passengers and cargo to Worldwide destinations with a combination of speed, comfort and very low energy use per passenger-kilometer and per tonne-kilometer as well as near-zero carbon emissions per passenger-kilometer and per tonne-kilometer, as will be further described in the following descriptive portion of the specification, drawings and claims.

BRIEF DESCRIPTION OF THE DRAWINGS

FIGS. 10A through 10E show block diagrams of some alternate preferred systems and controls architectures and features that can be applied on a partially aerostatically supported ram air cushion ship.

FIGS. 14A through 14E illustrate some alternate preferred methods of operation that can be applied for normal and nonnormal operations of a partially aerostatically supported air cushion ship.

DETAILED DESCRIPTION OF THE INVENTION

Figure 1A:
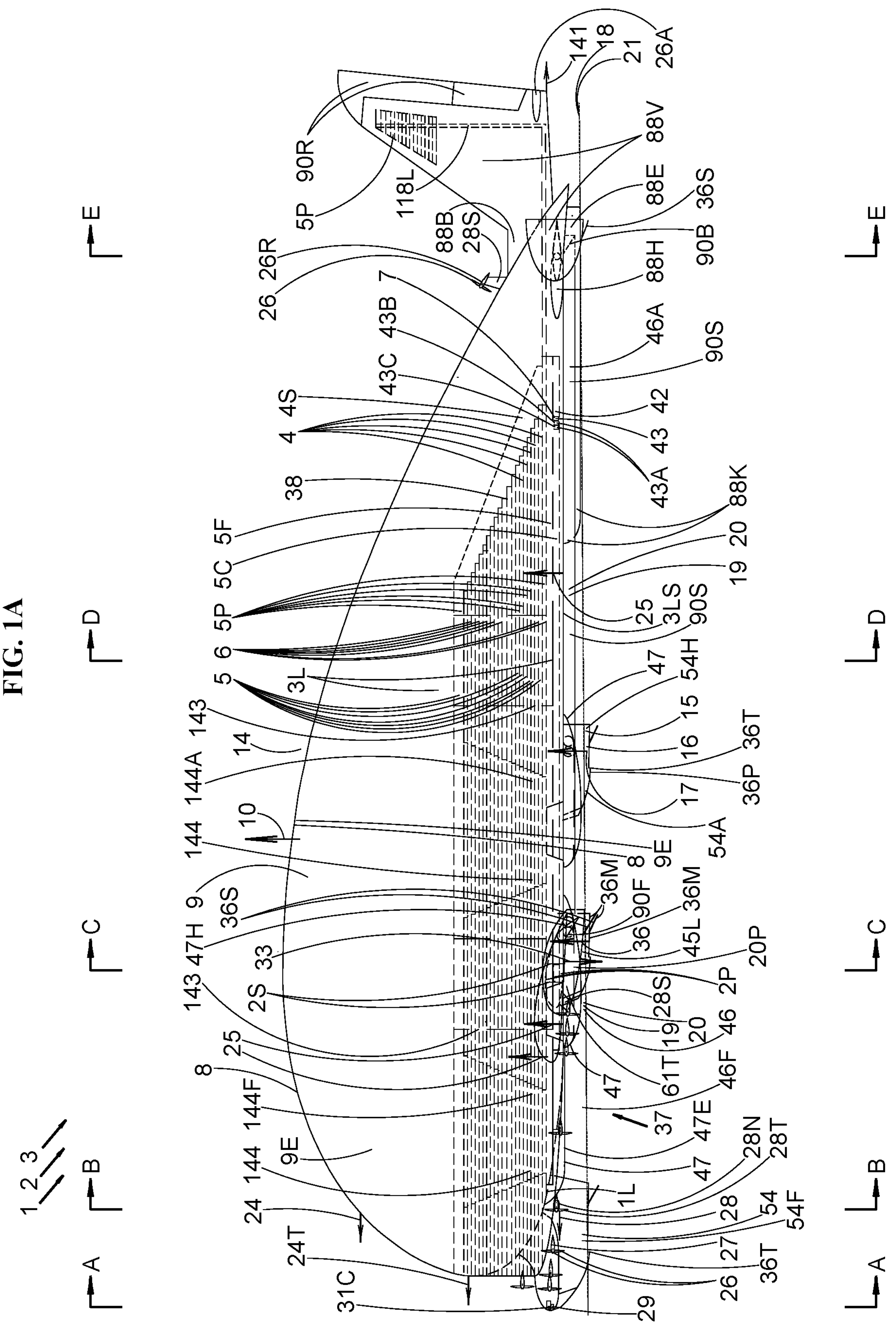
FIGS. 1A and 1B show left side and bottom plan views of a preferred embodiment of a partially aerostatically supported ram air cushion ship.

Prior to commencing with the detailed description, certain expressions are defined as pertaining to their use in the following detailed description and claims.

The expression "ship" is to be understood as meaning a vehicle or vessel capable of traversing a geographic region of water such as a region of an ocean or a sea, without limitation.

The expression "ground surface" is to be understood as meaning any of a solid surface, a frozen water surface or other frozen surface, and a semisolid surface such as a marsh surface, a swamp surface, a mud surface or a slush surface, without limitation.

The expression "Earth surface" is to be understood as meaning the interface surface immediately below the atmosphere, and can be either a ground surface at a top surface of the lithosphere or the top surface of a body of water supported by the lithosphere. Examples of a "body of water supported by the lithosphere" can include without limitation an ocean, a lake, a reservoir, a river, a canal, a salt water body, a fresh water body, a bay, an inlet, an estuary, a delta, a lagoon, a channel, and a sound; can include liquid or frozen or partially frozen water; and can include water and solids mixes such as in marsh or swamp or slush or mud or semisolid areas, without limitation.

The expression "aileron" is to be understood as meaning any of an aileron, a droopable aileron, a flaperon, an elevon and a deployable fluid dynamic control surface capable of generating a rolling moment from fluid dynamic forces acting on a vehicle fitted with the aileron.

The expression "wing tip fence" is to be understood as meaning any of a series of wing tip devices known in the prior art for reducing spanwise flow and/or induced drag, including a tip fence, a downward winglet, an upward winglet, an up-down winglet, tip feathers, a raked tip and other devices known in this class.

The expression "ground-effect" is to be construed as applicable to a wing in ground-effect or other vehicle flying above the ground with aerodynamic support, when the induced drag ground-effect influence ratio is no greater than 98.9% or the height above ground to vehicle span ratio is no greater than 2, wherein these two values correspond substantially to each other according to the Hoerner & Borst (Ref. 4) closed-form mathematical model relationship known in the prior-art of aerodynamic flight in ground-effect.

The expression "weak ground-effect" is to be construed as applicable to a wing in ground-effect or other vehicle flying above the ground with aerodynamic support, when the induced drag ground-effect influence ratio is greater than 98.9% but no greater than 99.9% or the height above ground to vehicle span ratio is greater than 2 but no greater than 10, wherein the latter two values (99.9% and 10 respectively) correspond substantially to each other according to the Hoerner & Borst (Ref. 4, 20-10) closed-form mathematical model relationship presented in the prior-art of aerodynamic flight in ground-effect.

The expression "prop" is to be understood as meaning a fluid propulsor member such as an unducted or ducted propeller or fan or jet that can convey power or impart thrust to a fluid such as air or water.

The expression "window" is to be understood as meaning a view panel or a transparent member or a translucent member and further includes subvariants such as a dimmable window and an electrochromic window and a one-way window and a framed window and a frameless window and a fixed window and an openable window and a load-bearing window and a structural window and a transparent composite window and a membrane window and a shatter-proof window and a glass window and a safety glass window and a plastic window and an acrylic window and a polycarbonate window and a ETFE window.

FIG. 1A shows a left side view of a preferred embodiment of a partially aerostatically supported ram air cushion ship 1 or PASRACS 1 with a positive airspeed 24 that is in motion on a travel path 24T, with partial support in the transition condition shown from each of aerodynamic support from a ram air cushion 20, aerostatic support from aerostatic lift force 10 from use of a lifting gas 9, hydrodynamic support from a hydrodynamic lift force 36 from a hydrodynamic lift member 36M and hydrostatic support from a hydrostatic lift force 17 from a hydrostatic floatation subsystem 15 including a water displacing structure 16. Thrust force 28 is sufficient to meet or overcome drag force 141.

FIG. 1A further illustrates a PASRACS 1 which includes a payload volume 4, wherein for a design payload density, the payload volume 4 comprises no more than three-quarters of total volume of the PASRACS 1, leaving available internal volume in the PASRACS 1 for encompassed lifting volume 9E in a lifting gas enclosure 8 to contain lifting gas 9 with no increase in wetted area of the PASRACS 1. Note that depending on requirements and objectives, the design payload density applicable to the payload volume 4 for a particular vehicle design may be specified at a particular value lying in the order of magnitude range between 0.01 pound per cubic foot and 100 pounds per cubic foot, without limitation.

Figure 1B:
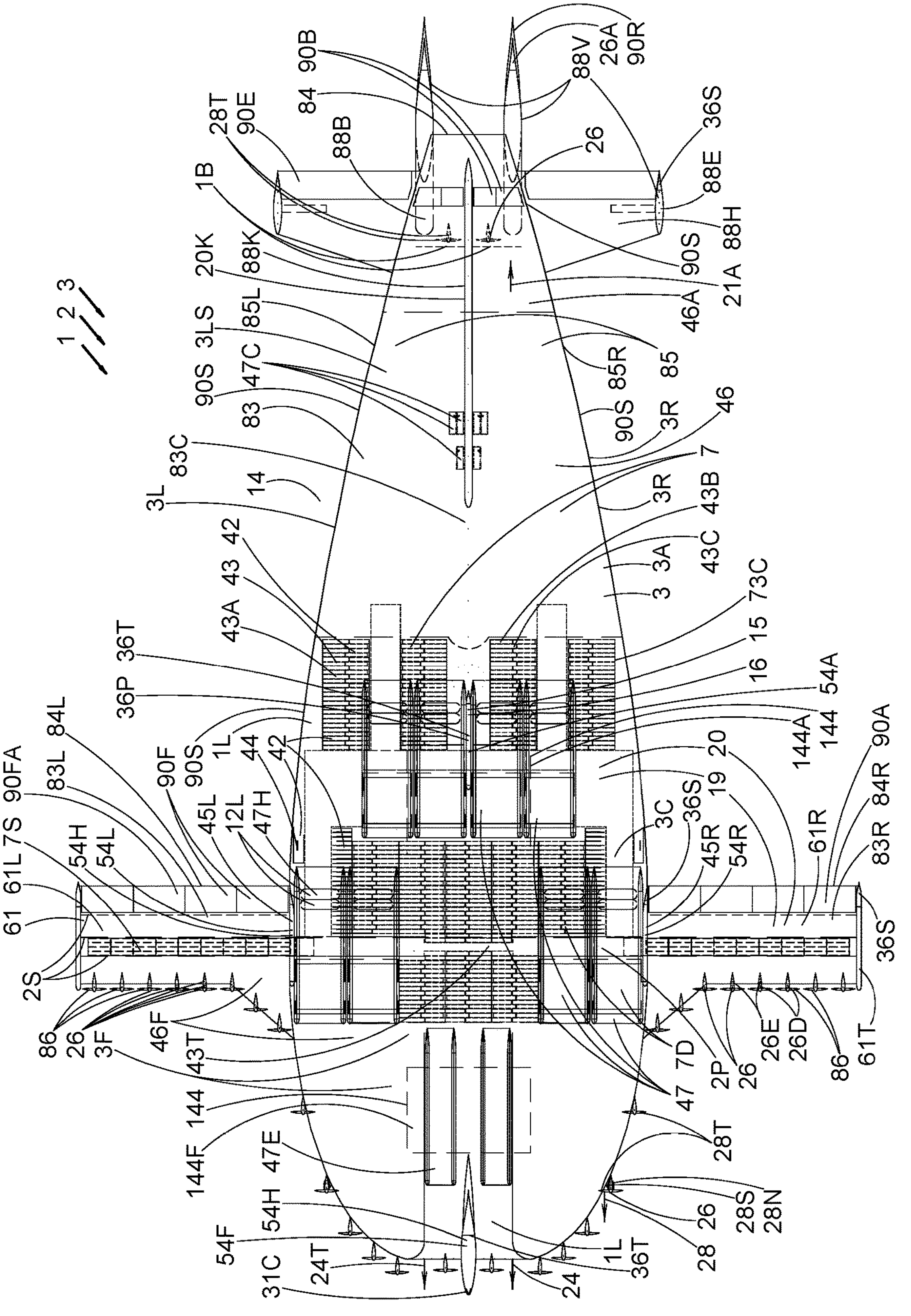

FIG. 1B shows a bottom plan view of the preferred embodiment of the partially aerostatically supported ram air cushion ship 1 shown in FIG. 1A. FIG. 1B shows how the propulsion system 26 provides pressurized outflow that helps pressurize the ram air cushion 20 under both the wing 61 and body 3, as shown. The illustrated propulsion system 26 also includes aft body mounted thrusters 28T with boundary layer ingestion intakes 26BL that feed air to provide oxygen for at least one of a combustion engine and a fuel cell in the propulsion system 26. The trailing edge Kutta condition that influences the pressurization under different portions of the wing 61 is set by appropriate trailing edge down deflections of the flaps 90F, the flaperons 90FA, and the ailerons 90A with an aileron droop functionality. While two inboard flaps, one flaperon and one aileron are shown on each wing side, it should be understood that a variety of alternate variant embodiments may employ different combinations of zero to many for each of ailerons, flaperons and flaps, and also be supplemented by spoilers that can provide aerobraking and roll control functionality as known from the art of aircraft spoilers. Flap types can include one or more selected from: a plain flap, a split flap, a translating flap, a hinged flap, a flap with motion along a flap track, a flap mounted on a deployment linkage, a single-slotted flap, a multi-slotted flap, a Fowler flap, a morphing surface flap, a blown flap, and a Coanda effect flap, for example and without limitation. Flexible members such as a flexible seal and/or a flexible connecting membrane may be provided in gap areas between adjacent flap elements or members. Note that both the ailerons 90A and flaperons 90FA also perform roll control by differential deflections between the left and right wings. FIG. 1B shows cargo volume 42 with payload 7 including cargo 43 that can comprise cargo containers 43A such as Unit Load Devices (ULDs), shown in dashed lines as they are located on the lowest deck of the PASRACS 1, located just above the base of the vehicle as seen in this bottom plan view. The cargo containers 43A can be transported to different locations via a cargo transport corridor area 43T utilizing an internal cargo container transport subsystem such as one using an overhead mobile crane subsystem as one example, or a roller tray and powered rollers subsystem as another example. FIG. 1B also shows the accommodation of liquid hydrogen 12L in a liquid hydrogen tank 47H. The liquid hydrogen tank 47H is on the payload transfer transport module 47 as illustrated, but it should be understood that in variant preferred embodiments liquid hydrogen tank(s) could be located anywhere in the partially aerostatically supported ram air cushion ship 1. The liquid hydrogen 12L can be used both as a fuel for the propulsion system 26 (such as a combustion subsystem and/or fuel cell subsystem) and/or for replenishing hydrogen gas in the aerostatic lift subsystem. FIG. 1B shows plural payload transfer transport modules 47 (eight shown in four pairs) that can be winched down from the PASRACS 1 and then detached, to move over water preferably in a powered barge mode to a docking facility. Each payload transfer transport module 47 is shown with space for accommodating passengers in a forward region, space for accommodating cargo and baggage in the middle region, and space for accommodating fuel and lifting gas (e.g. hydrogen and/or helium in illustrated tanks, as well as other fuels in tanks that are not shown) in an aft region; with appropriate safety and security separation structure and features between these regions. The payload transfer transport modules will also have tanks/compartments for potable water and for waste (liquid and solid) in suitable spaces such as "nooks and crannies" which are not explicitly called out but can be inferred from transportation and architecture prior art. In addition. FIG. 1B also shows downwardly winchable emergency evacuation barges 47E and also shows optional compact payload transfer transport modules 47C substantially adjacent to a keel 20K that acts as a keel ventral stabilizer 88K, which compact payload transfer transport modules 47C can be winched down and detached, and then subsequently winched up and carried by smaller vehicles such as will be described subsequently in the context of FIGS. 5A and 5E. The compact payload transfer transport modules may optionally have onboard power, propulsion, navigation and search and rescue sensors and functionality, and serve as piloted rescue boats and/or autonomous robotic rescue boats that can serve to rescue people or boarding payload or deboarding payload associated with the PASRACS 1 that somehow have gone "overboard" and/or other humanitarian rescue operations.

Figure 1C:
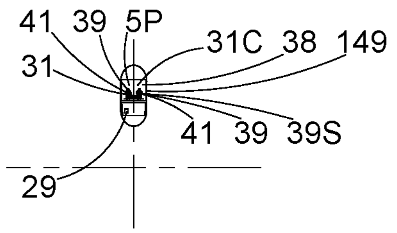
FIGS. 1C, 1D, 1E, 1F and 1G show transverse cross-sectional views, with scaling for improved understanding, of the preferred embodiment of FIGS. 1A and 1B, at longitudinal locations A-A, B-B, C-C, D-D and E-E of the partially aerostatically supported ram air cushion ship as notated on FIG. 1A.
Figure 1D:
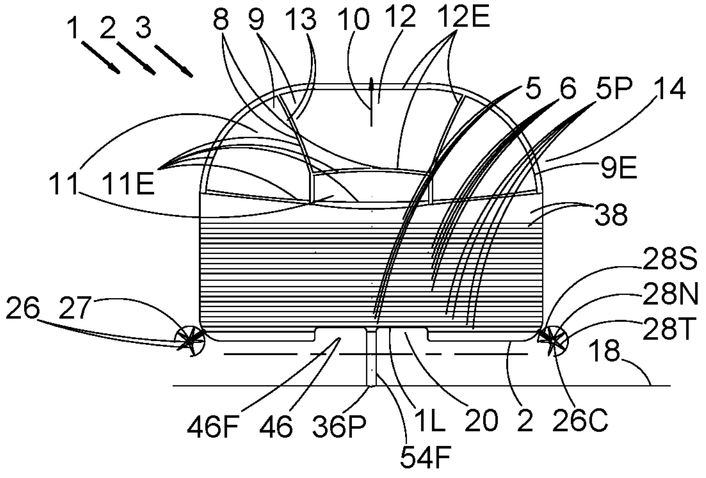
Figure 1E:
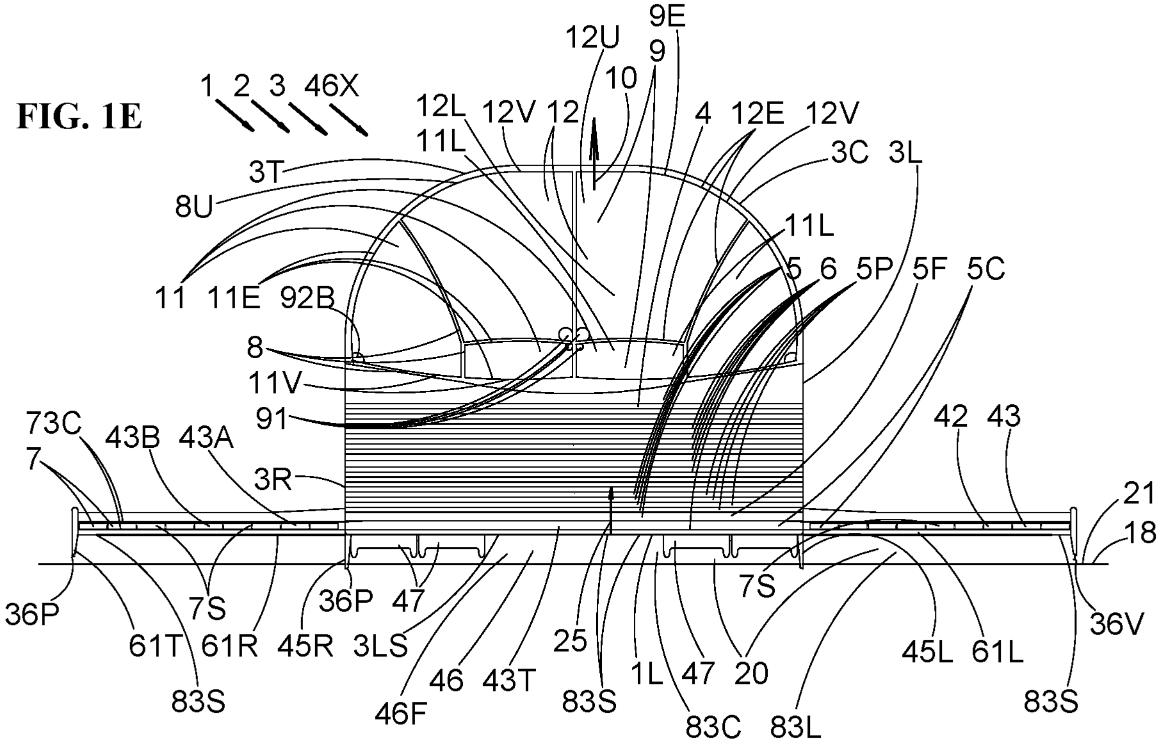
Figure 1F:
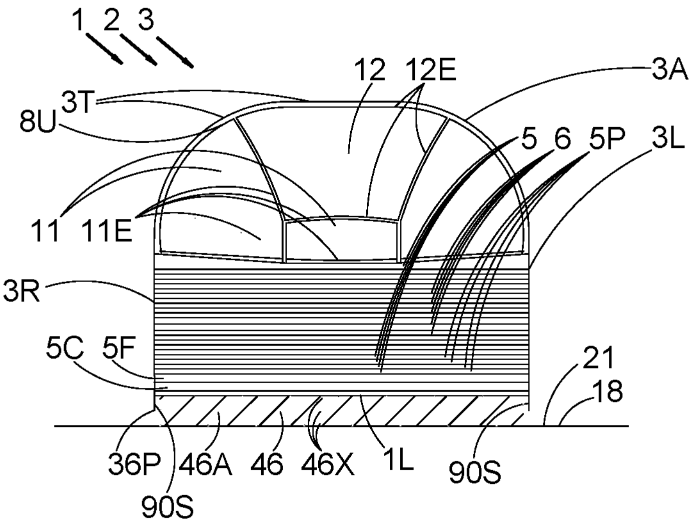
Figure 1G:
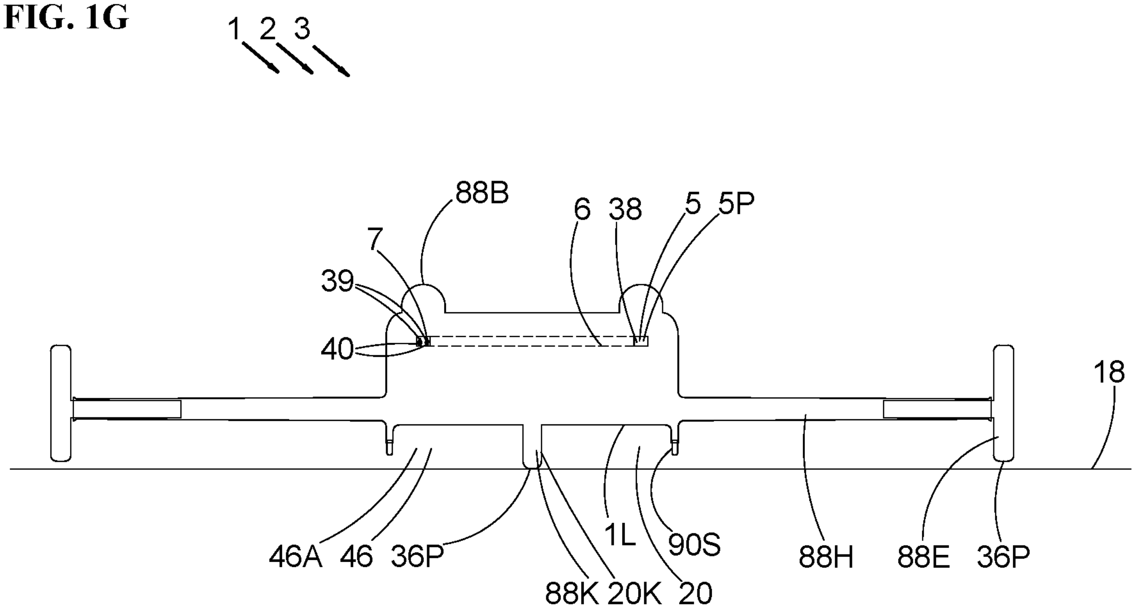

FIGS. 1C, 1D, 1E, 1F and 1G show transverse cross-sectional views of the preferred embodiment the partially aerostatically supported ram air cushion ship 1 of FIGS. 1A & 1B at longitudinal locations A-A, B-B, C-C, D-D and E-E respectively, of the partially aerostatically supported ram air cushion ship 1 as notated on FIG. 1A. Note that FIG. 1C is scaled by a linear scaling factor of 4 and FIG. 1G is scaled by a linear scaling factor of 2, for improved understanding, relative to the other corresponding Figures of this preferred embodiment (namely FIGS. 1A, 1B. 1D. 1E and 1F). FIG. 1C shows a forward cross-section showing the flight deck/cockpit 31C with windows 149 and with illustrated crew 31 being the flight deck crew such as a pilot and copilot, or Captain and First Officer, for example. The flight deck/cockpit 31C may be fitted with instrumentation and controls such as a wheel, a control column, a control stick, a sidestick, rudder pedals, a tiller, a joystick, a flat panel display, a multifunction touchscreen display, and other instrument and/or control; as well as with amenities such as movable high comfort seats and furniture for crew, auxiliary crew, and observers. A vehicle control and navigation system 29 is illustrated in an equipment bay beneath the cockpit 31C, in a manner analogous to electrical and electronics equipment bay ("EE Bay") precedents in commercial airliners. Volume in the body 3 that is behind the flight deck 31C and/or behind the EE bay, can be used for crew rest purposes for flight crew and optionally other crew members as well. Additional crew rest facilities can be provided in other spaces in the body 3 of the PASRACS 1. Crew rest facilities can include full-flat sleeping beds with quietness achieved by sound insulation and/or active noise control, and also include amenities such as bathrooms, showers and dressing areas, without limitation. Providing 24-7 flight crew coverage can be achieved with the use of more than one set of flight crew on board, such as for example the use of 3 flight crew sets working 8.67 hours on, 15.33 hours off in rotation, with 20 minute before and after overlaps with preceding and succeeding crews on duty. Additional flight crew can come on board at selected stops, while other flight crews disembark for landside rest periods. Still other protocols for 24/7 coverage can build on precedents from crewing paradigms for hospitals and other emergency response systems. FIG. 1D shows a forward cross-section with a forward hull 54F having a bottom hydrodynamic planning surface 36P; and above these a series of decks 5 that are people decks 5P at plural levels 6. Propulsion system 26 elements that are visible include a combustion engine 26C that uses energy 27, a propulsor strut 28S, a propulsor nacelle 28N and a thruster 28T. Above the decks 5 there are compartments associated with encompassed lifting volume 9E containing lifting gas 9, with helium 11 in helium enclosures 11E above the decks 5 and below hydrogen 12 in hydrogen enclosures 12E.

FIG. 1E shows a middle cross-section corresponding to C-C on FIG. 1A, showing similar features to FIG. 1D but also now showing the left wing 61L and right wing 61R, with payload (cargo containers 43A) on the cargo deck 5C also being carried in a span-loaded portion 7S of the payload 7, optionally going into the wing volumes from the body volume as illustrated. Movement of cargo containers 43A is facilitated by use of a cargo transport corridor area 43T, as described earlier with reference to FIG. 1B. Payload 7 also can include passenger payload in people decks 5P and a flexible use deck 5F that are decks 5 at different levels 6. The uppermost deck 5 has a high ceiling especially outboard, and representative potable water tanks 92B are shown above the high ceiling that can then provide water to users in all the decks, including galleys and lavatories and showers etc., using primarily gravity feed and optionally pumped feed. Pairs of payload transfer transport modules 47 are also shown on either side of the vehicle, and these can be winched down to the water surface as pairs or singly, and then disconnected after landing from the partially aerostatically supported ram air cushion ship 1, to carry disembarking payload to a destination dock or pier, with internal power and control and/or connection to a tug vehicle such as a tugboat for providing the power and control needed to move and navigate to the destination dock or pier, for example and without limitation. One or more payload transfer transport modules 47 can be winched down and used in normal operations to enable one set of passengers and cargo to disembark at a port of call, while another set of passengers and cargo embark on one or more replacement payload transport modules 47 that are winched back up to mate with the underside of the partially aerostatically supported ram air cushion ship 1, in the configuration shown. For emergency or non-normal operations, the full complement of humans including passengers and crew, preferably can all be evacuated from the partially aerostatically supported ram air cushion ship 1 using a combination of the illustrated eight payload transport modules 47 and potentially also emergency evacuation barge(s) 47E and compact payload transfer transport module(s) 47C as shown earlier in FIG. 1B, while cargo is still left on board for possible subsequent recovery.

The aerostatic lift system shown in FIG. 1E illustrates a lower location 11L for helium 11 in a helium enclosure 11E, located below an upper location 12U for hydrogen 12 in a hydrogen enclosure 12E. This configuration enhances safety of people in accommodations below the helium enclosure 11E, providing physical separation from the hydrogen 12. Furthermore, in the event of an accidental leak or explosion involving hydrogen gas, that will naturally propagate upward and away from the location of people, in view of the fact that hydrogen is lighter (lese dense) than air and lighter than helium. FIG. 1E also shows ballonets 91 adjacent to a hydrogen enclosure 12E and also adjacent to a helium enclosure 11E, to enable variations in gas volume of lifting gas while maintaining pressure of lifting gas at a desired level or within a desired range of levels. The use of ballonets is known from the prior art of dirigibles and other airships. Note that when some portion of the hydrogen 12 that is used as a lifting gas, is exported through a fuel pipe to be used as a fuel for a thermodynamic cycle engine such as a gas turbine or as a fuel for a fuel cell, then the ballonets 91 can compensate for this hydrogen extraction from the hydrogen enclosure 12E.

FIG. 1E also illustrates that the ram air cushion 20 spans from under the central portion 3C of the body 3, to under the left and right wings 61L and 61R, up to the outer ends of the wings where outward leakage flow from the ram air cushion 20 is inhibited by wing tip fences 61T on either side of the vehicle. The bottom ends of the wing tip fences 61T are shown fitted with optional hydrodynamic planing surfaces 36P that are variable height hydrodynamic planing surface 36V, that can also incorporate suspension and shock absorption functionality for when they encounter big waves, for example and without limitation.

FIG. 1E thus illustrates a partially aerostatically supported ram air cushion ship 1, further comprising wing tip fences 61T at the left end of said left wing 61L and the right end of said right wing 61R. FIG. 1E also illustrates a partially aerostatically supported ram air cushion ship 1, wherein each said wing tip fence 61T has a downwardly deployable lower end to reduce wingtip leakage flow for geometric conditions with increased surface clearance below said lower end as caused by one or more of (i) a higher wingtip height for the higher wing in a vehicle bank angle condition and (ii) a trough between waves. FIG. 1E further illustrates a partially aerostatically supported ram air cushion ship 1, wherein each said wing tip fence 61T has a downwardly deployable suspension-mounted hydrodynamic lift member 36M comprising at least one of a hydroski 36S and a hydrodynamic planning surface 36P (shown) and a supercavitating hydrofoil 36HB and a subcavitating hydrofoil 36HA.

FIG. 1F shows an aft body cross section that further illustrates a cargo deck 5C as the lowest deck 5, and immediately above it a flexible use deck 5F. FIG. 1F also illustrates an aft portion 46A of the ram air cushion volume 46 with a transverse cross-sectional area 46X.

FIG. 1G is the aftmost cross-section illustrated, and is the cross-section at the aft longitudinal location where the horizontal tail 88H is located. A keel 20K that acts as a keel ventral stabilizer 88K is illustrated, which serves in parts as a ventral fin and ventral strake. Body side flaps 90S provide lateral constraint to the ram air cushion 20. The body side flaps 90S can incorporate members that translate up and down, and can optionally be narrow finger-like members that can better seal spanwise flow beneath the flap bottom and above the water surface 18 even if the water surface has undulations such as waves. The finger like members may also include flexible portions and air-blowing/air curtain portions as known from the prior art of hovercraft skirt design as applied to a PASRACS 1. A person 39 who is a passenger 40 is also shown as part of the payload 7 in a deck 5 at a level 6. Twin tail booms 88B are also shown which are structurally connected to twin vertical stabilizers (or vertical tails or fins) 88V, with rudders 90R at the trailing edge of the vertical stabilizers 88V. Near the lower ends of the vertical stabilizers 88V, there are installations of auxiliary power units (or APUs) 26A. The use of auxiliary power units is known from vehicle prior art, notably in commercial aircraft where the auxiliary power units utilize some kind of source energy such as fuel or hydrogen and convert that source energy into a usable form such as electrical energy, transmitted through wiring as electrical power to user systems in the vehicle and also optionally to user electrically powered propulsors or thrusters. Air to feed the APU may come from a fixed or deployable air scoop (not shown) or a boundary layer suction system with holes in a vehicle external skin surface. Exhaust from the APU may exit through fixed or openable exhaust ports or nozzles as known in the art. In the illustrated embodiment some of the thrusters 28T may be electrically powered, without limitation. The conversion process in the APU 26A may entail use of a combustion engine, fuel cell, and/or other energy conversion device. The type of APU 26A may also entail the use of one or more of a gas turbine engine, a piston engine, a diesel engine, a wankel rotary engine, an inside-out wankel rotary engine, a detonation engine, a pulse detonation engine, a rotating detonation engine, a continuous detonation engine, a turbocharger, a supercharger, a fuel injector and a combustor.

The following paragraphs will provide further descriptive material on the preferred embodiment shown in FIGS. 1A through 1G, which descriptive material can also apply to further variants of this preferred embodiment. The descriptive material will include various nominal numerical values and/or ranges of values, but it should be understood that the invention encompasses variant embodiments with other potential numerical values which may vary by multiple orders of magnitude, within the spirit and scope of the invention as described in the claims, figures and descriptive portion of the specification.

For the preferred embodiment of FIGS. 1A through 1G, the illustrated partially aerostatically supported ram air cushion ship 1 has a body 3 (which can also be considered to be a fuselage) and has a ship structure 2 that includes said body 3 as well as a wing 61 and a horizontal stabilizer (or tail) 88H and a vertical stabilizer (or tail) 88V. The ship structure 2 can utilize materials, components, parts, assemblies and structural architecture and structural design elements known from the prior art of vehicle structures including aircraft structures, marine vehicle structures such as ship structures, and ground vehicle structures. Structures can be designed and sized to sustain normal and nonnormal internal and external loads, and also be provisioned with hard points or hard zones to carry extra loads such as optional external stores, auxiliary and/or drop tanks (for water or fuel or other fluids), or modules or barges, for example and without limitation. Appropriate applications of structural joint architectures can include one or more of: bonded, riveted, welded, stir-welded, friction stir-welded, brazed, bolted, one-side fastener connected, and linear-connected (e.g., zippered) joint architectures and designs. Portions of the structure that might encounter impact loads, such as the forward portions of the hulls 54 that might encounter impacts from floating debris or flotsam, a log, a floating dead fish or sea mammal etc., can employ impact resistant and impact absorbing structural architectures and features that leverage prior art technologies from vehicle design, bumper design, locomotive cow-catcher design and other weight-effect and cost-effective impact capable structures. The PASRACS 1 will be fitted with systems for the detection and management of structural faults and failures, including one or more selected from: an overload failure, a crippling failure, a crack, a buckling failure, a shear failure, a bending failure, a compression failure, a tension failure, a fatigue failure, an aeroelastic effects failure including divergence and flutter, a composite structure failure including delamination and interlaminar failure, and a sandwich structure failure.

The partially aerostatically supported ram air cushion ship 1 is shown in a representative transition mode of operation with a positive airspeed 24 moving along a travel path 24T, wherein the airspeed 24 is below a full flight in ground-effect airspeed and hence the weight of the partially aerostatically supported ram air cushion ship 1 in this transition mode is supported by a combination of a hydrostatic lift force 17 and a hydrodynamic lift force 36 in addition to an aerostatic lift force 10 and an aerodynamic lift force 25 that is associated with a ram air cushion 20 below said partially aerostatically supported ram air cushion ship 1 and above an Earth surface 21 that is illustrated as a water surface 18, in FIG. 1A. The aerostatic lift force 10 is created with use of a lifting gas 9 in an encompassed lifting volume 9E, where the lifting gas may be helium 11 and/or hydrogen 12 in certain species of this preferred embodiment, as shown in FIG. 1E. The hydrostatic lift force 17 is created with the use of a hull member when it displaces water below a water surface 18, such as the aft hull member 54A shown in FIG. 1A. The hydrodynamic lift force 36 is created when a hydrodynamic lift member 36M moves through water with a nonzero velocity and wherein the hydrodynamic lift member lower surface is inclined so as to downwardly deflect water that is encountered, as shown in FIG. 1A. The body 3 has a centerline longitudinal shape as seen in FIG. 1A, that is an aerodynamic shape such as the illustrated modified Clark Y airfoil section with approximately 25% t/c or thickness to chord ratio. The body 3 acts as a lifting body when the vehicle is in flight in ground effect, contributing aerodynamic lift. In plan view as shown in FIG. 1B, the body 3 is seen to have a central region with substantially constant chord, in the region spanwise between the two vertical tails 88V. On either side of this central region, the body 3 is illustrated with aerodynamically smooth planform left and right lateral contours, each of which is approximately a half contour from a Gottingen 776 25% t/c or thickness to chord ratio symmetrical airfoil shape. The use of thicker airfoil shapes in both side and plan view is beneficial in allowing the body 3 to have aerodynamically desirable properties with minimal flow separation and associated drag, while maximizing the volume within the body 3 for use for both encompassed lifting volume 9E for aerostatic lifting gas 9 and for payload volume 4, as illustrated. It will be understood that different body 3-dimensional surface contour shapes can be developed using known methods in the art of optimizing aerodynamic body shapes for usable volume maximization along with ground-effect aerodynamic lift-to-drag ratio optimization and weight minimization for the partially aerostatically supported ram air cushion ship 1. It will also be readily understood that the use of plural decks 5 to carry payload 7 enables large efficiency gains and increases in figures of merit such as total payload deck area divided by total vehicle wetted area, and total payload deck area divided by total vehicle volume, while still leaving substantial internal volume for encompassed lifting volume 9E for lifting gas 9 providing aerostatic lift to help support the weight of the partially aerostatically supported ram air cushion ship 1.

The illustrated wing 61 includes a left wing 61L and right wing 61R, which are shown with modified Clark Y airfoils and 18% t/c or thickness to chord ratio, and with representative 3 degrees incidence angle relative to the body 3 so that these wings will be operating at a higher lift coefficient even when the body 3 is at zero or low angle of attack relative to the Earth surface 21 that is illustrated as a water surface 18, in FIG. 1A. A part of the ship structure 2 is the structure of the wing 61, and can include structural spars 2S, with 3 spars illustrated and not construed to be limiting. Note that prior art wing box structural architectures with one or more of a front spar, middle spar(s), rear spar, ribs and stringers can be accommodated in wing structural architecture in the ship structure 2, in variant embodiments of the invention. The illustrated structural spars 2S include flange elements forward and aft of a cargo payload volume in the outboard portions of the wing 61, and these structural spars 2S are structurally connected to near-planar structures 2P that carry loads across the body 3, wherein the near-planar structures 2P can preferably include at least two of (i) below the cargo deck 5C, (ii) above the cargo deck 5C, and (iii) above the flexible use deck 5F. The ram air cushion 20 encompasses spaces below both the body 3 and the left wing 61L and right wing 61R, as illustrated. The aft edges of the ram air cushion 20 comprise the trailing edge regions appropriate for the well-known aerodynamic Kutta condition (a) under downwardly deployable body side flaps 90S that run along the aft left edge 85L and aft right edge 85R of the body 3 wherein the lateral distance between the aft left edge 85L and aft right edge 85R reduces in an aftward direction, and (b) under the trailing edges of downwardly deployable flaps 90F at the back ends of the left wing 61L and right wing 61R. Lateral leakage flow from the ram air cushion 20 is minimized through the use of wing tip fences 61T that reduce the available height for leakage flow between the bottom ends of the wing tip fences 61T and the Earth surface 21 that is illustrated as a water surface 18.

The illustrated propulsion system 26 uses thirty thrusters 28T such as thrusting fans (which may be propellers and/or unducted fans and/or ducted fans and/or augmentor fans), of which some also serve to pressurize the ram air cushion 20 for takeoff and landing flight phases of the partially aerostatically supported ram air cushion ship 1. Varying numbers and types of thrusters can be utilized in variant embodiments of the invention, as needed to balance or overcome drag force 141, that can include both aerodynamic drag (with components such as skin friction or parasite drag, laminar drag, turbulent drag, induced drag associated with aerodynamic lift, form drag, profile drag, trim drag, excrescence drag and compressibility wave drag) and hydrodynamic drag (with components such as hull drag, skin friction drag, laminar drag, turbulent drag, wave making resistance, wave drag, spray drag, planing drag, step drag, hump drag, induced drag and excrescence drag). It will be understood that a partially aerostatically supported ram air cushion ship 1 or PASRACS 1 can incorporate aerodynamic drag reduction features and technologies and hydrodynamic drag reduction features and technologies to reduce the total thrust that is required to be provided by the propulsion system 26. Examples of such features and technologies known from the art of aircraft and marine craft design include, without limitation: skin friction reduction with natural laminar flow, skin friction reduction with hybrid laminar flow, skin friction reduction with riblets, skin friction reduction with sharkskin surfacing, skin pores for suction, skin pores for blowing, vortex generators to inhibit flow separation, span load optimization to reduce lift-induced drag, detailed surface features design to reduce excrescence drag, hull loft optimization to minimize hydrodynamic drag, step design to minimize hydrodynamic drag and enable vehicle rotation for takeoff, air injection for hull drag reduction, bubble injection for hull drag reduction, optimization of planing surface lofts for drag reduction & lift optimization, optimization of hydroski lofts for drag reduction & lift optimization, optimization of hydrofoil lofts for drag reduction & lift optimization, and optimization of combined hydrofoil and hydroski lofts for drag reduction & lift optimization.

The ram air cushion 20 when pressurized at least in part by a thruster 28T, becomes by definition a power-augmented ram air cushion 20P. A thruster 28T may be structurally connected to propulsor nacelle 28N that in turn is structurally connected to primary ship structure 2 of the partially aerostatically supported ram air cushion ship 1 through a propulsor strut 28S, as shown in FIG. 1D. Power to drive the thruster may come from an electric motor and/or a fuel cell and/or a heat engine (such as a combustion engine 26C) that may burn a fuel such as hydrogen from a lifting gas module and/or a separate gaseous or cryogenic liquid hydrogen tank, and/or a hydrocarbon fuel such as a biofuel that may be sourced from plant material such as algae or jatropha without limitation. A heat engine may be of a variety of thermodynamic cycles such as the Brayton Cycle (e.g. gas turbine), Otto Cycle or Diesel Cycle (e.g. including piston engine or Wankel engine), Rankine Cycle (steam engine) and/or other thermodynamic cycles known in the art of heat engines (Stirling Cycle, Humphrey Cycle, Carnot Cycle and others). A heat engine such as a combustion engine 26C may incorporate performance enhancement features and technologies such as at least one of: turbocharging, supercharging, water injection, intercooling, a topping cycle, and afterburning, within the spirit and scope of the invention.

The horizontal stabilizer (or tail) 88H is fitted with a controllable control surface that is an elevator 90E, which when deflected trailing edge down will cause an increase in lift on the horizontal stabilizer 88H, which increase in lift has a larger quantitative value because of the aerodynamic ground effect with the horizontal stabilizer 88H being not too high relative to the Earth surface 21 that is illustrated as a water surface 18. The air flow below the horizontal stabilizer 88H will also be a ram air cushion in this situation, with an aerodynamic Kutta condition below the trailing edge of the downwardly deflected elevator 90E in this scenario. The increase in lift on the horizontal stabilizer 88H can contribute one or more of lift augmentation, heave control, pitch control and pitch trim, as known in the art of air vehicle aerodynamic lift, control and trim. Optional dual vertical stabilizers 88V are shown, wherein each illustrated vertical stabilizer 88V is fitted with a rudder 90R, and left or right trailing edge deflections of the rudder 90R can cause left or right yawing moments to act on the partially aerostatically supported ram air cushion ship 1. While symmetric airfoils are illustrated for both horizontal and vertical stabilizers in the preferred embodiment of FIGS. 1A through 1G, variant embodiments may utilize asymmetric airfoils with nonzero camber. Stabilizer trim systems may optionally be provided to enable adjustable stabilizer incidence angles relative to the body 3.

The preferred embodiment of the partially aerostatically supported ram air cushion ship (PASRACS) 1 shown in FIGS. 1A through 1G must be designed to meet all requirements and to meet some of the objectives specified for the vehicle and its operation. As known in the art of vehicle design, the term "requirements" are to be construed to refer to parameters or attributes that must be fully satisfied such as safety requirements and certification requirements, while the term "objectives" are to be construed to refer to parameters or objectives that are captured as desirable, but may be traded off relative to other objectives to enable balanced achievement of one or more objective functions or measures of merit. Requirements may be published in one or more of a certification document/standard, a safety document/standard, and a requirements document/standard. Some examples of requirements and objectives that could apply can be found in a publication of the International Maritime Organization MSC.1/Circ. 1592 Guidelines for WIG Craft, where WIG stands for Wing-in-Ground effect. This set of Guidelines treats requirements and objectives across many known areas of vehicle requirements and objectives including:

- Buoyancy, stability and subdivision
- Structures
- Accommodation and escape measures
- Directional, attitude and altitude control systems
- Anchoring, towing and berthing
- Fire safety
- Life-saving appliances and arrangements
- Machinery
- Auxiliary systems
- Remote control, alarm and safety systems
- Electrical installations
- Navigational equipment
- Radiocommunications
- Operating compartment layout
- Aerodynamic stabilization systems
- Handling, controllability and performance
- Operational provisions
- Inspection and maintenance provisions
- Safety assessment and safety management (including: Use of probability concept; Safety assessment for WIG craft systems; Safety management)
- Form of Wing-in-ground Craft Safety Certificate and Record of Equipment
- Form of Permit to Operate WIG Craft
- Ice accretion applicable to all types of craft
- Methods relating to the intact stability investigation of hydrofoil assisted wing-in-ground craft
- Residual stability
- Criteria for testing and evaluation of revenue and crew seats
- Open reversible liferafts
- Procedures for demonstration of operational safety Preferred embodiments of the partially aerostatically supported ram air cushion ship (PASRACS) 1, as described and claimed herein, can be designed, engineered and built to meet applicable requirements along with appropriate balanced partial achievements of objectives as described above.

For the embodiment of FIGS. 1A through 1G, the illustrated partially aerostatically supported ram air cushion ship 1 has a very large size, and the following representative data indicate this large size and representative associated parameters, without limiting the invention as claimed and described herein:

| | | |
|---|---|---|
| Plan View Body Area | 1,252,000 | sq. ft. |
| Plan View Area Wings | 187,150 | sq. ft. |
| Effective Wing Area | 1,439,150 | sq. ft. |
| Body width | 730 | ft. |
| Vehicle Width = Total Wing Span | 1,600 | ft. |
| Wing Effective Mean Chord | 899 | ft |

Note that the wing effective mean chord is equal to the effective wing area divided by the wing span.

Geometric Wing Aspect Ratio (AR) 1.779

Note that geometric wing aspect ratio is defined as the ((wing span)2)/(effective wing area) It is well understood in the art that the effective wing aspect ratio for a wing flying in ground-effect (IGE) can be substantially greater than the geometric AR, because the wing tip leakage flow associated with lift is constrained to flow outward through a much-constrained height beneath a wing tip fence 61**T, and because with the in-ground-effect (IGE) aerodynamic flow can be modelled by an imaginary "mirror" vehicle reflected underneath the ground plane. Effective aspect ratio will be discussed further later, in the context of induced drag analysis.

| | |
|---|---|
| Wing Max Chord | 2,292 ft |

Note that the wing max chord is equivalent to the vehicle length excluding the cockpit and tail elements of the vehicle (which are included in the Vehicle Length), because the lifting body can be considered a part of the effective wing.

| | | |
|---|---|---|
| Vehicle Length | 2,603 | ft |
| Body wetted area | 4.00 | million sq. ft. |
| Overall vehicle wetted area | 5.165 | million sq. ft. |
| Body volume | 540. | million cu. ft. |
| Lifting volume | 250. | million cu. ft. |

For an approximate assumption of 0.07 lb aerostatic lift/cu.ft, of lifting gas based on an average of hydrogen lift and helium lift in representative operational conditions:

| | |
|---|---|
| Approximate aerostatic lift | 17.5 million lb. |
| Approximate vehicle overall empty weight (OEW) | 16 million lb. |

This OEW assumes appropriate use of lightweight materials, architectures and structures and systems designs optimized to keep weight sufficiently low, leveraging technical knowledge from the state of the art of vehicle designs pertaining to vehicles in general and weight-sensitive aircraft in particular.

| | |
|---|---|
| Approximate full payload weight | 27 million lb. |
| Approximate liquid fuel weight | 2 million lb. |

Note that liquid fuel could be a hydrocarbon fuel such as jet fuel or biofuel or liquid hydrogen, and that this liquid fuel weight excludes hydrogen lifting gas weight wherein hydrogen lifting gas can also optionally be used as fuel through the course of a trip of a PASRACS. Note that the lifting volume of 250 million cu.ft. may optionally be around half hydrogen and half helium in different lifting envelopes as will be described further below, and that 1000 cu.ft, hydrogen gas ($H_2$) weighs around 5.21 lb and provides around 73, lb of aerostatic buoyant lift in representative operational conditions. The representative "full payload" weight of 27 million pounds is based on 632 cargo containers (1264 TEU) and 50,000 passengers at representative filled container density of around 9 pounds per cubic foot and representative passenger weight including carry-on baggage of 285 pounds per passenger.

| | |
|---|---|
| Nominal Maximum Takeoff Weight (MTOW) | 45 million lb. |

Note that with these representative numbers, aerostatic lift is around 39% of nominal MTOW, and so the remaining 61% of nominal MTOW in the event of a maximum takeoff weight condition during takeoff, must be balanced with a combination of aerodynamic lift (e.g., ram air cushion under the vehicle operating in ground-effect) and hydrodynamic and hydrostatic lift.

| | |
|---|---|
| Normal cruise speed | 250 miles per hour (mph) |
| Maximum cruise speed | 280 mph |

This representative maximum cruise speed corresponds approximately to indicated airspeed (IAS) of 245 knots, which is below the 250 knots airspeed limit below 10,000 feet altitude that is regulated by the FAA in United States airspace.

At the nominal cruise speed of 250 mph or 366.7 ft/sec, drag is estimated as follows, with assumptions of surface skin friction drag coefficient of 0.00137 and effective aspect ratio in ground-effect of 6:

| | |
|---|---|
| Cruise parasite/skin friction drag | 1,130,000 lb |
| Cruise lift induced drag | 173,000 lb |
| Total cruise drag | 1,303,000 lb |
| Aerodynamic lift/drag ratio | 21.1 |
| Vehicle overall lift/drag ratio | 34.5 |

It should be understood that all these numbers are nominal estimates for a described preferred embodiment of the invention, and should not be construed to limit the invention as described and claimed.

In a takeoff, once the PASRACS 1 is clear of the water, the nominal MTOW needs to be matched by just aerostatic and aerodynamic lift, with the needed 27.5 million lb, of aerodynamic lift corresponding to a liftoff speed (wherein hydrodynamic lift from elements such as hydroskis and/or hydrofoils and/or planing surfaces goes down to zero) of 86.4 mph (126.7 ft/sec) at a nominal lift coefficient of 1.0 flight in close ground-effect, denominated by the effective wing area. The aerodynamic lift force 25 of the PASRACS 1 includes aerodynamic lift components from the wing 61, body 3, and horizontal stabilizer 88H. Note that due to square-cube law effects, the use of very large vehicle size for a partially aerostatically supported ram air cushion ship (PASRACS) 1 allows the use of multiple decks for ultra-comfortable passenger accommodations and amenities while still leaving volume for substantial aerostatic lifting gas, and maintaining really very good metrics for passenger vehicle figures of merit such as wetted area per passenger, a figure of merit known in the art to be important to minimize to reduce aerodynamic skin friction drag or parasite drag. The square-cube law effects will be detailed further with reference to FIG. 11A subsequent. For the representative numbers noted above, wetted area per passenger is approximately 103 sq.ft, per passenger, similar in magnitude as for a representative intercontinental service airliner like the A380 that has a wetted area per passenger of approximately 120 sq.ft, per passenger (Ref. 5, Ref. 6). Aerodynamic skin friction drag per passenger for PASRACS will be much lower than for an airliner due to the lower cruise speed (drag scales with speed squared) and lower dynamic pressure, while comfort and amenities will be tremendously better as will be seen from the drawings and descriptive portion and claims of the PASRACS invention herein presented.

It should be noted that the "full payload" noted above is between typical payload quantities for state-of-the-art jet airliners and transoceanic ships, while the cruise speed is also between typical cruise speeds of jet airliners and transoceanic ships. At the nominal cruise speeds noted above it should be possible for a single partially aerostatically supported ram air cushion ship 1 to circumambulate the World in one week, while stopping at many stops to board and deboard payload at those stops that serve as origins and destinations. Examples of the "many stops" possibly numbering into the regime of multiple dozens or more, will be described further with reference to FIGS. 16A through 16G following, that show World circumambulation routes with a majority of flight lengths over water but also with limited flight over designated land segments, such as a Red Sea to Mediterranean Sea segment over Egypt and a Caribbean Sea to Pacific Ocean segment crossing over Costa Rica and Nicaragua, for example and without limitation. It follows that a fleet of partially aerostatically supported ram air cushion ships 1 (PASRACS) could serve destinations around the World while providing economical, safe, and fast transportation for large numbers of passengers as well as large quantities of cargo/freight/baggage.

While some representative numerical values have been cited in the context of the preferred embodiment shown in FIGS. 1A through 1G, it should be understood that the invention can encompass variant embodiments with other potential numerical values with wide variation ranges for all parameters, including potential variations by multiple orders of magnitude, within the spirit and scope of the invention as described in the claims, figures and descriptive portion of the specification.

FIGS. 1A, 1B, 1C, 1D, 1E, 1F and 1G collectively illustrate a partially aerostatically supported ram air cushion ship 1, comprising in combination: a ship structure 2 incorporating a body 3 with a payload volume 4 with plural decks 5 at plural levels 6 for carrying payload 7; said ship structure 2 connected to a lifting gas enclosure 8 (shown in FIG. 1D) configured to contain a lifting gas 9 (shown in FIG. 1D) providing an aerostatic lift force 10 (shown in FIG. 1D for the hydrogen enclosure illustrated) acting on said ship 1, said lifting gas 9 comprising at least one of helium 11, hydrogen 12 and a low-density lifting gas 13 with density lower than that of an atmosphere 14 immediately outside said ship 1; a hydrostatic floatation subsystem 15 (shown in FIG. 1A) comprising a water displacing structure 16 connected to said ship structure 2, said water displacing structure 16 configured to provide a hydrostatic lift force 17 acting on said ship 1 in a period of time when said water displacing structure 16 is displacing a water volume below a water surface 18 below said atmosphere 14; an aerodynamic lift subsystem 19 comprising a ram air cushion 20 when said ship 1 has positive airspeed 24, said ram air cushion 20 below a lower surface 1L of the ship 1 and above an Earth surface 21, wherein said aerodynamic lift subsystem 19 comprising said ram air cushion 20 is configured to contribute an aerodynamic lift force 25 acting on said ship 1 when said ship 1 has said positive airspeed 24; a propulsion system 26 capable of using energy 27 to generate a thrust force 28 acting on said ship 1; and a vehicle control and navigation system 29 configured to enable said ship 1 to move and maneuver on a travel path 24T; wherein weight 33 of said partially aerostatically supported ram air cushion ship 1 is substantially balanced by a combination of said aerostatic lift force 10 and said hydrostatic lift force 17, when said ship 1 is in a substantially stationary mode 34 (not the mode illustrated in FIG. 1A) on said water surface 18; wherein the weight 33 of said partially aerostatically supported ram air cushion ship 1 is substantially balanced by a combination of said aerostatic lift force 10 and said aerodynamic lift force 25, when said partially aerostatically supported ram air cushion ship 1 is in a flight in ground-effect mode 35 (not the mode illustrated in FIG. 1A); and wherein the weight 33 of said partially aerostatically supported ram air cushion ship 1 is substantially balanced by a combination of said aerostatic lift force 10 and said aerodynamic lift force 25 and at least one of said hydrostatic lift force 17 and a hydrodynamic lift force 36, when said partially aerostatically supported ram air cushion ship 1 is in a transition mode 37 (illustrated in FIG. 1A) comprising a landing transition mode 37L.

It should be understood that payload 7 could comprise one or more of passengers and crew and baggage and cargo. The ram air cushion 20 is in part under the wing 61 and serves to contribute a portion of the aerodynamic lift force 25 acting on the wing 61 when it is operating in a wing in ground effect flight mode. A substantially stationary mode 34 could occur when the partially aerostatically supported ram air cushion ship 1 or PASRACS 1 is floating on a water surface 18 in a port region for normal operations to load and unload payload, or floating on a water surface 18 for non-normal operations such as emergency evacuation, following an emergency water landing or controlled ditching maneuver.

It should be understood that a transition mode 37 could comprise either a landing transition mode 37L (as illustrated in FIG. 1A) or could alternatively be a takeoff transition mode 37T. As known in the art of aircraft equipped with flaps, flap deflections may be lower for a takeoff transition mode of a PASRACS type of vehicle with associated high values of lift to drag ratio, than for landing transition mode where higher lift coefficient can be obtained with greater flap deflection to enable lower landing speed, notwithstanding higher drag coefficient typically associated with greater flap deflection for the landing transition case.

FIGS. 1A, 1B, 1C, 1D, 1E, 1F and 1G also collectively illustrate a partially aerostatically supported ram air cushion ship 1, comprising in combination: a body 3 configured to accommodate payload 7, said body 3 encompassing (i) a cabin 38 configured to accommodate persons 39 comprising at least one of passengers 40 and crew 41 and (ii) a cargo volume 42 configured to accommodate at least one of baggage 44 and cargo 43; and (iii) a lifting gas enclosure 8 configured to contain a lifting gas 9 providing an aerostatic lift force 10 acting on said ship 1, said lifting gas 9 comprising at least one of helium 11, hydrogen 12 and a low-density lifting gas 13 with density lower than that of an atmosphere 14 immediately outside said ship 1; a hydrostatic floatation subsystem 15 comprising a water displacing structure 16 connected to said body 3, said water displacing structure 16 configured to provide a hydrostatic lift force 17 acting on said ship 1 when said water displacing structure 16 is displacing a water volume below a water surface 18 below said atmosphere 14; a propulsion system 26 capable of using energy 27 to generate a thrust force 28 acting on said ship 1; a left catamaran sidewall 45L and a right catamaran sidewall 45R both connected to said body 3 and defining at least one ram air cushion volume 46 that is beneath said body 3, above an Earth surface 21 and at least in part between said left and right catamaran sidewalls 45L and 45R, wherein said ram air cushion volume 46 is configured to decrease in transverse cross-sectional area 46X (shown in diagonal hash line area in FIG. 1F) moving aft from a forward portion 46F of said ram air cushion volume 46 to an aft portion 46A of said ram air cushion volume 46; an aerodynamic lift subsystem 19 utilizing said ram air cushion volume 46 configured to create a ram air cushion 20 providing aerodynamic lift force 25 acting on said body 3 when said ship 1 has a positive airspeed 24, propelled by said propulsion system 26; and at least one payload transfer transport module 47 configured to receive disembarking payload 7D comprising at least a partial subset of said passengers 40 and said baggage 44 and said cargo 43 from at least one of said cabin 38 and said cargo volume 42, and said payload transfer transport module 47 further configured to separate from said ship 1 and carry said disembarking payload 7D from said ship 1 starting at a transfer time 48.

FIGS. 1A, 1B, 1C, 1D, 1E, 1F and 1G also collectively illustrate a partially aerostatically supported ram air cushion ship 1, comprising in combination: a body 3 configured to accommodate payload 7, said body 3 encompassing (i) a cabin 38 configured to accommodate persons 39 comprising at least one of passengers 40 and crew 41 and (ii) a cargo volume 42 configured to accommodate at least one of baggage 44 and cargo 43 and (iii) a lifting gas enclosure 8 configured to contain a lifting gas 9 providing an aerostatic lift force 10 acting on said ship 1; wherein said a central portion 3C (shown in FIG. 1E) of said body 3 is encompassed by a body lower surface 3LS spanning above a ram air cushion volume 46 located between said body 3 and an Earth surface 21, a body left side surface 3L, a body right side surface 3R and a curved body top surface 3T connecting said body left side surface 3L and body right side surface 3R and wrapped around an upper boundary 8U of said lifting gas enclosure 8; wherein said ram air cushion volume 46 is bounded on upper left and right sides by side flaps 90S in a region beneath an aft body 3A portion of said body 3; a propulsion system 26 capable of using energy 27 to generate a thrust force 28 acting on said ship 1; wherein said ram air cushion volume 46 is configured to decrease in transverse cross-sectional area 46X (shown in diagonal hash line area in FIG. 1F) moving aft from below said central portion 3C to below said aft body 3A; an aerodynamic lift subsystem 19 utilizing said ram air cushion volume 46 configured to create a ram air cushion 20 providing aerodynamic lift force 25 acting on said body 3 when said ship 1 has a positive airspeed 24, propelled by said propulsion system 26; and an aerostatic lift subsystem utilizing said aerostatic lift force 10 provided by said lifting gas 9. Note that the side flaps 90S can include fixed and/or movable panel members, wherein movable panel members if used can include movement by translation and/or rotation. FIGS. 1A, 1B. 1C. 1D, 1E, 1F and 1G also collectively illustrate partially aerostatically supported ram air cushion ship 1, further comprising a keel ventral stabilizer 88K in said ram air cushion volume 46 in said transverse cross-sectional area 46X below said aft body 3A, wherein said keel ventral stabilizer 88K separates said ram air cushion volume 46 into left and right portions and contributes to at least one of a roll stability contribution and a yaw stability contribution acting on said partially aerostatically supported ram air cushion ship 1 with said positive airspeed 24. In loading and normal or non-normal operational conditions when the keel 20K that acts as a keel ventral stabilizer 88K penetrates below the local water surface 18 (which may also be nonlevel with waves), the keel 20K also serves in a contributing capacity as a hull 54.

The preferred embodiment as illustrated in and described with reference to FIGS. 1A, 1B, 1C, 1D, 1E, 1F and 1G, with particular reference to FIG. 1E, shows a partially aerostatically supported ram air cushion ship 1, wherein said ship structure 2 is connected to plural lifting gas enclosures 8 comprising at least one helium enclosure 11E in a helium encompassing volume 11V and at least one hydrogen enclosure 12E in a hydrogen encompassing volume 12V, and wherein said helium encompassing volume 11V is configured with a location 11L being below said hydrogen encompassing volume 12V and with said location 11L being above said payload volume 4, and wherein said hydrogen encompassing volume 12V is configured with an upper location 12L being noncontiguously above said payload volume 4. A safety benefit of configuring the hydrogen encompassing volume to be above the helium encompassing volume is that in the event of any possible localized accident involving the hydrogen (for example and without limitation such as a localized gas containing envelope rupture combined with ignition of a hydrogen fire as hydrogen escapes into the atmosphere and encounters oxygen in the air in the atmosphere), the localized accident is spatially separated from the payload volume 4 by the helium encompassing volume 11V which acts as an intermediate spatial buffer, and with the localized hydrogen accident spewing upward rather than downward as hydrogen is a lighter-than-air gas.

The preferred embodiment as illustrated in and described with reference to FIGS. 1A, 1B, 1C, 1D, 1E, 1F and 1G, with particular reference to FIG. 1B and FIG. 1A, shows a partially aerostatically supported ram air cushion ship 1, wherein said ram air cushion 20 comprises a ram air pressurized region 83 spanning from (i) a left region 83L under a left wing 61L forward of a left trailing edge 84L of the left wing 61L, through (ii) a central region 83C under the body 3 of said partially aerostatically supported ram air cushion ship 1 and forward of an aft left edge 85L and an aft right edge 85R of an aft portion 85 of the body 3, and to (iii) a right region 83R under a right wing 61R forward of a right trailing edge 84R of the right wing 61R, when said partially aerostatically supported ram air cushion ship 1 is moving on said travel path 24T with said positive airspeed 24.

The preferred embodiment as illustrated in and described with reference to FIGS. 1A, 1B, 1C, 1D, 1E, 1F and 1G, with particular reference to FIG. 1B and FIG. 1A, also shows a partially aerostatically supported ram air cushion ship 1, wherein said hydrostatic floatation subsystem 15 comprises at least three hull members 54H, comprising a left hull member 54L on a left side of said partially aerostatically supported ram air cushion ship 1, a right hull member 54R on a right side of said partially aerostatically supported ram air cushion ship 1, and at least one of an aft hull member 54A in an aft region of said partially aerostatically supported ram air cushion ship 1 and a forward hull member 54F in a forward region of said partially aerostatically supported ram air cushion ship 1.

The preferred embodiment as illustrated in and described with reference to FIGS. 1A, 1B, 1C, 1D, 1E, 1F and 1G, with particular reference to FIG. 1B and FIG. 1A, also shows a partially aerostatically supported ram air cushion ship 1, wherein said propulsion system 26 comprises plural energy conversion devices 26E that are configured to transfer drive energy 26D to drive plural fluid thrusting effectors 86. An example of an energy conversion device 26E is a thermodynamic cycle engine such as a gas turbine engine, without limitation.

Other examples of an energy conversion device 26E could be a piston engine, a rankine engine, a sterling engine, a wankel engine, or a fuel cell. An example of a component to transfer drive energy 26D is a drive shaft. An example of a fluid thrusting effector 86 that acts on air and/or water can be any one of: a propeller, an unducted prop, a ducted prop, a fan, an unducted fan, a ducted fan, a ring fan, a geared fan, an augmentor fan, a water propeller, a waterjet, and an azipod thruster, wherein some of these will be further presented subsequently.

The preferred embodiment as illustrated in and described with reference to FIGS. 1A, 1B, 1C, 1D, 1E, 1F and 1G, with particular reference to FIGS. 1C, 1E and 1G, also shows a partially aerostatically supported ram air cushion ship 1, wherein said plural decks 5 at plural levels 6 for carrying payload 7 include (i) a people deck 5P with a cabin 38 configured to accommodate persons 39 comprising passengers 40 and crew 41 and (ii) a cargo deck 5C with a cargo compartment 73C configured to accommodate at least one of cargo 43 and baggage 44.

The preferred embodiment as illustrated in and described with reference to FIGS. 1A, 1B, 1C, 1D, 1E, 1F and 1G, also shows a partially aerostatically supported ram air cushion ship 1, further comprising a keel 20K below said body 3 with a majority of a length dimension of said keel length being located below an aft portion of said body 3, wherein said keel 20K separates a left ram air cushion portion 46L from a right ram air cushion portion 46R both of which are parts of said ram air cushion volume 46 that is beneath said body 3, and wherein said keel contributes to at least one of roll stability and yaw stability of said partially aerostatically supported ram air cushion ship 1 at said positive airspeed 24. It should be noted that water contacting members such as one or more of the following can also contribute to one or more of roll stability, yaw stability, and pitch stability: a hull 54, a hydrodynamic planing surface 36P, a hydroski 36S, a hydrofoil 36H, a combined hydrofoil and hydroski 36HS, a step 36T, and any other water contacting member on the PASRACS 1.

The preferred embodiment as illustrated in and described with reference to FIGS. 1A, 1B, 1C, 1D, 1E, 1F and 1G, also shows a partially aerostatically supported ram air cushion ship 1, wherein an encompassed lifting volume 9E of said lifting gas 9 is configured to be at least 25% of an encompassed vehicle volume 1E of said partially aerostatically supported ram air cushion ship 1. It should be noted that for a sufficiently large PASRACS 1 such as that illustrated, the required internal volume to accommodate a maximum weight-limited payload will be less than 75% of encompassed vehicle volume, which implies that the at least 25% of encompassed vehicle volume can be used to accommodate lifting gas with no wetted area or aerodynamic skin friction drag penalty at the vehicle level.

The preferred embodiment as illustrated in and described with reference to FIGS. 1A, 1B, 1C, 1D, 1E, 1F and 1G, with particular reference to FIG. 1E, also shows a partially aerostatically supported ram air cushion ship 1, wherein a transverse cross-section 46FX of said partially aerostatically supported ram air cushion ship 1, at a longitudinal location corresponding to a forward portion 46F of said ram air cushion volume 46, is characterized by (i) a left wing 61L, (ii) said left catamaran sidewall 45L, (iii) a central portion 3C of said body 3, (iv) said right catamaran sidewall 45R, and (v) a right wing 61R; wherein said a central portion 3C of said body 3 comprises a body lower surface 3LS above said ram air cushion volume 46, a body left side surface 3L, a body right side surface 3R and a curved body top surface 3T connecting said body left side surface 3L and body right side surface 3R and wrapped around an upper boundary 8U of said lifting gas enclosure 8. Note from FIG. 1B that the ram air cushion volume 46 is a volume of air under the partially aerostatically supported ram air cushion ship (PASRACS) 1, which volume of air serves as an air cushion contributing supporting lift force on the ship by having air pressure higher than the ambient air pressure of the outside atmosphere at some distance separated from the PASRACS; and wherein the ram air cushion volume 46 is laterally constrained by a plurality of members selected from: (a) body side flaps 90S on left and right sides of the body 3, (b) the left catamaran sidewall 45L and right catamaran sidewall 45R, and (c) wing tip fences 61T at the outer ends of the left wing 61L and right wing 61R. The plurality of members for lateral flow constraint will preferably be controlled by a high lift control system, in conjunction with members for rear constraint of the air cushion that further include a plurality of rear constraint members selected from: flaps 90F on the left wing 61L and right wing 61R, and at least one body flap 90B. Control settings implemented by the high lift control system can control the pressure field under the partially aerostatically supported ram air cushion ship (PASRACS) 1 so as to provide a targeted amount of lift as well as to provide at least one of pitching moment and rolling moment and yawing moment, that can be created through the use of appropriate control laws and commands to yield tailored pressure distributions in the air cushion.

The preferred embodiment as illustrated in and described with reference to FIGS. 1A, 1B, 1C, 1D, 1E, 1F and 1G, with particular reference to FIGS. 1B and 1A and 1F, also shows a partially aerostatically supported ram air cushion ship 1, wherein an aft body 3A of said partially aerostatically supported ram air cushion ship 1 includes a body lower surface 3LS and downwardly deployable body flaps 90B at left and right ends of said body lower surface 3LS, inwardly tapering surfaces for body left side surface 3L and body right side surface 3R in an aftward direction 21A on said aft body 3A, and a curved body top surface 3T connecting said body left side surface 3L and body right side surface 3R and wrapped around an upper boundary 8U of said lifting gas enclosure 8.

The preferred embodiment as illustrated in and described with reference to FIGS. 1A, 1B, 1C, 1D, 1E, 1F and 1G, with particular reference to FIG. 1E, also shows a partially aerostatically supported ram air cushion ship 1, wherein said ram air cushion 20 providing aerodynamic lift force 25 acting on said body 3, provides span-loaded support 83S for a span-distributed portion 7S of said payload 7, with said span-loaded support 83S spanning from left to right sides of at least one of said forward portion 46F and said aft portion 46A of said ram air cushion volume 46. It is well known from the art of aerodynamically supported vehicle design that the use of span-loaded payload can reduce structural loads such as wing root bending moment, and can accordingly reduce structural gages and reduce empty weight of such aerodynamically supported vehicles. It will be evident from FIG. 1B that the planform shape of the area with the ram air cushion 20 includes a forward area with a large span that spans from under the left wing 61L through under the forward body 3F and center portion 3C to under the right wing 61R, and further includes an aft area which tapers to reduced spans under the aft body 3A.

FIGS. 2A through 2F show representative top plan view diagrams of deck layout configurations of different level decks of the preferred embodiment of a partially aerostatically supported ram air cushion ship 1 as shown in FIGS. 1A and 1B.

Figure 2A:
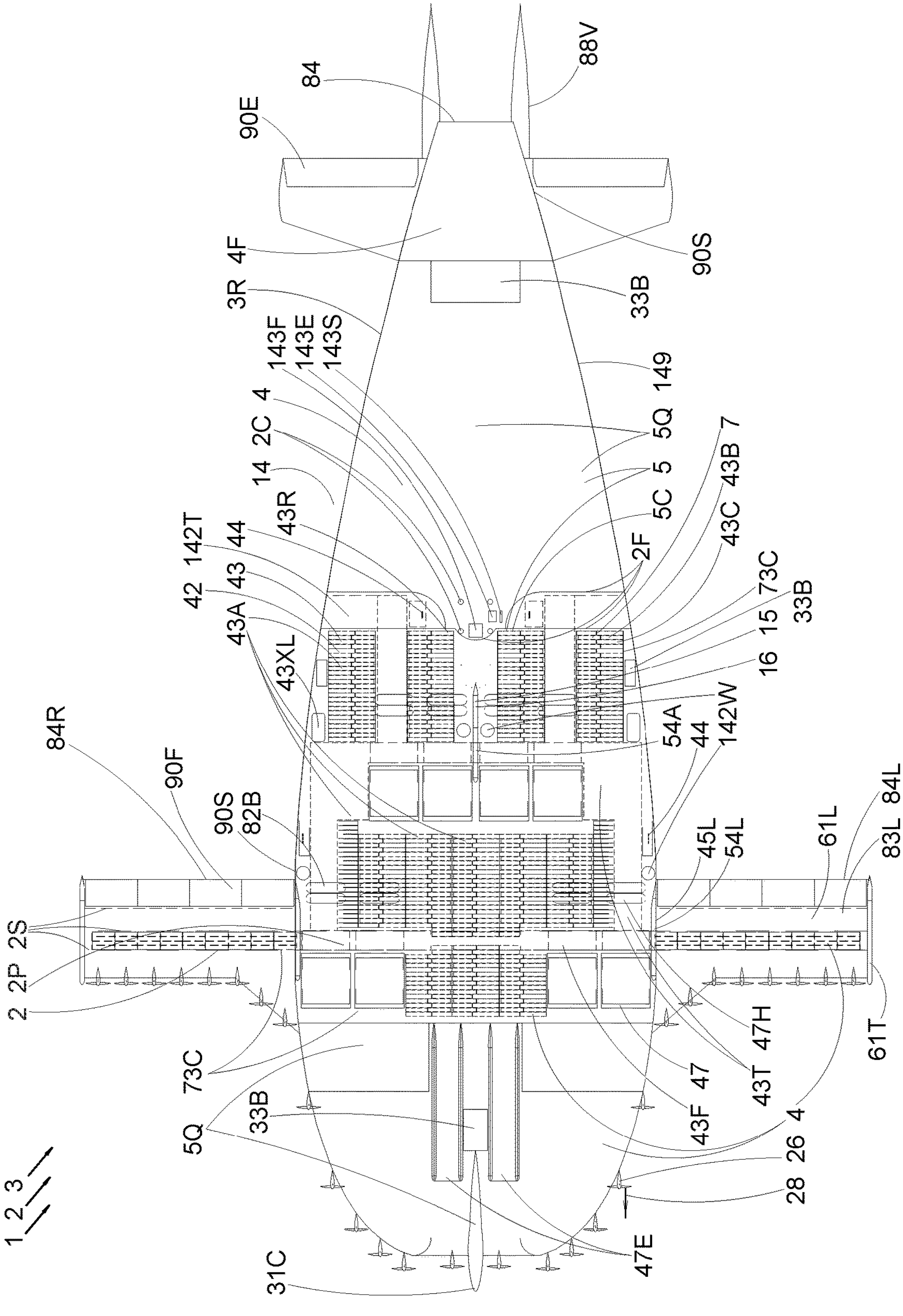
FIGS. 2A through 2F show representative top plan view diagrams of deck layout configurations of different level decks of the preferred embodiment of FIGS. 1A and 1B.

FIG. 2A shows a representative plan view diagram of a deck layout configuration of the bottom payload accommodating deck (cargo deck 5C) of the preferred embodiment of a partially aerostatically supported ram air cushion ship las shown earlier in FIGS. 1A and 1B. Please note the left-right inversion relative to FIG. 1B, as that is a bottom plan view while FIG. 2A is a top plan view. Note that the payload volume 4 that is the cargo volume 42 is above the floor of the cargo deck 5C and is also at a level just above the primary top surface of the payload transfer transport module 47 when the payload transfer transport module 47 has been winched up and locked in its mated-to-the-ship configuration connected to the PASRACS 1, as shown. Payload volume 4 includes the cargo deck 5C and the crew quarters 5Q; as well as a vehicle parking area 142T for at least one of a bus, a car, a three-wheel vehicle, a two-wheel vehicle, a track supported vehicle, a floating vehicle, an amphibious vehicle and an air vehicle. Note that design features enable all the types of payload to be transferred between the cargo deck 5C and the eight payload transfer transport modules 47 that are suspended below the cargo deck 5C in the illustrated preferred embodiment (with the exception of tower portions of the payload transfer transport modules that go up through the cargo deck 5C up to the next higher deck, the flexible use deck 5F that will be described further with reference to FIG. 2B following). These design features include the cargo transport corridor area 43T (shown) as well as other design features including enablers for payload transfer known in the prior art (not shown) comprising but not limited to: a crane, an overhead mobile crane, a freight elevator or freight lift, a roller tray, a ball mat, powered rollers, a winch, a pallet transfer system, a container transfer system, a roadway for driving upon and a ramp for driving up and/or down.

In FIG. 2A the crew use areas including crew quarters 5Q are preferably separated from the cargo accommodating areas in the cargo volume 42 by fire-resistant partitions 2F, though openings may be provided for firefighting crew to enter the cargo compartment for firefighting purposes, as known in the prior art of cargo aircraft. Crew quarters 5Q are illustrated in both the front and back parts of the deck 5, and preferably include some windows 149 for external view. Crew quarters 5Q can include a plurality of crew quarters features and amenities known from the prior art of vehicle crew quarters for marine, air and land vehicles-including but not limited to plural features and amenities selected from: seats, sleeper seats, beds, bunk beds, berths, stowage areas, closets, lockers, bathrooms, toilets, showers, bath tubs, kitchen, galley, cafeteria, dining areas & features, recreational areas & features, sport area & features, exercise & fitness area & features, entertainment area & features, socialization area & features, training/education area & features, multipurpose rooms, medical area & features, quarantine area & features, childcare area & features, and area & features for persons of limited mobility or other handicap. Common and/or separate facilities and amenities may be provided for various categories of crew comprising a plurality selected from: flight crew, a pilot, a flight engineer, a navigator, a flight attendant, a purser, hospitality crew, a consultant, a translator, a ship guide, maintenance crew, repair crew, health crew, a physician, a nurse, a medical assistant, food services crew, beverage services crew, an entertainer, a musician, an athlete, special services crew, tourism crew, education crew, stores and inventory management crew, security crew, safety crew, government services crew, crowd management crew, complaint management crew, funeral services and morgue crew, other crew and multirole crew. Volume in the deck that is not payload volume 4 is flexible use volume 4F, and in variant embodiments can be utilized for one or more of: structures elements, systems elements, propulsion elements, payloads elements, crew-use elements, operational elements, ballast system elements, eg control elements, water system elements, waste system elements, stores, supplies, service elements, modular elements, maintenance elements, repair elements and other elements. As an example of ballast system elements, ballast volumes 33B are shown at fore and aft and left and right spaced representative locations. It should be understood that a variety of locations could be used for a variety of ballast types including liquid pumpable ballast (such as water sourced from a controllable inlet/outlet in a hull) and solid movable ballast.

The ship structure 2 includes structural spars 2S in the wings, with 3 spars illustrated in each wing but variant embodiments could use any number of spars. The spars 2S may comprise one or more of: a manufactured spar, a truss spar, an extruded spar, a composite spar, a metallic spar and a hybrid spar. The spars 2S may utilize various structural components such as flanges and webs and trusses. The spars 2S in the wings are shown with constant chord, but in a variant embodiment the spars may increase in chord for the regions where the spar flanges bifurcate into reduced-depth planar members 2P that are located below and above the illustrated cargo deck in the body 3, and transfer loads betwixt the left wing 61L, body 3 or fuselage, and right wing 61R, as shown earlier in FIGS. 1A and 1B. Planar members 2P may comprise one or more of: a near-planar structure, a rib, a frame, a floor, floor coverings such as at least one of a carpet and a mat and a nonskid surface, a wall and a bulkhead. Planar elements 2P can incorporate panel, sandwich panel, truss, and/or topology-optimized structural subelements. FIG. 2A also illustrates structural columns 2C that that can carry vertical loads, that are part of the ship structure 2 and that are shown in the body 3 aft of the cargo container storage volume. These structural columns 2C will also be evident in FIGS. 2B, 2C, 2E and 2F showing decks 5 above the cargo deck 2C, and carry vertical loads connecting all these decks with the overall vehicle structure 2. Near the location of these structural columns 2C in FIG. 2A, means for crew and other persons and goods and baggage and freight to move from the illustrated crew quarters 5Q to other decks 5 include the illustrated freight elevator 143F and elevator 143E and stairway 143S (which may optionally be a moving stairway/escalator, and as illustrated connects the illustrated cargo deck 5C which includes the crew quarters 5Q, to the deck immediately above which is the flexible use deck 5F that will be described with reference to FIG. 4B in the following. Additional stairway(s) and/or elevator(s) may be provided in the forward crew quarters 5Q illustrated in FIG. 2A and the flight deck/cockpit 31C illustrated in FIG. 2A and FIG. 2B, but these are not specifically illustrated or called out. Note that stairway(s) and elevators(s) will preferably include fire propagation prevention features such as fire doors or deployable fire screens to prevent propagation of potential fires across deck boundaries and/or personnel area to cargo area boundaries and/or other fire containment volume boundaries, as known in the art of fire propagation prevention in occupiable volumes.

There is still space beneath the floor of the cargo deck 5C for cargo containers 43A such as Unit Load Devices (ULDs) and/or 40, 45, 53 or other foot long standard geometry shipping containers or high-cube containers, to be located in a single layer on the top surface of the payload transfer transport module 47. The cargo deck 5C will preferably have openable cargo transfer floor openings 43F to enable a ceiling mounted mobile crane (not shown but known in the prior art of mobile cranes) to engage and lift up to the cargo deck 5C, cargo containers 43A that were brought to the ship 1 on the payload transfer transport module 47. The cargo transfer floor openings 43F may be fitted with closure means such as sliding or hinged closure panels. Once lifted up to the cargo deck 5C, the mobile crane can then transport the lifted cargo container 43A both longitudinally and laterally in cargo transport corridor areas 43T in the cargo deck 5C to the place where it is to be deposited for transport, then drop said cargo container 43A down on the floor of the cargo deck 5C. Means to constrain and/or lock the cargo container 43A in position could include a variety of pallet lock and/or container lock and/or barrier rail and/or bumper bar and/or bollard and/or container restraint mechanisms and subsystems as are known from the art of container restraint subsystems for aircraft and for ships and for freight trains and for container-carrying trucks. FIG. 2A shows a representative full load of 598 cargo containers 43A in designated spaces on the cargo deck 5C. The cargo containers 43A are preferably ultra-lightweight cargo containers designed to minimize container tare weight, while sharing geometric aspects and fittings aspects with current standard air and sea shipping containers known in the art of containers shipping. Illustrated cargo containers 43A include 45 foot high-cube cargo containers 43B, 53 foot high-cube cargo containers 43C and refrigerated containers 43R. Forty-foot containers and twenty-foot containers could also be carried, as well as other containers of different geometries and weight specifications. Since the 40 foot, 45 foot and 53 foot containers are all nominally considered as two "twenty-foot equivalent units" or TEUs, the 598 containers corresponds to nominally 1196 TEUs of containerized cargo capacity. Note that a mix of high-cube and standard-height and non-normal height containers could be accommodated in the cargo deck 5C. Containers of other non-standard dimensions (length, width) could also be accommodated. An area for storage of baggage 44 is also illustrated on the cargo deck 5C. This area could have either fully automated, fully manual, or a hybrid mix of baggage handling so baggage can be stowed and then retrieved to be reunited with the owner or designee for each piece of baggage. An area for oversize cargo 43XL is also shown, to enable carriage of oversize cargo 43XL that is larger in at least one dimension relative to the 53-foot high-cube cargo container 43C. These areas for oversize cargo 43XL are preferably located directly above the stowed locations of payload transfer transport modules 47, and as an option it will be possible to have oversize cargo 43XL sitting on and secured to the upper surface of a payload transfer transport module 47, and projecting up through an openable opening (not shown) in the undersurface of the body 3, into the space shown herein in FIG. 2A. In a similar manner the illustrated fuel tanks 82B are supported on the payload transfer transport module 47 below, and project upwards through an opened opening (not shown) in the undersurface of the body 3, into the space in the illustrated cargo deck 5C. Note that the fuel tanks 82B may carry a liquid fuel such as jet fuel or diesel fuel or gasoline or biofuel or may be cryogenic fuel tanks that act as liquid hydrogen tanks 47H. Appropriate safety and fire protection systems known in the art from aircraft and ships can be incorporated to address leakage, ignition and fire risks and meet appropriate certification requirements. Appropriate connectors and hoses can be used as known in the prior art, to connect the fuel system of the partially aerostatically supported ram air cushion ship 1 to the fuel tanks 82B on the first hand, and to the propulsion system 26 on the second hand. The fuel system will preferably incorporate a plurality of safety features as known in the art of vehicle fuel systems, including features to prevent, inhibit, or suppress risks like ignition, fire and/or explosion (including one or more selected from: a fuel inerting subsystem, a fire detection subsystem, a fire suppression subsystem, an internal fire truck, a pumper truck, a fire hydrant, an unmanned fire-fighting device such as a robotic device or an autonomous device, nitrogen inerting subsystem, a halon fire suppressant, and a non-halon fire suppressant). Water piping system including hydrants to pumper truck or device can connect to. Potential sea water suck and feed system if on board fresh water is insufficient for major fire. Nitrogen inerting? Halon or halon replacement? and an explosion containment subsystem as examples cited without limitation). In the case of liquid hydrogen tanks 47H as illustrated, appropriate connectors and hoses can access the liquid hydrogen in these tanks to be used as fuel for the propulsion system 26 and/or to be used with boiloff of the liquid hydrogen into gaseous hydrogen to refill and/or pressurize gaseous hydrogen 12 used as a lifting gas 9 to contribute an aerostatic lift force 10, as described earlier in the description of the preferred embodiment shown in FIGS. 1A through 1G.

It should be noted that some of the cargo containers 43A may be refrigerated and a portion of area for oversize cargo 43XL may also be refrigerated, in various sub-embodiments of the invention. It should also be noted that some of the cargo containers 43A and/or some portion of area for oversize cargo 43XL may also be provisioned for humane live animal carriage, with suitable provisions for air, water, food, and all aspects of health and comfort of the animals and protection of the animals from having to experience pain, fear, suffering or distress whether physical or mental. This should enable partially aerostatically supported ram air cushion ships 1 or PASRACS 1 to offer live animal carriage with high standards for animal health, welfare, comfort, care, and avoidance of mortality and morbidity, including for large animals such as zoo or aquarium species from the animal kingdom. Similarly, PASRACS 1 can offer pet accommodation and sanitation areas with high standards for animal health, welfare, comfort and care. An optional veterinary care facility can be provided in a proximal location on board.

FIG. 2A also illustrates waste containers 142W that collect waste from drain lines from lavatories, sinks, galleys etc from various decks 5 of the PASRACS 1 and accommodate one or more of solid waste and/or liquid waste. Per waste management best practices, all or most of the waste lines can gravity feed into the waste containers 142W for normal floating and flight attitudes of the vehicle; while waste pumping systems such as grinder pumps can be used as and where necessary, if at all. The waste containers 142W may also optionally collect other types of solid waste such as garbage, and in variant embodiments separate garbage and/or compacted garbage may be collected in garbage containers that can have the form and fittings of cargo containers such as standard Unit Load Devices (ULDs) and be separate from drain fed waste containers 142W that can take the form of tank type containers.

Figure 2B:
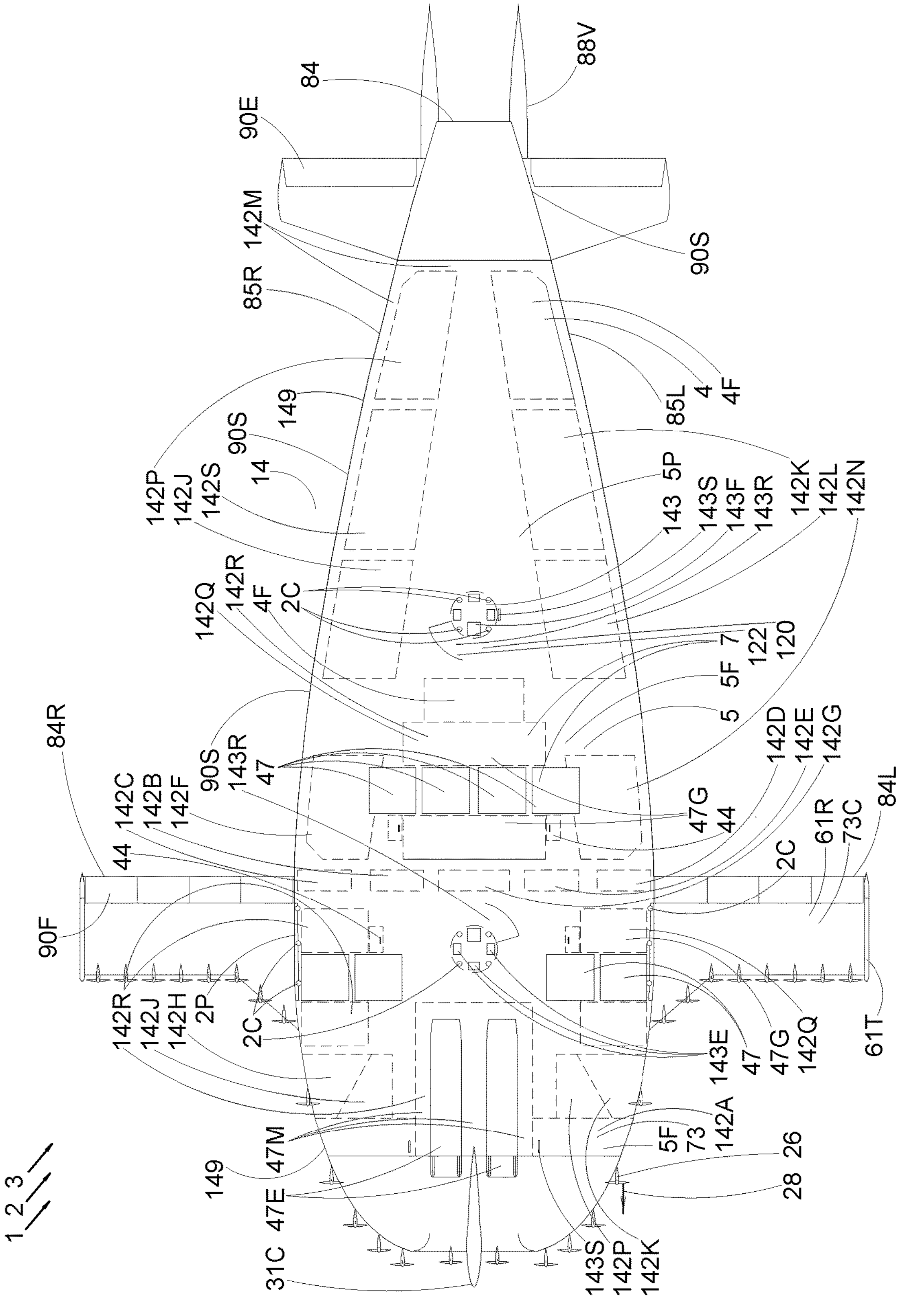

FIG. 2B shows a representative plan view diagram of a deck layout configuration of the next above the bottom deck (cargo deck 5C) of the preferred embodiment of a partially aerostatically supported ram air cushion ship 1 as shown in FIGS. 1A and 1B, which as illustrated comprises the flexible use deck 5F that includes windows 149. The flexible use deck 5F comprises features to flexibly and modularly accommodate different items for different uses including items for people (passengers and/or crew) and items for cargo (freight and/or baggage), and also encompassing a payload volume 4 with a flexible use volume 4B. FIG. 2B shows representative spaces including installations/modular installations on the flexible use deck 5F, for items for people shown including: a payload accommodating compartment 73 with a lounge area 142A; special service area 142B to accommodate & service special needs for persons of reduced mobility (PRM) or other categories of human handicaps; restroom 142C with a toilet and sink; bathroom 142D with a toilet and sink and at least one of a shower and a bath tub; a baggage management area 142E for at least one of baggage check and baggage reconciliation and baggage claim; a government formalities area 142F for at least one of customs processing and immigration processing and emigration processing and security processing and police station and jail and agriculture/food screening; a medical area 142G for at least one of a traveler health aid station, a first aid station, a basic life support station, an advanced cardiac life support station, a nurse station, a medical station, a medical clinic, a telemedicine station, a medical transport area, an ambulance, a powered gurney (such as a robotic gurney for transport of patients to a clinic or corpses to morgue area and final rites at a different location, without limitation), a medevac unit, a climate control module, an oxygen control module and a disease containment module; a general service area 142H for at least one of a welcome center, traveler aid station, customer support, customer complaints, customer counsel, language translation, financial services and lost & found; a food service area 142J for at least one of food service, snack service, meal service, vending machines, microwave oven area, refrigerator area, beverage service, food cart or trolley, beverage cart or trolley, café service, bar service, food truck service and vendor cart service; a wellness fostering area 142K comprising at least one of a gym, a fitness center, a yoga area, a massage chair area, a massage area, and a spa area; a sporting game area 142L comprising at least one of a game arcade area, a video game area, a simulator area, a table game area, a darts area, a table tennis area, a billiards area, a racquet sports court, a basketball hoop area, a skate area for people using roller skates or in-line skates or skateboards, a games of chance area and a racing game area; a walkway 142M for people to take a walk as well and/or jog and/or run with optional designated lanes; a children's area 142N with at least one of a playground, a swing, a slide, a merry-go-round, a rocking device, a riding device, a climbing device, a hanging device, a sand pit, a simulated beach area, a wading pool, and a splash area; a learning area 142P with at least one of a library area, a reading room, a periodicals area, a bookstore area, a tourist information area, a video area, and an interactive learning area; a deboarding gate area 142Q for accommodating people who will deboard at the next destination or stop of the vehicle, with areas for standing and/or sitting people and appropriate as-needed lighting, windows, heating, air conditioning, ventilation, air purification, drinking water, restrooms and facilities; a muster area 142R for accommodating and organizing people for evacuation in the event of an emergency (to enable direct transit onto an adjacent emergency evacuation barge 47E and/or onto an adjacent payload transfer transport module 47, as shown with access to the tower portion of the eight payload transfer transport modules 47 that project up into the illustrated flexible use deck through an opening in the cargo deck 5C, as shown and as noted earlier in the context of FIG. 2A). The deboarding gate area 142Q can also serve as a boarding gate area, and a location where elderly or handicapped passengers or others needing assistance can obtain assistance from cabin crew who may be human or robotic, as well as transit to onboard mobile carts or mobile chairs that can transport people and their bags internally in the PASRACS 1 to their seating or cabin locations, using internal roadways 120 and the spiral ramps 143R that are ramps 122 to transit between different payload levels. Note that the muster area 142R can share space with the deboarding gate area 142Q while having additional items to enable crew to appropriately muster and organize people for emergency evacuation scenarios; a store 142S comprising at least one of a general store, an essential items store, a grocery store, a souvenir store, a drug store or pharmacy, a department store, a snacks store, a coffee & tea store, a cold beverages store, and a specialty store for merchandise, tourist goods, clothing, fashion, shoes, footwear, eyewear, health/wellness, electronics, hardware, hobbies, toys, jewelry, and/or world goods; and a flexible use volume 4F.

FIG. 2B also illustrates that the ship structure 2 that includes planar members 2P that may comprise one or more of: a near-planar structure, a rib, a frame, a floor, a wall and a bulkhead. Vertically oriented planar members 2P are shown in FIG. 2B at the outboard left and right side ends of the body 3 near the wing roots. These planar elements 2P can incorporate panel, sandwich panel, truss, and/or topology-optimized structural sub-elements, and as shown these planar elements 2P can provide loads and structural connection between elements including the illustrated structural columns 2C that are part of the ship structure 2 and are shown in the body 3 near the inboard ends of the wings 61R and 61L and also elements shown earlier in FIG. 1B and FIG. 2A, namely (a) the wing spars 2S in the wings and (b) the horizontal planar members 2P traversing the body 3 and located below and above the cargo deck 5C in the body 3. The vertically oriented planar members in FIG. 2B and the associated structural columns 2C can contribute to carrying loads flowing through load paths from the winching system for the payload transfer transport modules 47 as well as carrying loads along load paths that are encompassed by the wings 61R and 61L and the body 3 between them that in turn encompasses both payload volume 4 and lifting gas enclosures 8 as shown earlier with reference to FIGS. 1A through 1G. Additional structural columns 2C are also shown in FIG. 2B near the centerline of the body 3 at longitudinal locations corresponding with the interfloor traversal columns 143 with spiral ramps 143R shown in FIG. 1B, wherein these structural columns 2C in conjunction with the interfloor traversal columns 143 serve as parts of the ship structure 2 that can carry vertical loads as well as other loads in the body 3. Access to the illustrated flexible use deck 5F from the passenger decks 5P above it can be via one or more of the illustrated elevator 143E, freight elevator 143F and spiral ramp 143R elements of the illustrated interfloor traversal column 143, wherein the particular preferred embodiment shown has one interfloor traversal column 143 in a middle region of the body 3 and another in an aft region of the body. FIG. 2B also shows a stairway 143S in the aft body going down to the crew quarters 5Q in the cargo deck 5C as described earlier in the context of FIG. 2A, plus two additional stairways 143S (wherein any of the stairways can optionally be a moving stairway or escalator) that connect forward left and right regions of the flexible use deck 5F up to a passenger deck 5P immediately above (that will be described further with reference to FIG. 2C). Note that variant embodiments of the invention may be fitted with various combinations of stairways(s), escalator(s), elevator(s), freight elevator(s), spiral ramp(s) and other ramp(s) to enable one or more of persons and baggage/cargo to traverse between different decks 5 as well as to payload transfer transport module(s) 47 and/or emergency evacuation barge(s) 47E, in manners that are understood from the prior art. Note that stairway(s) and elevators(s) will preferably include fire propagation prevention features such as fire doors or deployable fire screens to prevent propagation of potential fires across deck boundaries and/or personnel area to baggage area boundaries and/or other fire containment volume boundaries, as known in the art of fire propagation prevention in occupiable volumes.

Figure 2C:
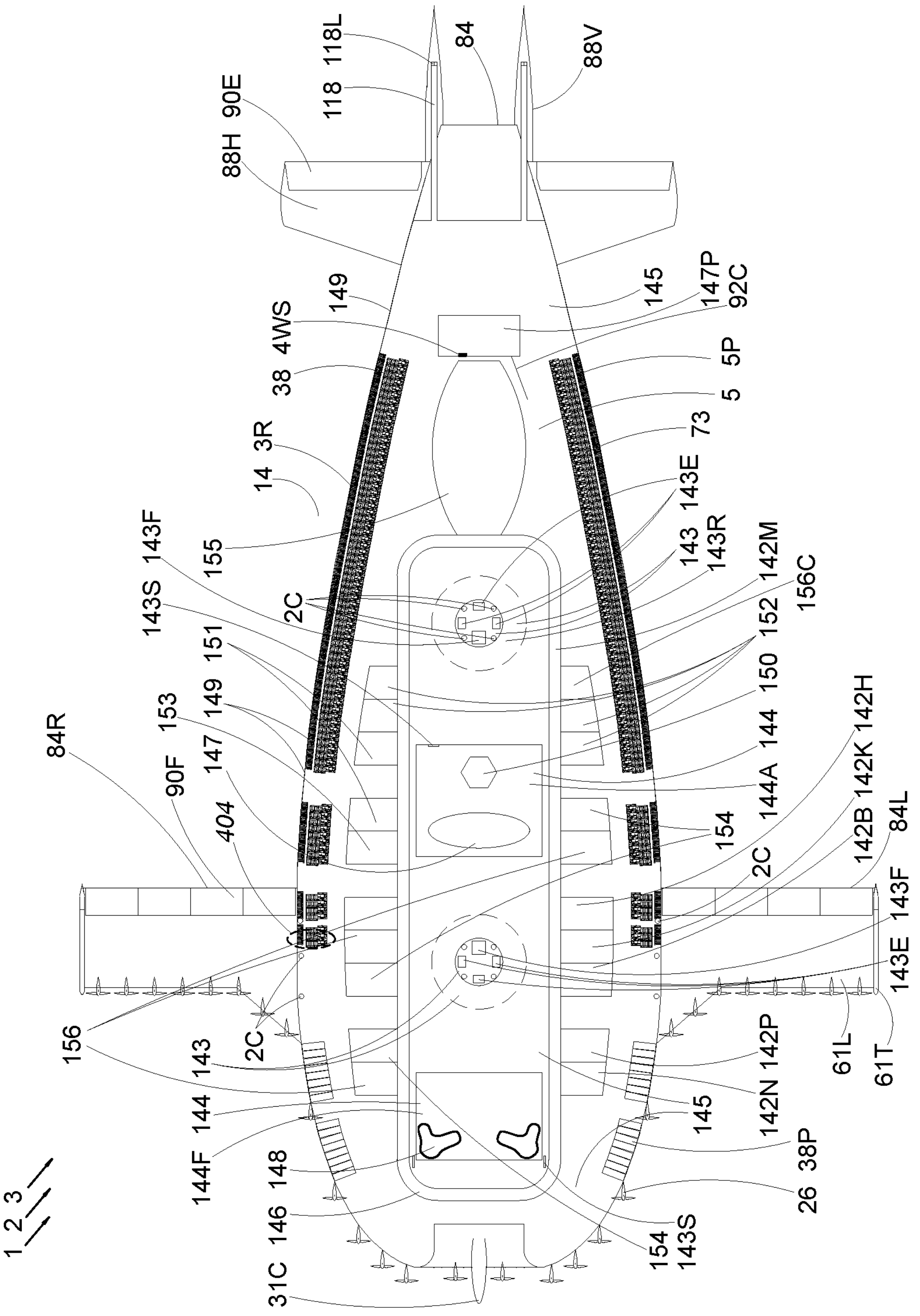

FIG. 2C shows a representative plan view diagram of a deck layout configuration of the next above the flexible use deck 5F of FIG. 2B. Thus FIG. 2C shows the deck 5 that is the $1^{st}$ or lowest passenger deck 5P of a payload accommodating compartment 73 of a partially aerostatically supported ram air cushion ship 1 as shown in FIGS. 1A and 1B. Access to the illustrated passenger deck 5P in FIG. 2C from other decks in the partially aerostatically supported ram air cushion ship 1 can be via one or more of the illustrated elevator 143E, freight elevator 143F and spiral ramp 143R elements of the illustrated interfloor traversal column 143, wherein the particular preferred embodiment shown has one interfloor traversal column 143 in a middle region of the body 3 and another in an aft region of the body. The spiral ramps 143R may feature one or more of: a walk area or lane, a wheeled vehicle area or lane, a driving area or lane, an internal vehicle train area or lane (e.g. for rubber tire vehicle trains, for example and without limitation), separate up and down lanes, and reversible lanes. Lifts 118L that are also elevators, are shown also at the aft of walkways 118 to enable access to passenger deck 5P locations in the vertical stabilizers 88V, which may provide, for example, luxury cabins and/or suites for ultra-premiere classes of travel even above First Class, that may be branded in a variety of ways such as “Luxury Class” or “Elite Class” or “UltraLux Class” or “Royal Class” or “Stellar Class” for example and without limitation, and that can be fitted with luxury amenities as well as large picture windows on both sides, that may be structural windows.

A cabin 38 includes an expansive cabin space 145 in the aft portion of the illustrated passenger deck 5P, where the expansive cabin space 145 can be characterized as a “People’s Park” for persons 39 such as passengers 40 and crew 41 to enjoy. The park area can include benches and chairs for people to sit on, and walking and jogging paths and play areas with greenery, for example and without limitation. The cabin space 145 is fitted with windows 149 to enable persons to have a view to the outside of the PASRACS 1, of scenery while at a destination or en route. The aft portion of the illustrated passenger deck 5P also includes a pool 147P, that is nominally Olympic size as illustrated and can be used for swimming and/or diving and/or as a splashdown pool at the bottom of a waterslide 4WS (that will also be described in the following in the context of FIG. 2E). To enable the pool 147P to be used for diving, a deep end may have a pool floor that drops to some extent into volume of the next lower deck, namely the flexible use deck 5F described earlier in the context of FIG. 2B. Diving boards and entry stairs and varying depths are known from prior art and can be incorporated as design and implementation features of the pool 147P within the spirit and scope of the invention. In view of the weight sensitivity of vehicles capable of flight, one preferred variant embodiment of that shown in FIG. 2C may forego the water depth needed for diving so as to enable reduced water weight and associated impacts on the vehicle weight of the PASRACS 1. Water 92 for the pool 147P as well as for a potable water supply for the vehicle can be sourced from one or more of (a) upload using a fill system from a payload transfer transport module 47 (not shown in FIG. 2C) through a potable water piping system 92C and (b) upload from a water scoop system on a hull 54 (not shown in FIG. 2C) followed by a water purification system that can include one or more of desalination and filtration and ultraviolet radiation (UV) purification subsystems, as known in the prior art of water purification systems. Water systems will be further described subsequently in the context of FIG. 13A.

FIG. 2C also illustrates several features and amenities. FIG. 2C shows a special service area 142B, a general service area 142H, a wellness fostering area 142K, a walkway 142M, a children’s area 142N, and a learning area 142P. The illustrated walkway 142M also serves as a closed loop track 146, that can be used for one or more of walking, jogging, running, rollerskates, rollerblades, and cycling. FIG. 2C further illustrates the interfloor traversal columns 143 with the associated elevator 143E, freight elevator 143F and spiral ramp 143R elements.

FIG. 2C also illustrates a stairway 143S in an atrium 144 that allows persons to traverse from the $1^{st}$ or lowest passenger deck 5P up to the next or $2^{nd}$ passenger deck 5P that is above the deck shown in FIG. 2C. Note that FIG. 2C shows both an aft atrium 144A and a forward atrium 144F, while it should be understood that variant embodiments may have zero, one or plural atriums. A vegetation feature 148 that could comprise one or more of a lawn, a garden, a hydroponic garden, flowers, shrubs and trees, plant boxes and/or hanging basket plants, is shown in the forward atrium 144F but such features can clearly be included in other locations within the PASRACS 1, within the spirit and scope of the invention.

FIG. 2C illustrates a water feature 147, that could be one or more of a fountain, a waterfall, a wading pool, a splash pool, other water feature for decoration and other water feature for use.

FIG. 2C also shows:

- a recreational area 150 that can include one or more of a kids playground, jungle gym, game room, skate park or other recreational item;
- an eatery 151 that can include one or more of a restaurant, a café, a bistro, a food court, a dessert/ice cream bar, a food facility and a beverage facility;
- a store 152 that can include one or more of a merchandise store, a tourist goods store, a drug store, an essentials store, a clothing store, a fashion store, a shoe store, a department store, a health/wellness store, an electronics store, a hardware store, a hobby store, a toy store, a fashion store, a jewelry store, a world goods store, and a specialty store;
- a medical facility 153 that can include one or more of a clinic, a hospital, an emergency aid station, a telemedicine facility, an isolation facility, a surgery room, a dental facility, an eye care facility, a medical specialty facility, an urgent care facility, an emergency room, a preventive medicine facility, a pediatric facility, a geriatric facility, a defibrillator & CPR station, and a nonallopathic health facility;
- a human facilities area 154 that can include one or more of a restroom, a bathroom, a men’s room, a women’s room, and facilities for persons of reduced mobility (PRM) and/or other handicap;
- a sporting game area 155 that can include one or more of table tennis, billiards, croquet, mini-golf, badminton, tennis, volleyball, basketball, a bowling alley, another sport area, and another game area;
- a flexible use room 156 and a conference room 156C that can serve as a business use room.

Figure 2D:
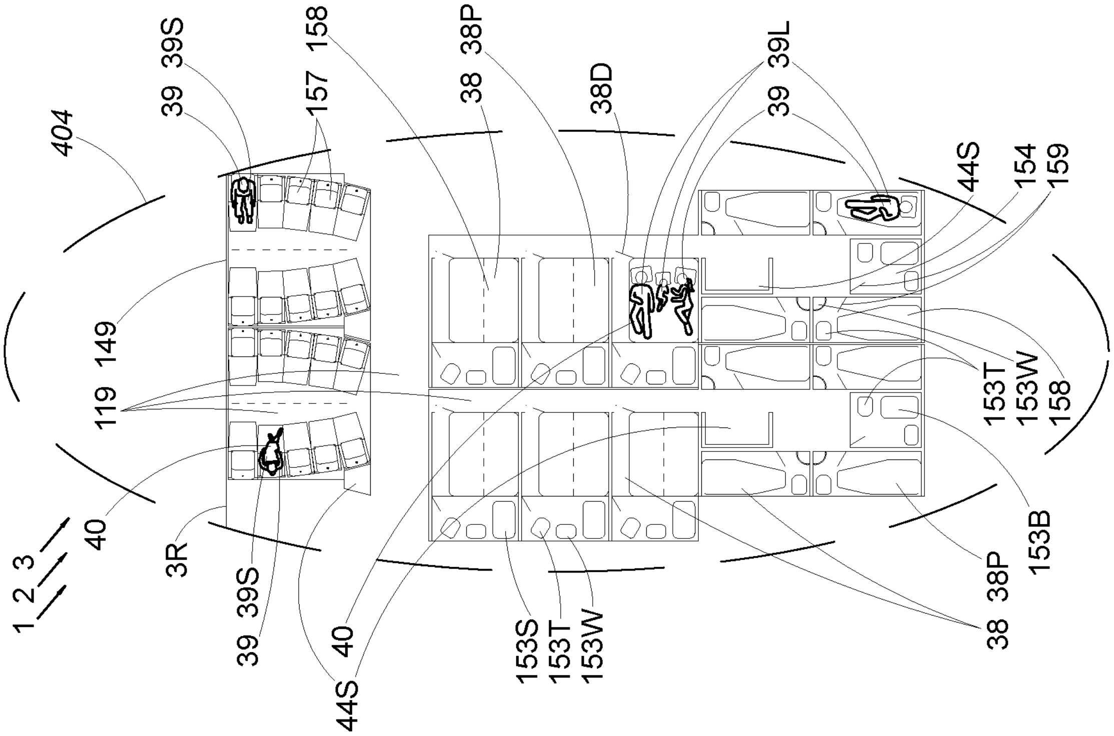

Reference is now made to FIG. 2D, which schematically illustrates an enlarged view of section 404, which is marked in FIG. 2C by a broken line in a region on the right side of the deck 5 that is the $1^{st}$ or lowest passenger deck 5P of the illustrated payload accommodating compartment 73 in the body 3 of the partially aerostatically supported ram air cushion ship 1 or PASRACS 1. The enlarged view is scaled up by approximately 20:1 to better show the features within the section 404.

FIG. 2D illustrates representative persons 39 that are seated persons 39S in representative seats 157 that will preferably be of a class comprising at least one of a cushioned seat and a reclinable seat and sleeper seat and full-flat seat, all of which are known in the art of vehicle design and furnishing to enable comfortable vehicular travel by persons such as passengers 40. The seats 157 are shown arranged in a pattern that enables people seated in the seats to see outside the PASRACS 1 through at least one window 149 fitted in the body right side surface 3R in the illustrated preferred embodiment. The pattern shown is representative but not limiting, and utilizes slightly increased angles for more inboard seats to enable better viewing angles through the window elements, and five abreast seating modules facing each other across an aisle 119 that is a transverse aisle. The transverse aisle connects to a longitudinally oriented aisle 119 that separates the window seats passenger accommodation area from an area with cabins 38 such as a minicabin passenger accommodation area that is inboard of the longitudinal aisle 119 as illustrated. A stowage volume 44S comprising a closet is shown facing the longitudinal aisle 119, and an additional stowage volume 44S is shown in the cabins area inboard of the longitudinal aisle, as illustrated. It will be understood that a variety of stowage members known in the prior art of vehicles, including a closet, an overhead stowage bin, underseat stowage, furniture-integrated stowage, wall-mounted stowage, ceiling-mounted stowage, and floor-mounted stowage can be utilized in various passenger accommodation areas within the spirit and scope of the invention.

The illustrated cabins 38 include a private cabin 38P for a person 39 such as a passenger 40, which private cabin 38P can be a luxury cabin. The private cabin 38P is shown equipped with a bed 158 with some shown with a single person bed and some with a two-person bed such as a Queen bed or King bed without limitation. The illustrated two-person bed in a preferred version could be of a sofabed or futon configuration so that it can occupy a smaller footprint and be used as for seating accommodation, at times when it is not in the illustrated deployed configuration suitable for full-flat lying and sleeping. One of the single person beds is shown occupied by a person 39 who is a person lying down 39L. Similarly one of the two-person beds is shown as a multi-person bed accommodating three persons lying down 39L, with the persons 39 comprising two adults (such as parents) and a child shown all occupying the bed. The representative single person cabins 38 are shown with a door 38D for entry and egress and privacy, and also shown with a toilet 153T and a washbasin 153W that can be a sink. The representative multiperson cabins are shown with a door 38D for entry and egress and privacy, and also equipped with a toilet 153T and a washbasin 153W that can be a sink, as well as a shower area 153S. The cabins area inboard of the longitudinal aisle is also shown with a human facilities area 154 such as a restroom or bathroom, including a door 159 that may be lockable (with emergency crew override) and including a toilet 153T and a washbasin 153W that can be a sink and a bathing facility 153B that can include a tub and/or shower. Space-efficient and functional and aesthetic restroom or bathroom design features are known in the art of vehicle design and equipage, with special note of recreational vehicles such as motorhomes or travel trailers or fifth-wheels, yachts, ships, airplanes and trains. Bathroom amenities can include one or more of: a mirror, a vanity, toilet paper, sanitary pads, dignity protection underwear, cleaning wipes, paper towel, and robotic resupply and cleaning provided to keep the bathroom(s) clean and sanitary. The restroom or bathroom design features can also include personal protective equipment (PPE) and safety features and features for persons of reduced mobility (PRM) and/or other physical or mental limitations or handicaps.

It will be understood that a wide variety of alternate preferred embodiments for seating area and cabin area and combined area arrangements, as well as seating amenities & features and cabin amenities & features, are all possible based on vehicle and feature prior art.

Figure 2E:
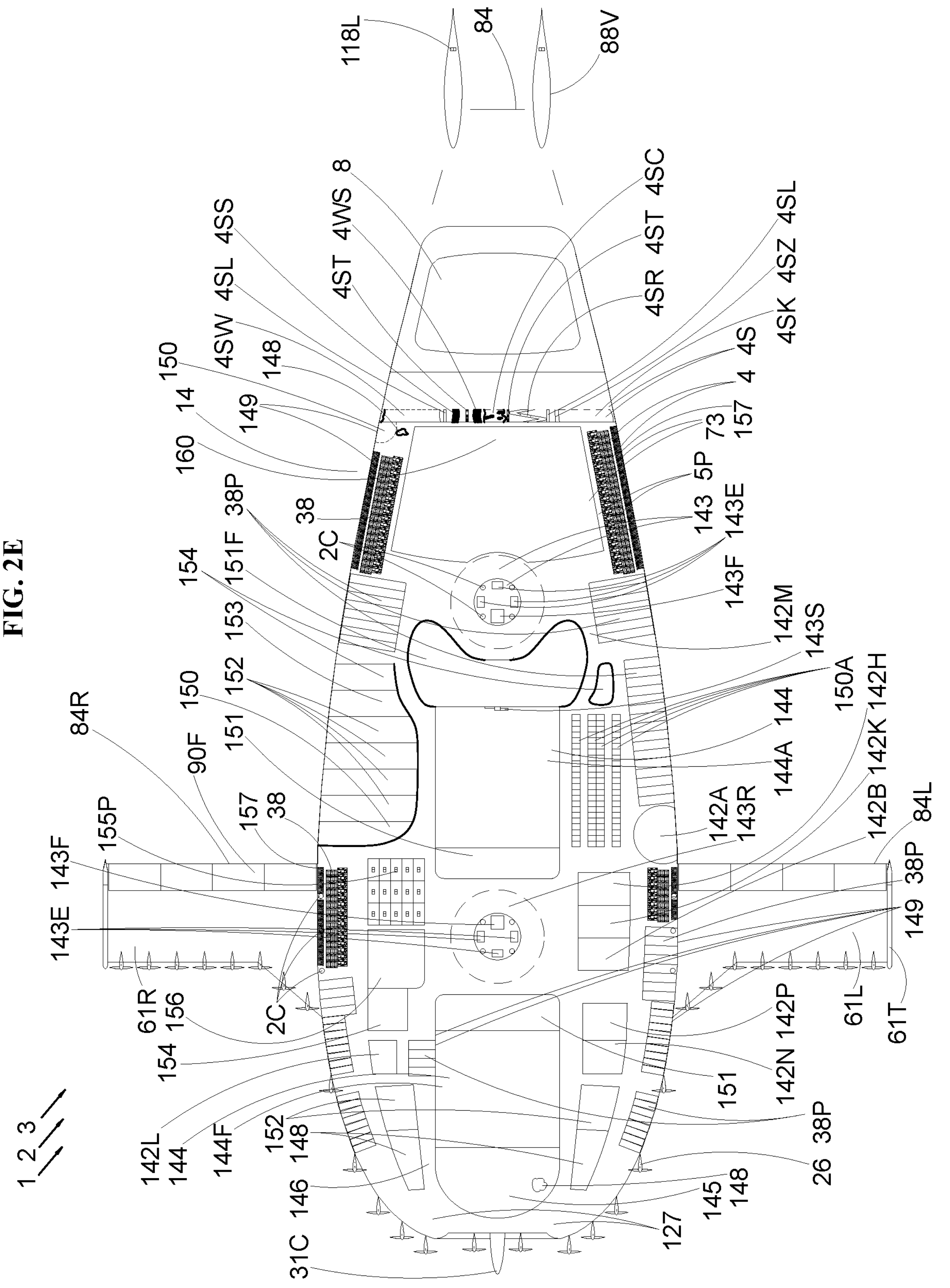

FIG. 2E shows a representative plan view diagram of a deck layout configuration of the 10th lowest passenger deck 5P, or 10 deck levels above the flexible use deck 5F shown in FIG. 2B. Portions of this passenger deck 5P accommodate seats 157 and cabins 38 in a manner similar to those described in the context of FIG. 2D, for example on the starboard (right) and port (left) sides of the body 3 inboard of the wings 61R and 61L and in the aft sides of the body 3. This passenger deck 5P is also fitted with a plurality of features and amenities including the following in the forward portion of the passenger deck 5P: a plaza 127; an expansive cabin space 145 such as a "people's park"; vegetation features 148 (which could involve one or more of a bush, a shrub, a tree, a plant, a garden, and a lawn); a store 152; an eatery 151; a human facilities area 154; a sporting game area 142L; a children's area 142N, a learning area 142P; and private cabins 38P such as luxury cabins (such as First Class cabins) with views to the outside of the vehicle through windows or views into the atrium 144 that is the forward atrium 144F through windows and/or view decks.

Moving aft into the region of the passenger deck 5P between the left wing 61L and right wing 61R, the passenger deck 5P is also fitted with a plurality of features and amenities including the following: ultra-large private cabins 38P with external view windows 149; a special service area 142B; a wellness fostering area 142K that may include one or more amenities such as a massage chair and an oxygen bar; a general service area 142H; a flexible use room 156; a Table Tennis (or 'Ping-Pong') area 155P; and an eatery 151 that is behind the interfloor traversal column 143 in this region (that also includes elevator 143E and freight elevator 143F and a spiral ramp 143R).

Moving further aft into the region of the passenger deck 5P aft of the left wing 61L and right wing 61R, the passenger deck 5P is fitted with a plurality of features and amenities including the following: more private cabins 38P; a lounge area 142A; human facilities area 154; an arcade of booths 150A (that may be for one or more of games and entertainment and shopping and snacking and drinking); a food court 151F aft of an atrium 144 that is the aft atrium 144A in the illustrated embodiment; a stairway (or moving stairway/escalator) 143S to facilitate people moving from deck-to-deck in said atrium 144; a recreational area 150 that may include one or more of a kids playground, skate park, jungle gym, game room and other recreational feature; stores 152 that may include more than one of a merchandise store, a tourist goods store, a drug store, an essentials store, a clothing store, a fashion store, a shoe store, a department store, a health/wellness store, an electronics store, a hardware store, a hobby store, a toy store, a fashion store, a jewelry store, a world goods store, and a specialty store; and a medical facility 153.

Moving to the aftmost region of the passenger deck 5P and associated payload accommodating compartment 73 in payload volume 4 in FIG. 2E that is behind the aftmost interfloor traversal column 143, the passenger deck 5P is fitted with a plurality of features and amenities including the following: a theatre 160 that may be one or more of a screen-fitted theatre, movie theatre, stage-equipped theatre, concert hall, opera hall, live-action theatre and other theatre; outboard seat 157 and cabin 38 features for passenger accommodation; recreational area 150; windows 149; vegetation feature 148; and a sloped multiuse volume 4S that contiguously and in a sloped manner traverses multiple decks so as to enable and incorporate features that comprise more than one of a sliding slope 4SK such as a real or artificial ski or sledding slope, a zipline 4SZ, an incline lift 4SL such as a chairlift, cablecar, gondola, telepherique, incline railway, T-bar, J-bar, rope tow or other lift, a waterslide 4WS, stairs 4ST, ramp 4SR, climbing surface 4SC such as a climbing wall or simulated mountain climb, slide 4SS and a wheeled sport slope 4SW area or track for use by one or more of a skateboard, rollerski, scooter, mountain bike, cart, soap box derby car, and riding cart. Note that the waterslide 4WS shown on FIG. 2E ultimately goes down through the sloped multiuse volume 4S down to the pool 147P shown earlier with reference to FIG. 2C.

Behind the occupiable spaces and the sloped multiuse volume 4S in FIG. 2E, the area horizontally behind cuts through a lifting gas enclosure 8 and then the vertical tails 88V with the lifts 118L that can take passengers up to the exclusive accommodation deck areas that are contained within the vertical tails.

Figure 2F:
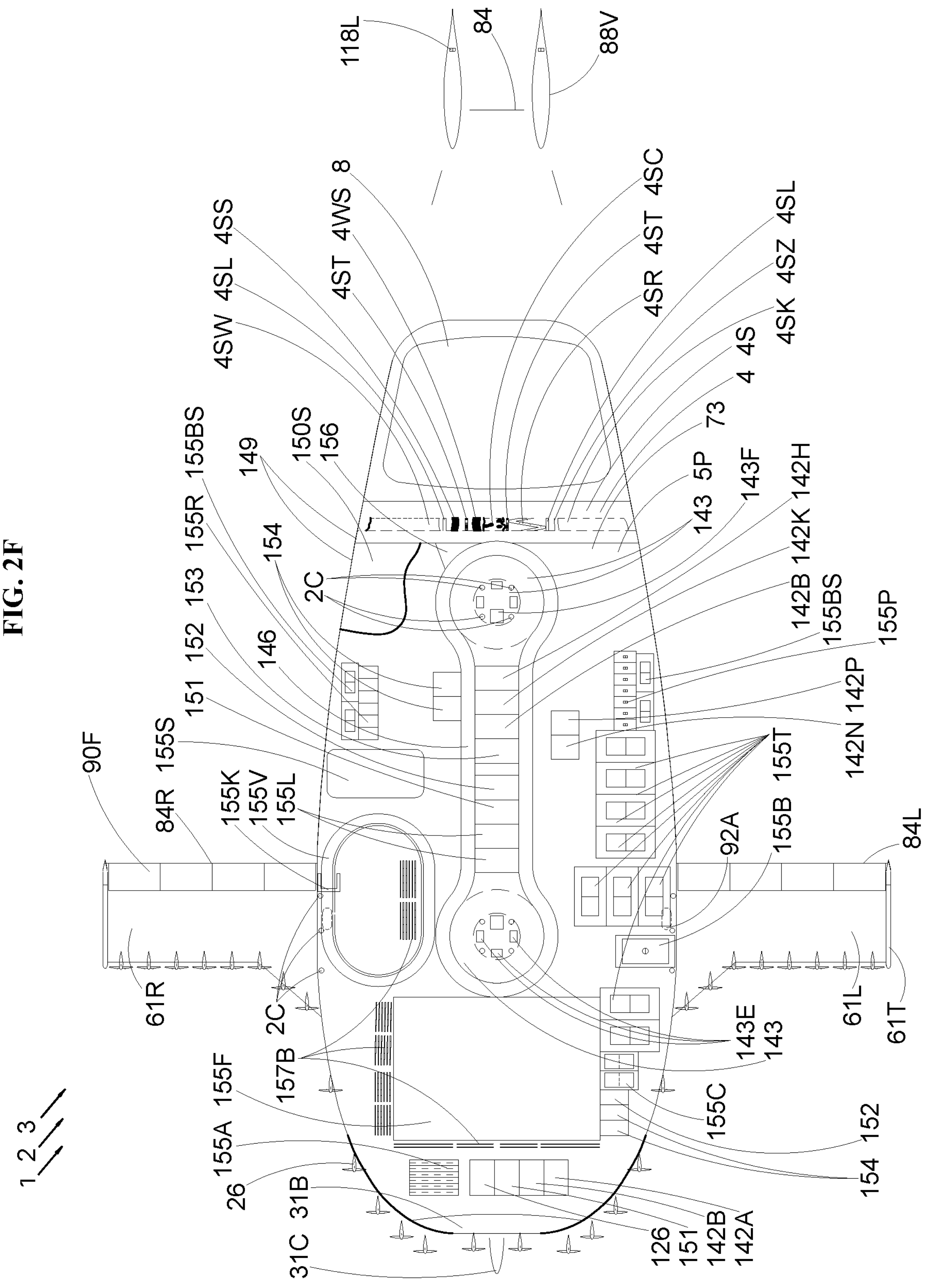

FIG. 2F shows a representative plan view diagram of a deck layout configuration of the topmost passenger uses deck of a partially aerostatically supported ram air cushion ship 1 or PASRACS 1, which per the illustrated embodiment is highest (or the 22$^{nd}$ lowest) passenger deck 5P, being 22 deck levels above the flexible use deck 5F shown in in FIG. 2B. In view of higher ceiling heights especially towards outboard sides of this topmost passenger use deck (as seen earlier in FIGS. 1D, 1E and 1F), this topmost passenger use deck is particularly suitable for facilities such as sporting facilities that need or benefit from higher ceiling heights. Several of these, without limitation, are shown in FIG. 2F. FIG. 2F also shows in dashed lines the installation of potable water tanks 92B above high parts of the high ceilings, to enable gravity feed of water to users on the topmost deck as well as all decks below. These are the same locations earlier shown in FIG. 1E.

The passenger deck 5P illustrated in FIG. 2F is fitted with a plurality of features and amenities including the following in the forward portion of the passenger deck 5P: a bridge 31B where crew can optionally control the partially aerostatically supported ram air cushion ship 1 from a higher location than the much lower location of the cockpit or flight deck 31C (as an option to provide redundant control locations in the event of an emergency condition arising from natural and/or man-made causes); plaza 127 that also serves as an open area for passenger and crew use; a room 126; a lounge 142A; a special service area 142B; an eatery 151 (that could be one or more of a restaurant and a café and a bistro and a food court and a dessert bar and an ice cream bar and a beverage bar and a snack bar); a bowling alley 155A; a field 155F for team sports such as one or more of soccer and US football and Canadian football and rugby and baseball and cricket and field hockey and track & field sports and frisbee and other field sport/activity); volleyball court 155C; tennis court 155T; bench/bleacher seating 157B suitable for viewing sports or other activities; human facilities area 154; and stores 152.

Moving aft into the region of the passenger deck 5P of FIG. 2F that is between the left wing 61L and right wing 61R, the passenger deck 5P is also fitted with a plurality of features and amenities including the following: a tennis court 155T; a basketball court 155B; the (forward) interfloor traversal column 143; a velodrome 155V that can have banking in curved portions of the track; and a skybridge 155K illustrated so persons can gain walking access into the infield area of the velodrome 155V.

Moving further aft into the region of the passenger deck 5P of FIG. 2F that is aft of the left wing 61L and right wing 61R, the passenger deck 5P is fitted with a plurality of features and amenities including the following: a tennis court 155T; a badminton/shuttle-cock court 155BS; a table tennis/ping-pong area 155P; a children's area 142N: a learning area 142P: a closed-loop track 146 suitable for one or more of walking, jogging, running, rollerskates, rollerblades, and cycling; a skating rink 155S (that could be an ice or roller skating rink, and is shown in the size of an Olympic size ice rink in FIG. 2F); a racquetball/squash court 155R; human facilities area 154; a general service area 142H; a wellness fostering area 142K; a special service area 142B; a medical facility 153 that may include one or more of a sports medicine facility, a clinic, a hospital, an emergency aid station, a telemedicine facility, an isolation facility, a surgery room, a dental facility, an eye care facility, a medical specialty facility, a nonallopathic health facility, an urgent care facility, and an emergency room; a store 152; an eatery 151; and locker room(s) 155L such as men's and women's locker rooms with one or more of changing areas and showers and lockers and restroom areas. With regard to one or more stores 152, it should be understood that a wide variety of store sizes, configurations, layouts and designs are possible, ranging from a large supermarket or department store down to small modular booths located in aisleways and public spaces on board the PASRACS 1.

Moving to the aftmost region of the passenger deck 5P and associated payload accommodating compartment 73 in payload volume 4 in FIG. 2F that is near or behind the aft interfloor traversal column 143, the passenger deck 5P is fitted with a plurality of features and amenities including the following:

a skatepark 150S that provides an area for users of skateboards or longboards or other wheel-borne equipment; a flexible use room 156 as well as flexible use undesignated open spaces on the passenger deck 5P; and a sloped multiuse volume 4S that contiguously and in a sloped manner traverses multiple decks so as to enable and incorporate features that comprise more than one of a sliding slope 4SK such as a real or artificial ski or sledding slope, a zipline 4SZ, an incline lift 4SL such as a chairlift, cablecar, gondola, telepherique, incline railway, T-bar, J-bar, rope tow or other lift, a waterslide 4WS, stairs 4ST, ramp 4SR, climbing surface 4SC such as a climbing wall or simulated mountain climb, slide 4SS and a wheeled sport slope 4SW area or track for use by one or more of a skateboard, rollerski, scooter, mountain bike, cart, soap box derby car, and riding cart. Note that the waterslide 4WS shown on FIG. 2F ultimately goes down through the sloped multiuse volume 4S down to the pool 147P shown earlier with reference to FIG. 2C.

Behind the occupiable spaces and the sloped multiuse volume 4S in FIG. 2F, the area horizontally behind cuts through a lifting gas enclosure 8 and then the vertical tails 88V with the lifts 118L that can take passengers up to the exclusive accommodation deck areas that are contained within the vertical tails.

The specific features and features count illustrated in FIG. 2F serve illustrate certain preferred options for features and amenities serving a variety of passenger pleasing purposes, and it should be understood that many variations as well as deletions and/or additions are possible within the spirit and scope of the invention.

The preferred embodiment based on the geometry illustrated in FIGS. 1A-1G and 2A-2F, comprises a partially aerostatically supported ram air cushion ship 1, configured with a ratio of a total plan-view deck area 98 of all said decks 5 combined, divided by a total wetted area 99 of said partially aerostatically supported ram air cushion ship 1, that when multiplied by 100%, exceeds 15%. While the illustrated preferred embodiment of FIGS. 1A-1G and 2A-2F has a total of 24 decks to enable this area ratio to be comfortably achieved, it should be understood that variant embodiments of the invention with at least 4 decks can also be configured to achieve the above area ratio with values exceeding 15%, even while providing adequate internal volume for lifting gas 9 to provide contributory aerostatic lift force 10 for the PASRACS 1.

FIGS. 3A through 3F show front views of some alternate preferred embodiments (relative to the preferred embodiment of FIGS. 1A through 1G and FIGS. 2A through 2F) of a partially aerostatically supported ram air cushion ship 1 or PASRACS 1, with interior features at middle longitudinal locations near maximum cross-sectional area longitudinal locations shown in dashed lines. FIGS. 3G and 3H show rear views of some alternate preferred embodiments (relative to the preferred embodiment of FIGS. 1A through 1G and FIGS. 2A through 2F) of a partially aerostatically supported ram air cushion ship 1 or PASRACS 1. FIGS. 3I through 3L show cross-sectional views of still other preferred embodiments of PASRACS 1. Note that the configurations illustrated in FIGS. 3A through 3L can have variations including different scales of lateral width, different scales of vertical height, and different scales of longitudinal length in subspecies of these illustrated preferred embodiments, as will be understood from the prior art of vehicle design, vehicle engineering and vehicle optimization.

Figure 3A:
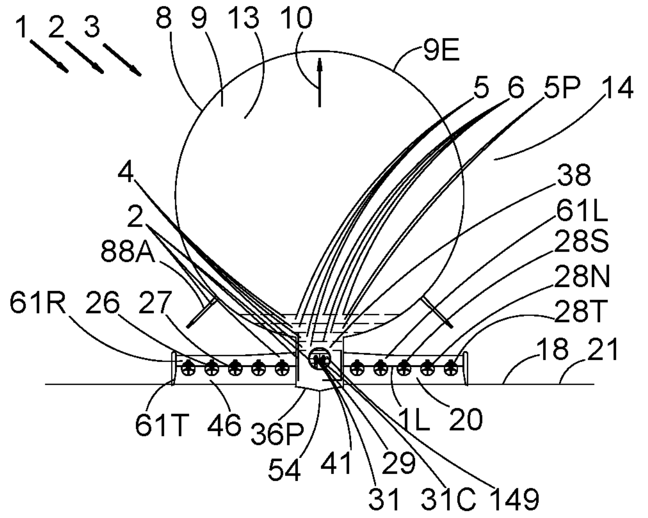
FIGS. 3A through 3F show front views of some alternate preferred embodiments of a partially aerostatically supported ram air cushion ship.

FIG. 3A shows a preferred embodiment of a PASRACS 1 in a transition mode still in contact with an Earth surface 21 that is a water surface 18, with the PASRACS 1 including ship structure 2 and a body 3. Payload volume 4 suitable for accommodating persons such as passengers, and/or cargo/baggage types of payload, are shown below an encompassed lifting volume 9E bounded by a lifting gas enclosure 8 and filled with a lifting gas 9 that is a low-density lifting gas 13 such as helium and/or hydrogen without limitation. The atmosphere 14 is outside the lifting gas enclosure 8. The low-density lifting gas 13 in the lifting gas enclosure 8 yields an aerostatic lift force 10. The illustrated payload volume 4 includes a cabin 38 and plural decks 5 at different levels 6, said plural decks 5 including at least one people deck 5P (two illustrated). The illustrated embodiment has angled stabilizers 88A with an inverted V tail configuration shown without limitation. The angled stabilizers 88A may have control surfaces behind them, not visible in this front view, which control surfaces may be ruddevators or combinations of rudder and elevator type control surfaces. Forward of the payload volume 4 the PASRACS 1 has a flight deck/cockpit 31C including a window 149 and including a crew input device 31 (central floor mounted control quadrant shown, similar to where throttle controls are mounted in airliners) that is usable by crew 41 (flight crew shown). The PASRACS 1 may also have crew stations and crew input devices for one or more of the following specialized crew member types: captain, first officer, navigator, flight engineer, loadmaster, chief safety officer, chief security officer, chief onboard regulations officer (for deployment and enforcement of onboard code of conduct and providing guidance to onboard security personnel if arrest or restraint actions are warranted for violators who pose threats to other people or themselves), chief communications officer, meteorologist, chief sea conditions officer, chief maintenance officer, chief repair officer, chief mechanic, chief steward, purser, chief monitoring officer, master chef, inventory management officer, terminal operations officer, chief guest officer, chief amenities officer, chief government affairs officer, and chaplain, without limitation. A variety of crew roles can be defined and multirole crew members can benefit from crew training and apprenticeship programs to be available to perform multiple roles depending upon circumstances and demand, including an "on call" system for unusual circumstances with high demand in specific roles. A vehicle navigation and control system 29 is shown in an equipment bay below the cockpit 31C, similar to an electronics equipment bay ('EE bay') used under cockpits of airliners. A PASRACS 1 may be fitted with plural EE bays and equipment centers to service needs of different portions of the vehicle in an optimally distributed way that reduces weight and complexity but still provides desired redundancy and backup capabilities.

The ship structure 2 includes a central portion with a hull 54 with a hydrodynamic planning surface 36P, and left and right portions that include a left wing 61L and right wing 61R on either side of said hull 54. The wings are fitted with wing tip fences 61T, and the wings and wing tip fences together provide upper and side bounds to a ram air cushion 20 in a ram air cushion volume 46, with the upper bounds at the lower surface 1L of the wings. The propulsion system 26 utilizes energy 27 to drive thursters 28T such as fans (ducted or unducted fans or propellers), where the thrusters 28T are connected to propulsor ducts 28D that may encompass an engine such as a gas turbine engine or other engine or electric motor, without limitation. The propulsor ducts 28D are supported from the left and right wings 61L and 61R by propulsor struts 28S, as shown.

Figure 3B:
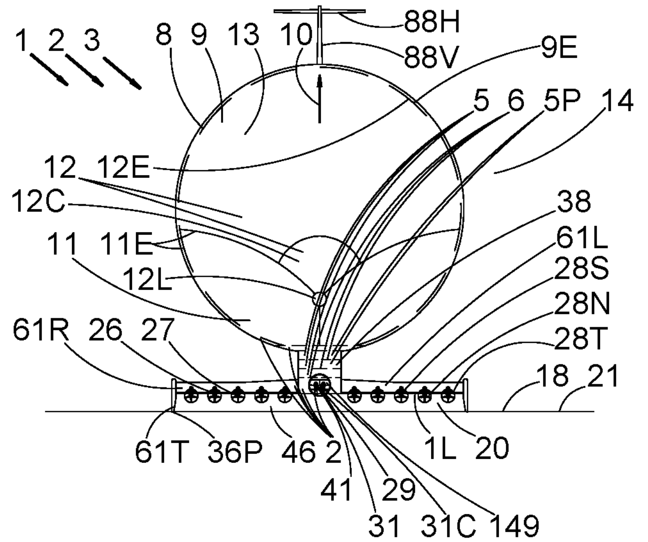

FIG. 3B shows another preferred embodiment of a PASRACS 1 in a transition mode still in contact with an Earth surface 21 that is a water surface 18, with the PASRACS 1 including ship structure 2 and a body 3. The left wing 61L and right wing 61R are below the encompassed lifting volume 9E as in the embodiment of FIG. 3A, but now the PASRACS 1 does not have a central hull 54, with the wing tip fences 61T serving as tip floats that provide buoyancy from water displacement from a displaced volume below the water surface 18, when the vehicle is in a static state with a loading condition that is net heavier-than-air. The embodiment of FIG. 3B is shown with the encompassed lifting volume 9E containing lifting gas 9 now including both a lower helium enclosure 11E containing helium 11, and an upper hydrogen enclosure 12E containing hydrogen 12 which generates greater aerostatic lift than an equivalent volume of helium, but should be separated from payload volumes to the extent practicable because of the flammability of hydrogen gas. FIG. 3B also shows a separate enclosure for cold hydrogen 12C such as can come from boil-off of liquid hydrogen 12L from a liquid hydrogen tank in the PASRACS 1. The cold hydrogen 12C can optionally provide a cooling source for a HVAC (heating, ventilation and air conditioning) system on the vehicle, as will be discussed further subsequently in this disclosure. Gas from the cold hydrogen 12C location shown can optionally be piped to the propulsion system 26 for use as a fuel in a combustor or fuel cell, and can optionally be piped to other hydrogen enclosures 12E for replenishment of lifting gas as needed. Mechanical means, pump means, and ballonet means can be utilized for enabling movement of gases and varying gas enclosure volumes, as known in the art of gas management in airships. The embodiment of FIG. 3B also differs from that of FIG. 3A in that FIG. 3B shows an empennage with a horizontal stabilizer 88H and a vertical stabilizer 88V, rather than the use of angled stabilizers 88A. A T-tail configuration is shown, but low tail or cruciform tails could be used within the spirit and scope of the invention.

Figure 3C:
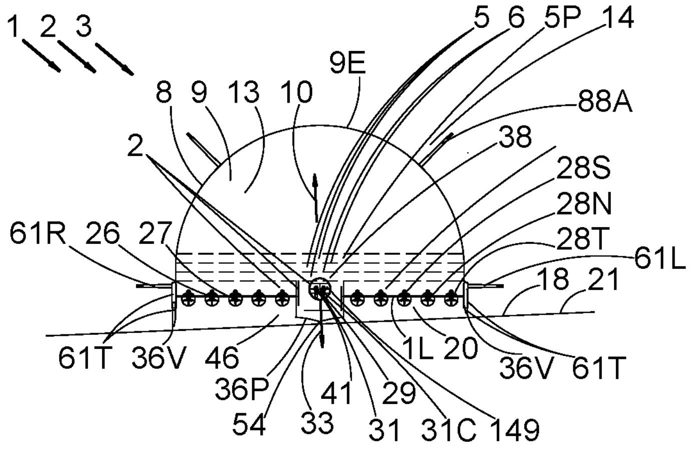

FIG. 3C shows a front view of another preferred embodiment of a partially aerostatically supported ram air cushion ship 1 or PASRACS 1, which is in a flight in ground-effect, banked configuration with a bank angle or roll angle of 2.5 degrees, shown for illustration and without limitation. The front view is slightly angled by 2.5 degrees, so the weight vector 33 aligned with the Earth's gravity vector is also tilted by 2.5 degrees, as illustrated, as is also the aerostatic lift force 10 which is a vector diametrically opposite to Earth's gravity vector, and the water surface 18 that is perpendicular to the Earth's gravity vector. This embodiment has an encompassed lifting gas envelope 9E with a boundary that is approximately a half circle rather than a full circle, while it should be understood that still other embodiments can have lifting gas envelopes that are various parts of a circle or ellipse or oval or other shape, without limitation. The embodiment of FIG. 3C has a hull 54 and is also shown with angled stabilizers 88A but now in a V-tail configuration, as opposed to the inverted V-tail configuration shown earlier in FIG. 3A. The embodiment of FIG. 3C is shown with short stub wings for the left wing 61L and right wing 61R, and these stub wings may be fitted with trailing edge control surfaces not visible in this front view, which trailing edge control surfaces may be one or more of aileron, flap, flaperon or elevon type control surfaces. The wing tip fences 61T that are illustrated are integrated with variable height planning surfaces 36V beneath them, and are shown with the left and right variable height planning surfaces 36V at different heights so as to better seal spanwise leakage flow from the left and right sides of the ram air cushion 20 in the ram air cushion volume 46, even is this kind of flight condition with a bank angle that would otherwise result in very different leakage flow gaps on left and right sides. By improving spanwise flow gap sealing, the overall lift induced drag of the PASRACS 1 in a banked configuration can be reduced, while persons on board can be more comfortable and possibly be free of sensing the floor tilt if the vehicle executes a "coordinated turn" with a bank angle such that the following coordinated turn criterion known from flight physics is at least approximately satisfied in consistent units:

$$\text{Gravitational acceleration} * \tan(\text{bank angle}) = (\text{forward velocity squared})/\text{turn radius}$$

For the illustrated bank angle of 2.5 degrees, with gravitational acceleration being 32.2 ft/sec$^2$ and at a nominal cruise speed (forward velocity) of 367 ft/sec (250 miles/hr), this yields a turn radius of approximately 95,800 ft or 18 miles, which should pose no issues for heading corrections in intercontinental enroute cruise tracks. These numbers should be treated as representative, and not limiting, and of course vary with both speed and bank angle according to the equation above noted, with smaller turn radius, tighter turns possible at lower speeds and/or higher bank angles.

The variable height hydrodynamic planing surfaces 36V can be rotationally and/or translationally variable height, can optionally be integrated with tip floats in addition to the wingtip fences 61T, and can use an actuation controlled and/or suspension mounted variable height system (both presumed in the illustrated embodiment). The planing surfaces 36V can be of hydroski or hydrofoil or other planing surface type within the spirit and scope of the invention.

Figure 3D:
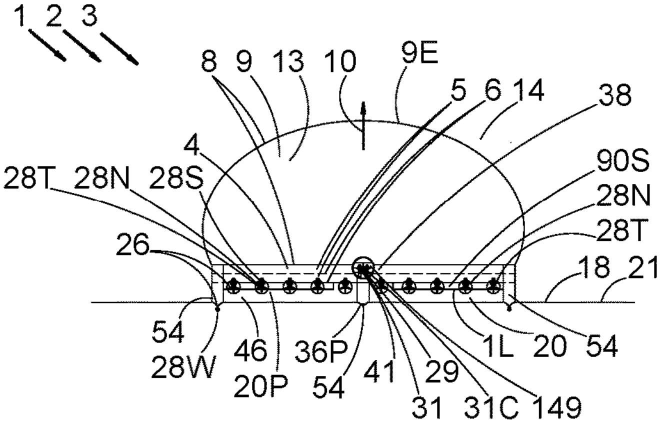

FIG. 3D shows a front view of another preferred embodiment of a partially aerostatically supported ram air cushion ship 1 or PASRACS 1, wherein the body 3 acts as a lifting body with support from a ram air cushion 20 beneath the body 3. This preferred embodiment is not fitted with wings. Tail surfaces for stability and control are included, but are not visible in this front view. The tail surface can comprise at least one of a horizontal surface, a vertical surface and an angled surface. The body 3 includes a lifting gas 9 that is a low-density lifting gas 13, in an encompassed lifting volume 9E enveloped by a lifting gas enclosure 8 that in turn provides separation of the lifting gas 9 from the outside atmosphere 14. The lifting gas 9 creates an aerostatic lift force 10 as shown. Payload volume 4 includes decks 5 at levels 6 and also includes a cabin 38. A flight deck or cockpit 31C is fitted with windows 149 and accommodates crew 41. Operation of the PASRACS 1 can be controlled with inputs from the crew 41 using at least one crew input device 31 and with inputs from a vehicle control and navigation system 29. The ram air cushion volume 46 is bounded on top by a lower surface 1L, at the rear by side flaps 90S that deploy downwards from the body 3, and at the sides (at longitudinal locations forward of the side flaps 90S) by the hulls 54 at the forward left and right sides of the body 3. Another hull 54 is located at a centerline aft location under the body 3, and separates left and right sides of the ram air cushion 20 under the aft body in a similar manner to the keel 88K shown in the embodiment of FIG. 1G, and in a similar manner contributing to roll stability and yaw stability of the PASRACS 1. The propulsion system 26 includes thrusters 28T connected to nacelles 28N that in turn are connected to the PASRACS 1 through propulsor struts 28S, as illustrated. The thrusters 28T contribute to pressurizing the ram air cushion 20 when the side flaps 90S are deployed, thereby making the ram air cushion 20 a power-augmented ram air cushion 20P. When the PASRACS 1 is in contact with an Earth surface 21 that is a water surface 18, the propulsion system 26 further comprises controllable water thrusters 28W attached under hulls 54. The illustrated water thrusters 28W are "azipod thrusters" known from the prior art of highly maneuverable watercraft such as tugboats and cruise ships, where the azipod thrusters use at least one of (i) a yaw-vectorable propeller, (ii) a yaw-vectorable waterjet thruster, (iii) a yaw-vectorable magnetohydrodynamic drive, (iv) an azimuth thruster, and (v) a cyclorotor such as a Voith Schneider propeller. The use of water propulsion and maneuvering with azipod thrusters enables quiet and very precise operations of a PASRACS 1 on a water surface 18, for operations such as rendezvous, alignment and mating and unmating of payload transfer craft (e.g., the payload transfer transport modules 47 that serve as boarding barges in the embodiment described with reference to FIGS. 1A through 2F), without limitation.

Figure 3E:
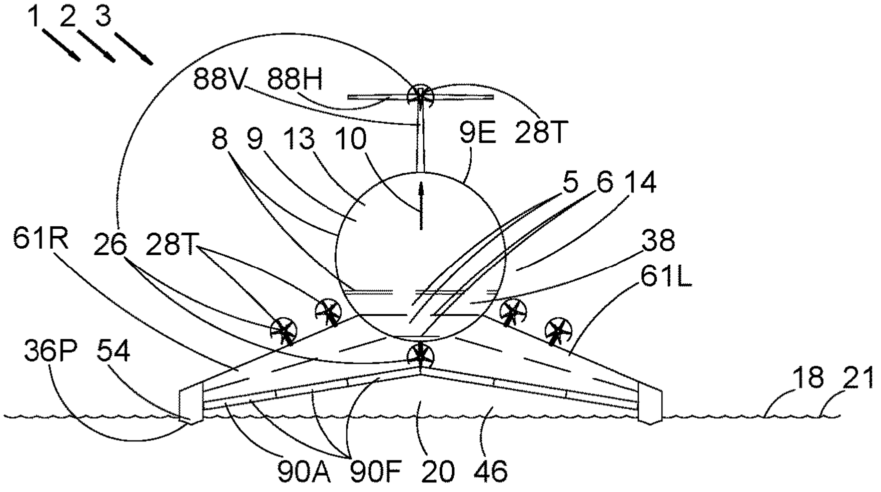

FIG. 3E shows a front view of another preferred embodiment of a partially aerostatically supported ram air cushion ship 1 or PASRACS 1, which has a body 3 of a round cross-section that can be near-circular and includes a lifting gas 9 that is a low-density lifting gas 13, in an encompassed lifting volume 9E enveloped by a lifting gas enclosure 8 that in turn provides separation of the lifting gas 9 from the outside atmosphere 14. The lifting gas 9 creates an aerostatic lift force 10 as shown. Payload volume 4 includes decks 5 at levels 6 and also includes a cabin 38. An empennage comprising a T-tail is shown, with a horizontal stabilizer 88H near the top of a vertical stabilizer 88V. A thruster 28T of the propulsion system 26 is shown wherein energized air from the thruster 28T can augment the control effectiveness of control surfaces comprising a rudder behind the vertical stabilizer 88V and one or more elevator(s) behind the horizontal stabilizer 88H. The rudder and elevator(s) are not seen in this front view. The propulsion system 26 illustrated also includes a forward central member and plural members above a left wing 61L and a right wing 61R, wherein the wings have anhedral and wingtip members that also serve as hulls 54. The bottoms of the hulls include hydrodynamic planning surfaces 36P as known in the prior art of flying boats, seaplanes, hydroplanes and speedboats. A ram air cushion 20 in a ram air cushion volume 46 is created under the left wing 61L and right wing 61R, with increased pressure from trailing edge downward deployment of flaps 90F as well as drooping of ailerons 90A. Note that differential aileron droop can provide aerodynamic rolling moment, as known in the prior art of airplanes with ailerons and drooping ailerons that may also be categorized as flaperons.

Figure 3F:
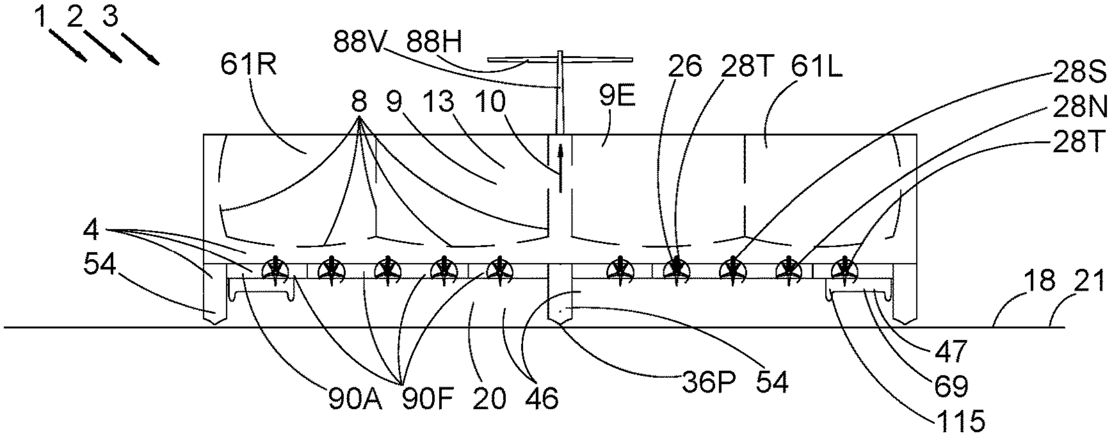
Figure 3G:
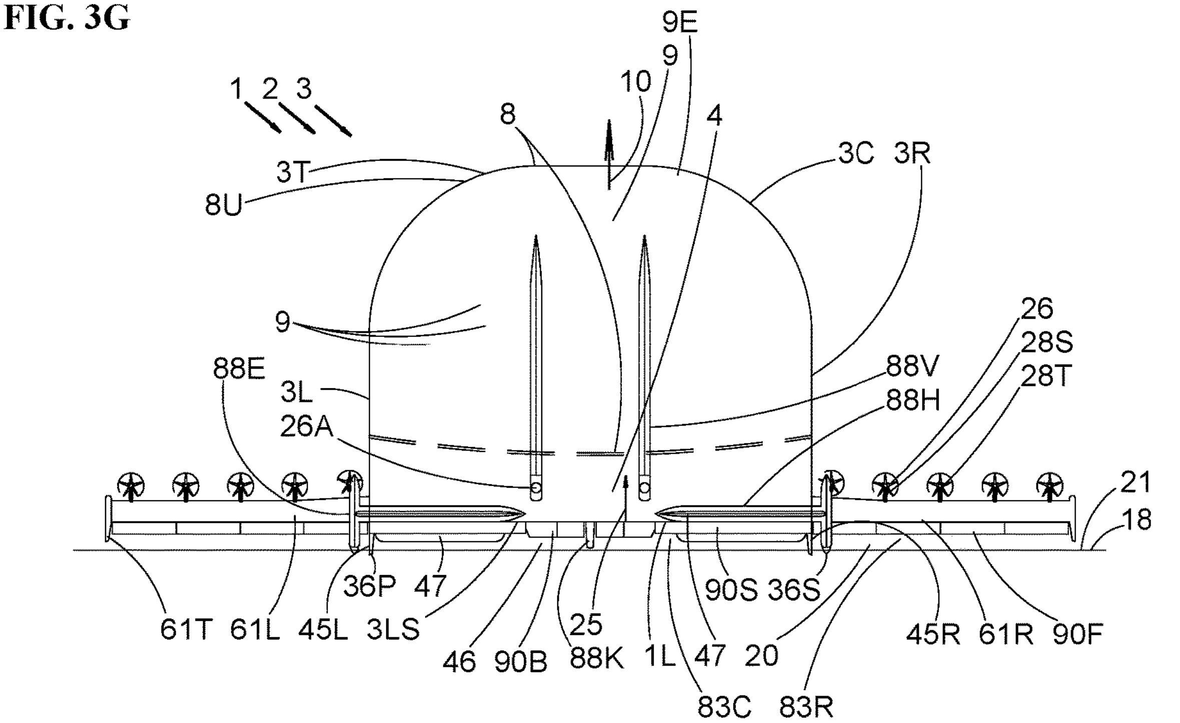
FIGS. 3G and 3H show rear views of some alternate preferred embodiments of a partially aerostatically supported ram air cushion ship.
Figure 3H:
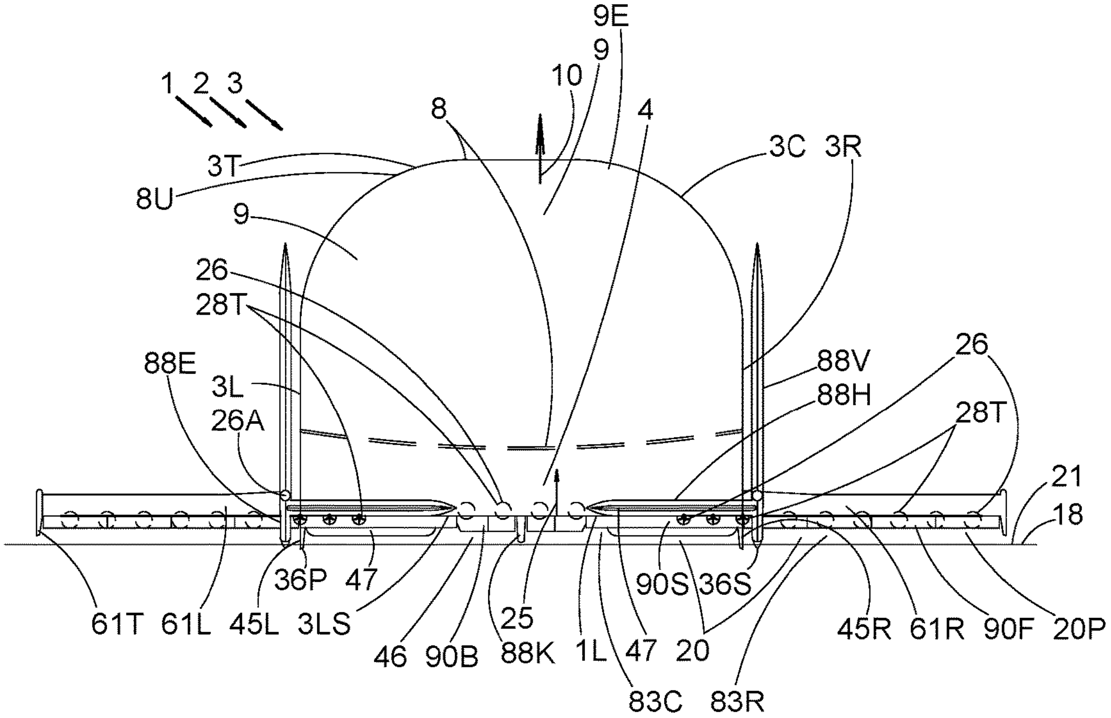

FIG. 3F shows a front view of another preferred embodiment of a partially aerostatically supported ram air cushion ship 1 or PASRACS 1 wherein thick members for a left wing 61L and right wing 61R together make up a "body" 3 even though a traditional fuselage is not included in this configuration. This configuration can be considered to be a span-loader wing in ground effect wherein the wings also include a lifting gas 9 that is a low-density lifting gas 13, in an encompassed lifting volume 9E enveloped by a lifting gas enclosure 8 that provides multiple cells or "gas bags" and also provides separation of the lifting gas 9 from the outside atmosphere 14. The lifting gas 9 creates an aerostatic lift force 10 as shown. A specific payload configuration is not shown but it should be understood that payload can be accommodated in payload volume 4 in one or more of the wings 61L and 61R and the plural hulls 54. A ram air cushion 20 in a ram air cushion volume 46 is created under the left wing 61L and right wing 61R and above an Earth surface 21 that is a water surface 18, with increased pressure from trailing edge downward deployment of flaps 90F as well as drooping of ailerons 90A. Note that differential aileron droop can provide aerodynamic rolling moment, as known in the prior art of airplanes with ailerons and drooping ailerons that may also be categorized as flaperons. The propulsion system 26 includes thrusters 28T connected to propulsor nacelles 28N that in turn are connected to the PASRACS 1 through propulsor struts 28S, as illustrated. As in the embodiment of FIG. 3E, the embodiment of FIG. 3F also features a T-tail. The embodiment shown in FIG. 3F also illustrates at least one payload transfer transport module 47 that is configured as a vehicle 115 serving as a transfer vehicle 69. This vehicle 115 can be winched down and detached from the PASRACS 1, to carry disembarking payload to a destination location. Example types of vehicle 115 include, without limitation, a boat, a catamaran, a trimaran, a yacht, a barge, a hydrofoil boat, a vehicle train, a hovercraft, an amphibious vehicle capable of traversing on both water and land, a landing craft, and an amphibious air vehicle capable of traversing on both water and through the air (such as a helicopter or helistat fitted with water landing gear). For onboarding payload the same type of vehicle 115 can board payload at an origin location, traverse to a mating location where it locates itself under the PASRACS 1, and is then winched up to mate securely to the underside of the PASRACS 1.

FIG. 3G shows a rear view of another preferred embodiment of a partially aerostatically supported ram air cushion ship 1 or PASRACS 1, which is similar to the preferred embodiment described with reference to FIGS. 1A through 2F, but wherein the location of the thrusters 28T of the propulsion system 26 is now above the wings which comprise the left wing 61L and the right wing 61R. The propulsor struts 28S project upwards from the wing in a manner similar to certain aircraft with overwing propulsors, such as the HondaJet or the VFW 614 or the Dornier Do X. The propulsor struts 28S support the propulsor nacelles 28N and thrusters 28T in representative overwing locations as shown. This rear view also illustrates the flaps 90F deployed downward at the wing trailing edges, and the side flaps 90S and body flaps 90B deployed downward from the body 3 of the PASRACS 1. Other features are the same as or similar to those that were earlier described in the description of the preferred embodiment of FIGS. 1A through 2F. Note that with the overwing propulsor configuration of FIG. 3G, the ram air cushion 20 is no longer a power-augmented ram air cushion. However, an advantage of the configuration of FIG. 3G is that the propulsors are located at a higher elevation relative to the water surface 18, and so less likely to suffer from problems associated with being impacted by spray impingement or contact with the tops of waves in adverse weather conditions. For this same reason, this configuration allows greater weather tolerance for smaller scale versions of the vehicle, with lesser length and width and height and smaller payload capacity than the preferred embodiment of FIGS. 1A through 2F.

FIG. 3H shows a rear view of another preferred embodiment of a partially aerostatically supported ram air cushion ship 1 or PASRACS 1, which is similar to the preferred embodiment described with reference to FIGS. 1A through 2F, but with the empennage now comprising a U-tail or H-tail configuration and having no body mounted vertical tail(s). The vertical tails 88V are now structurally connected to and supported by the outboard ends of the horizontal tails 88H, as illustrated. The bottom parts of the vertical tails 88V serve as stabilizer endplates 88E for the horizontal tails 88H, with hydroskis 36S underneath to provide hydrodynamic reaction with the water surface 18 upon contact. The hydroskis 36S may optionally be suspension-mounted and may optionally be height-adjustable (in which case they would comprise variable height hydrodynamic planing surfaces 36V). The propulsion system 26 that is illustrated comprises thrusters 28T forward and slightly under the left wing 61L and right wing 61R, which provide energized flow under the wings and make the ram air cushion 20 under the wings into a power-augmented ram air cushion 20P, under the wings and forward of a Kutta condition at the trailing edges of the deployed flaps 90F. The propulsion system 26 as illustrated also includes thrusters 28T forward and under the body 3, which provide energized flow under the body 3 and make the ram air cushion 20 under the body into a power-augmented ram air cushion 20P, under the body and forward of a Kutta condition at the trailing edges of the deployed body flaps 90B and side flaps 90S. The propulsion system 26 also illustrates optional thrusters 28T located forward and slightly under the horizontal tails 88H, that energize flow in the ground-effect flow region beneath the horizontal tails 88H, and can provide a power-augmented ram air cushion there as well when trailing edge elevators 90E on the horizontal tails 88H are moved to a deflected trailing-edge down configuration by elevator actuators. For clarification, the elevators 90E are shown in FIG. 3H in a centered position and not in a trailing edge down position. Other features are the same as or similar to those that were earlier described in the description of the preferred embodiment of FIGS. 1A through 2F.

Figure 3I:
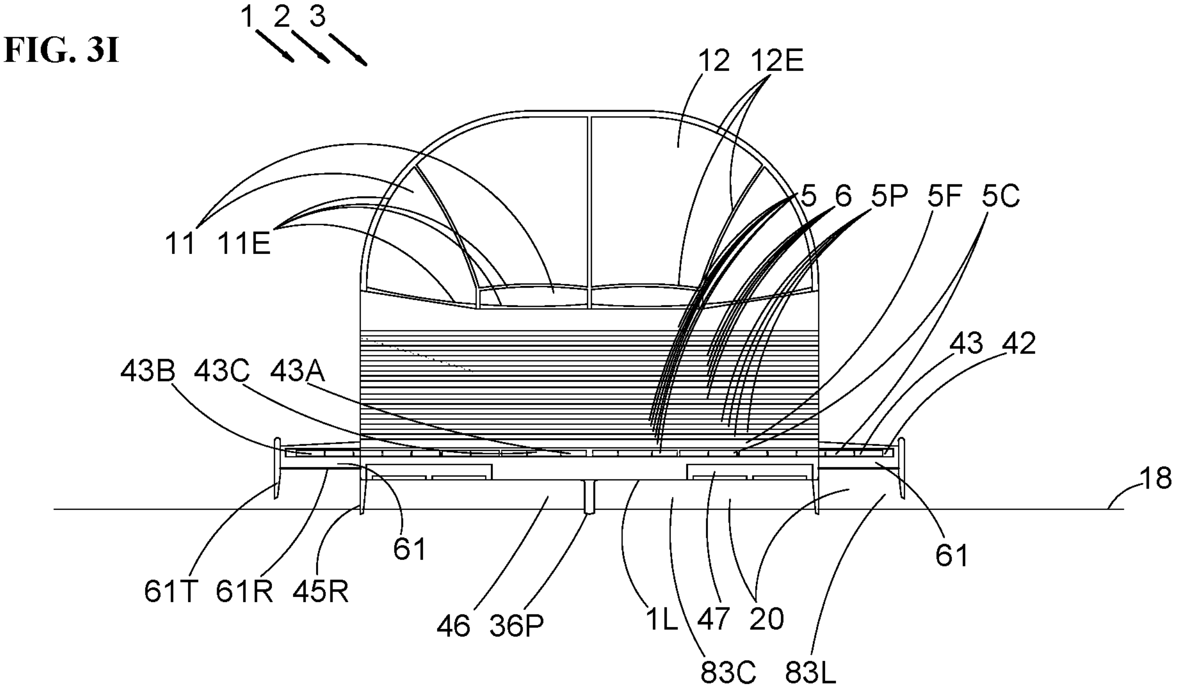
FIGS. 3I through 3L show transverse cross-sectional views of still other preferred embodiments of a partially aerostatically supported ram air cushion ship.

FIG. 3I shows a cross-sectional view from the front of another embodiment of a partially aerostatically supported ram air cushion ship 1 or PASRACS 1, similar to that described earlier with reference to FIG. 1E, but with much smaller span wings 61.

Figure 3J:
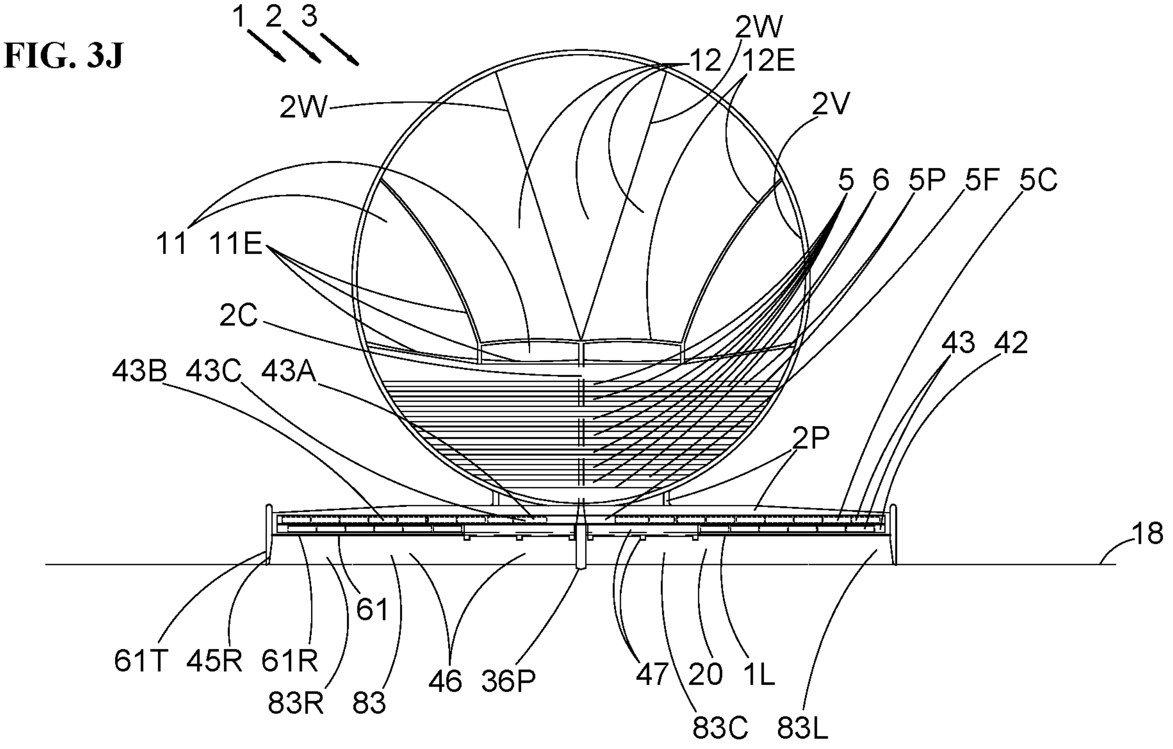

FIG. 3J shows a cross-sectional view from the front of another embodiment of a partially aerostatically supported ram air cushion ship 1 or PASRACS 1, wherein the body 2 has a near-circular cross-sectional configuration with a concave structure 2V, with the lowermost portion of the body 2 having decks 5 at various levels 6 and all the non-lowermost portions having volume for lifting gas comprising helium 11 and hydrogen 12, with hydrogen enclosures 12E separated from the lowermost portion housing payload, by helium enclosures 11E. Water contacting portions of the vehicle are limited to left and right wingtip portions and a central aft portion. The illustrated ship structure 2 includes the aforementioned concave structure 2V as well as at least one tension member 2W, a structural column 2C, and near-planar structure 2P. The tension members 2W and structural column 2C contribute to up-down load paths near the center region of the vehicle, down to the center hull. The illustrated embodiment has space for two stacked layers of containerized cargo in cargo containers 43A, within the envelope of the wing 61. The ram air cushion 20 comprises a ram air pressurized region 83 including a right region 83R, center region 83C and left region 83L, as shown.

Figure 3K:
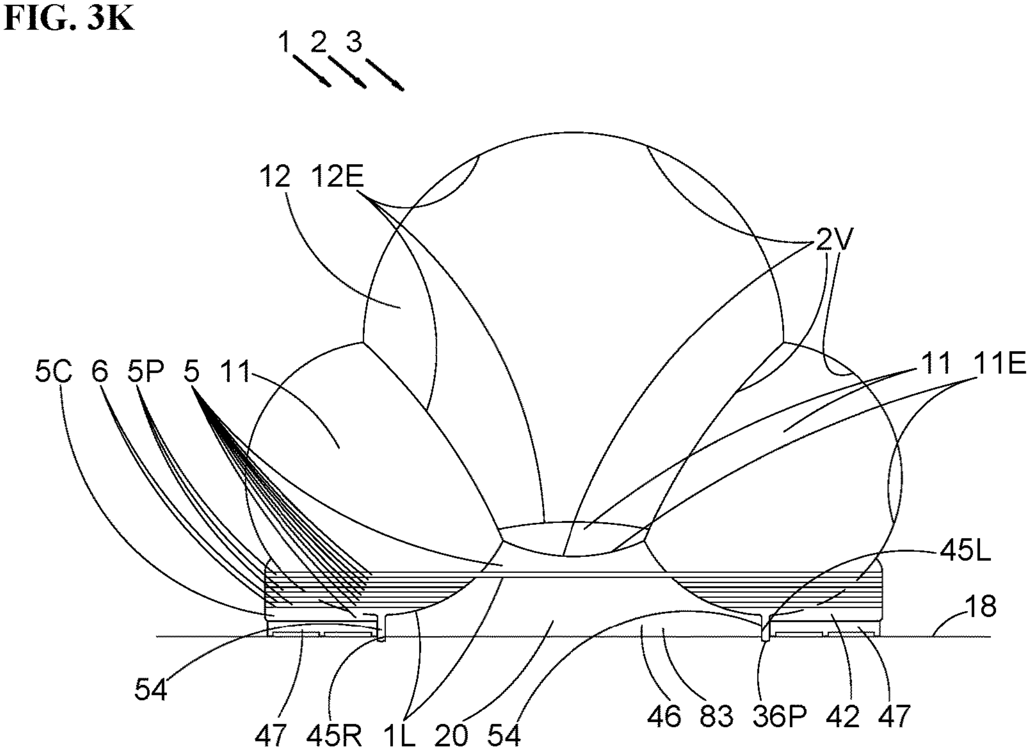

FIG. 3K shows a cross-sectional view from the front of another embodiment of a partially aerostatically supported ram air cushion ship 1 or PASRACS 1, wherein the body 3 has three lobes with left and right lobes on either side of a central lobe, and with lifting gas in all three lobes and constrained by concave structure 2V as shown. The center lobe is shown with helium lifting gas in an enclosure below an enclosure for hydrogen lifting gas. The left and right lobes are shown with only helium lifting gas, though this should not be construed as limiting. Decks 5 including a cargo deck 5C and one or more passenger decks 5P are located below the lifting gas enclosures, and include at least one deck that enables passengers to traverse laterally from the left to right lobe of the PASRACS configuration. A ram air cushion 20 is located below the vehicle and between a left catamaran sidewall 45L and right catamaran sidewall 45R associated with hulls 54 designed to contact a water surface 18. Payload transfer transport modules 47 can mate with the vehicle and be secured to it, just outboard of the hulls 54.

Figure 3L:
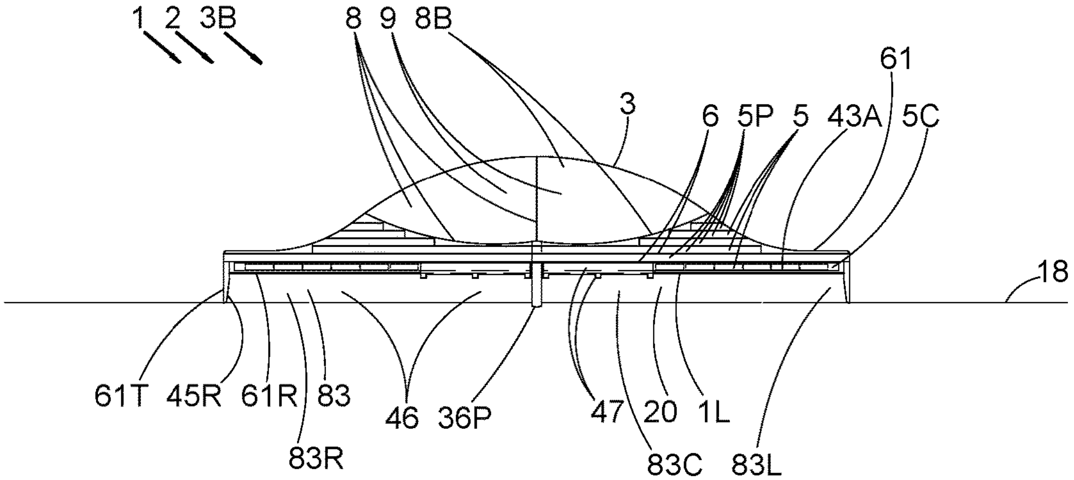

FIG. 3L shows a cross-sectional view from the front of another embodiment of a partially aerostatically supported ram air cushion ship 1 or PASRACS 1, wherein the body 3 is smoothly faired into and integrated with the wing 61 in a configuration that is a blended wing body 3B, as shown. The upper portion of the body 3 includes lifting gas 9 in a lifting gas enclosure 8 and a laterally separated second lifting gas enclosure 8B. The ram air cushion 20 comprises a ram air pressurized region 83 including a right region 83R, center region 83C and left region 83L, as shown.

FIGS. 4A through 4G show side views of some other alternate preferred embodiments of a partially aerostatically supported ram air cushion ship 1 or PASRACS 1. Illustrated decks 5 include a cargo deck 5C and passenger decks 5P.

Figure 4A:
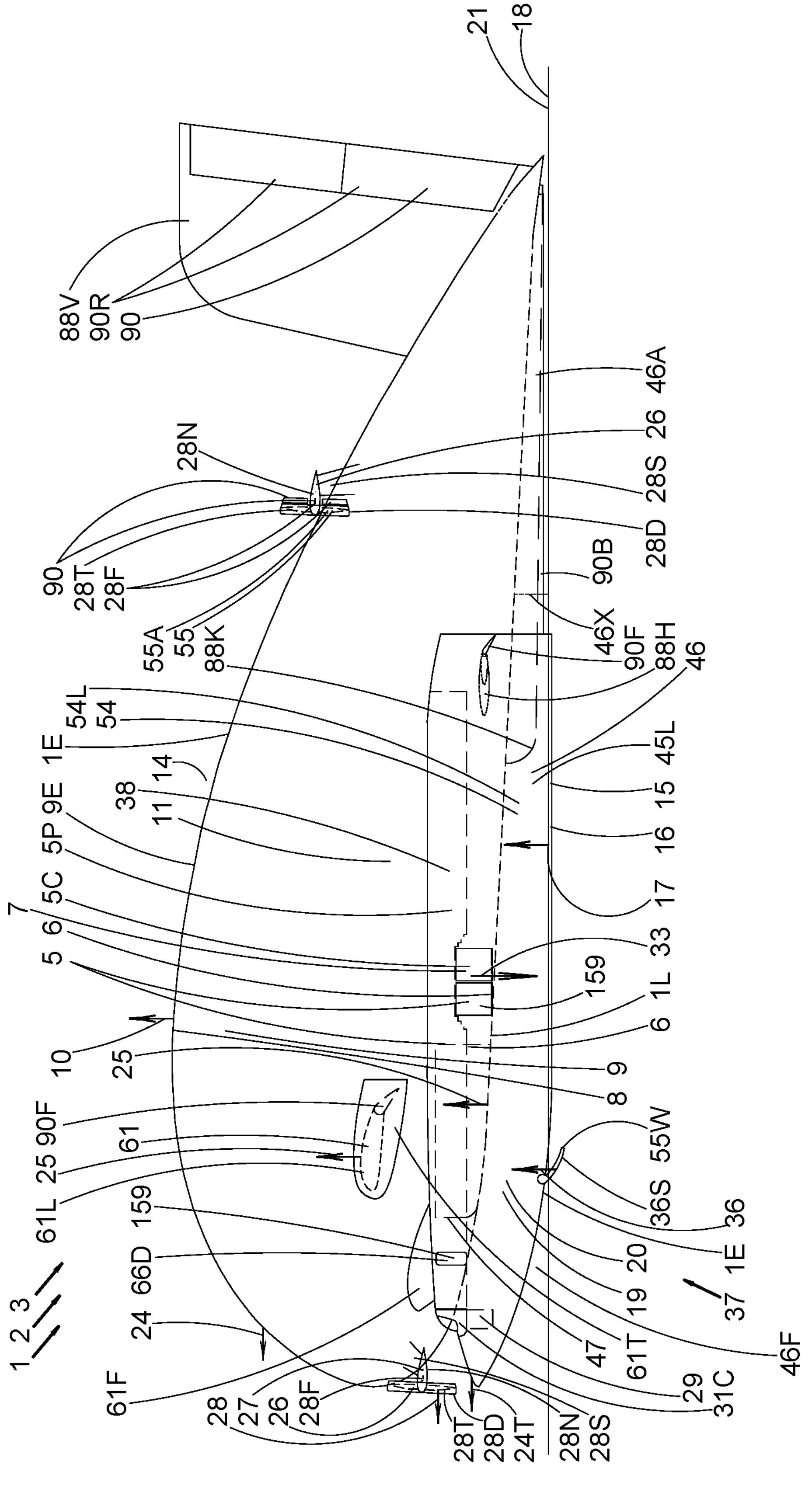
FIGS. 4A through 4G show left side views of some other alternate preferred embodiments of a partially aerostatically supported ram air cushion ship.

FIG. 4A shows a left side view of a preferred embodiment of a PASRACS 1 that is considerably smaller in scale than the preferred embodiment with the corresponding side view shown in FIG. 1A. The embodiment of FIG. 4A shows a PASRACS 1 with a ship structure 2 and body 3, wherein the body 3 includes a lifting gas 9 (such as helium 11) in an encompassed lifting volume 9E enveloped by a lifting gas enclosure 8 that in turn provides separation of the lifting gas 9 from the outside atmosphere 14. The lifting gas 9 creates an aerostatic lift force 10 as shown. On the sides of the body 3 and structurally connected to it by means such as wing-body join structure as known in the prior art of aircraft design, are wings including the visible left wing 61L fitted with a flap 90F and a wing tip fence 61T. Aerodynamic lift force 25 is produced both by the wing 61 and the body 3 as illustrated, when the PASRACS 1 has a positive airspeed 24. The body aerodynamic lift comes at least in part from a ram air cushion 20 beneath the lower surface 1L of the body 3. The PASACS 1 is able to maintain a positive airspeed 24 on a travel path 24T while countering drag forces, due to operation of a propulsion system 26 that uses energy 27 (such as chemical or electrical energy) to drive an illustrated thruster 28T near the front of the body 3, which comprises a propeller or fan in a duct 28D, such as a ducted prop or a ducted fan, as shown. The thruster 28T is connected to and supported by the ship structure 2 in the body 3, through a propulsor strut further comprises a 28S and a propulsor nacelle 28N. Another thruster 28T circumscribed by a duct 28D is visible above the aft part of the body 3, supported by a propulsor strut 28S and propulsor nacelle 28N. This aft thruster 28T is a fluid dynamic propulsor 55 that is an air propulsor 55A that also serves as a vectored thrust propulsor. The vectored thrust propulsor functions through the use of propulsor flow vectoring members 28F comprising controllable aerodynamic surfaces (also called "control surfaces") 90 that here entail vertically oriented yaw control vanes and horizontally oriented pitch control vanes in the slipstream of the aft thruster 28T. The aft end of the body 3 is fitted with a vertical stabilizer 88V that serves as a vertical tail providing a contribution to yaw stability for the PASRACS 1, and also providing support for at least one rudder 90R that serves as a control surface 90 that provides yaw control to the vehicle as it moves over an Earth surface 21 that is a water surface 18.

The body 3 further comprises left and right catamaran type members, and the left catamaran sidewall 45L on the left side of the left catamaran type member is visible in this left side view.

Payload volume 4 includes decks 5 at levels 6 and also includes a cabin 38.

FIG. 4A also shows a partially aerostatically supported ram air cushion ship 1, wherein an encompassed lifting volume 9E of said lifting gas 9 is configured to be at least 25% of an encompassed vehicle volume 1E of said partially aerostatically supported ram air cushion ship 1.

Figure 4B:
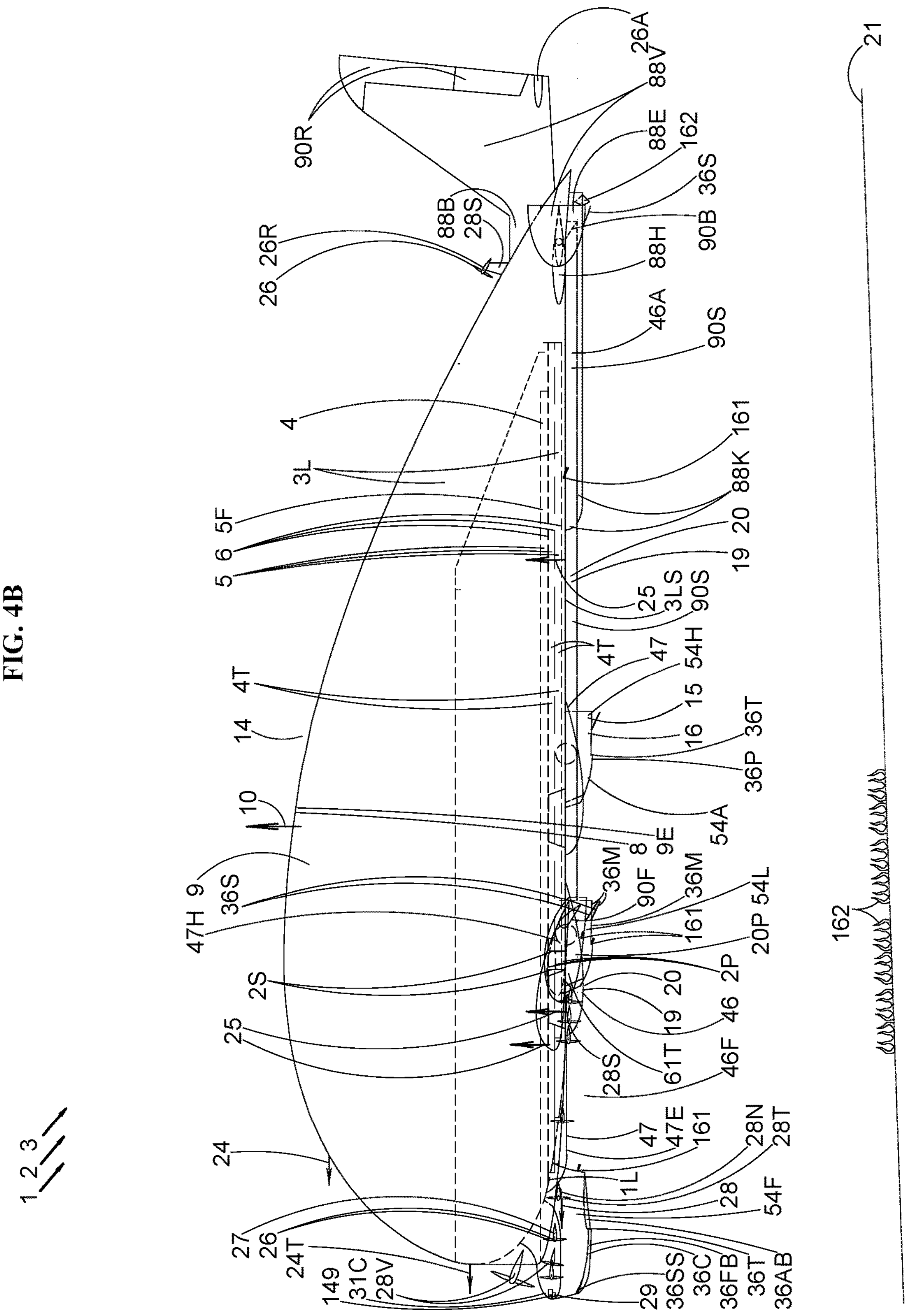

FIG. 4B shows a left side view of another preferred embodiment of a PASRACS 1 that is very similar in configuration to the preferred embodiment with the corresponding side view shown in FIG. 1A, but now fitted with structures and systems to enable it to serve as an aerial water-bomber or aerial firefighting vehicle that can fly over wildfires or forest fires and effectively combat those undesirable and highly damaging fires. The front hull 54F is shown configured with water contact and hydrodynamic features known from the prior art of flying boat hull design, including a hull forebody 36FB in the form of a vee hull with tailored optimally varying deadrise on either side of a keel line, a step 36T behind the forebody. 36FB, and a hull afterbody 36AB behind the step 36T, which hull afterbody 36AB is also in the form of a vee hull with tailored optimally varying deadrise on either side of a keel line. Hull chines 36C are shown on the upper side edges of the hull forebody 36FB, as well as optional hull spray strips 36SS that inhibit spray patterns from adverse effects such as harming view for the flight crew or impacting propulsion system parts in a harmful way. Similar hull features can be included on other hulls also within the spirit and scope of the invention. The PASRACS 1 is shown in flight in ground-effect at some significant height above an Earth surface 21, and shown at a nominal 2-degree angle of attack of the bottom of the body 3 relative to said Earth surface 21. One preferred concept of operations of this embodiment is that it can collect water from a water body while stationary, taxiing or taking-off on or from that water body, store the water in a tank volume 4T in the PASRACS 1, and then dump, spray, drop or otherwise discharge the water onto a fire to extinguish or suppress or reduce said fire. FIG. 4B shows several representative spray nozzles 161 that are discharging water that will fall on the Earth surface 21 at or near desired target locations to suppress or extinguish a fire 162 such as a forest fire or wildfire or other fire on the Earth surface 21. The spray nozzles 161 are shown at representative locations on the left hull 54L at the rear face of the step, on the wing tip fence 61T, the front hull 54F near its trailing edge, and the body left side surface 3L. These representative locations are not to be construed as limiting, as a variety of different spray nozzle locations could be provided anywhere around the PASRACS 1, including the body 3 and wings 61 in addition to hulls 54 and other vehicle locations. The spray nozzles 161 may spray either water or other fire suppression or fire extinguishing material or liquid, solid, gaseous or mixed phases in variant preferred embodiments of the invention. For the case of water, the water may be supplied from the illustrated water volume 4T that corresponds approximately to the two lowest decks of the PASRACS 1, with suitably strong and watertight floor, wall and ceiling members. The tank volume 4T may optionally be filled by water scoop 162 fitted to the keel 88K of the PASRACS 1. Deployment of the water scoop 162 is from a stowed configuration (shown in dashed lines) to a deployed configuration (labeled and shown in solid lines), and water can be scooped in when the PASRACS 1 is moving forward at speed right above a water surface with the intake of the water scoop 162 just under the water surface to enable very rapid filling of the tank volume 4T, in a manner known from the prior art of fire fighting flying boat aircraft such as the Viking/Canadair CL-415 “Super Scooper.” The embodiment shown in FIG. 4B also illustrates the use of vectored thrust propulsors 28V with two different size vectored thrusters shown, and these vectored thrust propulsors can be used beneficially for the aforementioned water scooping maneuver as well as other maneuvers of the PASRACS 1 while flying in ground-effect and while in transition modes such as taxiing on water, climbing the “hump” which is a well known phenomenon of seaplanes and flying boats during their takeoff maneuver, taking off, climbing, approaching, alighting, landing and decelerating with a combination of aerodynamic, aerostatic, hydrodynamic and hydrostatic forces and moments acting on the PASRACS 1. The vectored thrust propulsors 28V may feature controlled vectoring through the use of electric and/or hydraulic actuation and/or the use of a powered jackscrew similar to an aircraft stabilizer jackscrew. The vectored thrust propulsors may also optionally be rotors, ducted fans, unducted fans, and/or cyclorotors, and may be located at plural different locations on the PASRACS 1. For the case where the vectored thrust propulsors use a gas turbine, the vectored gas turbine exhaust or efflux may contact a water surface when in flight over a water surface, and evaporate some water to create steam that further augments the pressure in the ram air cushion 20 that is a power augmented ram air cushion 20P.

Figure 4C:
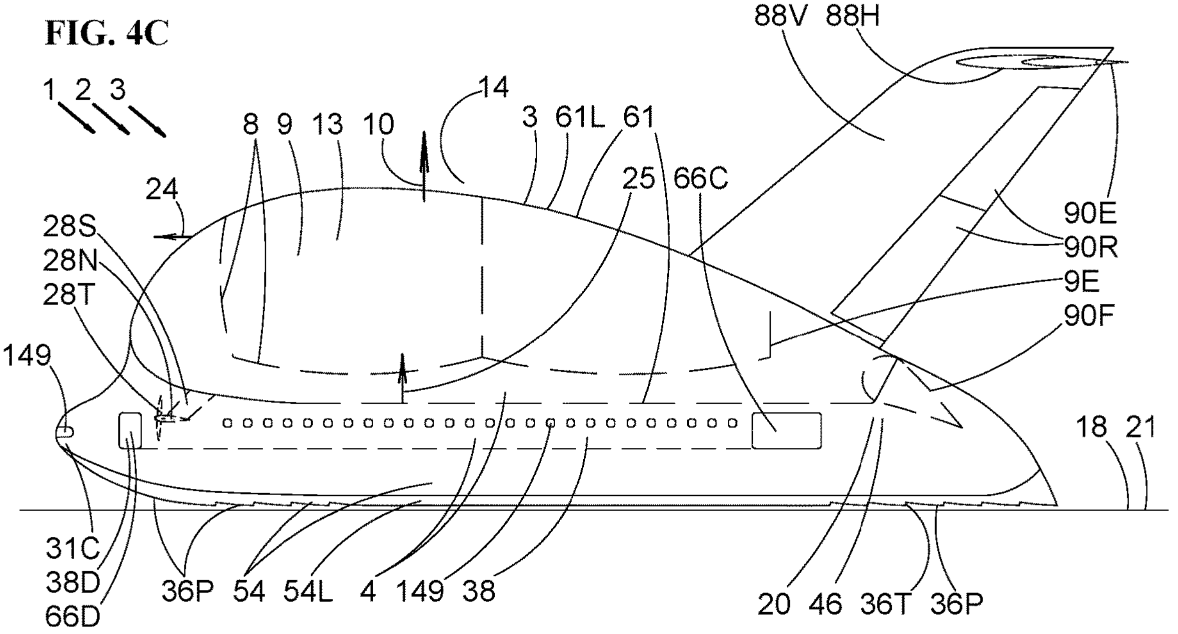

FIG. 4C shows a left side view of another preferred embodiment of a PASRACS 1 that is a partially aerostatically-supported flying wing configuration that is also a span-loaded configuration, in a manner to corresponding to the substantially similar embodiment earlier shown in front view in FIG. 3F. The PASRACS 1 includes ship structure 2. In this embodiment the wing 61 including the visible left wing 61L is a span-loaded wing that also serves as part of the body 3, in conjunction with hulls 54 including the visible left hull 54L. Lifting gas 9 can be a low-density lifting gas 13 such as helium or hydrogen both of which have lower density than the air in the atmosphere 14 outside the PASRACS 1. The lifting gas 9 is contained in lifting gas enclosures 8 that are in the span-loaded wing, and the lifting gas 9 provides an aerostatic lift force 10. The PASRACS 1 is fitted at an aft location with a vertical stabilizer 88V that serves as a vertical tail or fin. A horizontal stabilizer 88H is fitted to the vertical stabilizer 88V, and may be a fixed or trimmable horizontal stabilizer, as known in the art of airliners. Control surfaces at the trailing edges of the stabilizers comprise an aerodynamic elevator 90E at the trailing edge of the horizontal stabilizer 88H and a rudder 90R at the trailing edge of the vertical stabilizer 88V. A flap 90F at the trailing edge of the wing 61 is shown partially deployed trailing edge down, to provide an aerodynamic Kutta condition for a ram air cushion 20 forward of said flap 90F and below the bottom surface of the wing 61 and above an Earth surface 21 such as a water surface 18. The ram air cushion 20 works with the wing 61 in providing an aerodynamic lift force 25 when the PASRACS 1 is moving with positive airspeed 24, propelled by a thruster 28T supported by a propulsor nacelle 28N that is in turn supported from the wing 61 and body 3 by a propulsor strut 28S. The hull 54 is shown to include a payload volume 4 that can be reached for entry and egress via a door 38D that is a boarding door 66D that can be used for passengers and crew, and a cargo door 66C that can be used for cargo including bulk cargo and cargo on pallets and containerized cargo such as Unit Load Devices (ULDs) of various sizes and shape as known in the art of transport vehicles such as air transport vehicles. A flight deck or cockpit 31C is at the forward end of the left hull 54L, and windows 149 are shown for both the flight deck 31C and the cabin 38. The bottom of the hull 54 is shown with multiple hydrodynamic planing surfaces 36P and steps 36T, that allow for high speed and low drag in a hydrodynamic or water contact mode of operation, while still minimizing lateral leakage flow under the hull 54, from the ram air cushion 20 in the ram air cushion volume 46, when in a flight mode in ground-effect with small clearance under the hull 54, as shown in FIG. 4C. The embodiment of a PASRACS 1 shown in FIG. 4C can potentially serve as a much smaller feeder route vehicle that feeds passengers and cargo from secondary destinations, into a transport hub or major port or city destination, for transfer to and from a much larger intercontinental PASRACS 1 such as the large embodiment earlier described with reference to FIGS. 1A through 2F. Some examples of feeder routes can include the following, for example and without limitation: Persian Gulf feeder route, Black Sea feeder route, Arctic feeder route, Antarctic feeder route, Mississippi River feeder route, St. Lawrence River feeder route, Brahmaputra River feeder route, Ganges River feeder route, Nile River feeder route, archipelago and multi-islands feeder routes for Indonesia and the Philippines and the Hawaiian chain and other Pacific island groups and Caribbean islands.

Figure 4D:
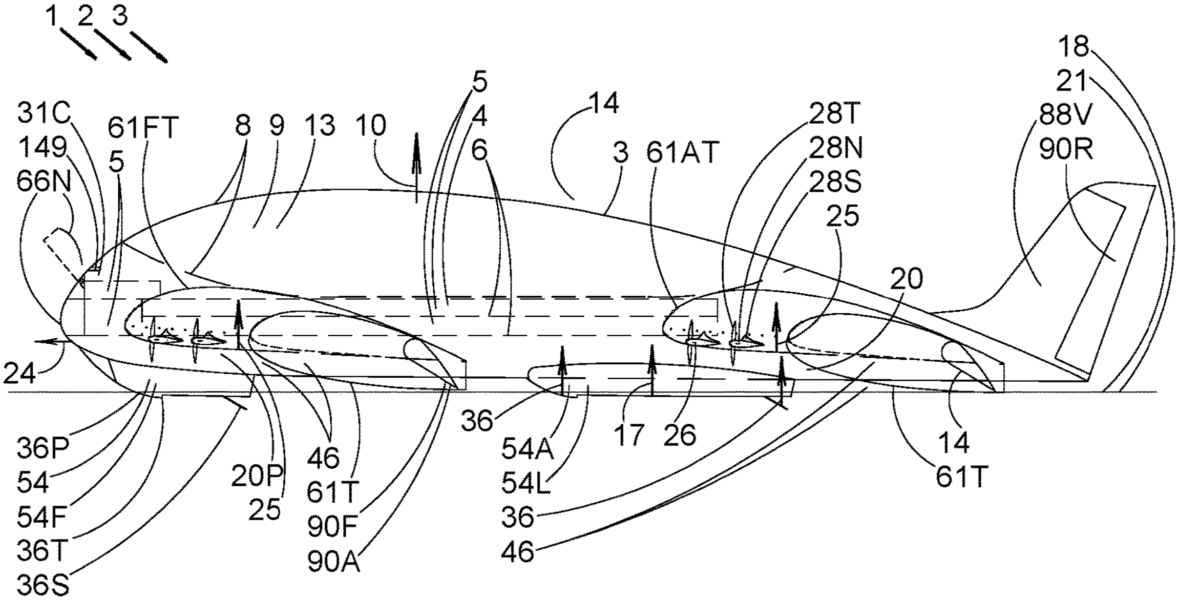

FIG. 4D shows a left side view of another preferred embodiment of a PASRACS 1 that is a tandem wing configuration. The PASRACS 1 includes ship structure 2 and a body 3. This tandem wing configuration has a forward tandem wing 61FT and an aft tandem wing 61AT, as shown, and each fitted with a wing tip fence 61T that is designed and serves as an induced drag reducing downward winglet for flight in ground-effect. The weight of the PASRACS 1 when in a moving forward on the water mode with positive airspeed 24, is supported by a combination of aerodynamic lift force 25 provided by both the tandem wings as shown, plus an aerostatic lift force 10 provided by a lifting gas 9 in a lifting gas enclosure 8, plus a hydrodynamic lift force 36 plus buoyancy from water displacement that is a hydrostatic lift force 17. Lifting gas 9 can be a low-density lifting gas 13 such as helium or hydrogen both of which have lower density than the air in the atmosphere 14 outside the PASRACS 1. The PASRACS 1 is fitted at an aft location with a vertical stabilizer 88V that serves as a vertical tail or fin along with a rudder 90R, but as shown no horizontal stabilizer is needed or provided, as the tandem wings can adequately provide both pitch stability and pitch trim, while the trailing edge controllable surfaces comprising high rate flaps 90F on the trailing edges of both the tandem wings, can be controlled collectively and differentially as needed to provide both pitch control and heave control moments and forces acting on the PASRACS 1. The propulsion system 26 includes thrusters 28T with propulsor nacelles 28N supported by both of the tandem wings through illustrated very short struts 28S in a quasi-slipper-nacelle installations, while full slipper-nacelle installations can also be used. Some of the pressurized slipstream flow from the thrusters 28T flows under the tandem wings and into the ram air cushions 20 in the ram air cushion volumes 46 under the wings and above an Earth surface 21 such as a water surface 18, making these regions into power-augmented ram air cushions 20P. The aft ends of the ram air cushion volumes 46 are below wing trailing edge mounted flaps 90F that serve as flaperons as they also have a roll control function as ailerons 90A, with high-rate actuation using preferably using powered actuators such as hydraulic actuators, electrohydraulic actuators, electromechanical actuators, linear actuators and rotary actuators known from the art of control surface actuator technology. The body 3 includes payload volume 4 comprising decks 5 at levels 6 below the lifting gas enclosure 8. The front end of the body 3 accommodates a cockpit or flight deck 31C including a window 149, and underneath the flight deck 31C a nose loading door 66N is provided, shown closed in solid lines. The nose loading door 66N is also for purposes of illustration shown in its open configuration in dashed lines. The interface shown in FIG. 4D between the bottom of the PASRACS 1 and the water surface 18, uses hulls 54 comprising a forward hull 54F and at least two laterally spaced aft hulls 54A of which the left hull 54L is visible in this view. The hulls have shaping to reduce drag at different speeds, including hydrodynamic planing surfaces 36P, steps 36T similar to those in flying boat aircraft, and hydroskis 36S that may be deployable and retractable and that may be fitted with shock absorbers with spring and damper attributes to reduce loads acting on the PASRACS 1 when it moves at speed over a water surface 18 and encounters waves on that water surface.

Figure 4E:
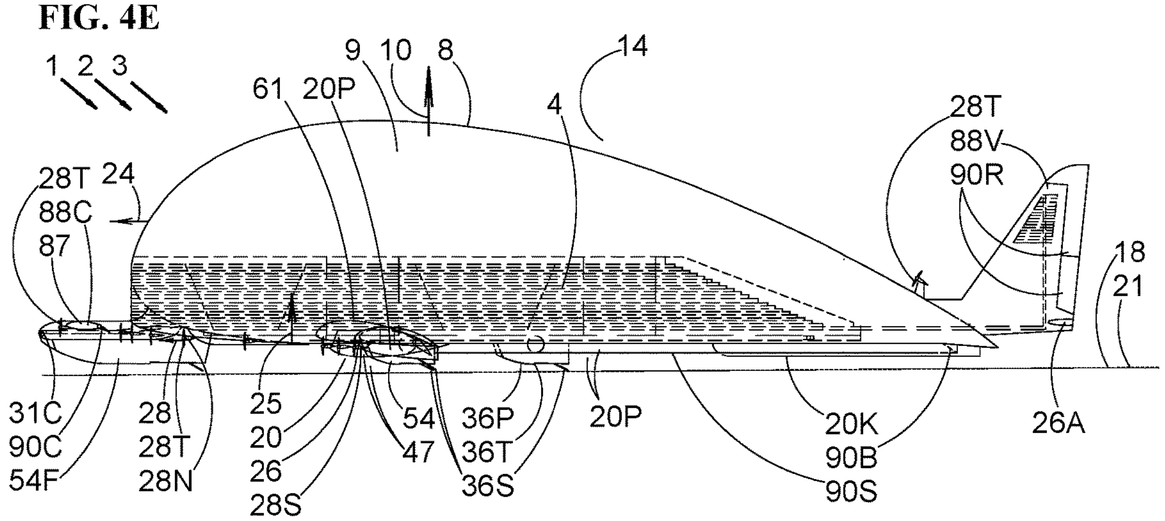

FIG. 4E shows a left side view of another preferred embodiment of a PASRACS 1 that is a canard configuration. This embodiment is similar in many ways to the preferred embodiment illustrated and described with reference to FIGS. 1A through 2F, but for longitudinal trim utilizes a canard surface 88C in the front region of the PASRACS 1 instead of a horizontal stabilizer 88H in the aft region of the PASRACS 1. The illustrated canard airfoil section Canard shown is a NACA 64(3) 418 airfoil with a trailing edge flap, but alternate airfoils and high lift devices and planforms and lofts can be used without limitation, within the spirit and scope of this invention. The canard surface 88C may optionally be trimmable, and is fitted with a trailing edge canard control surface 90C that serves as a canard flap and an elevator that can impart pitching moment trim and control upon the vehicle. The canard control surface 90C will preferably have high-rate actuation using powered actuators such as hydraulic actuators, electrohydraulic actuators, electromechanical actuators, linear actuators and rotary actuators known from the art of control surface actuator technology; serves as a longitudinal trim system 87 and may optionally also serve to contribute to roll trim and/or roll control through differential deflection of left and right canard control surfaces. Thrusters 28T blow pressurized air on the canard control surface and can increase its effectiveness in generating lift and pitching moment when the vehicle is travelling at relatively lower values of positive airspeed 24 and correspondingly relatively lower values of dynamic pressure. The canard control surface 90C is fitted on an extended length fuselage section portion of the body 3, that further includes a flight deck 31C and also serves integrally as the forward hull 54F. Note that the forward hull 54F is a member of plural hulls 54 configured to provide hydrostatic forces or water displacement buoyancy forces to help support the weight of the PASRACS 1 when it is floating statically on the water surface 18 supported by a combination of aerostatic lift force and hydrostatic lift force, with stable floatation enabled by having the vehicle center of gravity below an effective metacenter that takes into account both the hydrostatic and aerostatic lift. The PASRACS 1 of FIG. 4E includes ship structure 2 and a body 3 and a payload volume 4, wherein payload boarding and deplaning is accomplished via a payload transfer transport module 47, in a manner similar to the earlier described embodiment of FIGS. 1A through 2F. The propulsion system 26 now includes thrusters 28T with propulsor nacelles 28N supported by propulsor struts 28S, and provides thrust force 28 acting on the PASRACS 1. An auxiliary power unit 26A is also provided. Some of the pressurized slipstream flow from the thrusters 28T flows under the wing 61 and body 3 and into the ram air cushion 20 in the ram air cushion volume 46 under the wing 61 and body 3, forward of the body flap 90B and side flaps 90S, and above an Earth surface 21 such as a water surface 18, making this region into a power-augmented ram air cushion 20P. A keel 20K separates the aft portion of the ram air cushion 20 into left and right sides and contributes to vehicle roll and yaw stability. The weight of the PASRACS 1 when in a flight in ground-effect mode with positive airspeed 24 in the atmosphere 14, is supported by a combination of aerodynamic lift force 25 provided by the ram air cushion 20 and wing 61 and body 3 as shown, plus an aerostatic lift force 10 provided by a lifting gas 9 in a lifting gas enclosure 8. The PASRACS 1 is fitted at an aft location with a vertical stabilizer 88V that serves as a vertical tail or fin along with a rudder 90R, but as shown no horizontal stabilizer is provided for this canard configuration. The aerodynamic lift force 25 in this case is a summation of net lift from the wings 61, body 3 and canard surface 88C. A variant "tri-surface" embodiment may be fitted with an optional aft horizontal stabilizer 88H (not shown) in addition to the illustrated canard surface 88C, wherein the aerodynamic lift force 25 acting on the PASRACS 1 is a summation of net lift from the wings 61, body 3, horizontal stabilizer 88H and canard surface 88C.

Figure 4F:
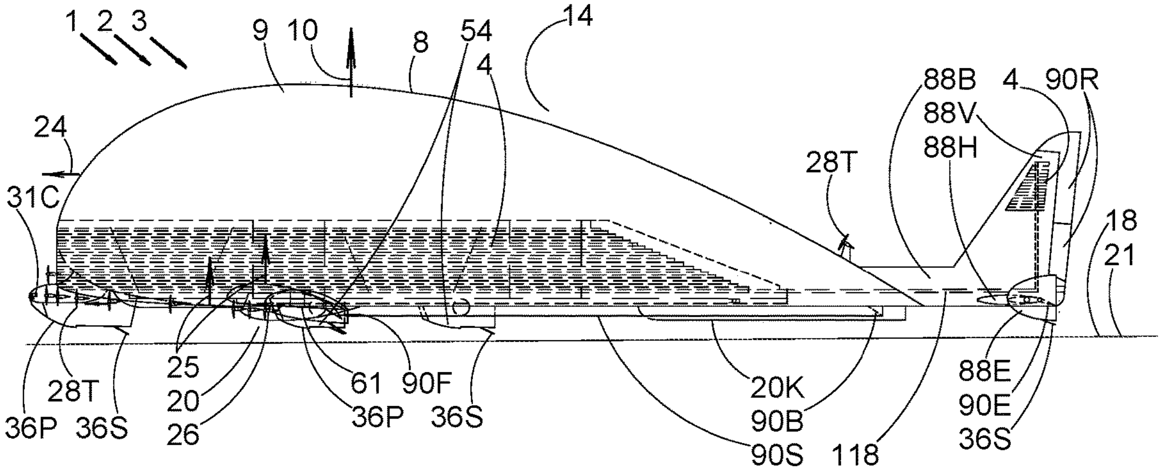

FIG. 4F shows a left side view of another preferred embodiment of a PASRACS 1 that is a configuration with a tail boom 88B. This embodiment is similar in many ways to the preferred embodiment illustrated and described with reference to FIGS. 1A through 2F, but the vertical stabilizer 88V and horizontal stabilizer 88H are moved further back to locations in the aft region of a tail boom 88B located at the aft end of the body 3 of a PASRACS 1. A walkway 118 goes through the tail boom 88B for passengers to access payload volume 4 in the vertical tail 88V. The increased "tail arms" of the vertical and horizontal tails allows them to contribute more greatly to yaw and pitch stability and control for given tail areas, as known from the prior art of aircraft with tail boom mounted vertical and horizontal tails. PASRACS 1 includes ship structure 2 and a body 3. The horizontal stabilizer 88H has stabilizer endplates 88E and aerodynamic elevators 90E for pitch control and trim. The vertical tail 88V has a rudder 90R for yaw control and trim. The body 3 includes a flight deck 31C and payload volume 4 and lifting gas 9 in a lifting gas enclosure 8. The bottom region of the body 3 includes hulls 54 capable of providing floatation or hydrostatic lift from water displacement. The hulls 54 also include hydrodynamic planing surfaces 36P and hydroskis 36S. The propulsion system 26 now includes thrusters 28T that provide thrust to counteract aerodynamic drag when the PASRACS 1 is in a forward flight in ground-effect mode of operation. The weight of the PASRACS 1 when in this flight in ground-effect mode with positive airspeed 24 in the atmosphere 14, is supported by a combination of aerodynamic lift force 25 provided by the ram air cushion 20 and wing 61 with flap 90F and body 3 as shown, plus an aerostatic lift force 10 provided by the lifting gas 9. The ram air cushion 20 is in the regions under the wing 61 and body 3, forward of the body flap 90B and side flaps 90S, and above an Earth surface 21 such as a water surface 18. A keel 20K separates the aft portion of the ram air cushion 20 into left and right sides and contributes to vehicle roll and yaw stability.

Figure 4G:
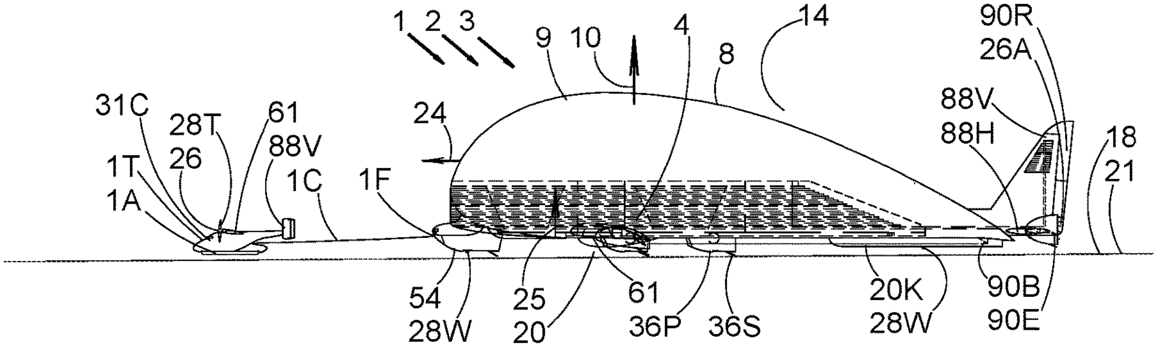

FIG. 4G shows a left side view, at a reduced scale relative to FIGS. 4E and 4F, of another preferred embodiment of a PASRACS 1 that is a configuration towed by a tow vehicle 1T. The towed PASRACS 1 is similar to the preferred embodiment illustrated and described with reference to FIGS. 1A through 2F, but now has no thrusters 28T that act on the air in the atmosphere 14. In other words, as illustrated the PASRACS 1 is a “glider” type of vehicle, that can maintain flight in ground-effect as shown only because of an effective thrust force from tension in the illustrated tow cable 1C acting on a tow cable fitting 1F, to counteract the aerodynamic drag acting on the PASRACS 1. The illustrated PASRACS 1 does have controllable water thrusters 28W such as the illustrated azipod type controllable thrust and direction of thrust propulsors, to enable propulsion and maneuvering while in a floating-on-water mode of operation such as low speed operations at origin and destination locations. Note that the tow vehicle 1T is fitted with a propulsion system 26 that has to be sufficiently powerful as to pull the PASRACS 1 along with the tow vehicle 1T at a desired positive airspeed 24. The illustrated propulsion system 26 on the tow vehicle 1T utilizes thrusters 28T such as a propeller, propfan, unducted fan, ducted fan, turbofan and/or turbojet that exhaust an energized downstream flow of jet efflux including air from the atmosphere 14, creating thrust. While a variety of tow vehicle types can be utilized, the one illustrated is an aircraft 1A with an air cushion landing system (ACLS). The aircraft 1A also has a wing 61 and a vertical tail 88V (visible) and horizontal tail (not visible in this view of a nominal H-tail configuration). The tow cable 1C and fittings on either end may include dual or multiple load paths to ensure fault tolerance, and cables may use various materials and architectures known in the art of structural cables, including metallic and/or composite materials, and twisted and braided stranding approaches amongst others. The PASRACS 1 includes ship structure 2 and a body 3. The horizontal stabilizer 88H has aerodynamic elevators 90E for pitch control and trim. The vertical tail 88V has a rudder 90R for yaw control and trim. The body 3 includes a payload volume 4 and lifting gas 9 in a lifting gas enclosure 8. The bottom region of the body 3 includes hulls 54 capable of providing floatation or hydrostatic lift from water displacement. The hulls 54 also include hydrodynamic planing surfaces 36P and hydroskis 36S. The weight of the PASRACS 1 when in the illustrated flight in ground-effect mode with positive airspeed 24 in the atmosphere 14, is supported by a combination of aerodynamic lift force 25 provided by the ram air cushion 20 and wing 61 and body 3 and horizontal stabilizer 88H, plus an aerostatic lift force 10 provided by the lifting gas 9. The ram air cushion 20 is in the regions under the wing 61 and body 3, forward of the body flap 90B and above an Earth surface 21 such as a water surface 18. A keel 20K separates the aft portion of the ram air cushion 20 into left and right sides and contributes to vehicle roll and yaw stability. Note that the type of tow vehicle 1T illustrated in FIG. 4G can also be used to tow a normal or powered PASRACS 1 such as the configuration of FIG. 1A through 2F fitted with an added tow cable fitting 1F, when towing is needed or beneficial for some non-normal or emergency conditions. Some examples of such a non-normal conditions include, without limitation, (i) when a PASRACS 1 has had multiple thruster failures, or (ii) when a PASRACS 1 has made an emergency landing on sea ice in the Arctic Ocean and does not have sufficient thrust to take off overcoming drag associated with breaking through some ice for the takeoff run.

FIGS. 5A through 5H show plan views of still other alternate preferred embodiments of a partially aerostatically supported ram air cushion ship 1 or PASRACS 1.

Figure 5A:
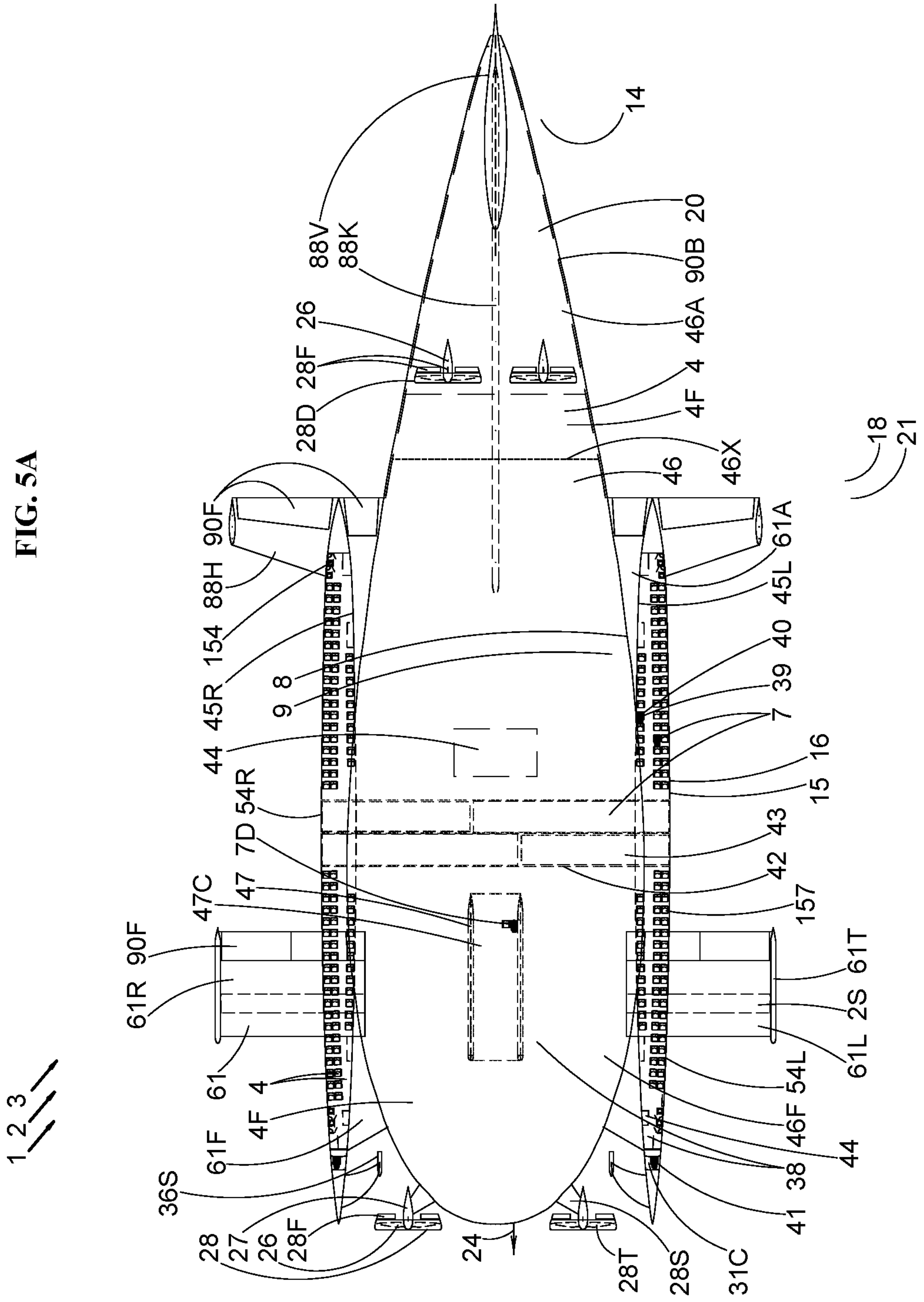
FIGS. 5A through 5H show plan views of still other alternate preferred embodiments of a partially aerostatically supported ram air cushion ship.

FIG. 5A shows a plan view of an alternate preferred embodiment of a partially aerostatically supported ram air cushion ship 1 or PASRACS 1. FIG. 5A can optionally correspond, without limitation, to the side view of the alternate preferred embodiment shown in FIG. 4A. The optional alternate preferred embodiment configuration of FIGS. 4A and 5A in combination, illustrates a partially aerostatically supported ram air cushion ship 1, comprising in combination: a ship structure 2 incorporating a body 3 with a payload volume 4 with plural decks 5 at plural levels 6 (not visible in this view) for carrying payload 7; said ship structure 2 connected to a lifting gas enclosure 8 configured to contain a lifting gas 9 providing an aerostatic lift force 10 acting on said ship 1, said lifting gas 9 comprising at least one of helium 11, hydrogen 12 and a low-density lifting gas 13 (specific lifting gases not called out in FIG. 5A) with density lower than that of an atmosphere 14 immediately outside said ship 1; a hydrostatic floatation subsystem 15 comprising a water displacing structure 16 connected to said ship structure 2, said water displacing structure 16 configured to provide a hydrostatic lift force 17 (not shown in the view of FIG. 5A) acting on said ship 1 in a period of time when said water displacing structure 16 is displacing a water volume below a water surface 18 below said atmosphere 14; an aerodynamic lift subsystem 19 comprising a ram air cushion 20 when said ship 1 has positive airspeed 24, said ram air cushion 20 below a lower surface 1L of the ship 1 and above an Earth surface 21, wherein said aerodynamic lift subsystem 19 comprising said ram air cushion 20 is configured to contribute an aerodynamic lift force 25 acting on said ship 1 when said ship 1 has said positive airspeed 24; a propulsion system 26 capable of using energy 27 to generate a thrust force 28 acting on said ship 1; and a vehicle control and navigation system 29 (not shown in FIG. 5A but in an equipment bay that might be, without limitation, under the flight deck 31C) configured to enable said ship 1 to move and maneuver on a travel path 24T; wherein the weight 33 of said partially aerostatically supported ram air cushion ship 1 is substantially balanced by a combination of said aerostatic lift force 10 and said hydrostatic lift force 17 (weights and lift force vectors not shown in FIG. 5A as they are into and out of the page), when said ship 1 is in a substantially stationary mode 34 (not the mode illustrated in FIG. 5A) on said water surface 18; wherein the weight 33 of said partially aerostatically supported ram air cushion ship 1 is substantially balanced by a combination of said aerostatic lift force 10 and said aerodynamic lift force 25, when said partially aerostatically supported ram air cushion ship 1 is in a flight in ground-effect mode 35 (not the mode illustrated); and wherein the weight 33 of said partially aerostatically supported ram air cushion ship 1 is substantially balanced by a combination of said aerostatic lift force 10 and said aerodynamic lift force 25 and at least one of said hydrostatic lift force 17 and a hydrodynamic lift force 36, when said partially aerostatically supported ram air cushion ship 1 is in a transition mode 37 (illustrated) comprising a landing transition mode 37L.

It should be understood that payload 7 could comprise one or more of persons 39 including passengers 40 in and crew 41 who can sit in seats 157, as well as baggage 44 and cargo 43. The payload volume 4 includes a cabin 38 and a flexible use volume 4F and a human facilities area 154 such as a restroom. Part of the payload volume 4 is in the left hull member 54L and right hull member 54R. A cockpit or flight deck 31C is provided near the front end of at least one of the hull members. It should also be understood that a transition mode 37 could comprise either the illustrated landing transition mode 37L or could alternatively be a takeoff transition mode 37T. Hydroskis 36S are mounted near the front ends of the left hull member 54L and right hull member 54R, to provide restoring pitching moment if the vehicle's nose angles downward into increasing contact with a water surface below. An aft keel 88K under the body 3 provides a corresponding restoring pitching moment if the vehicle's tail angles downward to a keel water increasing contact configuration, and the bottom ends of wing tip fences 61T serve a similar purpose for restoring rolling moments in the event of a bank angle causing tip increasing water contact. The payload volume 7 also includes cargo volume 42 including space for cargo 43 and baggage 44. The propulsion system 26 includes thrusters 28T with propulsor ducts 28D, that have pressurized exhaust flow that can be vectored by propulsor flow vectoring members 28F. Propulsor struts 28S connect the thrusters 28T to the body 3. The wing 61 includes a left wing 61L and right wing 61R, flaps 90F as well as fore-wing members 61F that can be in the form or a fairing and/or a strake. The horizontal tails 88H are mounted near the aft ends of the left hull member 54L and right hull member 54R, equipped with flaps 90F that may optionally act as flaperons and/or elevons. An aft-wing member 61A serves as a fairing or strake that at least partially fills a gap between the body 3 and the left hull member 54L and right hull member 54R. A ram air cushion 20 under the body 3 is in a ram air cushion volume 46 bounded at its aft edge by a Kutta condition under body flaps 90B. A keel 88K separates the ram air cushion volume 46 into left and aft sides under the aft portion of the body 3. A vertical tail 88V is mounted above the aft end of the body 3. In addition to aerodynamic lift from the ram air cushion 20 under the body 3 and the aerodynamic lift from the wings 61, aerostatic lift is provided by a lifting gas 9 in a lifting gas enclosure 8.

This alternate preferred embodiment configuration of FIGS. 4A and 5A in combination further illustrates a partially aerostatically supported ram air cushion ship 1, comprising in combination: a body 3 configured to accommodate payload 7, said body 3 encompassing (i) a cabin 38 configured to accommodate persons 39 comprising at least one of passengers 40 and crew 41 and (ii) a cargo volume 42 configured to accommodate at least one of baggage 44 and cargo 43; and (iii) a lifting gas enclosure 8 configured to contain a lifting gas 9 providing an aerostatic lift force 10 acting on said ship 1, said lifting gas 9 comprising at least one of helium 11, hydrogen 12 and a low-density lifting gas 13 with density lower than that of an atmosphere 14 immediately outside said ship 1; a hydrostatic floatation subsystem 15 comprising a water displacing structure 16 connected to said body 3, said water displacing structure 16 configured to provide a hydrostatic lift force 17 acting on said ship 1 when said water displacing structure 16 is displacing a water volume below a water surface 18 below said atmosphere 14; a propulsion system 26 capable of using energy 27 to generate a thrust force 28 acting on said ship 1; a left catamaran sidewall 45L and a right catamaran sidewall 45R both connected to said body 3 and defining at least one ram air cushion volume 46 that is beneath said body 3, above an Earth surface 21 and at least in part between said left and right catamaran sidewalls 45L and 45R, wherein said ram air cushion volume 46 is configured to decrease in transverse cross-sectional area 46X moving aft from a forward portion 46F of said ram air cushion volume 46 to an aft portion 46A of said ram air cushion volume 46; an aerodynamic lift subsystem 19 utilizing said ram air cushion volume 46 configured to create a ram air cushion 20 providing aerodynamic lift force 25 acting on said body 3 when said ship 1 has a positive airspeed 24, propelled by said propulsion system 26; and at least one payload transfer transport module 47 configured to receive disembarking payload 7D comprising at least a partial subset of said passengers 40 and said baggage 44 and said cargo 43 from at least one of said cabin 38 and said cargo volume 42, and said payload transfer transport module 47 further configured to separate from said ship 1 and carry said disembarking payload 7D from said ship 1 starting at a transfer time 48. The illustrate payload transfer transport module 47 is a compact payload transfer transport module 47C of a kind also illustrated in FIG. 1B and FIG. 5E.

Figure 5B:
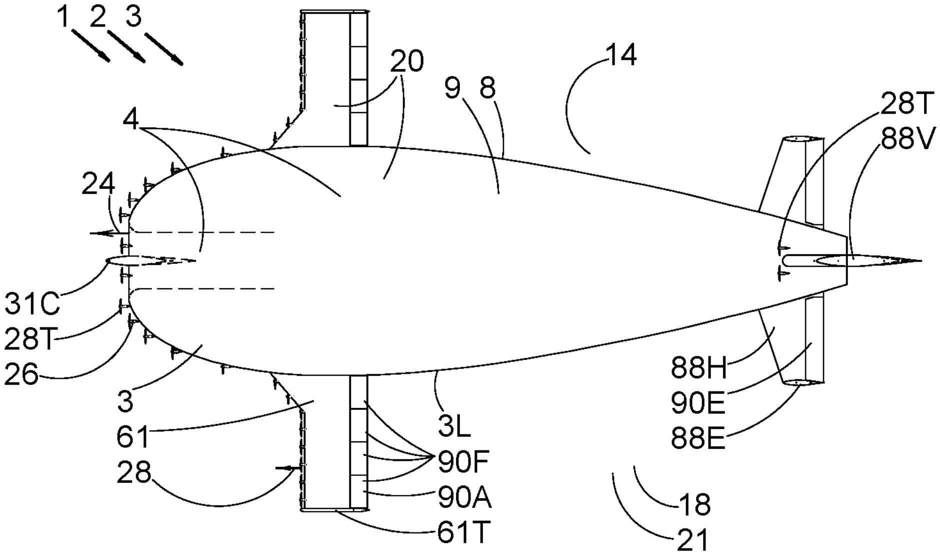

FIG. 5B shows a plan view of an alternate preferred embodiment of a partially aerostatically supported ram air cushion ship 1 or PASRACS 1. This embodiment is similar to the embodiment shown in bottom plan view earlier in FIG. 1B, but now a modified configuration with a single vertical stabilizer 88V instead of twin vertical stabilizers. FIG. 5B illustrates a partially aerostatically supported ram air cushion ship 1, comprising in combination: a ship structure 2 incorporating a body 3 with a payload volume 4; said ship structure 2 connected to a lifting gas enclosure 8 configured to contain a lifting gas 9 that provides an aerostatic lift force as its density is lower than that of the surrounding atmosphere 14. The PASRACS 1 is fitted with wings 61 with a wingtip fence 61T and flaps 90F and ailerons 90A; and an empennage with a horizontal stabilizer 88H with stabilizer endplates 88E and elevators 90E, plus a vertical stabilizer 88V with a rudder (not visible in this view). The PASRACS 1 can fly with positive airspeed 24 in ground-effect over an Earth surface 21 such as a water surface 18, with some support from aerodynamic lift from the wing 61 and body 3 with a ram air cushion 20 underneath. Flight crew can be accommodated in a flight deck 31C at the forward end of the body 3. The propulsion system 26 includes thrusters 28T that generate a thrust force 28.

Figure 5C:
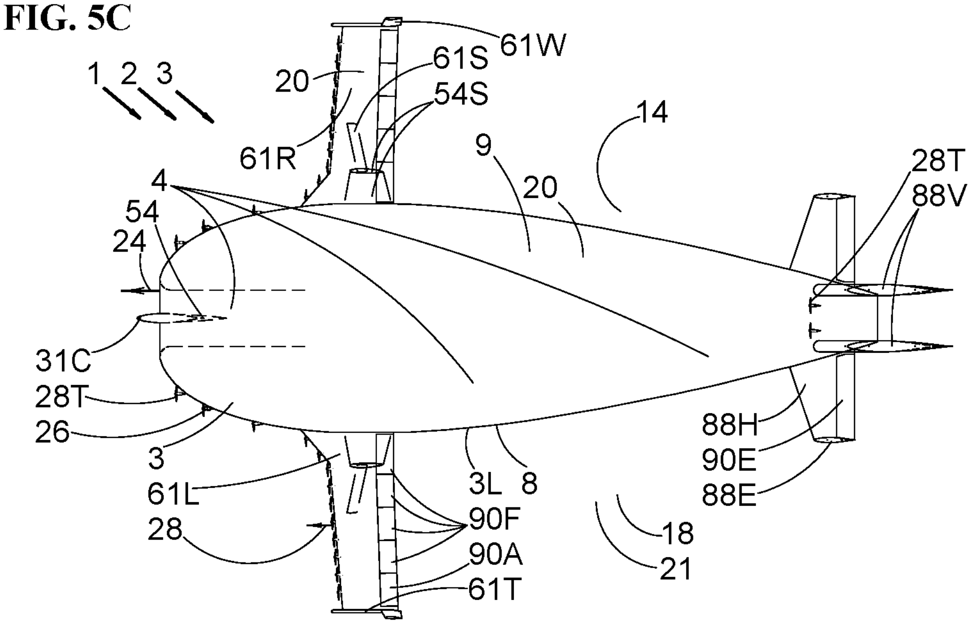

FIG. 5C shows a plan view of an alternate preferred embodiment of a partially aerostatically supported ram air cushion ship 1 or PASRACS 1. This embodiment is similar to the embodiment shown in bottom plan view earlier in FIG. 1B, but now a modified configuration with a wider span wing 61 (with left wing 61L and right wing 61R) that is mounted higher on the body 3, has a slight nonzero sweep as shown, and is strut-braced with wing struts 61S below the wing 61 and connecting down to sponsons 54S that serve as lower wings as well as stabilizing and planing floats when in contact with a water surface 18. To further reduce induced drag, the wider span wing 61 is also fitted with winglets 61W integrated with the wing tip fence 61T. The use of sponsons and strut-bracing has precedents in older flying boat aircraft. Up-down winglet mention tip sails and spiral winglets etc. It should be understood that the wing 61 can be further optimized as known in the art of wing design, utilizing one or more of variable planforms, different sweeps, different twist distributions, different shear distributions, varying airfoil sections with varying thickness and camber, and varying lofts. FIG. 5C illustrates a partially aerostatically supported ram air cushion ship 1, comprising in combination: a ship structure 2 incorporating a body 3 with a payload volume 4; said ship structure 2 connected to a lifting gas enclosure 8 (e.g., shown along body left side surface 3L) configured to contain a lifting gas 9 that provides an aerostatic lift force as its density is lower than that of the surrounding atmosphere 14. The PASRACS 1 has wings 61 with flaps 90F and ailerons 90A; and an empennage with a horizontal stabilizer 88H with stabilizer endplates 88E and elevators 90E, plus a vertical stabilizer 88V with a rudder (not visible in this view). The PASRACS 1 can fly with positive airspeed 24 in ground-effect over an Earth surface 21 such as a water surface 18, with some support from aerodynamic lift from the wing 61 and body 3 with a ram air cushion 20 underneath. Flight crew can be accommodated in a flight deck 31C at the forward end of the body 3. The propulsion system 26 includes thrusters 28T that generate a thrust force 28.

Figure 5D:
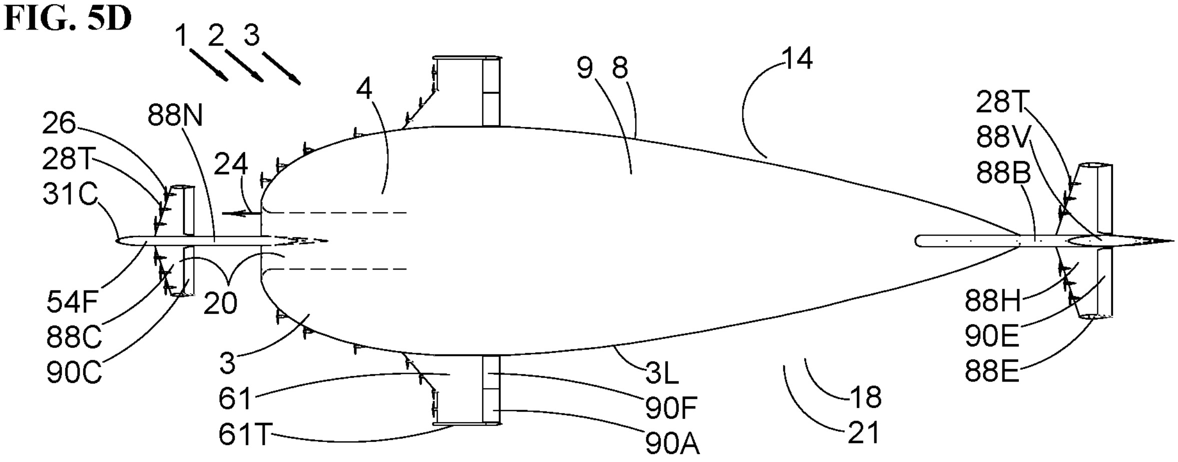

FIG. 5D shows a plan view of an alternate preferred embodiment of a partially aerostatically supported ram air cushion ship 1 or PASRACS 1. This embodiment is similar to the embodiment shown in bottom plan view earlier in FIG. 1B, but now a modified configuration with a tri-surface configuration with (a) the horizontal tail 88H and vertical tail 88V mounted further aft on a tail boom 88B and with (b) with a canard surface 88C with a canard control surface 90C (that serves as a canard flap) mounted forward of the main portion of the body 3, through the use of a nose boom 88N that serves as a forward fuselage and forward hull member 54F as well. FIG. 5D illustrates a partially aerostatically supported ram air cushion ship 1, comprising in combination: a ship structure 2 incorporating a body 3 with a payload volume 4; said ship structure 2 connected to a lifting gas enclosure 8 configured to contain a lifting gas 9 that provides an aerostatic lift force as its density is lower than that of the surrounding atmosphere 14. The PASRACS 1 has wings 61 with wing tip fences 61T and with flaps 90F and ailerons 90A; and in addition to the canard it has an aft empennage with a horizontal stabilizer 88H with stabilizer endplates 88E and elevators 90E, plus a vertical stabilizer 88V with a rudder (not visible in this view). The PASRACS 1 can fly with positive airspeed 24 in ground-effect over an Earth surface 21 such as a water surface 18, with some support from aerodynamic lift from the wing 61 and canard surface 88C and body 3 all with a ram air cushion 20 underneath. Flight crew can be accommodated in a flight deck 31C at the forward end of the nose boom 88N. The propulsion system 26 includes thrusters 28T.

Figure 5E:
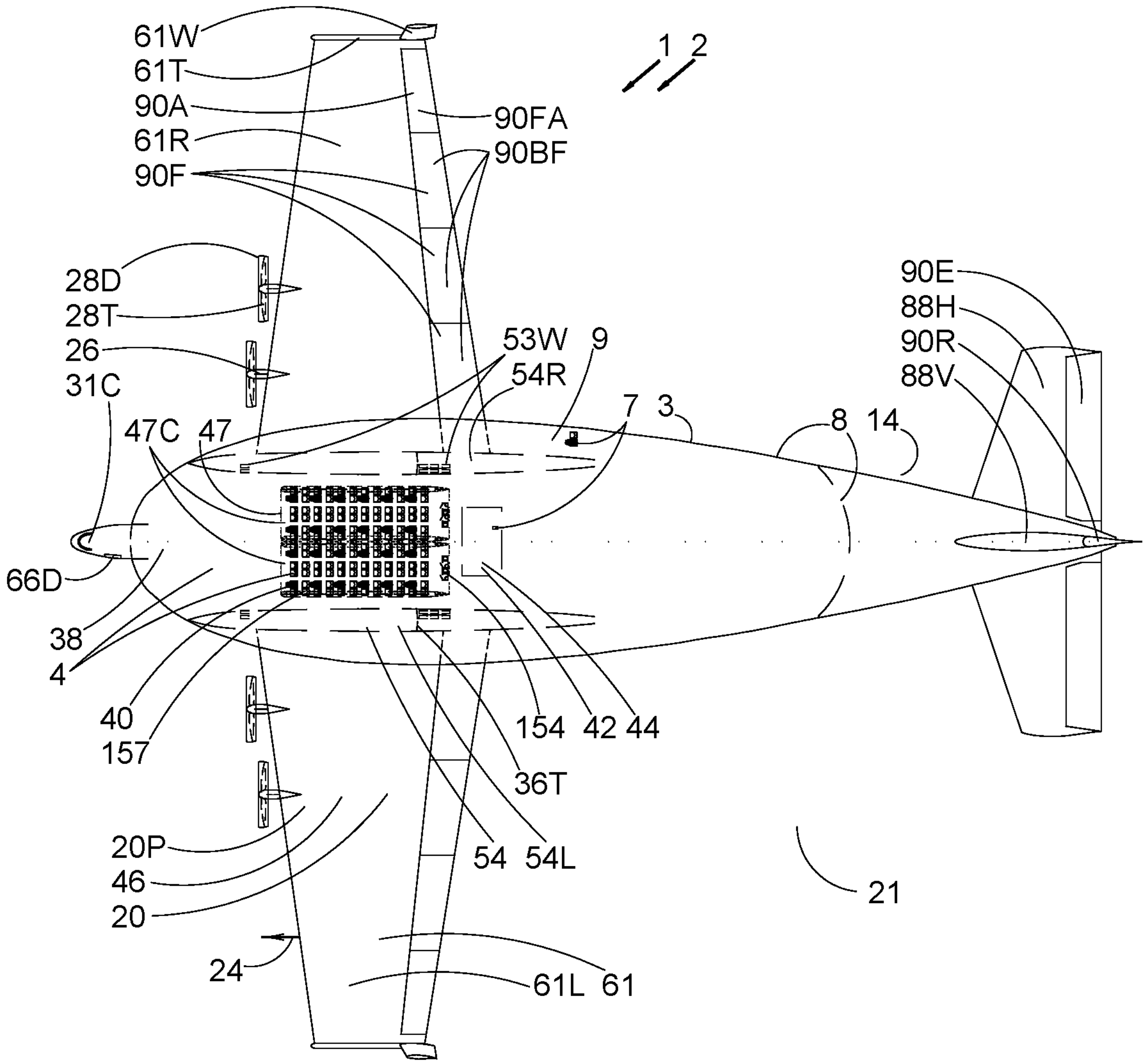

FIG. 5E shows a plan view of an alternate preferred embodiment of a partially aerostatically supported ram air cushion ship 1 or PASRACS 1. This configuration shows a partially aerostatically supported ram air cushion ship 1 including a ship structure 2, wings 61 including a left wing 61L and right wing 61R, and a body 3 with a payload volume 4. The ship structure 2 in the body 3 includes a lifting gas enclosure 8 configured to contain a lifting gas 9 that provides an aerostatic lift force as its density is lower than that of the surrounding atmosphere 14. The wings 61 have wingtip fences 61T integrated with winglets 61W, and flaps 90F and ailerons 90A. The illustrated flaps 90F are blown flaps 90BF that use blowing that is combined with tailored flap geometry and kinematics typically including some fowler motion, as known in the prior art of blown flaps to enable high lift coefficient increments and associated vehicle short takeoff and landing (STOL) or extreme short takeoff and landing (ESTOL) capabilities for the PASRACS 1 vehicle. ESTOL takeoff field length (TOFL) and landing field length (LFL) may be as small as 200 meters, without limitation. An empennage is fitted to the aft end of the body 3 and comprises a horizontal stabilizer 88H with elevators 90E, plus a vertical stabilizer 88V with a rudder 90R. A conventional low tail empennage configuration is shown, but variants could use T-tail or cruciform tail or V-tail or inverted V-tail or U-tail or H-tail configurations. The bottom of the body 3 is fitted with hulls 54 in a catamaran configuration, comprising left hull 54L and right hull 54R. The hulls 54 are fitted with steps 36T that enable takeoff rotation and reduce planing drag on the water, and the hulls can optionally include other water planing and floating features as known in the art of seaplane hulls, enabling and improving operations such as taxi, takeoff and landing on a water surface. The hulls 54 are also fitted with extensible wheeled landing gear members 53W, to enable the PASRACS 1 to operate from a land surface including an ability to land and take off from a runway or other land surface area. The wheeled landing gear members 53W may optionally be configured to serve as soft ground landing gear with soft ground tires suitable for beaching gear, for example and without limitation.

Thus the PASRACS 1 of FIG. 5E can be considered to have amphibious landing and takeoff operations capability (land and water) and triphibian operations capabilities (operations on water, on land and in the air).

Steering can be provided to some or all of the wheeled landing gear members 53W as known in the art of aircraft wheeled landing gear, to enable the PASRACS 1 to move and maneuver upon a land surface such as runways, landing fields, taxiways, taxilanes and aprons. Two side by side compact payload transfer transport modules 47C can be winched up and mated to the bottom of the body 3 as shown, from either land or water. These compact payload transfer transport modules 47C are payload transfer transport modules 47 of the same configuration shown also earlier in FIG. 1B and FIG. 5A, and they can be carried by the different carrier vehicles of FIGS. 1B, 5A, 5E and possible other carrier vehicles in an intermodal manner, within the spirit and scope of the invention.

Flight crew can be accommodated in a flight deck 31C at the forward end of the body 3, and a cabin 38 capable of accommodating passengers 40 who may enter the PASRACS 1 either from the compact payload transfer transport modules 47C or through a boarding door 66D (using at least one of a boarding bridge, airstairs or a built-in airstairs). Human facilities areas 154 are shown in the compact payload transfer transport modules 47C but may also be provided at other locations in the cabin 38. The PASRACS 1 is also shown to include a cargo volume 42 that is also capable of accommodating baggage 44.

An example of operation of the PASRACS 1 vehicle of FIG. 5E is as a feeder vehicle to a much larger PASRACS vehicle such as that described earlier in the context of FIGS. 1A through 2F. As a feeder vehicle, the PASRACS 1 of FIG. 5E can transport a payload transport transfer module such as a compact payload transfer transport modules 47C, with payload from an inland origin location with a small runway, airfield, and/or small water body such as a lake or reservoir, to an offshore large water area terminus area for the much larger PASRACS vehicle, and the compact payload transfer transport module 47C with payload on board can be dropped into the water from the feeder vehicle and then captured and winched up to mate with the much larger vehicle for subsequent over-ocean transport, with the payload transferring into the much larger vehicle from the compact payload transfer transport module 47C. In reverse operation, disembarking payload from the much larger vehicle can transfer into the compact payload transfer transport module 47C, get winched down to the water, then connected and winched up to mate with the feeder vehicle of FIG. 5E, then transported with flight in weak ground effect to an inland destination with a small runway, airfield, and/or small water body such as a lake or reservoir. The nominal span of the feeder vehicle PASRACS 1 of FIG. 5E is 279 ft., so weak ground effect flight can take place up to 2790 ft, above ground level (AGL) per the initially provided definition of the expression "weak ground-effect". The feeder PASRACS 1 of FIG. 5E will preferably be designed for quiet and safe flight over populated areas, incorporating features from prior art quiet STOL aircraft designs and technologies.

The propulsion system 26 includes thrusters 28T fitted with propulsion ducts 28D that help increase efficiency and reduce noise. The PASRACS 1 can fly with positive airspeed 24 in ground-effect over an Earth surface 21 while propelled by the propulsion system 26, with some support from aerodynamic lift from the wing 61 with a ram air cushion 20 that is a power augmented ram air cushion 20P underneath. The PASRACS 1 of FIG. 5E has an illustrated nominal size, without limitation, of under 80 meters span so it can operate from runway and taxiway and taxilane infrastructure in existing airports that can accommodate large airliners like the Airbus A380. Flight in "weak ground-effect." when the induced drag ground-effect influence ratio is greater than 98.9% but no greater than 99.8% or the height above ground to vehicle span ratio is no greater than 6, can be performed by the PASRACS 1 of FIG. 5E at a nominal elevation of 1560 feet above ground level (AGL) for a nominal wingspan of 260 feet. The PASRACS 1 can maintain a relatively constant elevation AGL but follow terrain over land to increasing altitudes to serve inland destinations, with one such example without limitation, being flying from the Gulf of Mexico up to Denver airport in Colorado. The flight deck 31C and cabin 38 can optionally be at least one of oxygenated and pressurized for increased comfort and health of human occupants of the PASRACS 1.

Figure 5F:
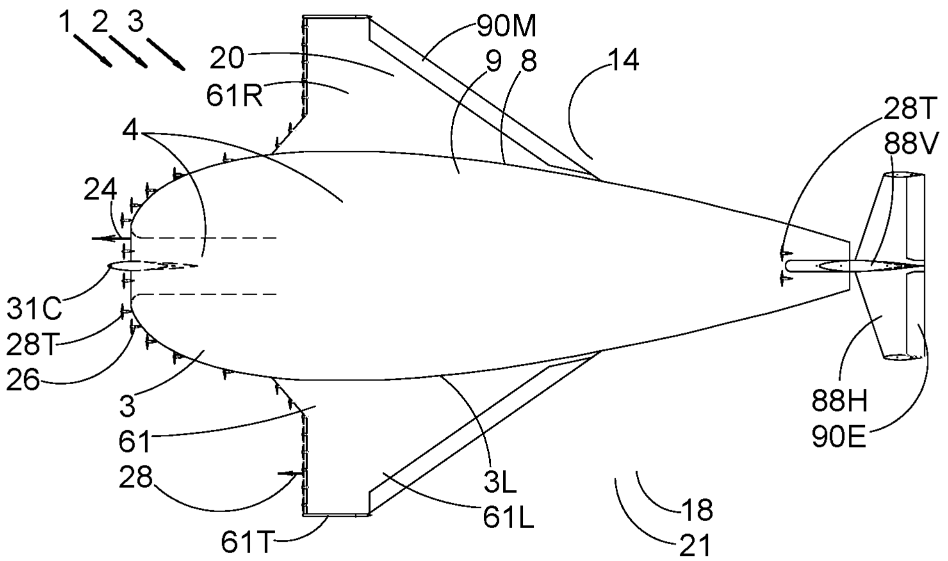

FIG. 5F shows a plan view of an alternate preferred embodiment of a partially aerostatically supported ram air cushion ship 1 or PASRACS 1. This embodiment is similar to the embodiment shown in bottom plan view earlier in FIG. 1B, but now a modified configuration with a T-tail empennage and with an inverse delta wing planform for the wing 61. FIG. 5F illustrates a partially aerostatically supported ram air cushion ship 1, comprising in combination: a ship structure 2 incorporating a body 3 with a payload volume 4; said ship structure 2 connected to a lifting gas enclosure 8 configured to contain a lifting gas 9 that provides an aerostatic lift force as its density is lower than that of the surrounding atmosphere 14. The PASRACS 1 is fitted with wings 61 with a wingtip fence 61T and trailing edge morphing control surfaces 90M that serve functionally as flaps and ailerons; and the aforementioned T-tail empennage with a horizontal stabilizer 88H mounted near the top of a vertical stabilizer 88V. The horizontal stabilizer 88H is fitted with elevators 90E and the vertical stabilizer 88V is fitted with a rudder (not visible in this view). The PASRACS 1 can fly with positive airspeed 24 in ground-effect over an Earth surface 21 such as a water surface 18, with some support from aerodynamic lift from the wing 61 and body 3 with a ram air cushion 20 underneath. Flight crew can be accommodated in a flight deck 31C at the forward end of the body 3. The propulsion system 26 includes thrusters 28T that generate a thrust force 28. A thruster 28T may be powered by a gas turbine burning jet fuel or biofuel or hydrogen or may be powered by an electric motor or may be powered by hybrid energy sources with inputs from plural sources being mechanically summed (as with a combining gearbox with clutch disengagement when needed) or aerodynamically summed (as with two coaxial contrarotating propellers or propfans). In the case of an electric motor being used, the electric power for the electric motor may come from at least one of a battery, a fuel cell, a generator, and an auxiliary power unit. Propeller blade pitch control may be provided for feathering and for reverse thrust through fine or feather, as known in the prior art of air propulsors. Some of the thrusters 28T may also optionally have a propulsor flow vectoring member or be vectored thrust propulsors.

Figure 5G:
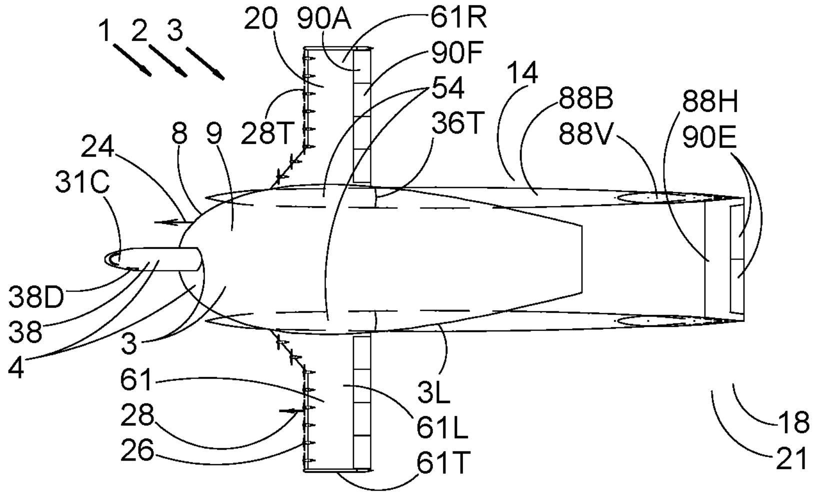

FIG. 5G shows a plan view of an alternate preferred embodiment of a partially aerostatically supported ram air cushion ship 1 or PASRACS 1. This embodiment is configured to use twin tail booms 88B that support a pi-tail empennage, where the tail booms 88B project backwards from twin hulls 54 in a catamaran arrangement. FIG. 5G illustrates a partially aerostatically supported ram air cushion ship 1, comprising in combination: a ship structure 2 incorporating a body 3 with a payload volume 4; said ship structure 2 connected to a lifting gas enclosure 8 configured to contain a lifting gas 9 that provides an aerostatic lift force as its density is lower than that of the surrounding atmosphere 14. The PASRACS 1 is fitted with wings 61 with wingtip fences 61T and trailing edge flaps 90F and ailerons 90A; and the aforementioned pi-tail empennage with a horizontal stabilizer 88H mounted near the tops of twin vertical stabilizers 88V. The horizontal stabilizer 88H is fitted with elevators 90E and the vertical stabilizers 88V are fitted with rudders (not visible in this view). The PASRACS 1 can fly with positive airspeed 24 in ground-effect over an Earth surface 21 such as a water surface 18, with some support from aerodynamic lift from the wing 61 with a ram air cushion 20 underneath. Flight crew can be accommodated in a flight deck 31C at the forward end of a cabin 38 at the forward end of the body 3, with access possible via a door 38D. The propulsion system 26 includes thrusters 28T that generate a thrust force 28.

Figure 5H:
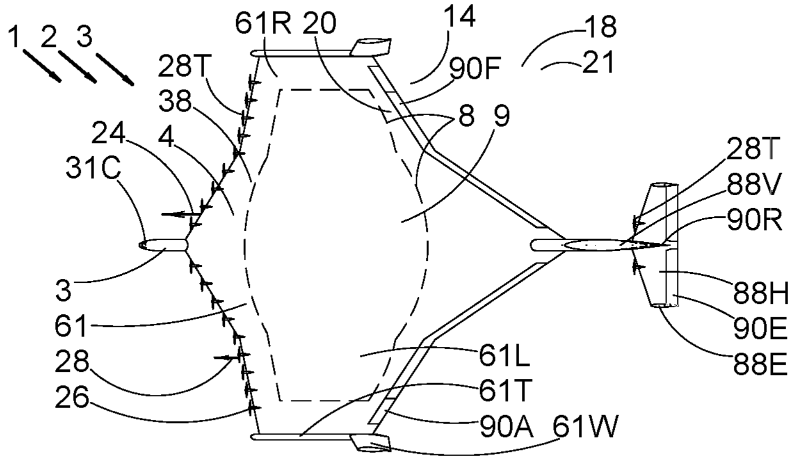

FIG. 5H shows a plan view of an alternate preferred embodiment of a partially aerostatically supported ram air cushion ship 1 or PASRACS 1. This embodiment is configured to use a span-loader wing 61 with double-taper, as shown, while multi-taper variants are also possible. FIG. 5H illustrates a partially aerostatically supported ram air cushion ship 1, comprising in combination: a ship structure 2 incorporating a body 3 forward that includes a flight deck 31 and further including said span-loaded wing 61 with space for payload 4 in a cabin 38 as well as space for a lifting gas enclosure 8 configured to contain a lifting gas 9 that provides an aerostatic lift force as its density is lower than that of the surrounding atmosphere 14. The PASRACS 1 is fitted with wings 61 with a right wing 61R, left wing 61L, wingtip fences 61T and trailing edge flaps 90F and ailerons 90A; and an empennage with a horizontal stabilizer 88H mounted in a cruciform tail configuration part-way up on a vertical stabilizer 88V. The horizontal stabilizer 88H is fitted with stabilizer endplates 88E and with elevators 90E while the vertical stabilizer 88V is fitted with a rudder 90R. The PASRACS 1 can fly with positive airspeed 24 in ground-effect over an Earth surface 21 such as a water surface 18, with some support from aerodynamic lift from the wing 61 with a ram air cushion 20 underneath. The propulsion system 26 includes thrusters 28T that generate a thrust force 28.

Figure 6A:
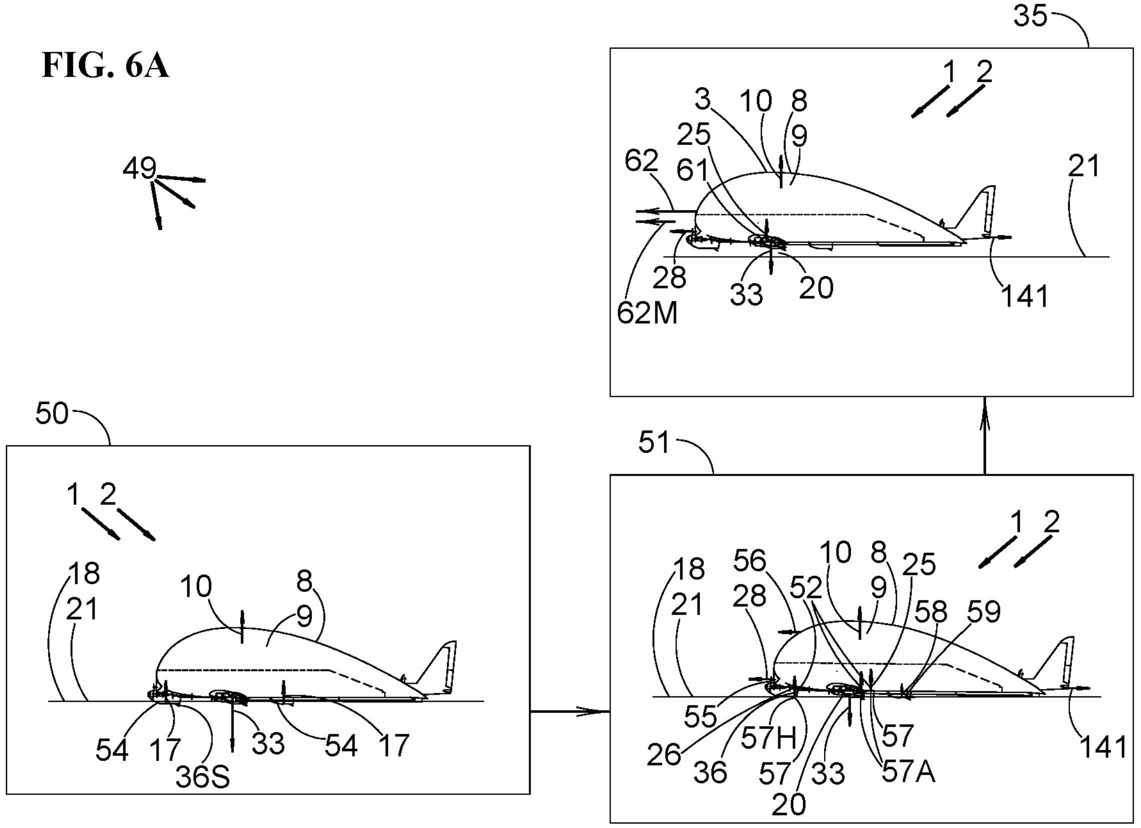
FIGS. 6A and 6B show a preferred embodiment of a transition method for a partially aerostatically supported ram air cushion ship to transition from a substantially static floating mode on a water surface to a water takeoff mode with supplemental fluid dynamic support and then to a forward flight in ground effect mode above an Earth surface.

FIG. 6A shows a preferred embodiment of a transition method for a partially aerostatically supported ram air cushion ship 1 that can be similar to the preferred embodiment earlier described with reference to the side view illustration in FIG. 1A, to transition from a substantially static floating mode on a water surface to a water takeoff mode with supplemental fluid dynamic support and then to a forward flight in ground effect mode above an Earth surface. More specifically. FIG. 6A shows a transition method 49 for a partially aerostatically supported ram air cushion ship 1 to transition from a substantially static floating mode 50 on a water surface 18 to a water takeoff mode 51 with supplemental fluid dynamic support 52 and then to a flight in ground-effect mode 35 above an Earth surface 21, comprising the sequential steps of:

(i) supporting weight 33 of said partially aerostatically supported ram air cushion ship 1 using a combination of (a) a hull 54 displacing water to provide a hydrostatic lift force 17 and (b) a lifting gas enclosure 8 containing lighter-than-air lifting gas 9 to provide an aerostatic lift force 10, in said substantially static floating mode 50;

(ii) powering a fluid dynamic propulsor 55 to apply a thrust force 28 acting on said ship 1 that exceeds drag force 141 acting on said ship 1, to propel the ship 1 to forward motion with increasing speed 56 in said water takeoff mode 51;

(iii) engaging a supplemental fluid dynamic support system 57 in said water takeoff mode 51, said supplemental fluid dynamic support system 57 comprising at least one of a hydrodynamic supplemental support subsystem 57H and an aerodynamic supplemental support subsystem 57A, wherein said engaging said supplemental fluid dynamic support system 57, reduces required hydrostatic support 58 and correspondingly reduces water displacement related drag 59 in said water takeoff mode 51; and (iv) configuring a ram air cushion 20 under at least one of a wing 61 and a body 3 of said ship 1 to provide a portion of an aerodynamic lift force 25 that complements said aerostatic lift force 10 to fully support weight 33 of said ship 1 in said flight in ground-effect mode 35 wherein said ship 1 flies at a flight speed 62 in ground effect above said Earth surface 21, said flight speed 62 no less than a minimum flight speed 62M.

FIG. 6A further illustrates that the partially aerostatically supported ram air cushion ship 1 or PASRACS 1 includes ship structure 2 and a propulsion system 26 that includes said fluid dynamic propulsor 55. In the water takeoff mode 51 the illustrated hydrodynamic supplemental support system 57A comprises a hydroski 36S and can also include one or more of the hydrodynamic lifting member 36M and hydrodynamic planing surface 36P and step 36T and keel 88K described earlier with reference to FIG. 1A but not called out explicitly here in FIG. 6A.

Figure 6B:
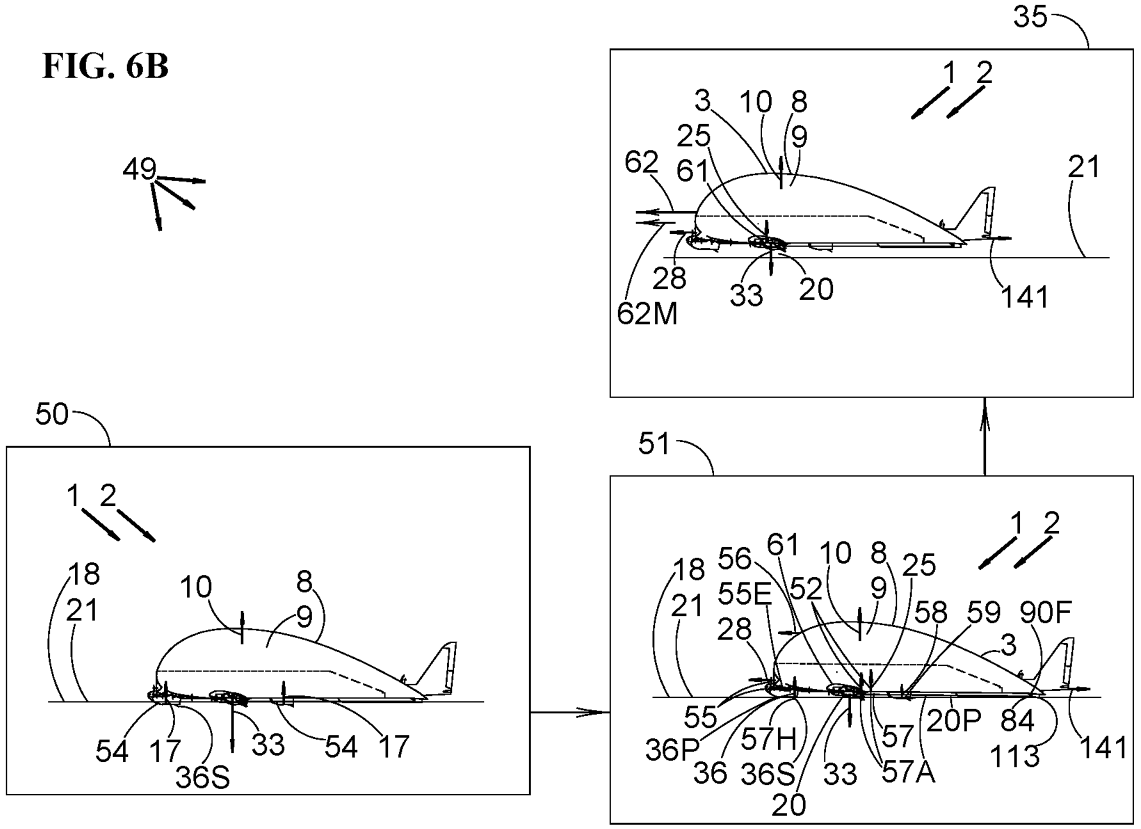

FIG. 6B also shows a preferred embodiment of a transition method for a partially aerostatically supported ram air cushion ship 1 that can be similar to that described earlier with reference to FIG. 1A, to transition from a substantially static floating mode 50 on a water surface 18 to a water takeoff mode 51 with supplemental fluid dynamic support 52 and then to a forward flight in ground effect mode 35 above an Earth surface 21. The preferred embodiment shown in FIG. 6B is very similar to that of FIG. 6A, but adds some particular details pertaining to the aerodynamic supplemental support subsystem 57A and the hydrodynamic supplemental support system 57H, as will be described below.

FIG. 6B thus illustrates a transition method 49, wherein said aerodynamic supplemental support subsystem 57A comprises a power-augmented ram air cushion 20P, wherein a trailing edge 84 of said power-augmented ram air cushion 20P is a reduced height flow passage 113 above said Earth surface 21 and below a downwardly deflected flap 90F on at least one of a wing 61 and a body 3 of said partially aerostatically supported ram air cushion ship 1, and wherein said power-augmented ram air cushion 20P is at least partially pressurized by energized flow 55E from said fluid dynamic propulsor 55.

FIG. 6B also illustrates a transition method 49, wherein said hydrodynamic supplemental support subsystem 57H comprises at least one of a subcavitating hydrofoil 36HA (not illustrated), a supercavitating hydrofoil 36HB (not illustrated), a hydroski 36S (illustrated) and a hydroplane planing surface 36P (illustrated). The hydroski 36S may be retractable and deployable, and may incorporate one or more of a suspension subsystem and shock absorber, as described elsewhere in this specification.

It should be understood that in the transition method 49 of FIGS. 6A and 6B, the PASRACS 1 is configured to produce aerostatic lift force 10 that reduces the amount of support needed from the combination of aerodynamic lift force 25 and lift from the hydrodynamic supplemental support subsystem 57H, and that correspondingly reduces lift-induced drag components associated with aerodynamic and hydrodynamic lift.

Figure 6C:
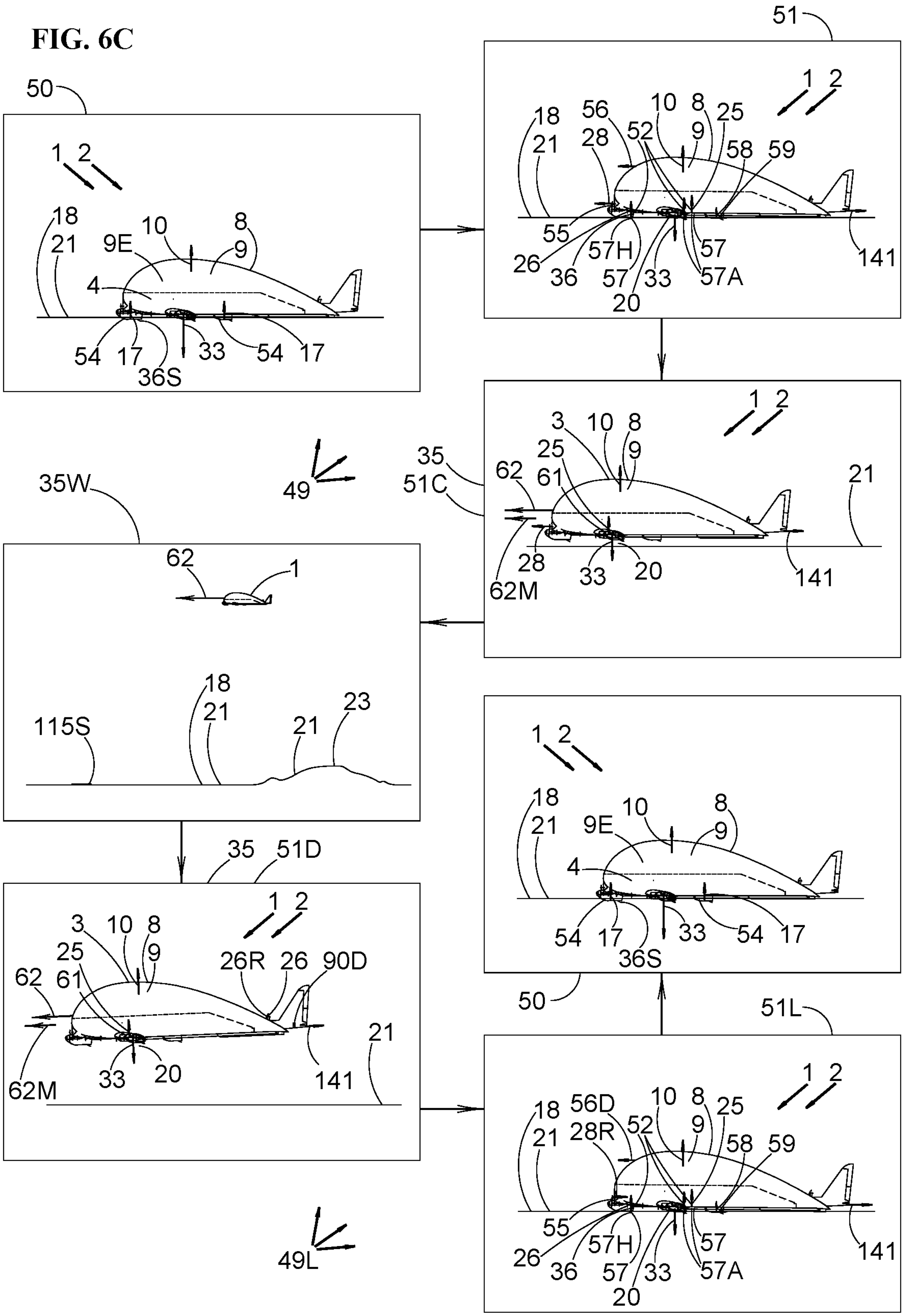
FIG. 6C shows corresponding transition methods including takeoff and landing transitions before and after a flight in ground effect phase of operation.

FIG. 6C also shows a preferred embodiment of a transition method 49, followed by cruise flight and then followed by a landing transition method 49L, for a partially aerostatically supported ram air cushion ship 1 that can be similar to that described earlier with reference to FIG. 1A, to transition according to said transition method 49 from a substantially static floating mode 50 on a water surface 18 to a water takeoff mode 51 with supplemental fluid dynamic support 52 and traversing a climb path with positive flight path angle then to a forward flight in ground effect mode 35 above an Earth surface 21 in cruise flight, and optionally then to a forward flight in weak ground effect mode 35W also in cruise flight; with the cruise flight then followed by said landing transition method 49L with a descent mode 51D and then to a water landing mode 51L and then finally back to a substantially static floating mode 50 on a water surface 18 at a destination location. The preferred embodiment shown in FIG. 6C is very similar to that of FIG. 6A, but adds some particular details pertaining to the aerodynamic supplemental support subsystem 57A and the hydrodynamic supplemental support system 57H similar to those described with reference to FIG. 6B. Note that scale of the illustration box for the weak flight in ground effect mode 35W is shown at 20% of the scale of the other boxes, to show flight in weak ground effect near the up to 6 times span criterion after the PASRACS 1 has climbed in altitude. For the nominal vehicle dimension of the embodiment of FIGS. 1A through 1G with nominal span of 1600 feet (that is also illustrated in FIG. 6C), the corresponding weak flight in ground-effect nominal height above ground (as might be measured with a radio altitude sensor) of up to 9600 ft, is shown for illustration. This illustration box for flight in weak ground effect 35W also shows a representative Earth surface 21 that includes a ground surface 23 with a nominal 1000 ft, hill and a water surface 18 with a nominal 1000 ft, long ship or marine vehicle 115S, to show one conservative approach to how safe overflight in weak ground effect can be implemented, flying and/or climbing over 'obstacles' that may be natural (e.g., hills, trees, etc.) or man-made (e.g., buildings, land-supported vehicles, water-supported vehicles, etc.). The illustration box for the descent mode 51D illustrates a PASRACS 1 with negative (or downwardly inclined) flight path angle and the use of a propulsion system with regenerative braking 26R, that can recharge batteries on board the PASRACS 1, as well as an optional drag control surface 90D such as a deployable speedbrake or spoiler. The illustration box for the water landing mode 51L illustrates forward motion with decreasing speed 56D, and the use of reverse thrust force 28R as for example from propeller reverse pitch through fine or feather as known in the art of aircraft propellers.

FIG. 6C thus also illustrates a transition method that is here a landing transition method 49L, wherein said aerodynamic supplemental support subsystem 57A comprises a power-augmented ram air cushion 20P, wherein a trailing edge 84 of said power-augmented ram air cushion 20P is a reduced height flow passage 113 above said Earth surface 21 and below a downwardly deflected flap 90F on at least one of a wing 61 and a body 3 of said partially aerostatically supported ram air cushion ship 1, and wherein said power-augmented ram air cushion 20P is at least partially pressurized by energized flow 55E from said fluid dynamic propulsor 55.

FIG. 6C further illustrates a transition method that is here a landing transition method 49L, wherein said hydrodynamic supplemental support subsystem 57H comprises at least one of a subcavitating hydrofoil 36HA, a supercavitating hydrofoil 36HB, a hydroski 36S and a hydroplane planing surface 36P, in a manner similar to that earlier described with reference to FIGS. 1A through 1G and FIGS. 2A through 2F.

The aerodynamic supplemental support subsystem 57A and hydrodynamic supplemental support subsystem 57H of FIG. 6C may also optionally include features to improve passenger comfort and ride quality such a ride quality enhancement control system, a landing crab and decrab control system, a landing impact reduction or "soft landing" control system, and "g" control systems such as a gust loads reduction control system and a wave and current loads reduction control system. These optional systems features will be described further with reference to FIG. 10B below.

FIG. 6C further illustrates a PASRACS 1 which includes a payload volume 4, wherein for a design payload density, the payload volume 4 comprises no more than three-quarters of total volume of the PASRACS 1, leaving available internal volume in the PASRACS 1 for encompassed lifting volume 9E in a lifting gas enclosure 8 to contain lifting gas 9 with no increase in wetted area of the PASRACS 1. Note that depending on requirements and objectives, the design payload density applicable to the payload volume 4 for a particular vehicle design may be specified at a particular value lying in the order of magnitude range between 0.01 pound per cubic foot and 100 pounds per cubic foot, without limitation.

FIGS. 6D through 6H show some alternate preferred embodiments of a transition method for a partially aerostatically supported ram air cushion ship 1 to transition from a substantially static floating mode on a water surface to a water takeoff mode with supplemental fluid dynamic support and then to a forward flight in ground effect mode above an Earth surface.

Figure 6D:
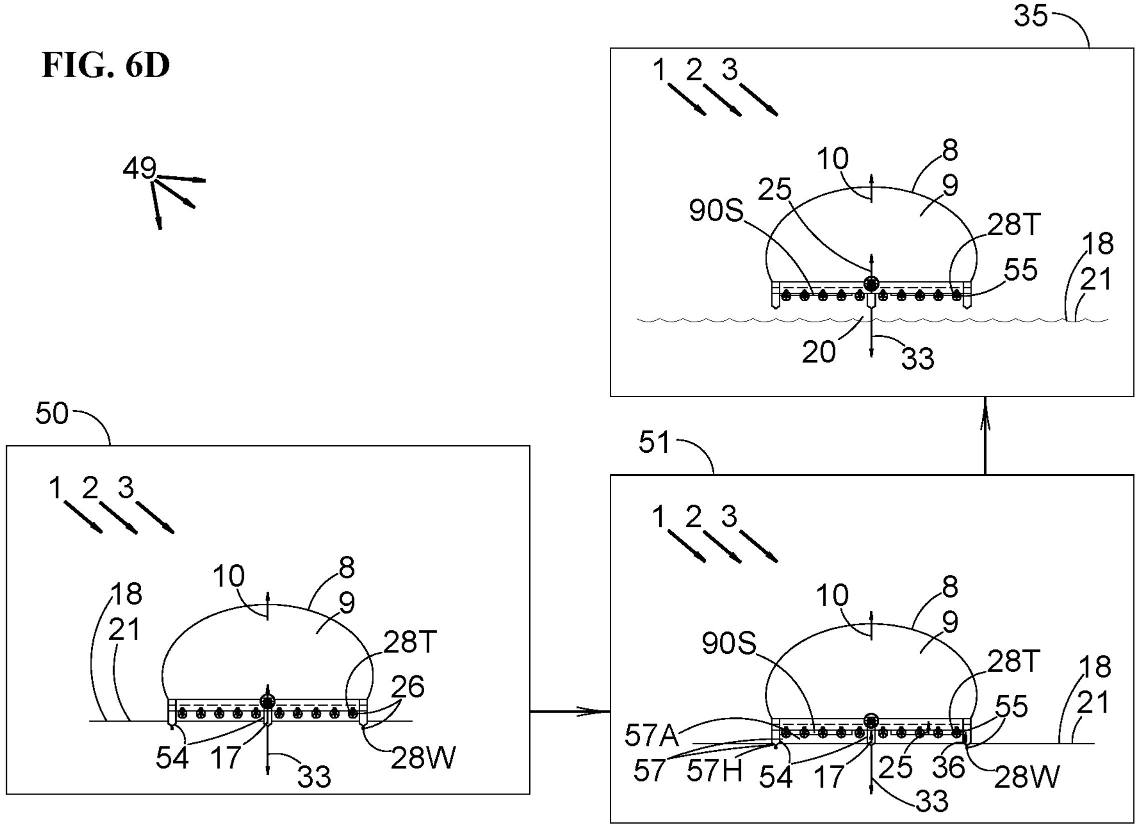
FIGS. 6D through 6H show some alternate preferred embodiments of a transition method for a partially aerostatically supported ram air cushion ship to transition from a substantially static floating mode on a water surface to a water takeoff mode with supplemental fluid dynamic support and then to a forward flight in ground effect mode above an Earth surface.

FIG. 6D shows a preferred embodiment with the vehicle configuration earlier described with reference to the front view shown in FIG. 3D, showing a transition method for a partially aerostatically supported ram air cushion ship 1 to transition from a substantially static floating mode on a water surface to a water takeoff mode with supplemental fluid dynamic support and then to a forward flight in ground effect mode above an Earth surface.

More specifically, FIG. 6D shows a transition method 49 for a partially aerostatically supported ram air cushion ship 1 to transition from a substantially static floating mode 50 on a water surface 18 to a water takeoff mode 51 with supplemental fluid dynamic support 52 and then to a flight in ground-effect mode 35 above an Earth surface 21, comprising the sequential steps of:

(i) supporting weight 33 of said partially aerostatically supported ram air cushion ship 1 using a combination of (a) a hull 54 displacing water to provide a hydrostatic lift force 17 and (b) a lifting gas enclosure 8 containing lighter-than-air lifting gas 9 to provide an aerostatic lift force 10, in said substantially static floating mode 50;

(ii) powering a fluid dynamic propulsor 55 to apply a thrust force (out of the page in this front view) acting on said ship 1 that exceeds drag force (into the page in this front view) acting on said ship 1, to propel the ship 1 to forward motion with increasing speed (out of the page in this front view) in said water takeoff mode 51;

(iii) engaging a supplemental fluid dynamic support system 57 in said water takeoff mode 51, said supplemental fluid dynamic support system 57 comprising at least one of a hydrodynamic supplemental support subsystem 57H and an aerodynamic supplemental support subsystem 57A, wherein said engaging said supplemental fluid dynamic support system 57, reduces required hydrostatic support 58 and correspondingly reduces water displacement related drag (into the page in this front view) in said water takeoff mode 51; and (iv) configuring a ram air cushion 20 under at least one of a wing (not included in this embodiment) and a body 3 of said ship 1 to provide a portion of an aerodynamic lift force 25 that complements said aerostatic lift force 10 to fully support weight 33 of said ship 1 in said flight in ground-effect mode 35 wherein said ship 1 flies at a flight speed (out of the page in this front view) in ground effect above said Earth surface 21, said flight speed no less than a minimum flight speed.

With reference to FIG. 6D, it should be further noted that in the floating mode 50, the PASRACS 1 can be stationary or can also move at slow speeds with thrust and control of speed and direction and orientation all accomplished by controllable water thrusters 28W such as azipod thrusters known in the art of marine vehicle propulsion and control. The controllable water thrusters 28W and thrusters 28T that operate on the air (such as propellers driven by motors or engines) are both fluid dynamic propulsors 55 and subsystems of the propulsion system 26. For low speed and quiet maneuvering in the floating mode 50, just the controllable water thrusters 28W can be used with individual thrust magnitude and thrust direction for each of the said controllable water thrusters 28W. The body side flaps 90S are retracted and so not visible. For faster movement such as high speed taxi operations in the floating mode 50, both the controllable water thrusters 28W and the thrusters 28T can be used in conjunction. For the water takeoff mode 51, the thrusters 28T will preferably be used while the controllable water thrusters 28W may be optionally used, for example at the start of a takeoff run up to a certain speed, and then turned off and optionally retracted into their associated hull 54. In the water takeoff mode 51 the hydrodynamic supplemental support system 57H can generate a hydrodynamic lift force 17 and/or the aerodynamic supplemental support system 57A can generate an aerodynamic lift force 25 that is further increased by trailing edge downward deflection of body side flaps 90S, as illustrated. In the flight in ground-effect mode 35 the controllable water thrusters 28W have been retracted and so are not visible, and the body side flaps 90S are shown with a lower deflection than for water takeoff mode 51, in view of a higher speed and adequate aerodynamic lift available with a lower overall lift coefficient despite the higher flight elevation. The Earth surface 21 shown om the flight in ground-effect mode 35 is a water surface 18 with significant waves. Selecting the flight elevation can be a careful balance of avoiding risk of wave contact at high speed, e.g. of a "rogue wave" that is higher than the typical waves, while trying to minimize aerodynamic induced drag by staying sufficiently low and the aerodynamic ground-effect staying sufficiently high.

Figure 6E:
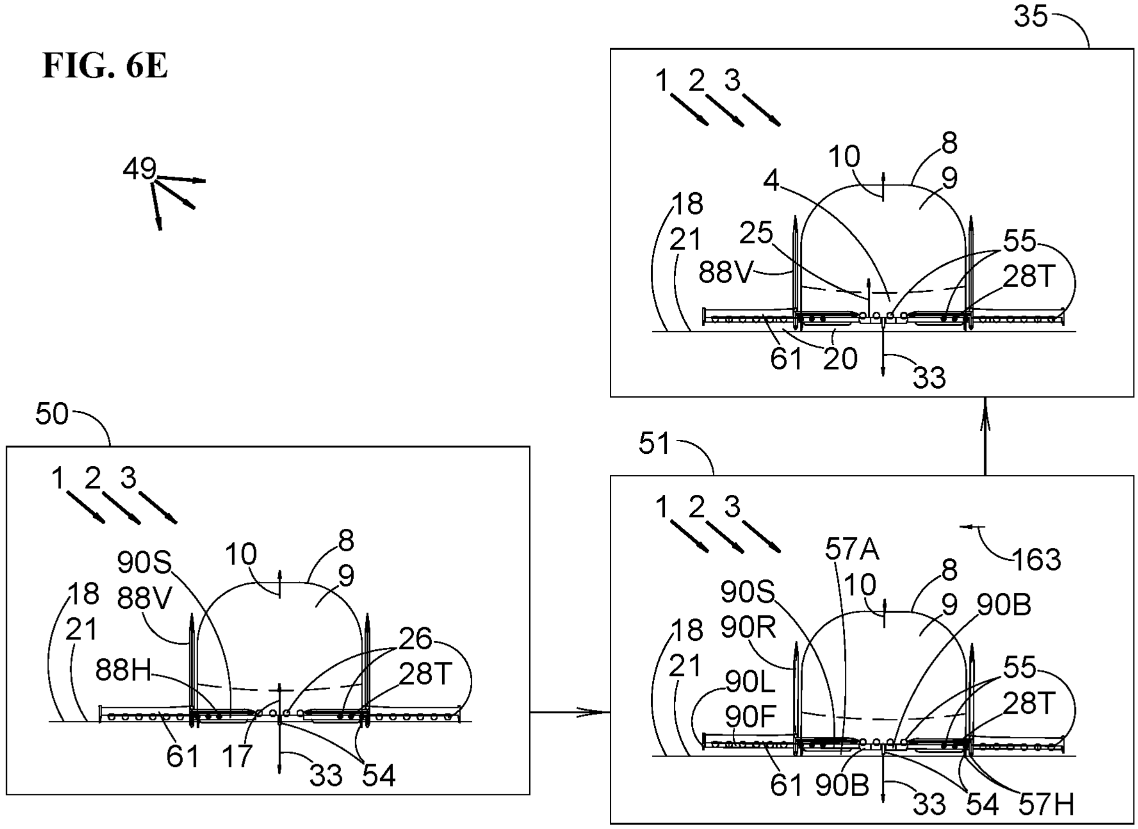

FIG. 6E shows a preferred embodiment with the vehicle configuration earlier described with reference to the rear view shown in FIG. 3D, showing a transition method for a partially aerostatically supported ram air cushion ship 1 to transition from a substantially static floating mode on a water surface to a water takeoff mode with supplemental fluid dynamic support and then to a forward flight in ground effect mode above an Earth surface.

More specifically, FIG. 6E shows a transition method 49 for a partially aerostatically supported ram air cushion ship 1 to transition from a substantially static floating mode 50 on a water surface 18 to a water takeoff mode 51 with supplemental fluid dynamic support 52 and then to a flight in ground-effect mode 35 above an Earth surface 21, comprising the sequential steps of:

(i) supporting weight 33 of said partially aerostatically supported ram air cushion ship 1 using a combination of (a) a hull 54 displacing water to provide a hydrostatic lift force 17 and (b) a lifting gas enclosure 8 containing lighter-than-air lifting gas 9 to provide an aerostatic lift force 10, in said substantially static floating mode 50;

(ii) powering a fluid dynamic propulsor 55 to apply a thrust force (into the page in this rear view) acting on said ship 1 that exceeds drag force (out of the page in this rear view) acting on said ship 1, to propel the ship 1 to forward motion with increasing speed (into the page in this rear view) in said water takeoff mode 51;

(iii) engaging a supplemental fluid dynamic support system in said water takeoff mode 51, said supplemental fluid dynamic support system comprising at least one of a hydrodynamic supplemental support subsystem 57H and an aerodynamic supplemental support subsystem 57A, wherein said engaging said supplemental fluid dynamic support system, reduces required hydrostatic support and correspondingly reduces water displacement related drag (out of the page in this rear view) in said water takeoff mode 51; and (iv) configuring a ram air cushion 20 under at least one of a wing 61 and a body 3 of said ship 1 to provide a portion of an aerodynamic lift force 25 that complements said aerostatic lift force 10 to fully support weight 33 of said ship 1 in said flight in ground-effect mode 35 wherein said ship 1 flies at a flight speed (into the page in this rear view) in ground effect above said Earth surface 21, said flight speed no less than a minimum flight speed.

With reference to FIG. 6E, it should be further noted that in the floating mode 50, the PASRACS 1 can be stationary or can also move at slow speeds with thrust and control of speed and direction and orientation all accomplished by thrusters 28T that operate on the air (such as propellers driven by motors or engines) that are both fluid dynamic propulsors 55 and subsystems of the propulsion system 26. Differential control of power and blade pitch for different propellers can be used for desired motion control as commanded by the flight crew and/or autoflight control system. In floating mode 50, the wing flaps 90F and body flaps 90B are retracted and so not visible. For the water takeoff mode 51, the thrusters 28T will be used to provide thrust. In the water takeoff mode 51 the hydrodynamic supplemental support system 57H can generate a hydrodynamic lift force 17 and/or the aerodynamic supplemental support system 57A can generate an aerodynamic lift force 25 that is further increased by trailing edge downward deflection of body side flaps 90S and wing flaps 90F and body flaps 90B, as illustrated. While typical water takeoffs in modest crosswinds can be "wings-level" for optimal passenger comfort, the particular water takeoff mode 51 is illustrated with a crosswind 163, and the use of both a small bank angle (half degree bank right shown) and differential deflection of wing flaps 90F and optionally other flaps. The particular water takeoff mode 51 is illustrated with a crosswind 163 also shows the deflection of rudders 90R and lateral force control panels 90L (that may also be considered as side force panels, shown integrated in the trailing edge of the wing tip fence in this particular embodiment. It will be understood from the art of crosswind takeoff techniques applicable to waterborne aircraft that a combination of one or more of pointing into the wind, modest bank angle when needed (e.g. for some stronger crosswind conditions), and use of control surfaces can be beneficially used to enable a smooth takeoff despite combinations of crosswind, water currents and waves. Curved takeoff paths can optionally be used. Differential deployment of hydroskis is also shown and can be beneficially applied for such crosswind circumstances; and air rudder(s), water rudder(s) and differential thrust can also be optionally used singly or in combination. In the flight in ground-effect mode 35 the flaps are still shown deflected in a substantially symmetrical manner for flight at relatively low airspeed, while it will be understood that flaps can be progressively retracted as airspeed increases in the flight in ground-effect mode. Automated takeoff control optimized control can optionally be applied, and can include (i) hydroski and/or hydrofoil optimized deployments, (ii) optimized transitions from floating mode to planing mode (e.g. on a step and/or hydroski), (iii) anti-porpoising control commands, (iv) anti-skipping control commands, (v) anti-ground-loop control commands, and (vi) propulsor-failure compensation commands. Shock absorbers with various spring and damping attributes can optionally be used on deployable members such as hydroskis or hydrofoils, along with deployment and retraction mechanisms and actuators.

It should be noted that the use of plural hydroskis and/or surface penetrating hydrofoils can contribute very significantly to heave stability of the PASRACS 1 when in water contact in forward motion.

Figure 6F:
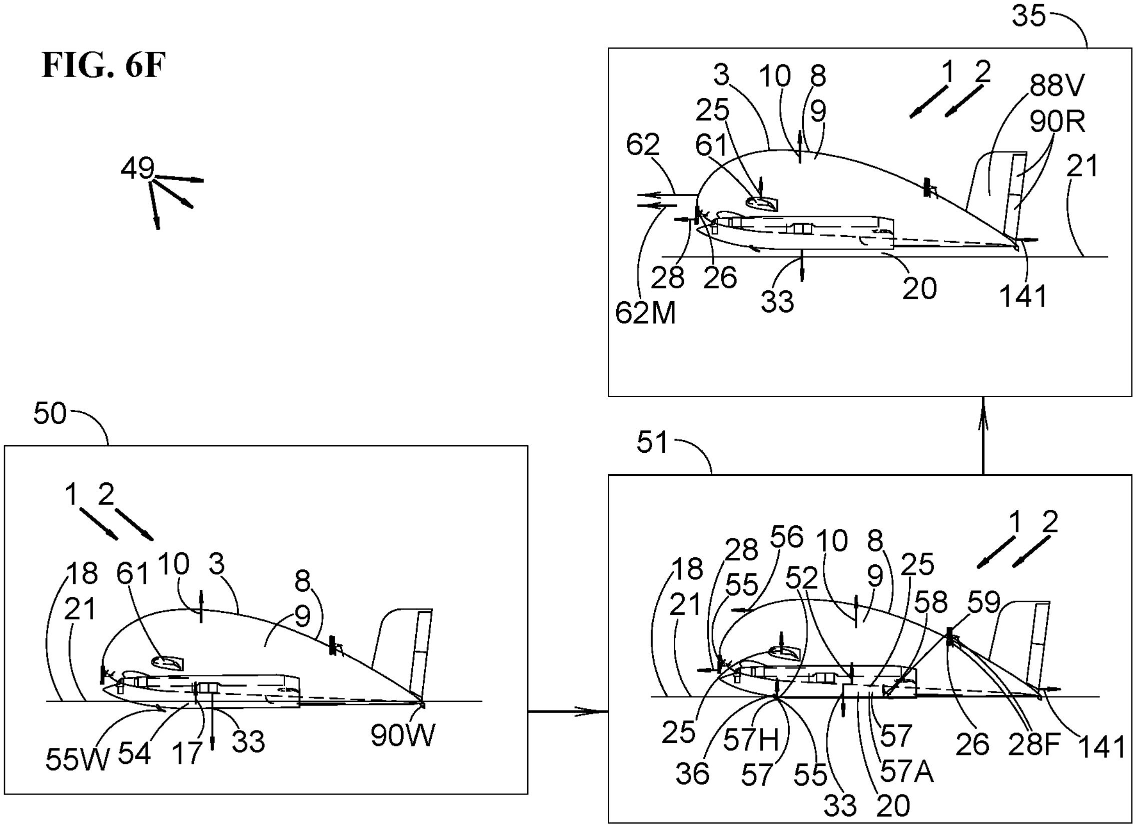

FIG. 6F shows a preferred embodiment with the vehicle configuration earlier described with reference to the side view shown in FIG. 4A, showing a transition method for a partially aerostatically supported ram air cushion ship 1 to transition from a substantially static floating mode 50 on a water surface to a water takeoff mode 51 with supplemental fluid dynamic support and then to a forward flight in ground effect mode 35 above an Earth surface.

Figure 6G:
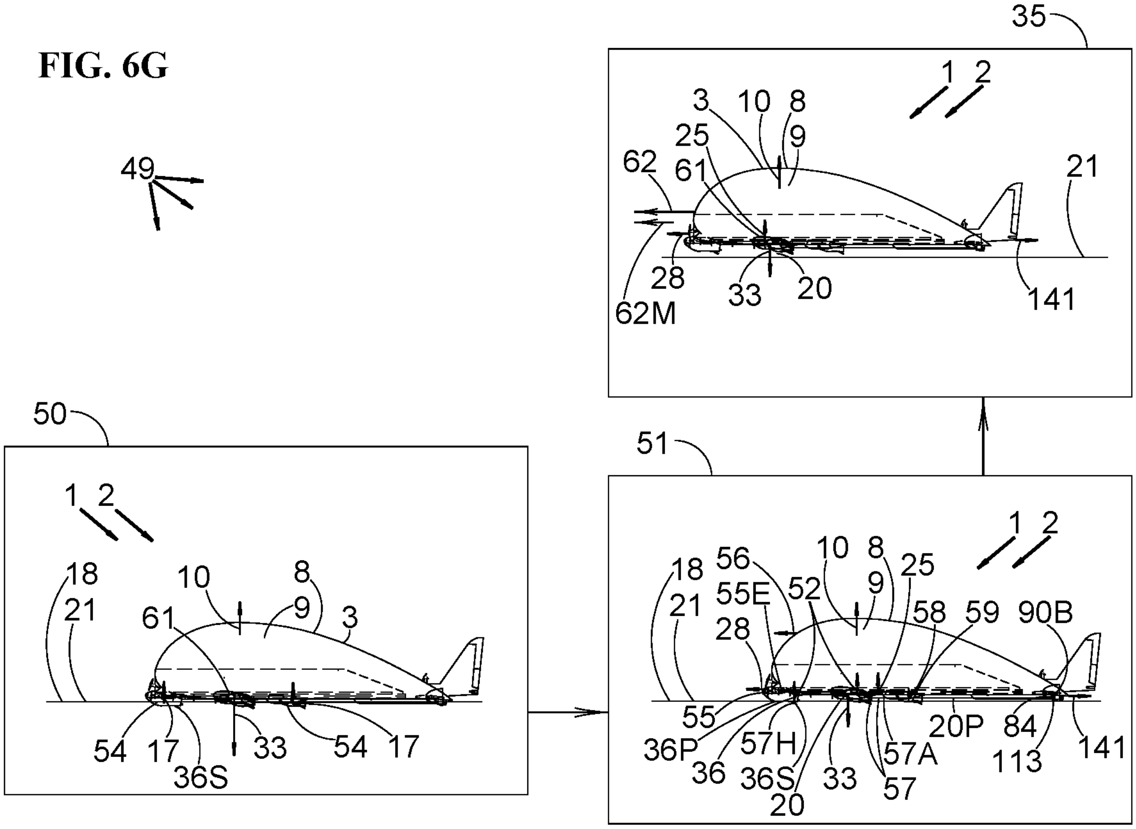

FIG. 6G shows a preferred embodiment with the vehicle configuration earlier described with reference to the side view shown in FIG. 4B, showing a transition method for a partially aerostatically supported ram air cushion ship 1 to transition from a substantially static floating mode 50 on a water surface to a water takeoff mode 51 with supplemental fluid dynamic support and then to a forward flight in ground effect mode 35 above an Earth surface.

More particularly, both FIGS. 6F and 6G show a transition method 49 for a partially aerostatically supported ram air cushion ship 1 to transition from a substantially static floating mode 50 on a water surface 18 to a water takeoff mode 51 with supplemental fluid dynamic support 52 and then to a flight in ground-effect mode 35 above an Earth surface 21, comprising the sequential steps of:

(i) supporting weight 33 of said partially aerostatically supported ram air cushion ship 1 using a combination of (a) a hull 54 displacing water to provide a hydrostatic lift force 17 and (b) a lifting gas enclosure 8 containing lighter-than-air lifting gas 9 to provide an aerostatic lift force 10, in said substantially static floating mode 50;

(ii) powering a fluid dynamic propulsor 55 to apply a thrust force (into the page in this rear view) acting on said ship 1 that exceeds drag force (out of the page in this rear view) acting on said ship 1, to propel the ship 1 to forward motion with increasing speed (into the page in this rear view) in said water takeoff mode 51;

(iii) engaging a supplemental fluid dynamic support system in said water takeoff mode 51, said supplemental fluid dynamic support system comprising at least one of a hydrodynamic supplemental support subsystem 57H and an aerodynamic supplemental support subsystem 57A, wherein said engaging said supplemental fluid dynamic support system, reduces required hydrostatic support and correspondingly reduces water displacement related drag (out of the page in this rear view) in said water takeoff mode 51; and (iv) configuring a ram air cushion 20 under at least one of a wing 61 and a body 3 of said ship 1 to provide a portion of an aerodynamic lift force 25 that complements said aerostatic lift force 10 to fully support weight 33 of said ship 1 in said flight in ground-effect mode 35 wherein said ship 1 flies at a flight speed (into the page in this rear view) in ground effect above said Earth surface 21, said flight speed no less than a minimum flight speed.

Other features shown in FIG. 6F include a waterjet propulsor 55W, a wing 61, a body 3 and propulsor flow vectoring members 28F, a vertical stabilizer 88V and rudders 90R, and a water rudder 90W (that can be used to help maneuver the PASRACS 1 in yaw while in a fully or partially floating mode.

Other features shown in FIG. 6G include a hydrodynamic planing surface 36P and a hydroski 36S, and a ram air cushion 20 that is a power-augmented ram air cushion 20P located forward of reduced height flow passage 113 beneath a trailing edge 84 of a deployed body flap 90B near the aft end of the body 3 of the PASRACS 1. FIG. 6G further illustrates a transition method wherein said aerodynamic supplemental support subsystem 57A comprises a power-augmented ram air cushion 20P, wherein a trailing edge 84 of said power-augmented ram air cushion 20P is a reduced height flow passage 113 above said Earth surface 21 and below a downwardly deflected flap 90F on at least one of a wing 61 and a body 3 of said partially aerostatically supported ram air cushion ship 1, and wherein said power-augmented ram air cushion 20P is at least partially pressurized by energized flow 55E from said fluid dynamic propulsor 55.

Figure 6H:
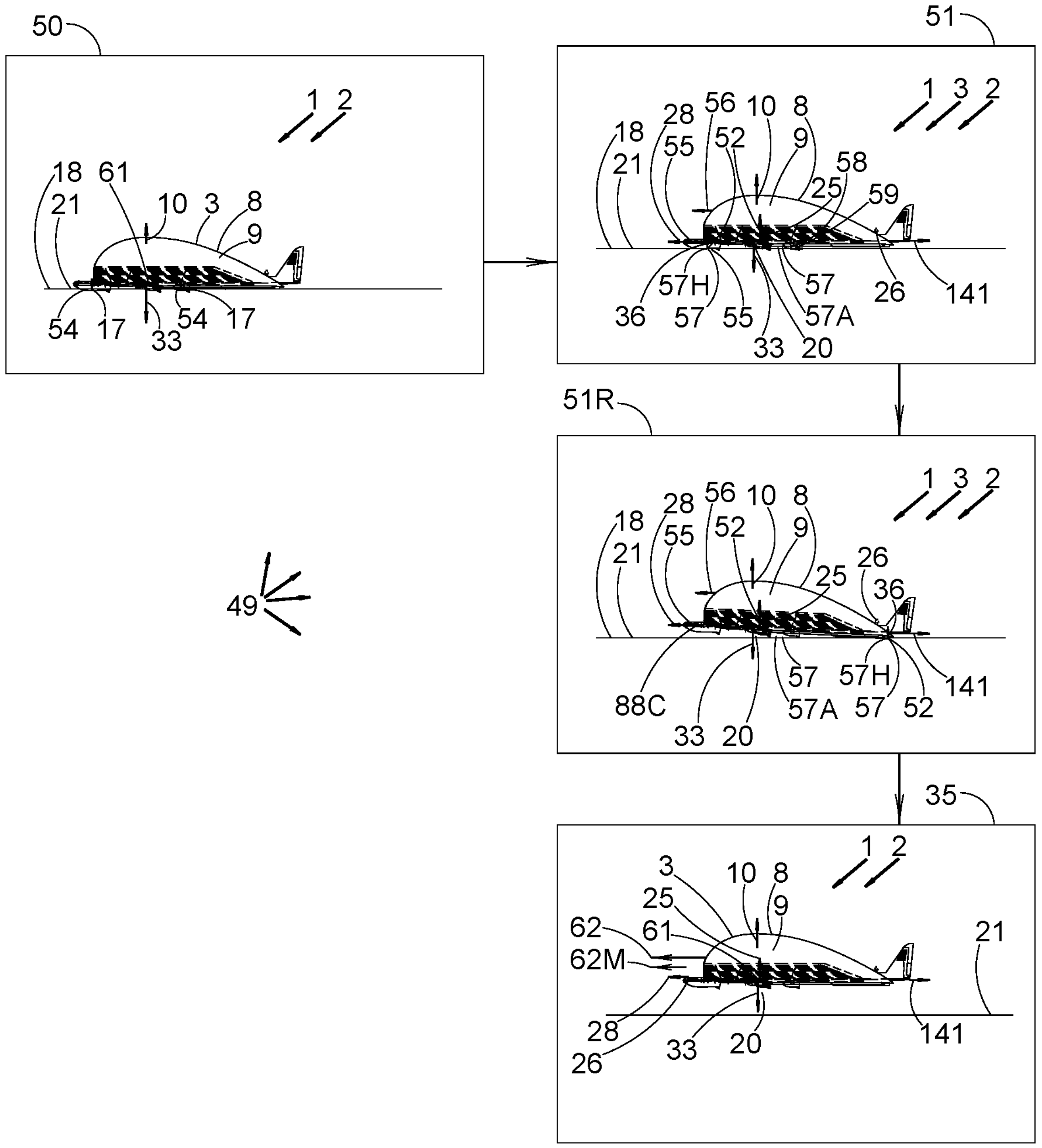

FIG. 6H shows a preferred embodiment with the vehicle configuration earlier described with reference to the side view shown in FIG. 4E, showing a transition method for a partially aerostatically supported ram air cushion ship 1 to transition from a substantially static floating mode 50 on a water surface to a water takeoff mode 51 with supplemental fluid dynamic support and then to a forward flight in ground effect mode 35 above an Earth surface.

More particularly, FIG. 6H shows a transition method 49 for a partially aerostatically supported ram air cushion ship 1 to transition from a substantially static floating mode 50 on a water surface 18 to a water takeoff mode 51 with supplemental fluid dynamic support 52 and then to a flight in ground-effect mode 35 above an Earth surface 21, comprising the sequential steps of:

(i) supporting weight 33 of said partially aerostatically supported ram air cushion ship 1 using a combination of (a) a hull 54 displacing water to provide a hydrostatic lift force 17 and (b) a lifting gas enclosure 8 containing lighter-than-air lifting gas 9 to provide an aerostatic lift force 10, in said substantially static floating mode 50;

(ii) powering a fluid dynamic propulsor 55 to apply a thrust force (into the page in this rear view) acting on said ship 1 that exceeds drag force (out of the page in this rear view) acting on said ship 1, to propel the ship 1 to forward motion with increasing speed (into the page in this rear view) in said water takeoff mode 51;

(iii) engaging a supplemental fluid dynamic support system in said water takeoff mode 51, said supplemental fluid dynamic support system comprising at least one of a hydrodynamic supplemental support subsystem 57H and an aerodynamic supplemental support subsystem 57A, wherein said engaging said supplemental fluid dynamic support system, reduces required hydrostatic support and correspondingly reduces water displacement related drag (out of the page in this rear view) in said water takeoff mode 51 with a water takeoff run followed by a rotation mode 51R; and (iv) configuring a ram air cushion 20 under at least one of a wing 61 and a body 3 of said ship 1 to provide a portion of an aerodynamic lift force 25 that complements said aerostatic lift force 10 to fully support weight 33 of said ship 1 in said flight in ground-effect mode 35 wherein said ship 1 flies at a flight speed (into the page in this rear view) in ground effect above said Earth surface 21, said flight speed no less than a minimum flight speed.

Note that the rotation mode 51R shown in FIG. 6H shows a nose up rotation of the PASRACS 1 by 2.5 degrees nose up for example and without limitation, enabled in part by increased trailing edge down deflection of a canard control surface 88C by 5 degrees incremental, without limitation. The illustrated level of rotation will still be safe and acceptable for passengers walking on aisles and walkways within the vehicle, based on deck angle precedents from commercial airliners wherein passengers have been found to be able to traverse aisles with angles of up to 3 degrees. Note also that similar use of nose up body angles of up to 3 degrees can be used for landing flare in addition to for takeoff rotation.

Figure 7A:
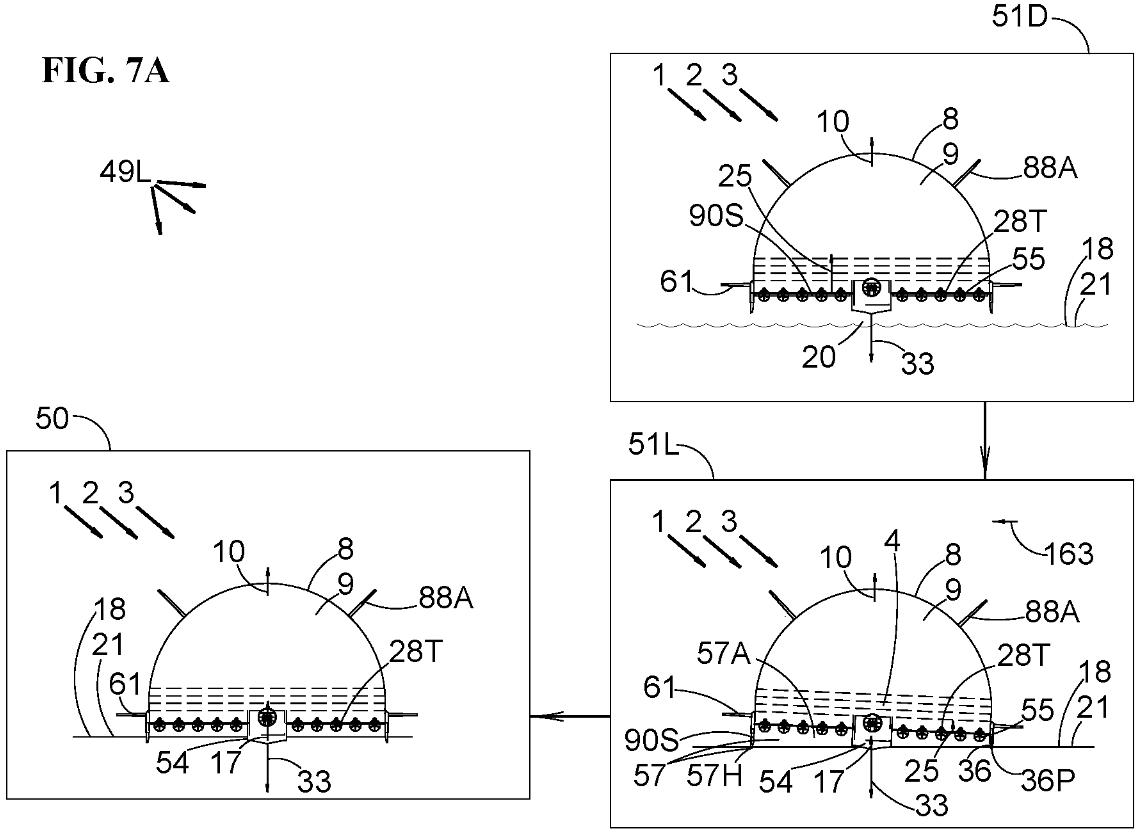
FIG. 7A through 7C show some preferred embodiments of a landing transition method for a partially aerostatically supported ram air cushion ship to transition from a forward flight in ground effect mode above an Earth surface, to a landing on a water surface and then to a substantially static floating mode on the water surface.

FIG. 7A shows a preferred embodiment with the vehicle configuration earlier described with reference to the front view shown in FIG. 3C, showing a transition method for a partially aerostatically supported ram air cushion ship 1 that was in cruise flight in a flight in ground-effect mode 35 (not shown) to thence transition in sequence through a descent mode 51D and then a water landing mode 51L and then finally back to a substantially static floating mode 50 on a water surface at a destination or end-of-flight leg region.

Figure 7B:
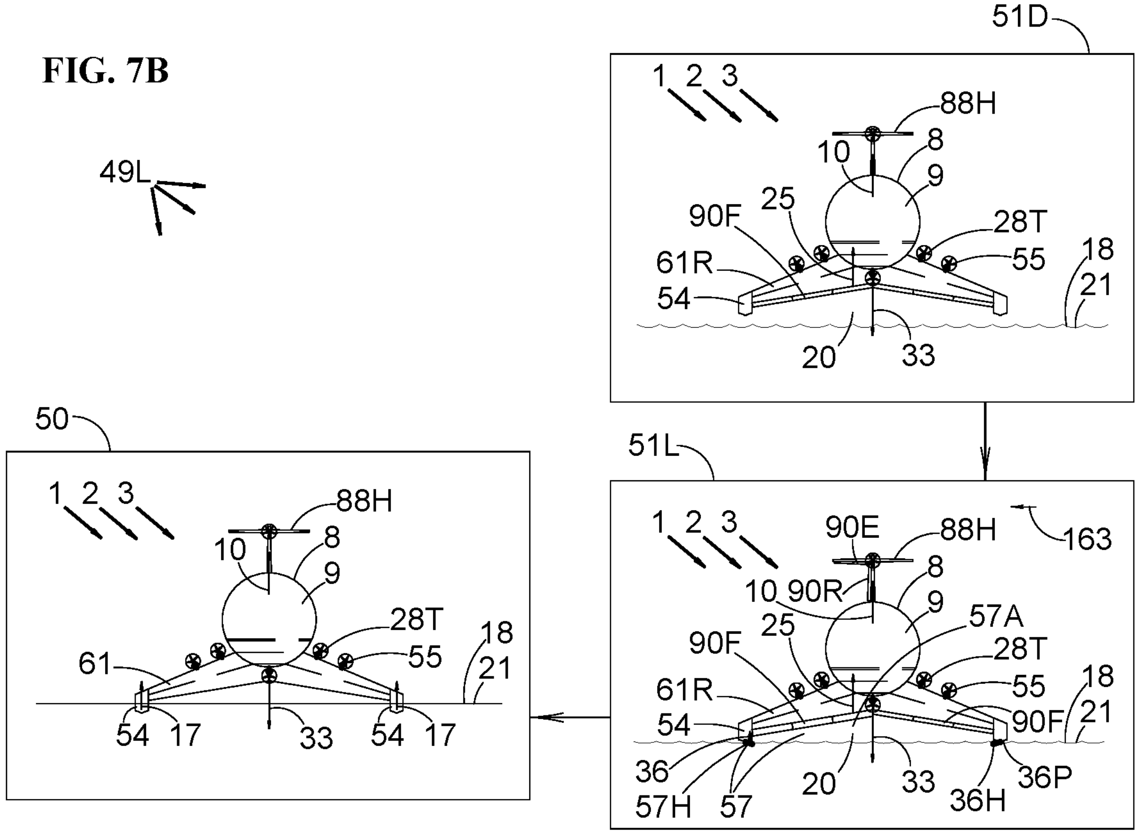

FIG. 7B shows a preferred embodiment with the vehicle configuration earlier described with reference to the front view shown in FIG. 3E, showing a transition method for a partially aerostatically supported ram air cushion ship 1 that was in cruise flight in a flight in ground-effect mode 35 (not shown) to thence transition in sequence through a descent mode 51D and then a water landing mode 51L and then finally back to a substantially static floating mode 50 on a water surface at a destination or end-of-flight leg region.

More particularly, both FIGS. 7A and 7B show a landing transition method 49L for a partially aerostatically supported ram air cushion ship 1 that was in cruise flight in a flight in ground-effect mode 35 (not shown) to thence transition in sequence through a descent mode 51D and then a water landing mode 51L and then finally back to a substantially static floating mode 50 on a water surface at a destination or end-of-flight leg region, comprising the sequential steps of:

(i) configuring a ram air cushion 20 under at least one of a wing 61 and a body 3 of said ship 1 to provide a portion of an aerodynamic lift force 25 that complements said aerostatic lift force 10 to fully support weight 33 of said ship 1 in flight in said descent mode 51D wherein said ship 1 flies at a flight speed (out of the page in this front view) in ground effect above said Earth surface 21, said flight speed no less than a minimum flight speed;

(ii) engaging a supplemental fluid dynamic support system in said water landing mode 51L wherein said ship 1 is in forward motion with decreasing speed, said supplemental fluid dynamic support system comprising at least one of a hydrodynamic supplemental support subsystem 57H and an aerodynamic supplemental support subsystem 57A, wherein said engaging said supplemental fluid dynamic support system, reduces required hydrostatic support and correspondingly reduces water displacement related drag (out of the page in this rear view) in said water takeoff mode 51; and (iii) supporting weight 33 of said partially aerostatically supported ram air cushion ship 1 using a combination of (a) a hull 54 displacing water to provide a hydrostatic lift force 17 and (b) a lifting gas enclosure 8 containing lighter-than-air lifting gas 9 to provide an aerostatic lift force 10, in said substantially static floating mode 50.

FIG. 7A further illustrates a crosswind landing with a crosswind 163, wherein a certain measure of a decrab maneuver is used in the crosswind landing, as seen with a 2.5 degree bank angle (quantity of bank representative and not limiting) achieved by optimal control to all control surfaces plus differential downward deployment of left and right hydrodynamic planing surfaces 36P, as illustrated.

FIG. 7B further illustrates a crosswind landing with no bank angle, keeping "wings level" with appropriate control surface deflections shown including differential flaps (that act as flaperons) 90F and differential elevator 90E and deployment of a rudder 90R. FIG. 7B also shows downward deployment of hydrofoils 36H from the hulls 54 on left and right sides of the vehicle, where the illustrated hydrofoils are surface penetrating hydrofoils. The surface-penetrating hydrofoils as configured will inherently enhance roll stability and heave stability in landing, and can optionally be fitted with suspension elements such as shock absorbers with spring and damping attributes, to smooth the landing even in the presence of waves on the water surface, as shown.

Figure 7C:
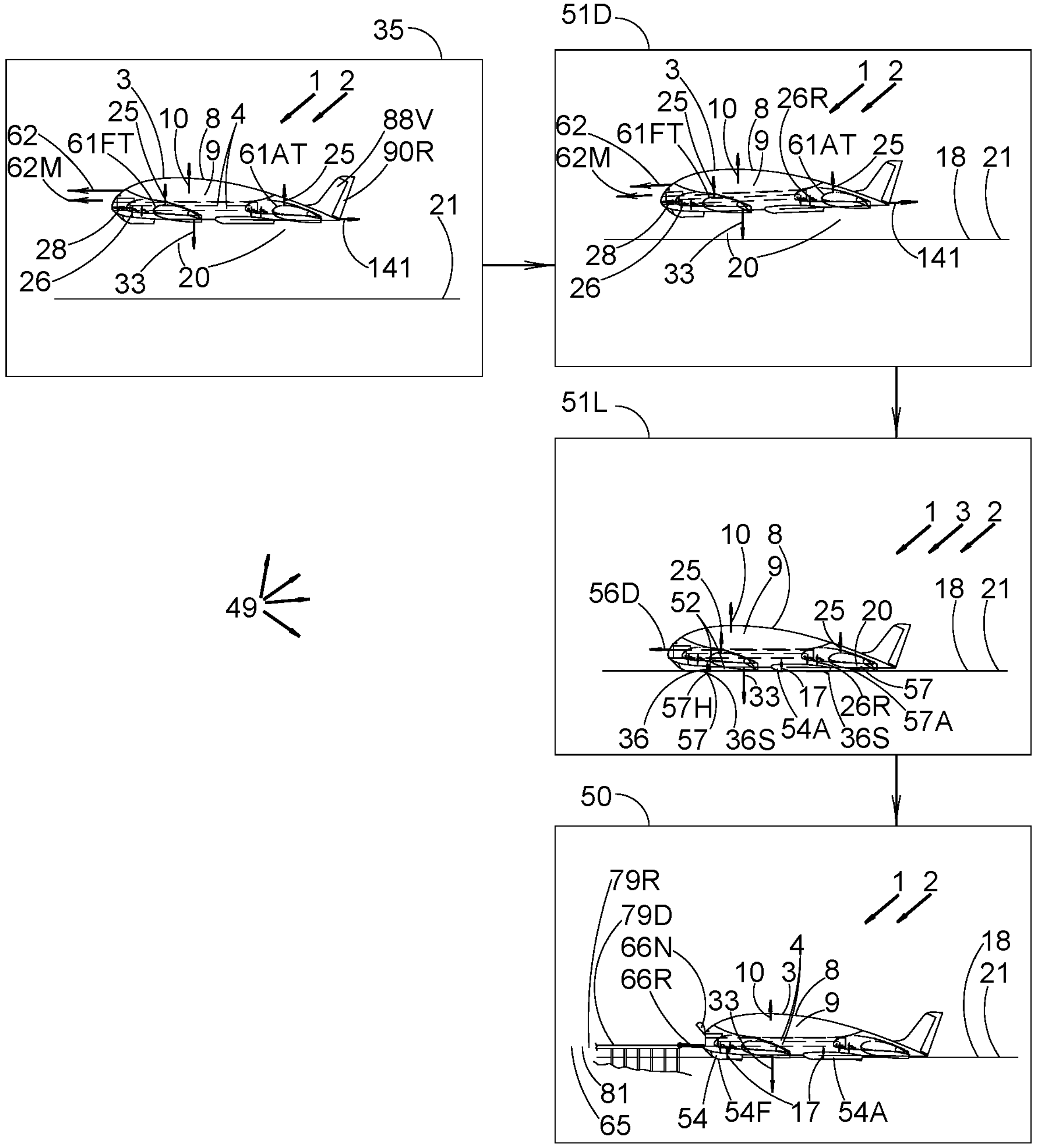

FIG. 7C shows a preferred embodiment with the vehicle configuration earlier described with reference to the side view shown in FIG. 4D, showing a transition method for a partially aerostatically supported ram air cushion ship 1 that starts in cruise flight in a flight in ground-effect mode 35 to thence transition in sequence through a descent mode 51D and then a water landing mode 51L and then finally back to a substantially static floating mode 50 on a water surface at a destination or end-of-flight leg region. The PASRACS 1 includes ship structure 2 and a body 3. This tandem wing configuration has wings 61 comprising a forward tandem wing 61FT and an aft tandem wing 61AT, as shown. The wings 61 provide aerodynamic lift force 25 due to their aerodynamic shaping as well as due to the presence of ram air cushions 20 beneath them; while aerostatic lift force 10 is provided by a lifting gas 9 in a lifting gas enclosure 8 in the body 3. A propulsion system 26 provides a thrust force 28 that counters drag force 141 acting on the vehicle in flight in ground-effect. The PASRACS 1 is fitted at an aft location with a vertical stabilizer 88V that serves as a vertical tail or fin along with a rudder 90R, but as shown no horizontal stabilizer is needed or provided, as the tandem wings can adequately provide both pitch stability and pitch trim. The body 3 includes payload volume 4 as well as other features described earlier with reference to FIG. 4D.

As the PASRACS 1 transitions from the flight in ground-effect mode 35 to the descent mode 51D, the vehicle is rotated nose down in pitch to achieve a desired vehicle flight path vector that is pointed downward at a slight angle, with a −2.5 degree flight path angle shown as an example and without limitation. Control surfaces and thrust are controlled for trimmed flight in descent at a desired flight speed 62 that is still above minimum flight speed 62M. A propulsive system with regenerative braking 26R may optionally be enabled for flight use under certain conditions, allowing some use of reverse thrust where needed or beneficial, e.g., for controlled steeper descents when required or for controlled deceleration in descent when required.

As the PASRACS 1 transitions from the descent mode 51D to the water landing mode 51L it will typically pitch nose up while reducing speed to just above minimum flight speed 62M, and maintain a low sink rate in a final flare and alighting maneuver that then leads to water contact by an aft water hull member 54A or a extended hydroski 36S mounted thereto. The vehicle will then derotate to a near-level configuration with all hydroskis contacting the water and then all hulls contacting the water surface 18, as shown in the illustration for the water landing mode 51L. The vertical sink rate can be gradually reduced without discomfort to passengers, with the help of shock absorbers in the hydroski suspension plus the effects of the regions with ram air cushion 20. With appropriate control of the propulsion system 26 and the propulsive system with regenerative braking 26R, a smooth deceleration can be achieved to enable the PASRACS 1 to finally transition from the water landing mode to a floating mode 50, where the vehicle can then taxi to a final destination location such as the illustrated location near a port dock 79D in a port region 79R, which can be close to both a destination waterfront populated area 81 at the end of a trip and an origin waterfront populated area 65 for the start of the subsequent outbound trip. This particular embodiment of PASRACS 1 is fitted with a nose loading door 66N, shown open in the floating mode 50 to enable deboarding from and boarding to the payload volume 4, optionally through use of a boarding ramp 66R that can be similar to prior art boarding ramps used for boarding and deboarding people and vehicles on marine car ferries.

Figure 8A:
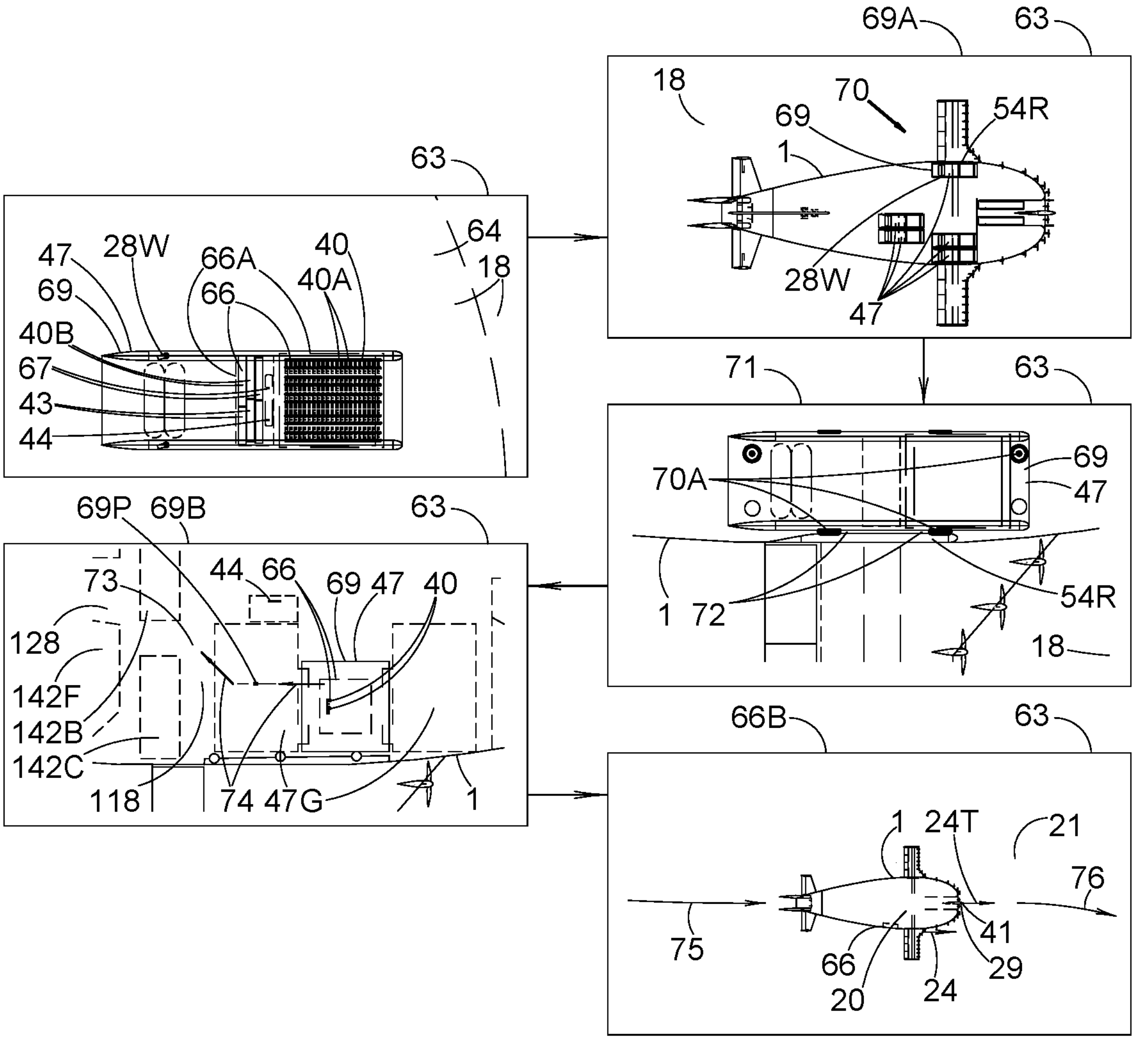
FIG. 8A shows a preferred embodiment of a transport method for multimodally transporting payload from an origin location.

FIG. 8A shows a preferred embodiment of a transport method for multimodally transporting payload from an origin location.

More particularly, FIG. 8A shows a transport method 63 for multimodally transporting payload 7 from an origin location 64, comprising the steps of:

(i) enabling a boarding payload 66 to be accommodated 66A in a transfer vehicle 69 at an origin location 64, shown in the first box in bottom view, wherein said boarding payload 66 comprises at least one of (a) a first plurality 40A of passengers 40 and (b) a second plurality 40B of items 67 of at least one of cargo 43 and baggage 44;

(ii) bringing together 69A said transfer vehicle 69 with a partially aerostatically supported ram air cushion ship 1, at a mating location 70, shown in the second sequential box in a bottom view at smaller scale or approximately 15% scale;

(iii) mating 71 said transfer vehicle 69 to said partially aerostatically supported ram air cushion ship 1 utilizing a mating apparatus 70A configured to contiguously connect 72 said transfer vehicle 69 to said partially aerostatically supported ram air cushion ship 1, shown in the third sequential box in plan view at the same scale as the first box;

(iv) enabling boarding transfer 69B of at least a portion of said boarding payload 66 from said transfer vehicle 69 to a payload accommodating compartment 73 in said partially aerostatically supported ram air cushion ship 1, through a boarding transfer path 74, shown in the fourth sequential box in the same scale enlarged plan view as the previous box; and (v) transporting 66B said boarding payload 66 in said partially aerostatically supported ram air cushion ship 1 on a travel path 24T as commanded by at least one of crew 41 and a vehicle control and navigation system 29, said travel path 24T including a takeoff phase 75 and a flight phase 76 with a positive airspeed 24 wherein said partially aerostatically supported ram air cushion ship 1 is supported in part by an aerostatic lift force (out of the page in this plan view) and in part by an aerodynamic lift force (out of the page in this plan view) leveraging a ram air cushion 20 between a lower surface of said partially aerostatically supported ram air cushion ship 1 and an Earth surface 21, shown in the fifth sequential box at smaller scale of approximately 7.5% scale as the first box, in plan view.

The illustrated partially aerostatically supported ram air cushion ship 1 or PASRACS 1 in the description of the transport method 63 shown in FIG. 8A, is similar to the preferred embodiment earlier described with reference to FIGS. 1A through 1G and FIGS. 2A through 2F. FIG. 8A further illustrates, in the first box top view, that the illustrated transfer vehicle 69 here comprises a payload transfer transport module 47 that is nominally a boarding barge floating on a water surface 18 and having 21 rows of 30 abreast seating (without limitation), and that is fitted with controllable water thrusters 28W such as azipods with waterjet and/or propeller effectors. FIG. 8A further illustrates, in the second box bottom view, that the PASRACS 1 includes a right hull member 54R with an adjacent payload transfer transport module 47, as well as other payload transfer transport modules 47 that are also supported under the PASRACS 1 and connected to it. FIG. 8A also illustrates, in the third sequential box top view, that the PASRACS 1 includes a right hull member 54R with an adjacent payload transfer transport module 47. FIG. 8A illustrates, in the fourth sequential box top view, that the PASRACS 1 includes the connected transfer vehicle 69 here comprising a payload transfer transport module 47, and features seen earlier in FIG. 2B (of a deck layout configuration of the next above the bottom deck, i.e. cargo deck 5C, of the preferred embodiment of a partially aerostatically supported ram air cushion ship 1 as shown earlier in FIGS. 1A and 1B), such as boarding and deboarding gate areas 47G, a special service area 142B, restroom 142C and government formalities area 142F that can be used for functions such as immigration control, emigration control, customs, security checks and other formalities required by origin, destination and stops jurisdictions. Boarding transfer 69B of passengers 40 can involve one or more of a passenger walking or on a wheelchair or on a motorized wheelchair or on an e-mobility scooter or on a personal transport vehicle 69P that may, for example and without limitation, be like the illustrated autonomous self-propelled wheeled scooter with a passenger seat and a luggage carrier big enough to carry the passenger's luggage such as a suitcase and a personal item. It will be understood that this type of personal transport vehicle 69P may be used to enable a passenger to go with his or her baggage all the way from a check-in area at an origin location or terminal, to the payload transfer transport module 47, to a final cabin or seat destination on a deck in the PASRACS 1. Personal transport vehicles 69P may also be configured to carry two or more passengers and their baggage. With regard to the travel path 24T including a takeoff phase 75 in the fifth sequential box, it should be noted that a space on the water surface 18 can be kept clear of other vessels or objects to enable a safe takeoff of the PASRACS 1 without collision risk. This can be done with manned or robotic patrol boats with warning and tow/push capabilities, and can alternatively or additionally be done by definition of a takeoff and landing "water runway" region on the water surface 18, with optional perimeter marker buoys and/or perimeter floating fences.

FIGS. 8B through 8E show some alternate preferred embodiments of a transport method 63 for multimodally transporting payload.

Figure 8B:
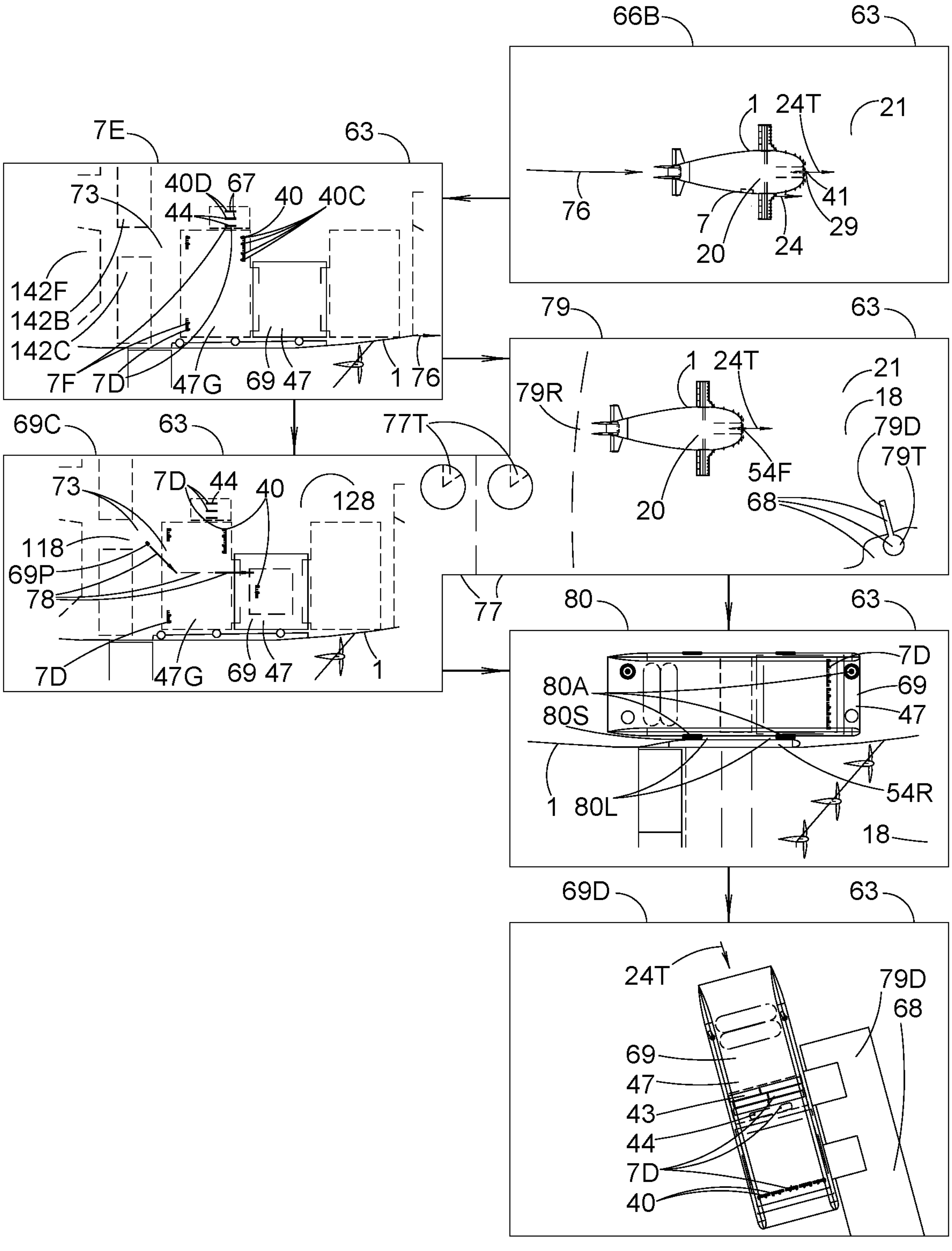
FIGS. 8B through 8E show some alternate preferred embodiments of a transport method for multimodally transporting payload from an origin location.

FIG. 8B shows a transport method 63 for multimodally transporting payload 7 from an origin location 64 as first illustrated in FIG. 8A, with the first box in FIG. 8B illustrating the flight phase 76 with positive airspeed 24 that was earlier illustrated and described in the smaller scale plan view of the last box of FIG. 8A, and further comprising the steps of:

(vi) identifying 7E a disembarking payload 7D for a destination location 68, which disembarking payload 7D, shown in enlarged plan view in the second box of FIG. 8B, is in on board 7F the partially aerostatically supported ram air cushion ship 1 in said payload accommodating compartment 73 in said flight phase 76, and wherein said disembarking payload 7D comprises at least one of (a) a third plurality 40C of passengers 40 and (b) a fourth plurality 40D of items 67 of at least one of cargo 43 and baggage 44;

(vii) performing the combined arrival preparation steps 77 within an arrival preparation time window 77T, as shown in the third box of FIG. 8B with left and right halves, of (a) enabling disembarking transfer 69C of said disembarking payload 7D from said payload accommodating compartment 73 in said partially aerostatically supported ram air cushion ship 1 to said transfer vehicle 69, through a disembarking transfer path 78, and (b) landing 79 said partially aerostatically supported ram air cushion ship 1 in a port region 79R encompassing said destination location 68 (shown at the same scale as the first box, or approximately 7.5% scale relative to the second box and the left side of the third box);

(viii) unmating 80 said transfer vehicle 69 from said partially aerostatically supported ram air cushion ship 1 at an unmating location 80L, shown in the fourth box in enlarged plan view, utilizing an unmating apparatus 80A configured to enable separation 80S of said transfer vehicle 69 from said partially aerostatically supported ram air cushion ship 1; and (ix) conveying 69D said disembarking payload 7D being accommodated in said transfer vehicle 69 to said destination location 68, shown in the fifth box at the same scale as the fourth box.

FIG. 8B thus illustrates a transport method 63 for multimodally transporting payload 7 to a destination location 68. The disembarking payload 7D can comprise some combination of payload 7 from said boarding payload 66 and payload 7 not from said boarding payload 66. The destination location 68 may be a "gate" or "docking location" or "dock" or "slip" or "terminal" for example and without limitation.

Disembarking transfer 69C of passengers 40 can involve one or more of a passenger walking or on a wheelchair or on a motorized wheelchair or on an e-mobility scooter or on a personal transport vehicle 69P that may, for example and without limitation, be like the illustrated autonomous self-propelled wheeled scooter with a passenger seat and a luggage carrier big enough to carry the passenger's luggage such as a suitcase and a personal item. It will be understood that this type of personal transport vehicle 69P may be used to enable a passenger to go with his or her baggage all the way from their cabin or seat on a deck in the PASRACS 1, to the payload transfer transport module 47, to a final destination location 68 such as a check out area, parking garage, pick-up area or other transit or final destination. Personal transport vehicles 69P may also be configured to carry two or more passengers and their baggage. With regard to the travel path 24T including a landing phase 75 in right center box, it should be noted that a space on the water surface 18 can be kept clear of other vessels or objects to enable a safe landing of the PASRACS 1 without collision risk. This can be done with manned or robotic patrol boats with warning and tow/push capabilities, and can alternatively or additionally be done by definition of a landing and takeoff "water runway" region on the water surface 18, with optional perimeter marker buoys and/or perimeter floating fences.

The illustrated partially aerostatically supported ram air cushion ship 1 or PASRACS 1 in the description of the transport method 63 shown in FIG. 8B, is similar to the preferred embodiment earlier described with reference to FIG. 8A and with reference to FIGS. 1A through 1G and FIGS. 2A through 2F. FIG. 8B further illustrates, in the first box plan view, a PASRACS 1 in a flight phase 76 such as nearing the end of the flight started earlier as illustrated in the fifth sequential box of FIG. 8A. FIG. 8B shows in its first box a starting step of transporting 66B a payload 7 in said partially aerostatically supported ram air cushion ship 1 on a travel path 24T as commanded by at least one of crew 41 and a vehicle control and navigation system 29, said travel path 24T with positive airspeed 24 wherein said partially aerostatically supported ram air cushion ship 1 is supported in part by an aerostatic lift force (out of the page in this plan view) and in part by an aerodynamic lift force (out of the page in this plan view) with a ram air cushion 20 between a lower surface of said partially aerostatically supported ram air cushion ship 1 and an Earth surface 21. The second box of FIG. 8B further illustrates features seen earlier in FIG. 2B (of a deck layout configuration of the next above the bottom deck, i.e. cargo deck 5C, of the preferred embodiment of a partially aerostatically supported ram air cushion ship 1 as shown earlier in FIGS. 1A and 1B), such as boarding and deboarding gate areas 47G, a special service area 142B, restroom 142C and government formalities area 142F that can be used for functions such as immigration control, emigration control, customs, security checks and other formalities required by origin, destination and stops jurisdictions. The third and fifth sequential boxes of FIG. 8B further illustrate a port dock 79D and terminal 79T in the destination location 68. Note that the dock 79D can be built-up, on pilings, and/or supported by floating dock floatation members, and can include bumpers to enable damageless contact by the transfer vehicle 76 which is here illustrated as a payload transfer transport module 47. The dock 79D may be equipped with boarding bridge, ramp, stairway, escalator, elevator, moving sidewalk, crane and other known devices and methods for loading and unloading people e.g., passengers 40, plus baggage 44 and cargo 43 from (and to) the transfer vehicle 69. Disembarking payload 7D is illustrated in FIG. 8B. Note that the terminal 79T can include known elements from the prior art of terminals, including without limitation: a terminal building, a parking area or garage, a park and ride, a kiss and ride, a transit center with connections to road and/or rail and/or marine and/or air connection vehicles, a store, a mall, a duty-free facility, a hotel, a restaurant, a parks and/or garden, a water view deck, a medical and/or health care facility, a cultural center, an entertainment/sports facility, a theatre, a stage, a live show venue, a music venue with one or more instruments (such as a piano, organ, keyboard, string instrument, woodwind instrument, brass instrument and/or other instrument), a business center, a convention center, a boarding complex for boarding and deboarding, a concourse, a gate area, a health care center, a gym/exercise/fitness center, a meditation/prayer area/chapel, a yoga area, a pet area, a baggage area, a baggage claim area, a cargo area, an immigration area, an emigration area, a security screening area, a customs area, an agricultural inspection area, a customer service area with customer service agents and/or AI/robotic agents, and an information center. The fourth sequential box in FIG. 8B shows an unmating method similar to that described earlier in the context of the preferred embodiment of FIGS. 1A through 1G and FIGS. 2A through 2F, and further illustrates a right hull member 54R on the transfer vehicle 76 which is here in FIG. 2B illustrated as a payload transfer transport module 47.

The transport method of FIGS. 8A and 8B in conjunction with the preferred embodiment described with reference to FIGS. 1A-G and 2A-F, show that the boarding transfer path 74 and the disembarking transfer path 78 each comprise at least one of (i) a walkway 118 (shown in FIGS. 8A and 8B), (ii) an aisle 119, (iii) a roadway 120, (iv) a stairway 143S, (v) a ramp 122, (vi) an elevator 143E, (vii) a moving stairway or escalator, (viii) a hallway, (ix) a room, (x) a plaza, (xi) a floored area 128, and (xii) a tunnel. PASRACS 1 will preferably be configured with boarding transfer path 74 and disembarking transfer path 78 being suitable for and usable by a Person with Reduced Mobility (PRM), an elderly person, and/or a handicapped person, including ability to accommodate a wheelchair or powered wheelchair and having ground slope levels that are not excessive, such as not exceeding a 1:12 pitch per ADA (Americans with Disabilities Act) ramp guidelines.

Figure 8C:
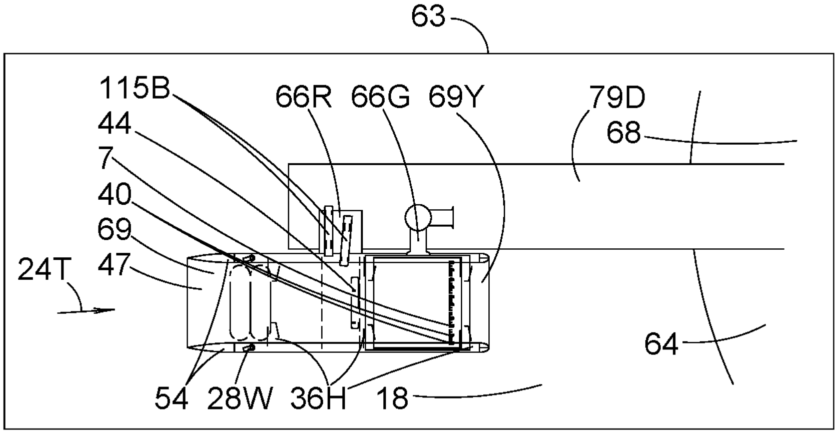
Figure 8D:
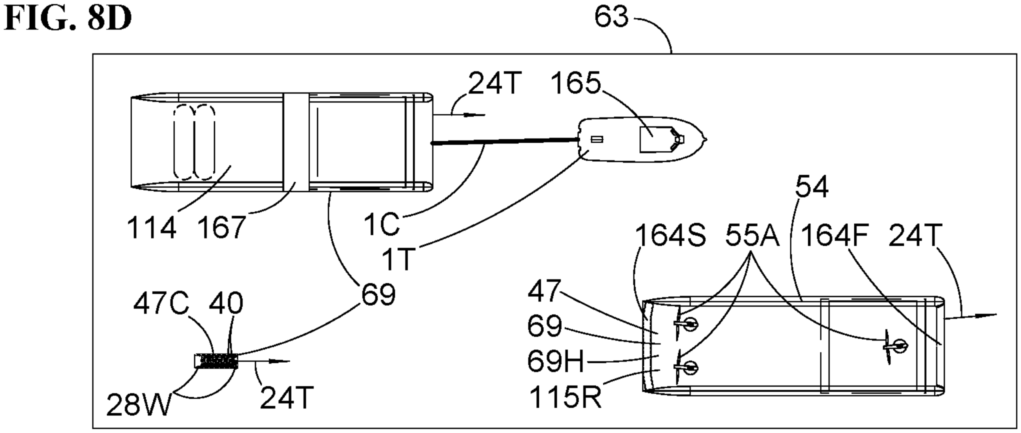
Figure 8E:
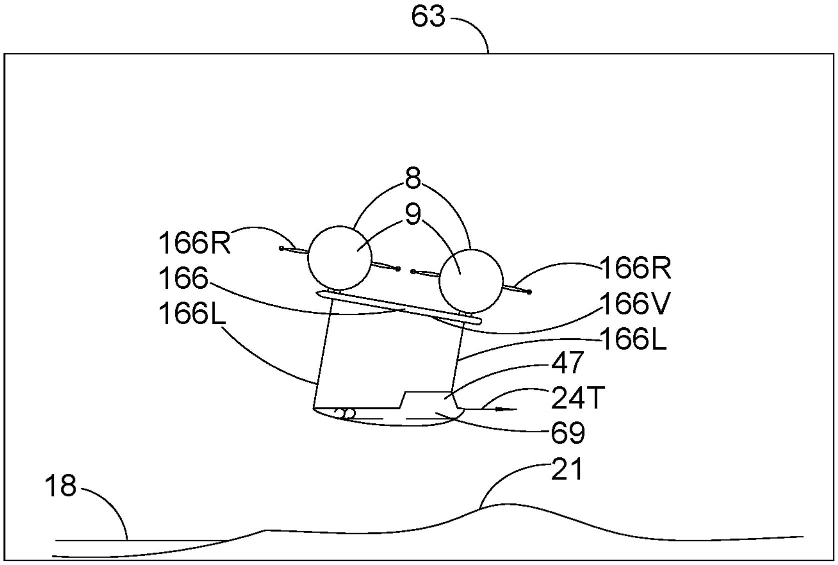

FIGS. 8C through 8E show some alternate preferred aspects and embodiments of a transport method 63 for multimodally transporting payload, in the context of the series of steps described earlier with reference to FIGS. 8A and 8B. The transport method 63 as shown in each of FIGS. 8C through 8E can apply to either or both of transport from an origin location 64 and transport to a destination location 68.

The transport method 63 in FIG. 8C shows a plan view of a transfer vehicle 69 that serves as a payload transfer transport module 47 for carrying payload 7 that can include passengers 40 and baggage 44, similar to the configuration described earlier in the context of the preferred embodiment of a PASRACS 1 described earlier in FIGS. 1A through 1G and FIGS. 2A through 2F. The transfer vehicle 69 is here a hydrofoil vehicle 69Y equipped with plural hydrofoils 36H that enable the vehicle to by lifted by hydrodynamic forces on the hydrofoils 36H when they are underwater and the vehicle is moving forward on a water surface 18, propelled by propulsors such as controllable water thrusters 28W, as known in the prior art of hydrofoil vehicles. By lifting hulls 54 significantly out of the water the hydrodynamic drag can be reduced and the vehicle speed increased and vehicle ride quality in choppy waters improved. The transfer vehicle 69 is shown docked at a port dock 79D after arriving along a travel path 24T. The port dock 79D is at a location that is either or both a destination location 68 (for disembarking payload) or/and an origin location 64 (for embarking payload for the next leg of travel of a PASRACS 1 to which the transfer vehicle 69 will return). As one alternative, some passengers can deboard or board the transfer vehicle 69 by utilizing a boarding bridge 66G, as illustrated, while some other passengers can deboard or board the transfer vehicle 69 on a bus 115B that can traverse to or from the port dock 79D driving on a boarding ramp 66R, as shown. The buses 115B can be considered to also be transfer vehicles, that carry passengers to and from final destinations/origins anywhere on a road system connecting to the port area and port dock 79D. Recreational vehicles, automobiles, other road vehicles, and tracked or rail vehicles can replace the illustrated buses 115B in variant embodiments.

The transport method 63 in FIG. 8D shows a plan view of three different exemplary transfer vehicles 69 that can transport payload to and from a PASRACS 1, including a PASRACS 1 of the preferred embodiment described earlier in FIGS. 1A through 1G and FIGS. 2A through 2F. One illustrated transfer vehicle 69, shown at the top of the Figure, is a barge 114 that is connected to a tugboat 165 by a tow cable 1C, with the tugboat 165 pulling the barge 114 along a desired travel path 24T for either outbound or inbound payload transport. The illustrated transfer vehicle 69 is shown with a view deck 167, preferably with a safety-provisioned opening to the atmosphere, such as openable window areas with safety grating, or open top with safety grating, with the safety provisions preventing risk of persons falling overboard. It should be understood that in variant embodiments to transfer vehicle 69 and/or the tugboat 165 could be a vehicle of single hull, catamaran, multimaran, hydrofoil boat (with surface penetrating hydrofoils and/or fully submerged hydrofoils), or hovercraft type of vehicle.

A second illustrated transfer vehicle 69 is compact payload transfer transport module 47C of the class earlier described in the context of FIG. 1B. The illustrated compact payload transfer transport module 47C is propelled by controllable water thrusters 28W on a desired travel path 24T to carry passengers 40 on either outbound or inbound transport legs.

A third illustrated transfer vehicle 69 is a payload transfer transport module 47 that is a hovercraft 69H. The prior art of hovercraft is well known and includes examples such as the SR.N4 hovercraft that carried payload across the English Channel for many years, before the Chunnel was built. The hovercraft 69H shown in FIG. 8D is traveling on a travel path 24T while propelled by air propulsors 55A that also provide directional control, and supported on a powered air cushion that is bounded around its perimeter by a combination of one or more of an air cushion bounding skirt 164S, an air cushion bounding flap 164F, and sidewall elements such as the bottom edges of the catamaran hulls 54. As illustrated but without limitation, the air cushion bounding skirt 164S is a hovercraft skirt at the aft end of the hovercraft 69H, the air cushion bounding flap 164F is a leading edge flap such as a Krueger flap at the front end of the hovercraft 69H, and the sidewall elements are the bottom edges of the hulls 54. The hovercraft 69H is an amphibious vehicle 115R, and can traverse on water and land and ice and swamp and marsh or soft surfaces, and can also serve terminal locations on shoreline ramps ask known with prior art hovercraft, enabling passengers and vehicles and cargo and baggage to transit to and from the hovercraft 69H via ramps or stairs as known in the prior art of hovercraft terminal operations.

FIG. 8E shows a side view of a transport method 63 for multimodally transporting payload, at half the scale of FIGS. 8C and 8D. FIG. 8E shows a transfer vehicle 69 that is a payload transfer transport module 47 similar to that shown carried by PASRACS 1 in FIG. 1A, now being carried and transported on a travel path 24T by an aircraft 166 while hanging below connected by plural lift cables 166L. The aircraft 166 is preferably a vertical takeoff and landing (VTOL) aircraft 166V, and is illustrated with tandem rotors 166R providing aerodynamic lift plus aerostatic lift from lifting gas 9 within lifting gas enclosures 8, in a manner analogous to the prior art "aerocrane" hybrid lighter-than-air (LTA) aircraft. The rotors 166R provide both lift and tractive force or thrust, as known from the prior art of helicopters and LTAs. After a PASRACS 1 has landed, it can drop off a payload transfer transport module 47 with deboarding payload, onto a water surface 18, from which it is picked up by the aircraft 166 and transported to a destination location, including flight over land surfaces as illustrated. The process can be reversed for boarding payload, starting from an origin location with carriage under the aircraft 166, flight over land or water areas, and drop off on a water surface 18 in a region from which a PASRACS 1 can come over the payload transfer transport module 47 and pick it up and mate with it to enable the boarding payload to then get onto the PASRACS 1 for an outbound travel leg.

Figure 9A:
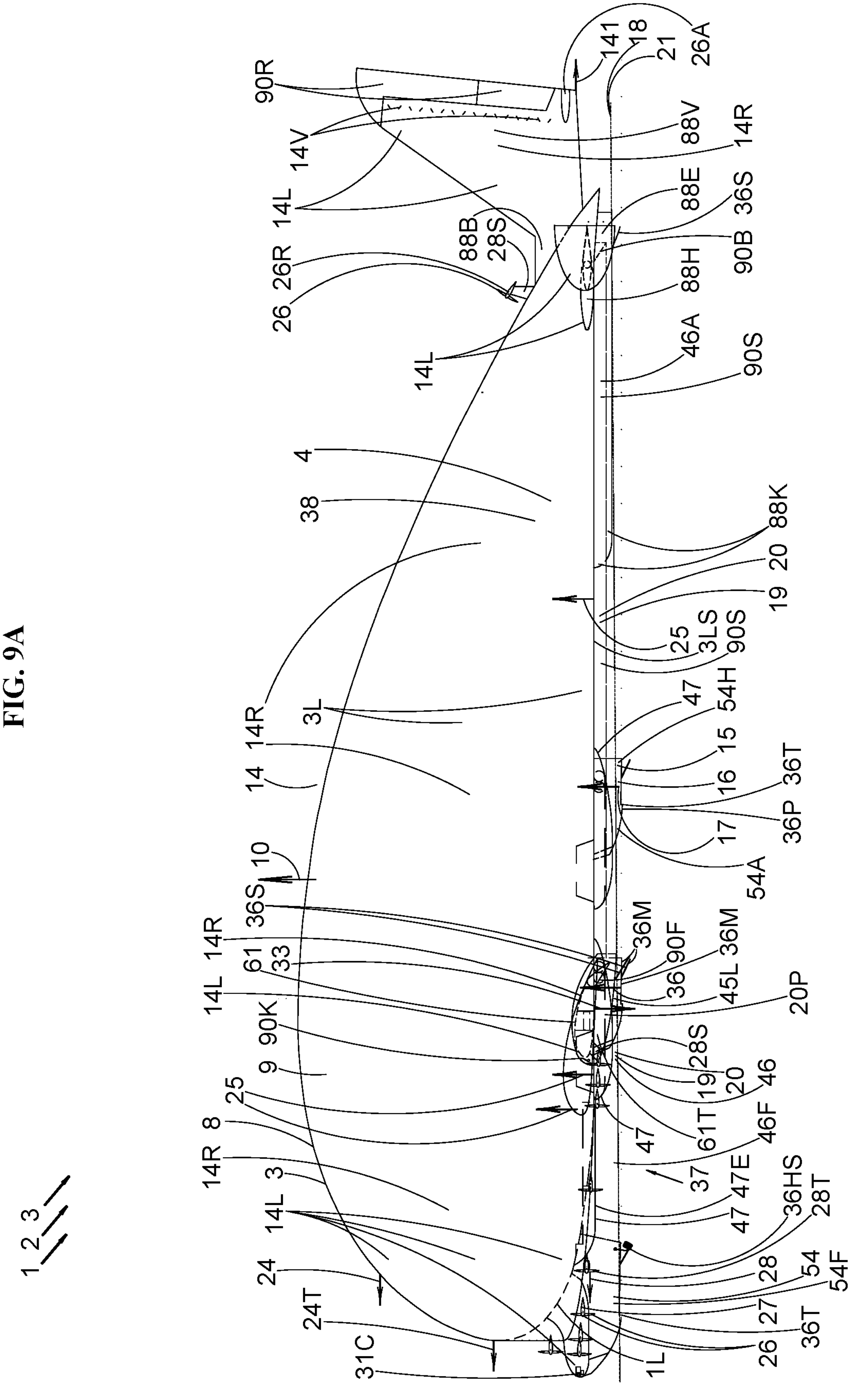
FIGS. 9A and 9B show some alternate preferred aerodynamic and hydrodynamic features that can be applied on a partially aerostatically supported ram air cushion ship.
Figure 9B:
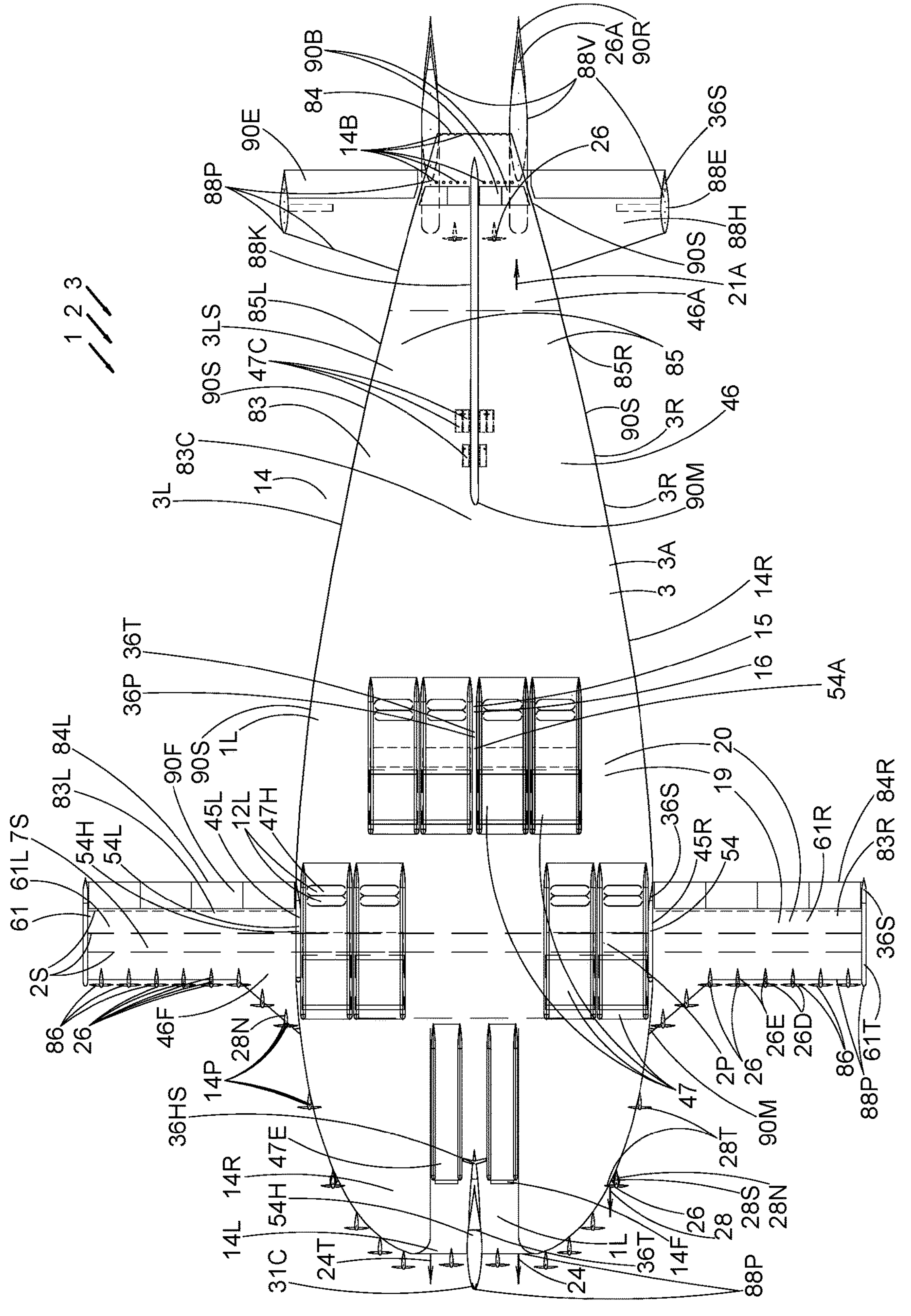

FIGS. 9A and 9B show some alternate preferred aerodynamic and hydrodynamic features that can be applied on a partially aerostatically supported ram air cushion ship 1.

FIG. 9A shows a left side view of a preferred embodiment of a partially aerostatically supported ram air cushion ship 1 or PASRACS 1, similar to that shown and described in detail with reference to FIG. 1A. FIG. 9A illustrates the use of a laminar flow surface 14L as an aerodynamic feature that acts to reduce skin friction aerodynamic drag, also called parasite drag, using principles known from the art of aerodynamic devices and their action on airflow adjacent to a vehicle in motion. The laminar flow surfaces 14L are shown in plural representative locations on the body 3 including the forward projection of the body containing the flight deck or cockpit 31C, on the wing 61, on the vertical stabilizer 88V and horizontal stabilizer 88H, and on the stabilizer endplate 88E, without limitation. The laminar flow surfaces 14L may be enabled and implemented utilizing a variety of methods known from the prior art of aerodynamics, and include areas of at least one of natural laminar flow, active laminar flow and hybrid laminar flow technologies and designs, and optionally including boundary layer control with at least one of surface loft tailoring, pressure gradients tailoring, suction, blowing, and a tailored skin single duct concept. The PASRACS 1 will also naturally feature a measure of skin friction drag (parasite drag) reduction from the reduced airflow speeds in the ram air cushion 20 that occur concurrently with the increased pressure in the ram air cushion 20 that contributes an aerodynamic lift force 25. This drag reduction from reduced airflow speed is inherent as skin friction drag scales with the local airspeed, squared.

FIG. 9A also illustrates the use of a riblet surface 14R as an aerodynamic feature that acts to reduce skin friction aerodynamic drag, also called parasite drag, using principles known from the art of aerodynamic devices and their action on airflow adjacent to a vehicle in motion. The riblets may utilize ridges on one or more of on an applique applied to a surface of ship structure 2 or cut or fabricated microgrooves in the surface of the ship structure 2. The riblet surfaces 14R are shown in plural representative locations on the body 3, on the wing 61, and on the vertical stabilizer 88V, without limitation.

FIG. 9A also illustrates the use of vortex generators 14V as an aerodynamic feature that acts to reduce at least one of aerodynamic flow separation and skin friction aerodynamic drag, also called parasite drag, using principles known from the art of aerodynamic devices and their action on airflow adjacent to a vehicle in motion. Vortex generators 14V are shown on the vertical stabilizer 88V forward for the rudders 90R, as one example and without limitation on numerous areas of potential beneficial application on the external surfaces of a PASRACS 1, as known from the prior art of the use of vortex generators to enhance flow attachment, reduce flow separation, drag reduction, and/or control surface effectiveness enhancement for control surfaces downstream of the vortex generators.

FIG. 9A also shows a plurality of hydrodynamic features known from the art of hydrodynamics of marine vehicles, hydrofoil vehicles with surface penetrating or fully submerged hydrofoils, amphibious vehicles, hovercraft, seaplanes and flying boats. Some hydrodynamic features can contribute to hydrodynamic lift force 36 acting to help lift the PASRACS 1 relative to the water surface 18. Specific features that are shown can leverage technologies and designs, without limitation, from the prior art. A first feature is the use of hulls 54 with water contacting surface lofts designed to minimize hydrodynamic drag at different phases of operation while moving on the water, such as floating operations, hump operations, planing operations, planing on a step operations, transition mode operations, ram air cushion operations with edge contacts of waves, and ram air cushion operations with no water contact. The hulls 54 may utilize one or more of curved surfaces, varying forward (bow) lofts, varying aft (stern) closure lofts, varying deadrise lofts, a keel edge, a hydrodynamic planing surface 36P, a step 36T, a chine, a strake and a spray rail. The bottom ends of the keel ventral stabilizer 88K and the body side flaps 90S will also preferably include lofting beneficially appropriate for them to contribute as hydrodynamic features (in addition to their aerodynamic primary purposes) as and when they contact the water surface 18. A hydrodynamic lift member 36M and a hydroski 36S can also be provided in a suite of hydrodynamic features designed to improve vehicle hydrodynamic attributes in waterborne and transition operations that include taxi and takeoff and landing on a water surface 18. FIG. 9A also shows a combined hydrofoil and hydroski 36HS as an additional optional hydrodynamic feature not shown earlier in FIG. 1A. The combined hydrofoil and ski 36HS has a hydrofoil mounted near the aft end of a hydroski, with the combined unit mounted to a hull 54 through a actuator controlled deployment mechanism with a suspension included, such as a shock absorber or active control shock strut. The hydrofoil can serve as a surface penetrating hydrofoil for part of the transition mode 37, if it has dihedral (as illustrated) that allows part of the hydrofoil to be below the waterline and part above the waterline. Fully submerged hydrofoil elements, subcavitating hydrofoil elements and/or supercavitating hydrofoil elements can optionally be used. This system can provide reduced ride quality adverse impacts and reduced loads for a landing derotation maneuver (known as 'slapdown loads' for a nose landing gear in airplane prior art) as well as enhancing ride quality when the PASRACS 1 might encounter a tall wave or a 'rogue wave' in the water surface 18. Vehicle hydrodynamic attributes that can be optimized singly or in combination with specific optimization functions or relationships or objective functions, include drag reduction for all types of waterborne drag (including skin friction drag, wave drag, hydrodynamic lift induced drag, pressure drag, excrescence drag, and water surface wave and current related drag), hydrodynamic lift to help lift the PASRACS 1 up relative to the water surface 18, contributing to vehicle control and navigation, and ride quality improvement to reduce vertical and lateral g forces on people on board when the PASRACS 1 is maneuvering and/or encountering disruptive forces from current and/or wave and/or floating object impacts. At speeds sufficiently low for operation of a subcavitating hydrofoil in subcavitating mode, increased hydrodynamic lift to drag ratio can be achieved by optimized design of the subcavitating hydrofoil including span, aspect ratio, lifting foil cambered section design, planform, taper, twist, dihedral and other known design parameters for hydrofoil design. It is important to note that controllable aerodynamic surfaces and controllable hydrodynamic surface can be used synergistically and in conjunction, with control algorithms or control laws in the vehicle motion control system (similar to a flight control system and flight navigation system in aircraft), enabling optimized performance and maneuvering for taxi, takeoff, landing, coordinated turns with appropriate vehicle bank angle, obstacle-avoidance maneuvers, passenger comfort and safety and other purposes. These will be discussed further with reference to FIG. 10 below on alternate preferred systems and controls architectures and features that can be applied on a partially aerostatically supported ram air cushion ship 1.

FIG. 9B shows a bottom plan view of a preferred embodiment of a partially aerostatically supported ram air cushion ship 1 or PASRACS 1, similar to the bottom plan view earlier shown and described in detail with reference to FIG. 1B. FIG. 9B shows some preferred aerodynamic and hydrodynamic features that can be applied on a partially aerostatically supported ram air cushion ship 1. As in FIG. 9A, representative surface areas of application of a laminar flow surface 14L and a riblet surface 14R are shown, without limitation. FIG. 9B also illustrates the use of base suction flow orifices 14B at representative locations at the trailing edge 84 and on the underside of the body 3 of the PASRACS 1 behind the body flaps 90B. When the PASRACS has a positive airspeed 24 and the body flaps 90B are deflected trailing edge down to set the aerodynamic Kutta condition at the trailing edge of the ram air cushion 20, these locations for the base suction flow orifices 14B are at sub-ambient pressure for aerodynamic flow reasons well understood in the art. These base suction flow orifices 14B can be connected by tubing to laminar flow surfaces 14L fitted with micropore holes to enable suction hybrid laminar flow facilitation without needing electrically powered suction fans. These base suction flow orifices 14B can thus serve as enablers for non-powered hybrid laminar flow areas and/or body flow relaminarization for the PASRACS 1. The base suction flow orifices 14B behind the deployed body flaps 90B can also act as base drag reduction enablers, to reduce the base drag caused by deflection of the body flaps 90B acting aerodynamically at least in part as split flaps. FIG. 9B also illustrates additional optional aerodynamic features, including and adjustable fairing 14F, that can be deployed and adjusted to provide smooth aerodynamic fairing surface lofts and reduce excrescence drag at interfaces such as the illustrated interface between the bottom of the body of the PASRACS 1 and an emergency evacuation barge 47E, for example and without limitation. FIG. 9B also illustrates representative use of plasma flow actuators 14P for one or more of aerodynamic flow control and/or active noise control. Exemplary locations are shown around a propulsor nacelle 28N, while many other locations of application on the surfaces of a PASRACS 1 are possible. FIG. 9B also illustrates exemplary applications of a morphing control surface 90M at representative locations at the leading edge of the keel ventral stabilizer 88K and at the strake leading edges of the wing 61 at side of body interfaces, for aerodynamic flow control purposes. Morphing control surfaces 90M may utilize a variety of actuation systems known from prior art including mechanical actuation systems and shape memory alloy actuation systems. Morphing control surfaces 90M can also be beneficially used to morph surface lofts of portions of the aerodynamic surfaces of the PASRACS 1 to improve transonic area-ruling of the PASRACS 1 vehicle and thus reduce its compressibility drag when flying at higher speeds between normal cruise speed and maximum cruise speed. FIG. 9B also illustrates the use of ice protection subsystems 88P, that may comprise anti-ice subsystems and/or de-ice subsystems and/or scraper subsystems and/or washer subsystems that inhibit growth of ice on the external surfaces of the PASRACS 1 and/or act to remove ice on the external surfaces of the PASRACS 1. External icing is a known hazard to heavier-than-air aircraft and airships and even to wind turbine blades are well known in the prior art, and a variety of anti-icing and de-icing have been successfully applied in the prior art, including weeping fluids such as glycol, electrical heating, vibration and scraping and/or washing. FIG. 9B illustrates representative applications of ice protection subsystems in forward facing regions near the flight deck/cockpit 31C and body 3 and wing 61 and wing tip fence 61T and horizontal stabilizer 88H and stabilizer endplate 88E and vertical stabilizer 88V, for example and without limitation. It should be understood that ice protection requirements and objectives for different parts of the surfaces of a PASRACS 1 will depend strongly on the specific geometry and flow physics and operation envelopes applicable to each particular design, with tailored application of ice protection subsystems to be made in specific manners as needed and appropriate to each particular design of a PASRACS 1.

FIG. 9B also shows representative hydrodynamic features in a manner similar to FIG. 9A, including use of a hull 54, a hydrodynamic planing surface 36P, a step 36T, plural hydroskis 36S and a combined hydrofoil and ski 36HS. Differential deployment of the plural hydroskis 36S can be used to adjust pitch trim, heave trim and roll trim while the PASRACS 1 is moving on a water surface, as well as for passive and/or active ride quality control and enhancement. As in FIG. 9A, the bottom ends of the keel ventral stabilizer 88K and the body side flaps 90S will also preferably include lofting beneficially appropriate for them to contribute as hydrodynamic features (in addition to their aerodynamic primary purposes) as and when they contact the water surface.

FIGS. 10A through 10E show block diagrams of some alternate preferred systems and controls architectures and features that can be applied on a partially aerostatically supported ram air cushion ship 1, including the preferred embodiment earlier described in detail with reference to FIGS. 1A through 1G and FIGS. 2A through 2F. Each system or subsystem can incorporate a computer or processor, hardware and software, programmable and modular components, diagnostic and health management, and redundancy and redundancy management as known from the prior art of system and subsystem design, fabrication and operation.

Figure 10A:
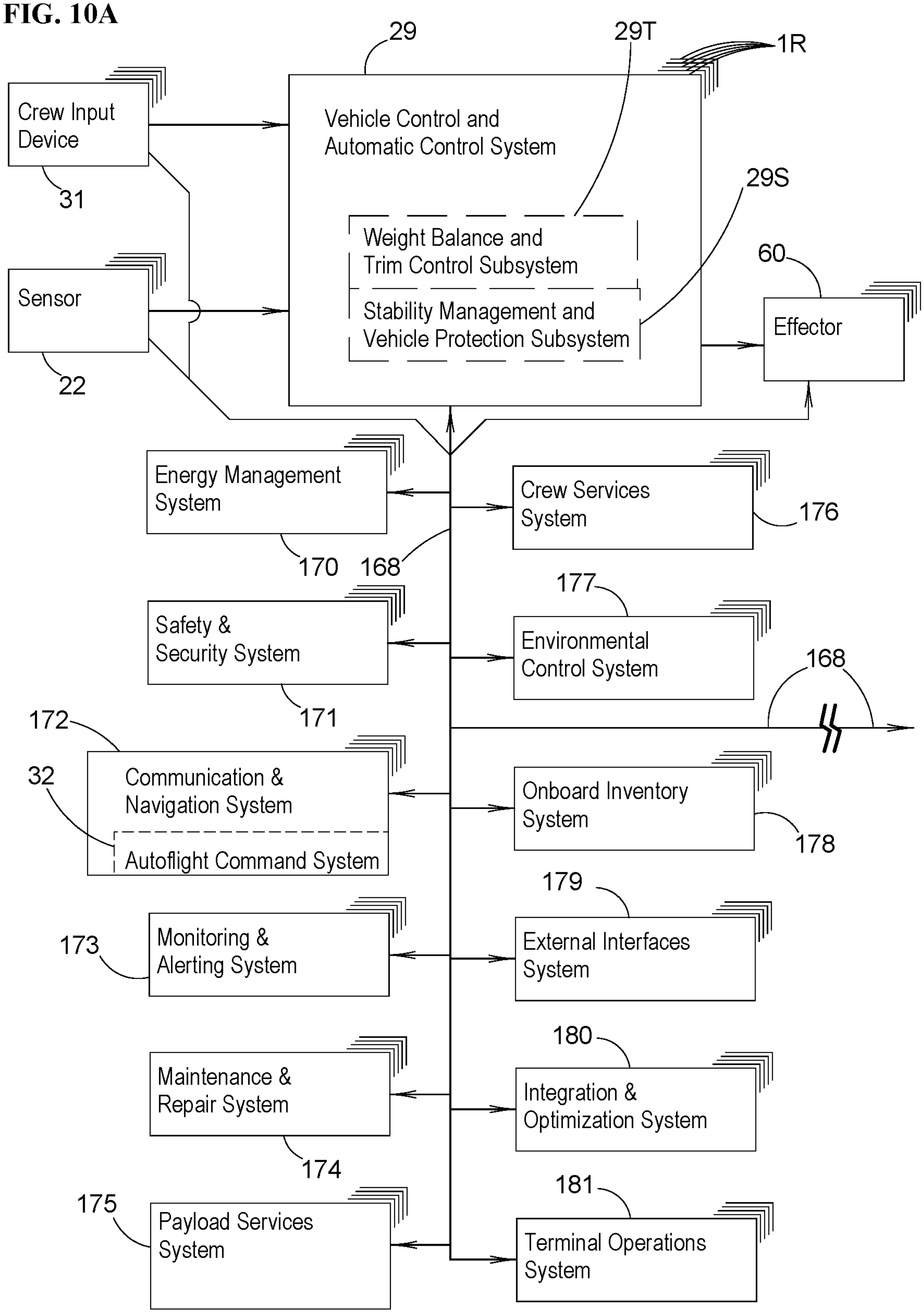

FIG. 10A illustrates a system architecture block diagram of a motion control system comprising a vehicle control and automatic control system 29 for a partially aerostatically supported ram air cushion ship 1 or PASRACS 1. The vehicle control and navigation system 29 can be configured to enable said PASRACS 1 to move and maneuver on a travel path 24T (such as that shown earlier in FIG. 1B) in accordance to commands 30 received from at least one of a crew input device 31 and an autoflight command system 32, as well as to enable other things as will be described below. The vehicle control and navigation system 29 is shown with system redundancy 1R with a redundancy level of 5 illustrated. Note that the level of redundancy of the illustrated vehicle control and navigation system 29 and the level of redundancy of the other boxes shown in FIG. 10A are all shown as representative and are not to be construed as limiting the invention to specific values of system redundancy for any illustrated item. It will be understood that the art and science of redundancy and redundancy management to improve fault tolerance and the ability of a vehicle and its systems to operate normally or with some limitations, following one or more failures of various kinds, is based on well-established precedents in the design of prior art vehicles such as airliners, for example. The vehicle control and navigation system 29 receives inputs from at least one crew input device 31 and at least one sensor 22, and sends output to at least one effector 60, as illustrated. The crew input device 31 can be any of numerous crew input devices known from the art of transport vehicles, including without limitation: a control column (as for example for a pitch control command in an aircraft), a control wheel (as for example a roll control command in an aircraft), a sidestick controller (as for example for pitch and roll control commands in an aircraft), a stick controller (as for example for pitch and roll control commands in an aircraft), rudder pedals or a tiller or a steering wheel (as for example for directional or yaw control commands in a vehicle), a throttle (as for example for a thrust control command in an aircraft), a brake command or reverse thrust control input device as for example to command braking or regenerative braking or reverse thrust in a vehicle), a heave or direct lift or vertical motion input device (such as a collective pitch control input device on a helicopter), a side force or sideways motion command input device with associated side force limiter, a control knob, a switch, a control lever, a hand-operated input device, a finger operated input device, a foot operated input device, a touchscreen device for crew input, a voice actuated input subsystem, and a thought actuated input subsystem. Note that for each architectural block shown in this architectural diagram, the types and numbers of each block may vary over a wide range and should not be construed to be limited to the notional representation of 5 architectural blocks (of each type) shown behind one another for illustrative purposes. For example, a PASRACS 1 may have two pilot input stations corresponding to a pilot station and a copilot or first officer station in a manner similar to that found in two-pilot airliners, each with a pitch input device, roll input device, and yaw input device, and with each device potentially having multiple redundant input sensor devices such as a linear variable differential transformer (LVDT) or rotary variable differential transformer (RVDT), for example and without limitation. The use of redundancy and redundancy management to ensure high levels of fault tolerance and continued operation following faults or failures, is well known in the art and can be applied for PASRACS 1 vehicles in a manner similar to prior art on other vehicles such as airplanes, helicopters, airships, spacecraft, ships and marine craft, automobiles and other road vehicles, and rail or tracked vehicles. The design and application of the vehicle control and automatic control system 29 and of the other systems shown in FIG. 10A can incorporate redundancy and redundancy management in sensors, actuators, analog control devices, digital control devices, electronic devices, computational devices, avionics, software, microprocessors, processors and hardware devices, as known in the prior art. The vehicle control and automatic control system 29 will enable both manual control of the motion, configuration and operation of a PASRACS 1 as commanded by the flight crew through crew input devices 31 and automatic control of the motion, configuration and operation the PASRACS 1. The automatic control portion of the vehicle control and automatic control system 29 can include automatic emulations of piloted controls for many routine and some nonroutine operations of the PASRACS 1, as known from the prior art of autopilot, autoflight, and automatic control systems for transport vehicles. For example and without limitation, automatic control examples may include cruise segment navigation with inputs from the communication and navigation system 172 that includes flight management functionality. Autoland functionality for smooth and safe landings of the PASRACS 1 on a water surface 18 as described earlier in the context of FIGS. 1 and 2, auto takeoff, and obstacle or hazard avoidance such as applying direct lift control to increase flight height in ground effect to effectively "jump" over a floating obstacle or hazard such as a fish, marine mammal, log, swimmer, kayaker, canoe, boat, ship or other marine vehicle. The vehicle control and automatic control system 29 will preferably include a weight, balance and trim control subsystem 29T, that will be described further with reference to FIG. 10B following, and a stability management and vehicle protection subsystem 29S, that will be described further with reference to FIG. 10C following. The weight, balance and trim control subsystem 29T is intended to enable safe and efficient operation of the PASRACS 1 even in the presence of a variety of loading conditions that can also change over the course of a vehicle trip. As shown in FIG. 10A, outputs from the vehicle control and automatic control system 29 include outputs sent to plural effectors 60. These plural effectors 60 can comprise one or more effectors selected from a wide variety of effectors known from the prior art, including actuators, linear actuators, rotary actuators, complex motion effectors combining at least one of an actuator and motor and at least one of a linkage and a gear and a drivetrain, electrical actuators, hydraulic actuators, electrohydraulic actuators, electromechanical actuators, pneumatic actuators, servoactuators, solenoids, thermal actuators, shape memory actuators, magnetic actuators, piezoelectric actuators, fluidic actuators, carriers, robotic effectors, robotic arms, grippers, lifters, robots, soft actuators, synthetic muscles, motors, stepper motors, gearmotors, pumps, valve actuators, fans, and screw jacks. For the PASRACS 1 configuration described in detail with reference to FIGS. 1A through 1G and 2A through 2F, the effectors 60 shown in FIG. 10A can act on a plurality of members including but not limited to: a controllable aerodynamic surface 90, an elevator 90E, an aileron 90A, a rudder 90R, a flap 90F, a body flap 90B, a side flap 90S, an aerodynamic lift subsystem 19, a wing 61, a horizontal stabilizer 88H, a stabilizer endplate 88E, a vertical stabilizer 88V, a keel ventral stabilizer 88K, a control device connected to a laminar flow surface 14L, a hydrodynamic lift member 36M configured to generate a hydrodynamic lift force 36, a hydroski 36S, a controllable device acting on at least one of weight 33 and on ballast in a ballast volume 33B, a controllable member of a propulsion system 26 such as a blade pitch control device, a thrust control device, a reverse thrust control device, a vectored thrust control device, and a fluid dynamic propulsor 55, a controllable device acting on energy 27, a controllable device acting on at least one of lifting gas 9 and a lifting gas enclosure 8 and a ballonet 91, a control device acting on a hydrostatic floatation system 15, a control device acting on a ram air cushion 20, a control device acting on ship structure 2, a control device acting on a hull 54, a control device acting on or for the benefit of any person or item of payload 7 (e.g. elevator 143E and freight elevator 143F), and a control device acting on a payload transfer transport module 47, all without limitation.

FIG. 10A shows that the above described vehicle control and automatic control system 29, is connected by a data transmission member 168 to multiple systems, comprising an energy management system 170, a safety & security system 171, a communication & navigation system 172, a monitoring & alert system 173, a maintenance & repair system 174, a payload services system 175, a crew services system 176, an environmental control system 177, an onboard inventory system 178, and external interfaces system 179, an integration & optimization system 180 and a terminal operations system 181, each and all without limitation. Note that design, operation and functioning of different systems can vary and that different systems could have varying boundaries and potential areas of overlap or joint responsibility, with appropriate coordination and prioritization amongst the systems. The data transmission member 168 could be at least one of: a parallel or serial databus, a bidirectional or unidirectional or multidirectional databus, an electrical databus or optical databus, a fly-by-wire link, a fly-by-light link, a direct optical link, a vehicle databus, an avionics databus, an Ethernet bus, an ARINC databus, a CAN bus, a LIN bus, a FlexRay databus, a Mil-Std databus, a critical databus, an essential databus, and a nonessential databus, for example and without limitation.

The energy management system 170 will be explained in further detail later with reference to FIGS. 12A through 12E that show block diagrams of some alternate preferred fuels, propulsion and energy architectures and features that can be applied on a partially aerostatically supported ram air cushion ship 1.

The safety and security system 171 can comprise at least one of: lockable/secure door systems, detection of a safety threat, response to a safety threat, detection of a security threat, response to a security threat, systems redundancy and separation for survival of threats including a bomb blast threat, emergency management, fire protection, hazard protection, lightning protection, electromagnetic effects (EME) protection, electromagnetic pulse (EMP) protection, ice and rain protection, sand and ash protection, pollution and chemical hazards protection, meteorological hazard protection, vehicle protection, human occupant protection, injury prevention or inhibition, death prevention or inhibition, animal protection (including collision probability reduction with optical/electromagnetic/sonic warning systems to scare off or otherwise reduce collision risk with birds, marine mammals, fish, and other animals), plant protection, pervasive cameras plus mirrors and life form monitoring sensors and other monitoring subsystems, digital tags and/or trackable wristbands for all people on board, safety monitoring, security monitoring, expert system for safety, expert system for security, antiterrorist expert system and remote monitoring and robotic remediation system, artificial intelligence (AI) for safety, AI for security, safety crew, first responders, emergency responders, security crew, police crew, firefighters, bomb and explosives squad, detention management crew, safety robots and security robots, without limitation. Fire protection systems can include robotic firefighting vehicles, fire trucks, crew trained in firefighting, fire containment deployable partitions, halon and water misting and spray and other fire suppression systems, fire hydrants, fire extinguishers, kitchen fire detection and suppression subsystem, cargo fire and smoke detection and suppression subsystem, use of potable water, use of sea water, and use of fire suppression foam, without limitation.

The communication and navigation system 172 can comprise at least one of: an autoflight command system 32, a radio, an electromagnetic communication device, a transmitter, a receiver, a wireless communication subsystem, a wired communication system, an optical fiber communication system, a laser communication system, a transponder, a traffic collision avoidance system (TCAS), a landing guidance system, an instrument landing system (ILS) or microwave landing system (MLS) or GPS landing system (GLS), a takeoff guidance system, a ground track guidance system, an en-route guidance system, a marine navigation system using sonar, a map and compass navigation system, a dead reckoning system, an inertial navigation system, a celestial navigation system, a satellite navigation system, an electronic route guidance system, a 4-D path (x,y,z,t) guidance system, a personal navigation assistant (PNA), a global positioning system (GPS) and a differential GPS.

The monitoring and alert system 173 can comprise at least one of: a sensor, instrumentation, a display, a warning, a caution, an advisory, a doppler radar, radar, a radio altimeter (RADALT), a wave sensor, an obstacle sensor, a video sensor with some sensed frequency range, a pattern recognition subsystem, a weather sensor or weather sensors for monitoring and alerting for many conditions (including but not limited to temperature, humidity, winds and gusts, Beaufort wind force scale, Beaufort sea state scale, Douglas sea and swell scale, windshear, reduced visibility, fog, low cloud ceiling, thunderstorms, lightning, turbulence, clear air turbulence, wave conditions, spray conditions, sand in the air, ash in the air, cyclone, typhoon, hurricane, Saffir-Simpson hurricane wind speed scale, tornado, tsunami, Tsunami Intensity Scale, freezing conditions, sleet, hail, and icing), a lookahead sensor, a health monitoring subsystem, a condition monitoring subsystem, a structures monitoring subsystem, a systems monitoring subsystem, an aerodynamic monitoring subsystem, a hydrodynamic monitoring subsystem, a surface condition monitoring subsystem (for skin, riblets, applique, EME layer, paint, etc), a video monitoring subsystem, a contamination monitoring subsystem, a biofouling monitoring subsystem, a visual alert subsystem, a display, a an aural alert subsystem, a speaker, a synthetized voice alert subsystem, a passenger monitoring subsystem, and a passenger alert subsystem. The passenger alert system may include visual and/or aural alerts for situations that may require passenger awareness, such as a brace warning or stay seated or stay belted warning for situations such as encountering severe turbulence or severe waves or the flight crew performing an emergency collision avoidance maneuver.

The maintenance and repair system 174 can comprise at least one of: a maintenance crew member, a repair crew member, a maintenance sensor, a maintenance computer, a maintenance management crew interface, a maintenance effector, a maintenance robot, a corrosion remediation subsystem, a repair diagnostic subsystem, a repair parts management subsystem, a repair effector, and a repair robot.

A payload services system 175 can comprise at least one of: a passenger service subsystem, a passenger concierge subsystem, an Internet of Things (IoT) subsystem, a passenger money management subsystem, a passenger health subsystem, a passenger wellness subsystem, a passenger comfort subsystem, a passenger entertainment subsystem, a passenger amenity subsystem, an operable passenger feature, a live animal carriage service subsystem, a baggage subsystem, a container subsystem, a cargo subsystem, and an oversize cargo subsystem.

A crew services system 176 can comprise at least one of: a flight crew service subsystem, a cabin crew service subsystem, an operational crew service subsystem, a freight crew service subsystem, a maintenance crew service subsystem, a repair crew service subsystem, a food & beverage crew service subsystem, a custodial crew service subsystem, a crew health & wellness subsystem, a crew eating subsystem, a crew accommodation subsystem, a crew amenities subsystem, a crew entertainment subsystem and a crew training subsystem.

An environmental control system 177 can comprise at least one of: a heating subsystem, a cooling subsystem, a heat pump subsystem, a skin heat exchanger subsystem, a ventilation subsystem, a fresh air subsystem, a controllable flow inflow scoop, a controllable flow outflow valve, a recirculated air subsystem, a filtration subsystem, a HEPA filter subsystem, a UV purification subsystem, a humidity management subsystem, an air quality enhancement subsystem, a water purification subsystem, a water quality enhancement subsystem, a lighting subsystem, an interior noise management subsystem, a thermal insulation subsystem, a noise insulation subsystem, and an active noise control subsystem.

An onboard inventory system 178 can comprise at least one of: a supply management system, an inventory management system, a vehicle configuration specification file system, a sensor, a computer, a database, a crew interface, a passenger interface, a loading on and loading off command system, an inventory handling robot, a loading on and loading off items handling system, a storage system, a retrieval system, an internal movements management system, an ordering system, a just-in-time (JIT) inventory system, and a kanban system.

An external interfaces system 179 can include at least one of: a mating system for a payload transfer transport module 47, an unmating system for a payload transfer transport module 47, an outward command and control subsystem, an inward command and control subsystem, a remote pilot subsystem, a remote medical subsystem, a medevac subsystem and an external security interface subsystem.

A terminal operations system 181 can include at least one of: a harbor pilot subsystem, a terminal area control subsystem, a multientity deconflicting subsystem, a taxi guidance subsystem, a terminal collision prevention subsystem, an inbound track vector subsystem and an outbound track vector subsystem. Further detail on terminal operations will be presented subsequently with reference to FIGS. 14A through 14F that illustrate some alternate preferred methods of operation that can be applied for normal and nonnormal operations of a partially aerostatically supported air cushion ship 1.

Finally, an integration & optimization subsystem 180 can include at least one of: connection and integration of plural systems and/or subsystems, and optimization of plural systems and/or subsystems wherein "optimization" can be relative to a wide variety of objective functions or measures of merit, and can include built-in prioritization and deconfliction as appropriate.

FIG. 10B illustrates a weight, balance and trim control subsystem 29T that is part of the vehicle control and automatic control system 29 earlier described with reference to FIG. 10A.

As illustrated in FIG. 10B, a suite of sensors 22 can comprise a variety of sensor types along with processing and integration of sensor outputs. The types of sensors can include, without limitation, air data 22A (e.g., static pressure, dynamic pressure, impact pressure, pitot tube pressure, airspeed, altitude, wind data, windshear data, turbulence data, air temperature data, humidity data, particulates data); water data 22W (e.g., water static pressure, water dynamic pressure, water speed, water current, water depth, wave height, wave spacing, wave speed, wave direction, water temperature, water salinity, water purity, water particulates, ice particulates, ice masses, ice layer); inertial data 22N (e.g., accelerometers in all axes, gyros in all axes); electromagnetic data 22E (e.g., cameras, IR cameras, UV cameras, custom frequency cameras, optical sensor data, camera pattern recognition data, radar, astronomical sensor data, EME data); satellite data 22S (e.g., GPS data, differential GPS data, navigation satellite data); acoustic data 22C (e.g., noise data, noise cancellation data, noise damping data, frequency data, spectral data, sonar, pattern data and processed data); operational data 22P (vehicle internal position sensors, motion sensors, discrete data, mode identification data, non-normal identification data); and data processing & integration 22D that allows and performs fusion of multiple data sources along with integration and synthesis of desired synthesized and forecast data. The sensors 22 provides data and information to the weight, balance and trim control subsystem 29T that is part of the vehicle control and automatic control system 29, and also to other systems connected to the data transmission member 168, as illustrated in FIG. 10B.

Using inputs from the crew input devices 31 and the sensors 22, the weight balance and trim control subsystem 29T accomplishes estimation and control functions using plural incorporated subsystems, these being a vehicle mass & weight estimator 29W (that can use one or more of a bottoms-up buildup starting with manufacturer's empty weight; a trim estimation using a summation of estimates for aerostatic lift+aerodynamic lift+hydrostatic lift+hydrodynamic lift; an inertial method estimation from measured delta acceleration having a defined mathematical relation such as measured force such as thrust or lift divided by mass, or increment variants thereof; build-ups and integration from an array of strain gages and/or load sensors and/or water displacement sensors and/or air displacement sensors and/or air pressure sensors and/or water pressure sensors and/or weighbridges and/or suspension cable tension sensors on cables supporting payload transfer transport modules or other suspended modules; state space estimator algorithms and back-solve methods based on modeled vehicle response functions to control surface deployments; and hybrid methods combining multiple sub-methods); a vehicle moments of inertia estimator 29M (that can use one or more of a bottoms-up buildup method; an inertial method estimation from measured delta angular acceleration having a defined mathematical relation such as measured moment divided by a moment of inertia; state space estimator algorithms and back-solve methods based on modeled vehicle response functions to control surface deployments; and hybrid methods combining multiple sub-methods); a vehicle balance estimator & controller 29B; a kinematics estimator & controller 29K (that can use: inputs from one or more of linear variable differential transformers or LVDTs, rotary variable differential transformers or RVDTs, video sensors and other sensors, and crew input device(s) 31; control laws; and command outputs to effectors 60); a dynamics estimator & controller 29D (that can use: inputs from one or more of linear variable differential transformers or LVDTs, rotary variable differential transformers or RVDTs, force sensors, load sensors, video sensors and other sensors, and crew input device(s) 31; control laws; and command outputs to effectors 60); a longitudinal trim system 87 (that can define a target longitudinal trim condition using inputs from crew input device(s) 31 and sensor(s) 22; that can estimate actual longitudinal trim condition using inputs from sensor(s) 22 and longitudinal trim computations; that can implement control laws to drive actual longitudinal trim condition towards matching the target longitudinal trim condition in a desired manner; and that can issue command outputs to effectors 60 that can affect longitudinal trim); a lateral trim system 93 (that can define a target lateral trim condition and target directional trim condition using inputs from crew input device(s) 31 and sensor(s) 22; that can estimate actual lateral trim condition and directional trim condition using inputs from sensor(s) 22 and lateral/directional trim computations; that can implement control laws to drive actual lateral trim condition towards matching the target lateral trim condition and actual directional trim condition towards matching the target directional trim condition both in a combined desired manner; and that can issue command outputs to effectors 60 that can affect lateral trim and directional trim); and an objective functions estimator & controller 29F (that can define objective functions based on inputs from crew input device(s) 31 and sensor(s) 22; that can estimate deviations from the objective functions; that can implement control laws that work to minimize deviations in a desired manner; and that can issue command and optimization outputs to effectors 60 directly and/or indirectly through outputs to other control systems, control subsystems and controllers). The vehicle balance estimator & controller 29B comprises plural incorporated subsystems, these being an aerostatic estimator & controller 10E (that uses: inputs from crew input device(s) 31 and sensor(s) 22; estimator to estimate actual aerostatic lift force and moments from each aerostatic lift member that comprises an encompassed lifting volume 9E with associated effects of lifting gas, ambient conditions and ballonet 91 as applicable; control laws to generate aerostatic lift commands and generate resultant outputs to effector(s) 60 acting on each aerostatic lift member as well as on ballonets and on interconnect pipes or tubing with valves and pumps); an aerodynamic estimator & controller 25E (that uses: inputs from crew input device(s) 31 and sensor(s) 22; estimator to estimate actual aerodynamic forces and moments from each aerodynamic member that interfaces with the atmosphere 14 at ambient conditions as applicable; control laws to generate aerodynamic commands and generate resultant outputs to effector(s) 60 acting on each aerodynamic member); a hydrostatic estimator & controller 17E (that uses: inputs from crew input device(s) 31 and sensor(s) 22; estimator to estimate actual hydrostatic lift force and moments from each hydrostatic lift member that such as a hull 54 with associated effects of displacement and water properties and ambient conditions as applicable; control laws to generate hydrostatic lift commands and generate resultant outputs to effector(s) 60 as applicable acting on each hydrostatic lift member); a hydrodynamic estimator & controller 36E (that uses: inputs from crew input device(s) 31 and sensor(s) 22; estimator to estimate actual hydrodynamic forces and moments from each hydrodynamic member that interfaces with water near a water surface 18 at water properties and ambient conditions as applicable; control laws to generate hydrodynamic commands and generate resultant outputs to effector(s) 60 acting on each hydrodynamic member such as at least one of a hull 54 and a hydrodynamic planing surface 36P and hydrodynamic lift member 36M and hydroski 36S and hydrofoil 36H a step 36T, without limitation); and a CG estimator & controller 29C (that can define a target center-of-gravity or CG location or envelope of CG locations using inputs from crew input device(s) 31 and sensor(s) 22; that can estimate actual CG location using inputs from sensor(s) 22 and the aerostatic estimator & controller 10E and the aerodynamic estimator & controller 25E and the hydrostatic estimator and controller 17E and the hydrodynamic estimator and controller 36E and the longitudinal trim system 87 and the lateral trim system 93; and that can implement control laws to drive the actual CG location towards matching the target CG location or to drive the actual CG location to fall within said envelope of CG locations in a desired manner; and that can issue command outputs to effectors 60 that can affect CG location either directly or indirectly through a cargo handling system 43S, potable water system 92C, waste system 92G, ballast system 33B, fuel system 82, and fuel transfer system 82S, as illustrated and without limitation).

The outputs from the weight balance and trim control subsystem 29T along with other outputs from the vehicle control and automatic control system 29, comprise plural outputs to plural effectors 60, as illustrated in FIG. 10B. Examples of effectors 60 can be a variety of effector and actuator types, including those creating one or more of desired linear and rotary NS complex motions powered by one or more of electrical power and a mechanical linkage and a cable and a pushrod and hydraulic power and pneumatic power and a servo and a fluid dynamic control tab such as an aerodynamic control tab or hydrodynamic control tab. Effectors 60 can serve to position or move a variety of items described and shown earlier in FIGS. 1A through 1G and 2A through 2F, said items including but not limited to: a controllable aerodynamic surface 90, an elevator 90E, an aileron 90A, a rudder 90R, a flap 90F, a body flap 90B, a side flap 90S, an aerodynamic lift subsystem 19, a wing 61, a horizontal stabilizer 88H, a stabilizer endplate 88E, a vertical stabilizer 88V, a keel ventral stabilizer 88K, a control device connected to a laminar flow surface 14L, a hydrodynamic lift member 36M configured to generate a hydrodynamic lift force 36, a hydroski 36S, a controllable device acting on at least one of weight 33 and on ballast in a ballast volume 33B, a controllable member of a propulsion system 26 such as a blade pitch control device, a thrust control device, a reverse thrust control device, a vectored thrust control device, and a fluid dynamic propulsor 55, a controllable device acting on energy 27, a controllable device acting on at least one of lifting gas 9 and a lifting gas enclosure 8 and a ballonet 91, a control device acting on a hydrostatic floatation system 15, a control device acting on a ram air cushion 20, a control device acting on ship structure 2, a control device acting on a hull 54, a control device acting on or for the benefit of any person or item of payload 7 (e.g. elevator 143E and freight elevator 143F), and a control device acting on a payload transfer transport module 47, all without limitation.

Figure 10C:
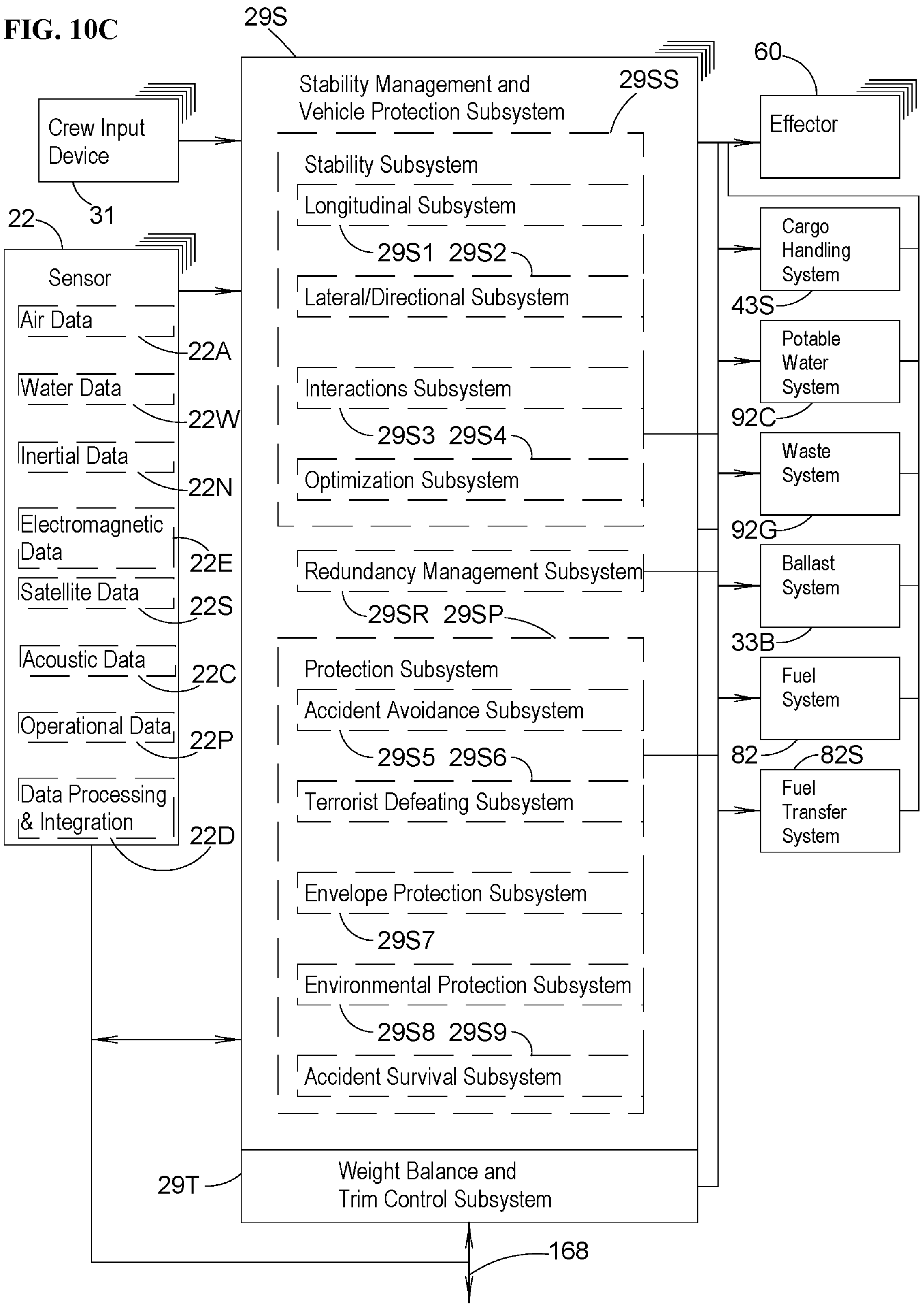

FIG. 10C illustrates further details of a stability management and vehicle protection subsystem 29S. The stability management and vehicle protection subsystem 29S is, like the weight balance and trim control subsystem 29T, a part of the vehicle control and automatic control system 29, as described earlier with reference to FIG. 10B. FIG. 10C shows that the stability management and vehicle protection subsystem 29S includes a stability subsystem 29SS, a protection subsystem 29SP and a redundancy management subsystem 29SR. The stability subsystem 29SS comprises a longitudinal subsystem 29S1, a lateral/directional subsystem 29S2, an interactions subsystem 29S3 and an optimization subsystem 29S4. The protection subsystem 29SP comprises an accident avoidance subsystem 29S5, a terrorist defeating subsystem 29S6, an envelope protection subsystem 29S7, and environmental protection subsystem 29S8 and an accident survival subsystem 29S9, and may optionally further include additional protection subsystem(s) to contribute to protection of passengers, crew and other life forms for a variety of normal and nonnormal operations and scenarios. As shown in FIG. 10C, the stability management and vehicle protection subsystem 29S is connected to data transmission member 168 such as one or more databuses, and outputs from the stability management and vehicle protection subsystem 29S flow to plural other systems and also flow to effectors 60. The stability subsystem 29SS can provide one or more of stability augmentation, artificial stability, and natural stability attributes modification, for all operation modes including flight, flight in ground effect, flight with intermittent or partial water surface contact, takeoff, landing and on-water operation. The longitudinal subsystem 29S1 contributes to stability attributes and dynamic behavior of the PASRACS 1 in pitch, heave and fore-and-aft motion. The lateral/directional subsystem 29S2 contributes to stability attributes and dynamic behavior of the PASRACS 1 in roll, yaw and side-to-side motion. Note that dynamic behavior encompasses both rigid-body dynamics and dynamics of a wide variety of flexible modes such as structural dynamic modes and dynamic modes involving control surfaces in contact with the air and/or the water under the vehicle, including dynamic effects from maneuvering, controls and external variations such as winds, gusts, windshear, precipitation (e.g., rain, hail, sleet), waves, current, tides and impacts from particles (e.g., dust, ash, sand, spray, debris, bird droppings, birds). The interactions subsystem 29S3 manages coupling and interactions between the longitudinal subsystem 29S1, the lateral/directional subsystem 29S2, and other subsystems as illustrated in FIG. 10C. Examples of effects that can be managed by the interactions subsystem 29S3 include Coriolis force effects and pitch-roll coupling & pitch-yaw coupling arising from gyroscopic effects, without limitation. The optimization subsystem 29S4 can operate to optimize one or more objective function by modifying, varying or overriding outputs to effectors 60 or other systems shown. As one example, maintaining stability while performing a commanded maneuver may be accomplished with multiple alternate command sets to propulsors and control surfaces, and the optimization subsystem 29S4 may select a "most preferred" command set that optimizes an objective function that may be characterized by a parameter such as (i) minimizing vehicle drag, (ii) minimizing parasite power needed for commanded movements of the control surfaces, (iii) a linear combination of (i) and (ii), or (iv) a linear combination of (i), (ii) and other specified optimization parameters or variables.

The redundancy management subsystem 29SR is intended to furnish redundancy management for redundant (plural and/or alternative) components and subsystems such as power wires, data wires or optical fibers, databuses, sensors, transducers and actuators is well-known in the prior art of high-reliability, fault-tolerant and fail-operational architectures and designs for commercial airliners and other advanced vehicles and technological systems. Redundancy management is for critical, essential and nonessential systems, subsystems and components is also well-known from the prior art, and includes signal selection and failure detection (SSFD) such as median-selection or equalized median-selection with failure detection thresholds, algorithmic or deterministic redundancy management, expert system and artificial intelligence aided redundancy management, and flight crew overridable redundancy management such as deliberate selection of simple deterministic highly reliable analog links such as direct electrical or optical links to control surfaces following the occurrence of complex or undiagnosable failure scenarios.

The accident avoidance subsystem 29S5 is configured to enable the PASRACS 1 to conduct normal and nonnormal operations whilst avoiding any accident, where examples of an accident include a collision with a living being (e.g. a birdstrike hitting or being hit by a bird in flight or fish/marine mammal/swimmer strike hitting or being hit by a living being in the water or hitting a tree on land), a collision with an object (e.g., hitting or being hit by another vehicle such as another aircraft or watercraft, hitting or being hit by debris in the air or water such as a floating log, hitting a fixed object such as a floating pier or drilling rig or offshore wind turbine or onshore building), flight into terrain such as controlled flight into terrain, a landing-related accident, a takeoff related accident, a terminal operations accident, a loading accident and an unloading accident. The accident avoidance subsystem 29S5 will preferably include functionality from prior art aircraft accident avoidance subsystems including one or more examples without limitation such as an Air Traffic Control (ATC) system, Automatic Terminal Information Service (ATIS), a Traffic Collision Avoidance System (TCAS) system or Airborne Collision Avoidance System (ACAS), Automatic Dependent Surveillance-Broadcast (ADS-B), a warning or avoidance system for Controlled Flight Into Terrain (CFIT) such as a Ground Proximity Warning System (GPWS) or Terrain Awareness Warning System (TAWS), Short Term Conflict Alert (STCA), navigation lights with right-of-way rules, and a tiered warning and caution and advisory system to alert flight crew of different categories of actual or impending danger or threat. The accident avoidance subsystem 29S5 will preferably also include functionality from marine accident avoidance subsystems including one or more examples without limitation such as shipping lane definition and marking, radio and sonar, dive detection sonar, doppler radar, swimmer detection system, an infrared swimmer detection system, a computer vision system, a sensing and neural network system for marine mammal detection, warning siren/fog horn, Machine Vision for Safety at Sea (SEA.AI or OSCAR), and International Regulations for Preventing Collisions at Sea (COLREGs) with associated collision avoidance decision support schemes, an improved artificial potential field (IAPF) method and nonlinear model predictive control (NMPC) algorithm. The accident avoidance system 29S5 may also optionally incorporate elements from prior art land vehicle accident avoidance systems, including without limitation one or more selected from forward looking sensors, radar, LIDAR, ultrasonic sensors, cameras with image recognition, a night vision system, a blind spot monitoring system, a pedestrian/bicyclist/person detection system, a forward collision warning (FCW) system, a cross traffic warning system, a pre collision system (PCS), an automatic emergency braking system (AEBS), a lane-holding system, an emergency steering function (ESF) and an autonomous driving system.

The terrorist defeating subsystem 29S6 will preferably include features and technologies from the prior art of detecting, detaining and/or defeating a terrorist or "bad actor" person or persons or entity that may comprise, without limitation, one or more of a politically motivated terrorist, a religiously motivated terrorist, a jihadist, a suicidal person, a mentally unhinged person, a maniac, an angry armed person, a vengeful armed person, a depressed armed person, an impaired armed person, a villain, an anarchist, a criminal, a vandal, and a person who wishes to cause harm or hurt or death. The terrorist defeating subsystem 29S6 can include features and technologies from the prior art such as screening sensors, technologies and methods, Transportation Security Administration (TSA) sensors, technologies and methods, enforcement of policies prohibiting carriage of arms or weapons or dangerous goods, on board security personnel and robots with nonlethal (e.g. TASER) and lethal (e.g., firearm) armaments, continuous tracking or each person on board using retina scans and person identifiers and pervasive detection sensors and video cameras, detention and expulsion devices and methods (e.g., zipties, handcuffs, conefinement cells and jettisonable lifeboats to eject captured terrorists from the PASRACS 1) and advanced methods such as NATO's DEXTER (Detection of EXplosives and firearms to counter TERrorism) leveraging advancements on sensors, detection and artificial intelligence.

The envelope protection subsystem 29S7 will preferably include features and technologies from the prior art of aircraft or vehicle envelope protection systems and envelope limiting systems, which may include at least one of: a normal load limiting system that limits normal load factor for maneuver and/or gust loads, a normal load protection system that inhibits crew command of normal load factor outside normal limits without an overriding force level or an override control or switch, a load limiting system that limits an other load factor for maneuver and/or gust loads, a load protection system that inhibits crew command of an other load factor outside normal limits without an overriding force level or an override control or switch, a water contact load limiting system, a water contact load protection system, an angle of attack limiting system, an angle of attack protection system, a stall protection system, a stall prevention system, a stall recovery system, a sideslip limiting system, a sideslip protection system, a pitch rate limiting system, a pitch rate protection system, a pitch-roll diagram limiting envelope for normal operations, a heave limiting system, a heave protection system, an airspeed limiting system, an airspeed protection system, a water speed limiting system, a water speed protection system, a roll rate limiting system, a roll rate protection system, a roll angle protection system, a yaw rate limiting system, a yaw rate protection system, a ride quality envelope limiting system, a ride quality envelope protection system (e.g. that inhibits vertical acceleration magnitude and spectral density and lateral acceleration magnitude and spectral density within specified boundaries, such as the International Standards Organization or ISO ride quality criteria boundaries), a ride quality enhancement system, a wing load alleviation system, a tail load alleviation system, a water alighting load alleviation system, a control surface load limiting system, a control surface load alleviation system, a structural modes limiting system, a structural modes modification system, and a component failure avoidance system using component retraction or reconfiguration. A ride quality enhancement system may also incorporate a roll damper, yaw damper, turn coordinator, pitch damper, heave damper, longitudinal acceleration damper, jerk limiter (where jerk is a time derivative of acceleration), dutch roll damper, coupled motions damper, and modal suppression damper as elements of its portfolio of subsystems.

The environmental protection subsystem 29S8 will preferably include features and technologies from the prior art of aircraft or vehicle environmental protection systems, including at least one of: windshield wipers, windshield water protection, windshield defogger, deicing feature, anti-icing feature, surface protection for rain, surface protection for sleet, surface protection for hail, surface protection for water impact, surface protection for ash (e.g. from an erupting volcano), surface protection from sand (e.g. from a sandstorm or sirocco), lighting strike protection that may include conductive mesh or other Faraday Cage members around human occupied volumes, electromagnetic effects (EME) protection, electromagnetic pulse (EMP) protection, birdstrike protection, fish and marine mammal strike protection, airborne debris protection, waterborne debris protection, and corrosion protection.

The accident survival subsystem 29S9 will preferably include features and technologies from the prior art of aircraft or vehicle accident survival systems and inventions, including at least one of: impact absorption subsystems (e.g., crushable structures, bumpers, shock struts, hydraulic members, pneumatic members, spring members, damper members, cowcatcher type members), shatterproof transparencies, crash load limiting members supporting seats and furnishings used by people on board, belts such as seatbelts and bed belts, handholds, railings, straps, airbags and personal protection items such as lifejackets, helmets or other protective gear, smoke detection system such as a photoelectric smoke detector, gas leak detection systems, fire detection and fire suppression systems, fire door systems, sprinklers, escape slides, escape chutes, slide-rafts, liferafts, lifeboats, life rings, floating cushions, detachable boarding barges or payload transfer transport modules (with onboard equipment that can include but is not limited to heating ventilation and air conditioning/HVAC as well as life support equipment and signalling and communication equipment and first aid and medical equipment and disabled personnel support equipment), flares, batteries, radios, satellite communication, locator beacons, telemetry, accident data recorder, crash data recorder, voyage data recorder, flight data recorder, event data recorder, video data recorder, life detection devices, medics, emergency responder trained crew, robotic rescue devices also known as rescue robots, and remote monitoring and action crew that can perform appropriate search and rescue operations from a remote or offboard location by commanding onboard robots that may include humanoid robots.

Figure 10D:
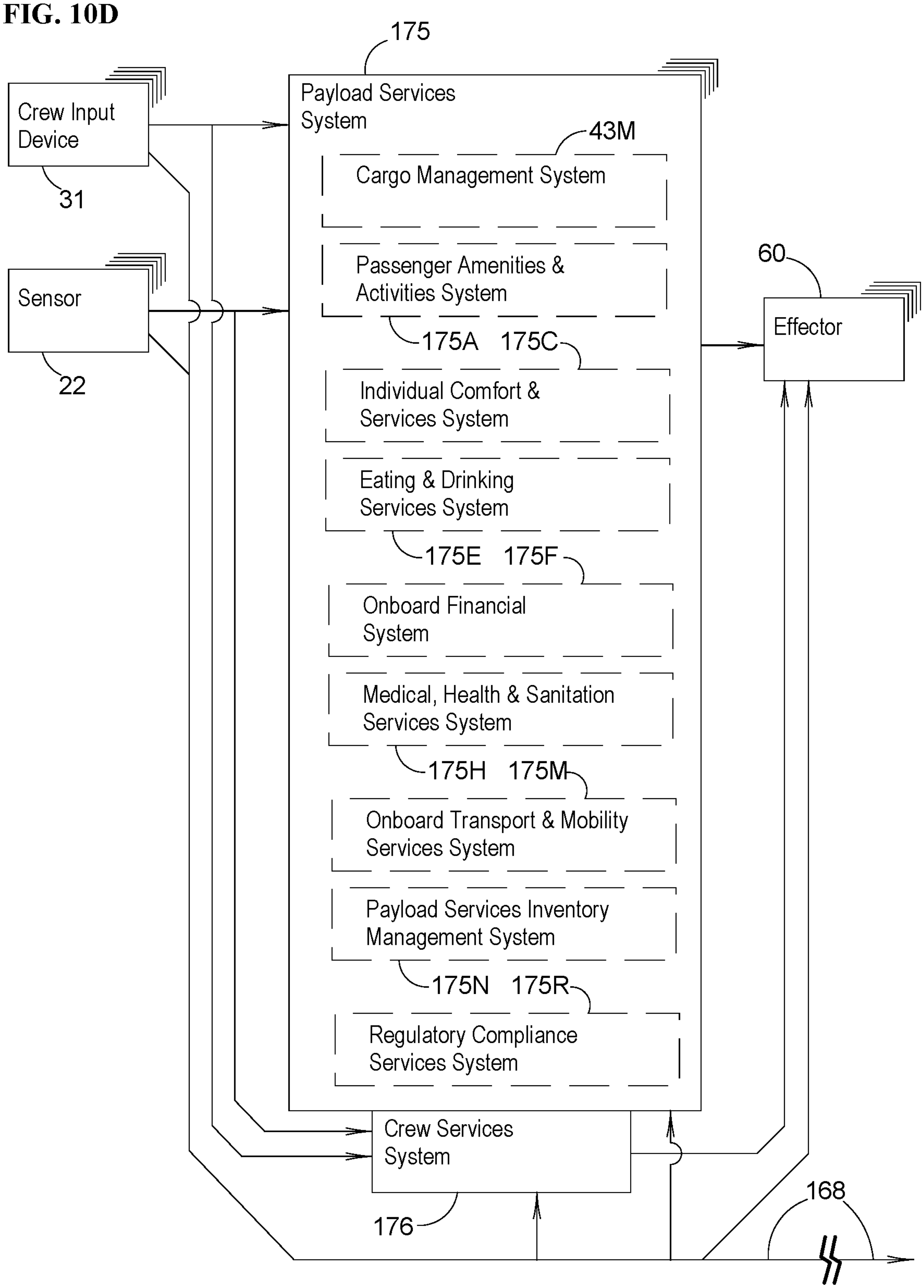

FIG. 10D illustrates further subsystems in a payload services system 175. The payload services system 175 will preferably include a plurality of systems selected from: a cargo management system 43M, a passenger amenities & activities system 175A, an individual comfort & services system 175C, an eating & drinking services system 175E, an onboard financial system 175F, a medical, health & sanitation services system 175H, an onboard transport & mobility services system 175M, a payload services inventory management system 175N, a regulatory compliance services system 175R. An adjacent crew services system 176 provides many or all of the features of the payload services system 175, with added functionality tailored to the needs of different categories of crew such as flight crew, cabin crew, maintenance crew, repair crew etc. It should also here be noted that more details of payloads will be presented subsequently with reference to FIGS. 13A through 13E that illustrate some alternate preferred payloads architectures and features that can be applied on a partially aerostatically supported air cushion ship 1.

The cargo management system 43M shown in FIG. 10D orchestrates and performs all management functions related to cargo 43, that as described earlier with reference to FIGS. 1A through 1G and FIGS. 2A through 2F, can include one or more of: a cargo container or unit load device (ULD) 43A, a refrigerated container 43R, oversize cargo 43XL, baggage 44, and living cargo. The cargo management system 43M can comprise more than one of: a cargo handling system 43S (which can include one or more of ball mats, roller trays, powered rollers, crane systems, ramps, elevators, fittings, locks, stops, and cargo handling robotic members), a cargo transfer floor opening 43F, a cargo transport corridor area 43T, stowage volumes 44S, a live animal carriage subsystem 43L for carrying pets, animals, land and marine mammals, birds, and fish, each in controlled safe and health-fostering and physically and psychologically comfortable environments suitable to each animal type, and a plant carriage subsystem 43P for carrying all kinds of plants including trees and bushes and houseplants and ornamental plants and food-yielding plants, each in controlled safe and health-fostering and physically appropriate environments suitable to each plant type.

Figure 10E:
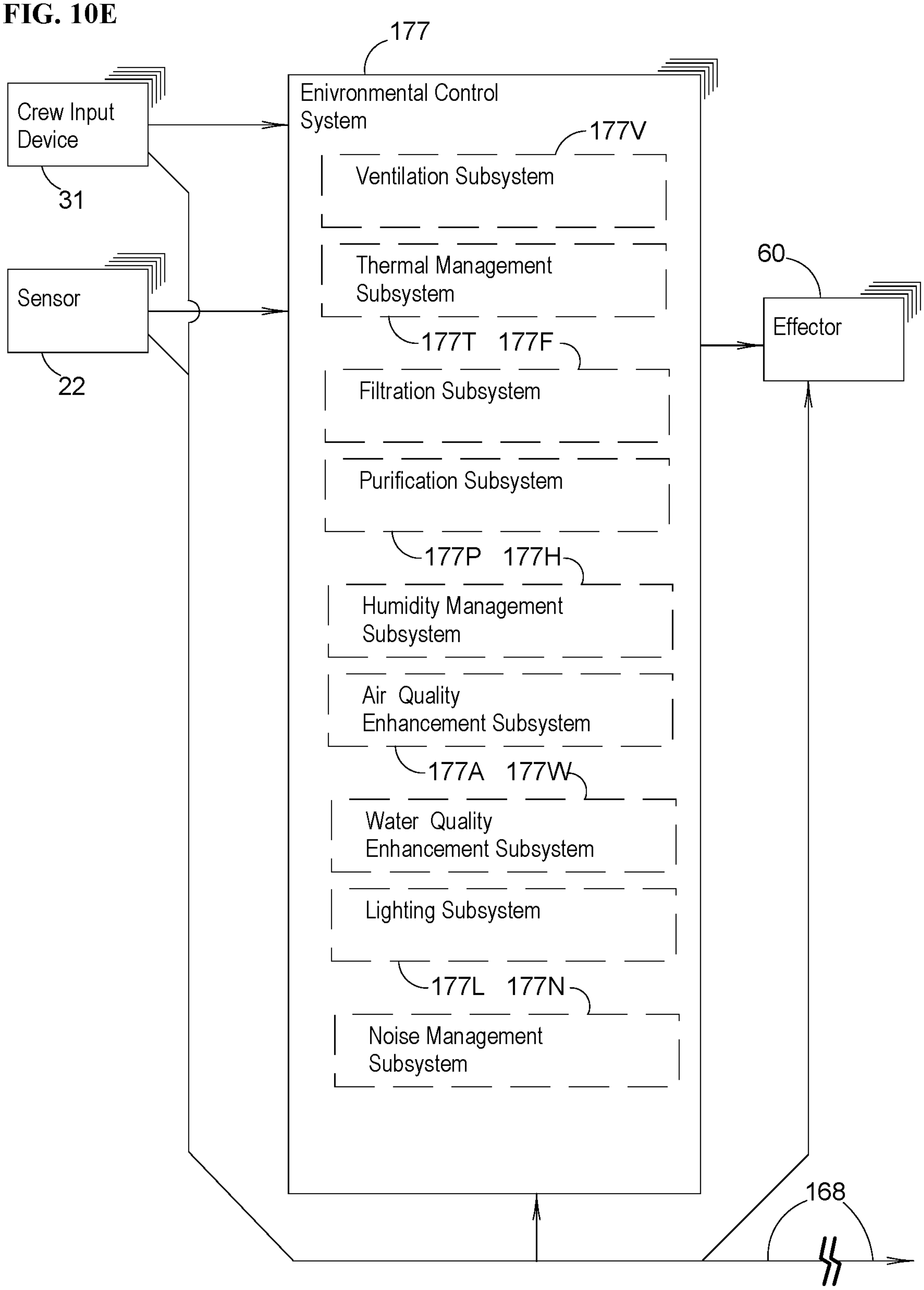

The passenger amenities & activities system 175A can include amenities & activities in more than one of: arts, music, a stage feature, a screen feature, an entertainment feature, sports, recreation, gaming, events, meetings, conferences, other amenities and other activities. Special amenities may be provided free or at a charge for special categories of people such as infants, toddlers, children, obese persons, elderly persons, handicapped persons, Persons of Reduced Mobility (PRM), blind or limited vision persons, deaf or limited hearing persons, and other categories of persons whether they be passengers or crew. Similarly, special amenities may be provided for animals and plants and other living beings on board. Several of the amenities can be provided by features already described with reference to FIGS. 2A through 2F. The individual comfort & services system 175C can include more than one of: a personal digital assistant or PDA, apps, a language translator, wayfinding, onboard communications, a financial onboard credit/debit card, a crew assist connection, concierge services, and personal & private cabin items including comfort, temperature, humidity, lighting & mood lighting, pillows and bedlinen and blankets/quilts and sleep facilitating provisions, ADA provisions, and personal air customization including oxygen enrichment. The eating & drinking services system 175E can include on-demand food and drinking services, robotic delivery, food carts, beverage carts, food and beverage trucks, crew food and beverage vendors, vending machines, grocery stores, cabin refrigerators and microwaves, self-service bars and kitchenettes, cafes, restaurants, bistros, food courts, and specialized cuisine and beverage venues, without limitation. The onboard financial system 175F can comprise one or more of: onboard electronic currency, loading and replenishing financial onboard credit/debit cards, buying and selling, retail, payment for amenities, destination shopping, deposit and withdrawal, interest and dividend, wire transfer and duty free zones, without limitation. The medical, health & sanitation services system 175H can comprise more than one of: a clinic, a preventative medicine site, a salon, a gym area, a yoga area, a walk area, an oxygen bar, a massage chair, a bathroom, a shower, a jetted hot tub, a sauna, antibacterial and antiviral provisions, a morgue, and other medical, health & sanitation features without limitation. The onboard transport & mobility services system 175M can include onboard aisles, paths, moving sidewalks, stairways, escalators, elevators, roads, vehicle ramps, spiral ramps, vehicle elevators, self-propelled chairs, electric personal vehicles such as ebikes or self-balancing scooters, onboard vehicles for carrying people, vehicle trains, rickshaws, cycle rickshaws, motorized rickshaws, robotic rickshaws, robotic people carrying mobile pods, mobile cabins, electric microbuses, tracked vehicles, automated guideway transit (AGT) vehicles, and vehicles with vision systems and collision avoidance, for example and without limitation. The payload services inventory management system 175N can include at least one of: supplies management, food management, potable water management, beverage management, store inventory management for a wide variety of stores, inventory cleaning/maintenance/repair/recycling for different categories of inventory, rentable items inventory management, and inventory management related to all the other items shown in FIG. 10D. Note that the potable water management system may be integrated with a more general onboard water management system that manages potable water as well as nonpotable water such as gray water and sewage on board, with water use minimization features and water reuse features such as optional recycling of gray water for toilet or urinal flushing purposes. Water purification, desalination and distillation subsystems can be optionally provided. Low flow showers and toilets can help minimize water weight needed to be carried on board. Potable water can be sourced both by incoming potable water coming in from shore sources, and onboard creation of potable water from salt water sourced from the ocean or sea water below the vehicle when it is in a mode floating on a water surface 18. Potable water can also be sourced on board a PASRACS 1 from a water condenser system from an engine and/or APU and/or fuel cell, as well as collection of water from hydrogen combustion with air to create water as an output product. The payload services inventory management system 175N shown in FIG. 10D should be closely connected and functionally integrated with the onboard inventory system 178 shown earlier in FIG. 10A, wherein the latter has coverage over all types of inventory related to the PASRACS 1, and not just for payload related inventory. The regulatory compliance services system 175R can comprise more than one of: passenger-assist crew, Transportation Security Administration (TSA) or similar administrative personnel and equipment, customs, immigration, police/security personnel and equipment, impaired persons management, external markings and lighting, and other regulatory compliance subsystems without limitation. The regulatory compliance services system 175R can also monitor and help foster compliance with a plurality selected from the following regulatory and standards items:

1) meeting all applicable regulatory standards
2) meeting electrical & mechanical & civil engineering standards
3) meeting environmental standards
4) meeting operational risk standards for risk of hazards to people, birds, marine animals, and vehicles including marine and air vehicles
5) having appropriate placards and warnings and instruction manuals for all categories of personnel
6) having installation and repair processes that minimize risks to personnel or equipment
7) being operational with constraints with wave heights through Douglas sea scale TBD
8) fostering survival in flight mode over either tsunami waves or ultra-high or rogue waves up to TBD meters high
9) enabling operation with specified constraints in adverse weather conditions including heavy rain, snow, and severe hail such as TORRO hail scale TBD (up to and including TBD mm ice balls)
10) Including design for long life, design for robustness, design for reliability, and design for serviceability, maintainability & repairability standards FIG. 10E illustrates further details of an environmental control system 177 for a PASRACS 1. As illustrated, the environmental control system 177 comprises at least one of: a ventilation subsystem 177V that may include at least one of a fresh air subsystem, a controllable inflow subsystem such as an inflow scoop, a controllable flow outflow subsystem such as an outflow valve, and a recirculation subsystem; a thermal management subsystem 177T that may include at least one of a heating subsystem, a cooling subsystem, an air conditioning subsystem with a refrigerant, a heat pump subsystem, a heat exchanger subsystem, a thermal insulation subsystem, a hot fluid storage & distribution subsystem, a cold fluid storage & distribution subsystem, a heat provision system for hot food preparation and a cold provision system for food and medicine refrigeration and/or freezing; a filtration subsystem 177F for at least one of air and water that may include at least one of a filter screen and a HEPA filter and an electrostatic filter; a purification subsystem 177P for at least one of air and water that may include at least one of a UV purification element, a UV excimer lamp, a 222 nm excimer member that can provide disinfection for COVID while greatly reducing human exposure risk, a UV wand, and a cleaning robot with at least one of wipe cleaning capability, wet-wiping capability, UV purification cleaning capability, antimicrobial administration capability, disinfectant administration capability, fogging capability, chemical cleaning capability, vacuuming capability, dusting capability, and cover-changing capability for fabric coverings and pillow cases and bedlinen; a humidity management subsystem 177H that can include at least one of a humidifier and a mister and a fountain and a waterfall and a dehumidifier; an air quality enhancement subsystem 177A that can include at least one of an oxygen supplementation subsystem, a deodorizer subsystem, a desirable scent adding subsystem, an ionizer subsystem, a desirable gas adding subsystem, a desirable droplets adding subsystem and a desirable particles adding subsystem; a water quality enhancement subsystem 177W that can include at least one of a filtration subsystem, a purification subsystem, an impurity removal subsystem, a water softener subsystem, a chlorination subsystem, and a desirable additives integration subsystem; a lighting subsystem 177L that includes at least one of interior lighting, emergency evacuation lighting, cabin lighting, cockpit or flight deck lighting, instrumentation lighting, display lighting, mood lighting, “starry sky” night lighting, biorhythm/circadian rhythm lighting, personal area lighting, reading light, warming light, disco lighting, venue lighting, theatre lighting, movie lighting, advertising lighting, maintenance lighting, repair lighting, portable lighting, lighting mobile robots, exterior lighting, lighting for night operations, lighting for reduced visibility operations, logo lighting, marker lighting, navigation lighting, warning lighting, landing light, and terminal area operations lighting; and a noise management subsystem 177N that can include features, technologies and components for at least one of interior noise management, community noise management, overflight noise management, terminal operations noise management, a noise insulation subsystem, a white noise subsystem, a transient noise minimization subsystem, a sleeptime reduced noise subsystem, a personal noise control subsystem, a noise cancelling headset with a personal sound system, a virtual reality headset, and an active noise control subsystem.

FIGS. 11A through 11G illustrate some alternate preferred structures architectures and features that can be applied on a partially aerostatically supported air cushion ship or PASRACS 1, including but not limited to the preferred embodiment of a PASRACS 1 described earlier with reference to FIGS. 1A through 1G and FIGS. 2A through 2F.

Figure 11A:
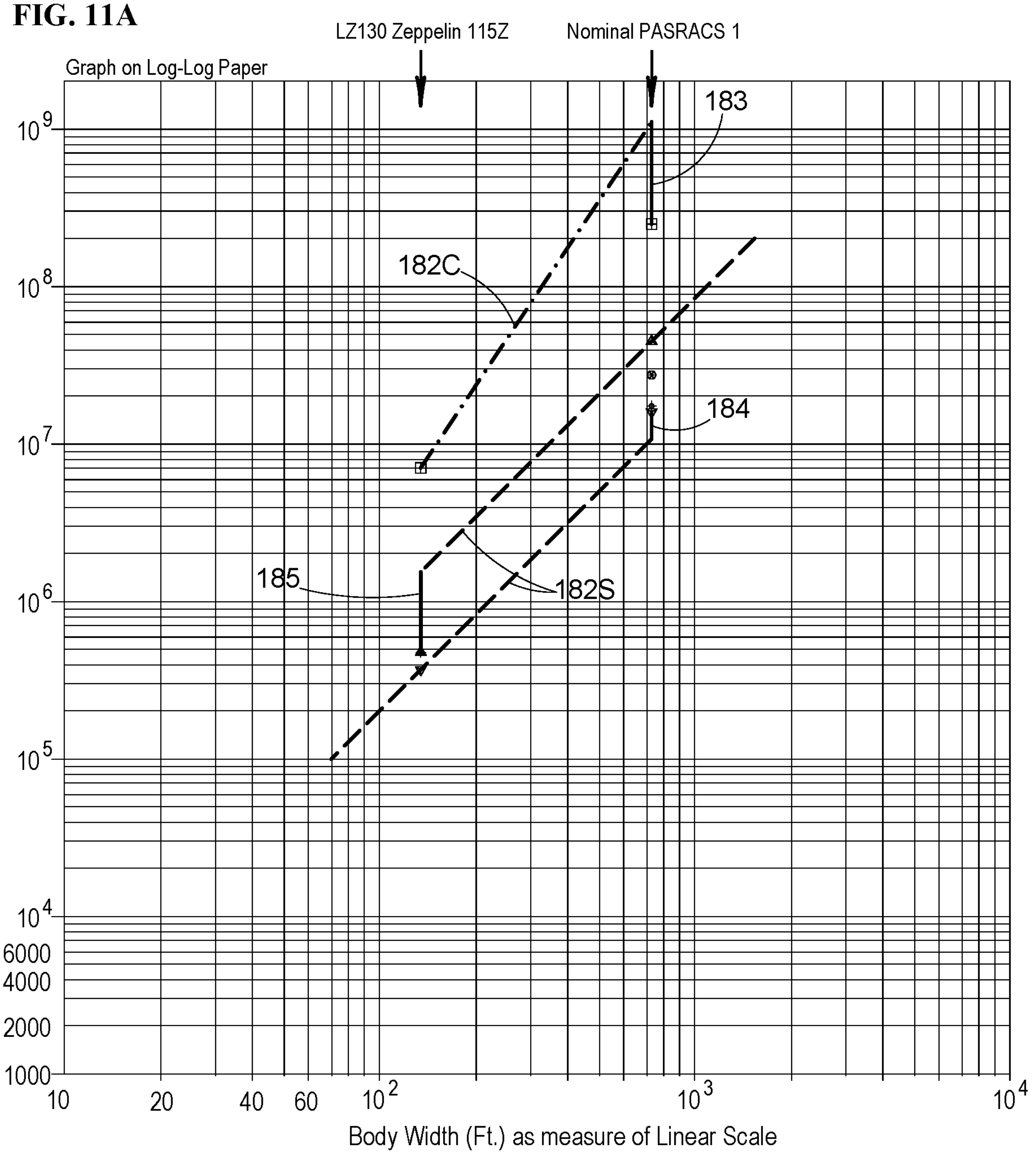
FIGS. 11A through 11G illustrate some alternate preferred structures architectures and features that can be applied on a partially aerostatically supported air cushion ship.

FIG. 11A shows a graph in a log-log scale format to illustrate the foundational and important effects of “square-cube” laws on sizing and scaling effects applicable to vehicles in general, and especially so to vehicles that include aerostatic lift, such as dirigibles or partially aerostatically supported air cushion ships. Square-cube laws are one of the very early discoveries of modern science and engineering, and were first published by Galileo Galilei in 1683. The simplest form of the square-cube law captures the mathematic and scientific principle that the law states that as an object increases in size without changing shape or configuration, its volume increases faster than its surface area, where the area ‘squares’ while volume ‘cubes’ relative to a linear dimension or linear scale. In the vehicle design arena parameters such a vehicle volume, lifting gas volume, and other volume metrics behave according to the Cube Law, while parameters such as vehicle wetted area, body wetted area, wing planform area, and weights that scale with areas behave substantially according to the Square Law. In FIG. 11A the horizontal axis or abscissa is a linear scale corresponding to body width of a vehicle incorporating aerostatic lift, in feet. To anchor the square and cube trend lines, data is included for a known reference vehicle that was actually built and flown, the dirigible LZ130 Graf Zeppelin II (Ref. 7). The body width of the LZ130 was 135.1 ft., as shown by the column of data points at abscissa value 135.1. The nominal partially aerostatically supported air cushion ship data shown in FIG. 11A is for the preferred embodiment nominal PASRACS 1 described earlier with reference to FIGS. 1A through 1G and FIGS. 2A through 2F. This preferred embodiment PASRACS 1 has a body width of 730 ft., as shown by the column of data points at abscissa value 730. It should be noted that PASRACS of different sized and configurations can have significantly varying body widths, as well as significantly varying alternate metrics of linear scale such as body length, overall length, wingspan or average chord, and so the specific data shown should not be construed as limiting the invention as described and claimed. Square symbols are used to indicate lifting gas volume, with the anchor value for the LZ130 being 7,062,000 cubic feet or cu.ft., as shown. By the square-cube law, lifting gas volume should increase by the cube of the linear scale, as shown by the Cube Law Relationship trend line 182C that is shown in FIG. 11A. The PASRACS 1 has a lifting gas volume of 250,000,000 cu.ft, as shown, which is below the Cube Law Relationship trend line 182C by an aerostatic lift volume decrement 183, as shown. This aerostatic lift volume decrement occurs for multiple configuration, technology and requirements reasons, with three key reasons being that: (1) the body length/width or fineness ratio is smaller for the PASRACS 1, (2) a larger fraction of the vehicle overall volume is used for payload on the PASRACS, correspondingly reducing lifting gas volume as a percentage of overall vehicle volume, and most importantly, (3) the PASRACS 1 gets only 17.5 million lb, of aerostatic lift out of 45 million lb, needed to balance a maximum takeoff weight condition of 45 million lb., with the remaining 27.5 million lb, coming from aerodynamic lift in ground effect. Thus for this hybrid lift vehicle at the MTOW condition at a vehicle takeoff condition (when airspeed has increased sufficiently such that aerodynamic and aerostatic lift together match 100% of weight and when hydrodynamic lift drops to zero), only 39% of the lift is aerostatic while 61% is aerodynamic. These three key reasons plus other second order effect differences can thus fully explain and justify the illustrated aerostatic lift volume decrement 183 from the Cube Law Relationship trend line 182C. While the Cube Law Relationship has been illustrated in FIG. 11A for lifting gas volume, the Cube Law Relationship also applies to overall vehicle volume and to aerostatic lift and hydrostatic lift. Variations from the Cube Law Relationship can occur for configuration, technology and requirements reasons as well as second order effects such as use of helium rather than hydrogen for some or all of the lifting gas sub-volumes and compartments or gas bags or gas cells, as noted and described earlier herein. The Square Law Relationship applies to parameters that scale exactly or approximately with area rather than volume, and include for example and without limitation, vehicle wetted area, vehicle planform area, wing planform area, body wetted area, tail areas, aerodynamic forces, hydrodynamic forces (when in motion with water contact, before takeoff or after landing), and weights of various categories that approximately follow the Square Law Relationship. Two of the most important vehicle-related weights that approximately follow the Square Law relationship are Maximum Takeoff Weight (MTOW) which is shown with triangle symbols, and Operational Empty Weight (OEW) 33E which is shown with inverted triangle symbols in FIG. 11A. Note that MTOW corresponds to the heaviest takeoff condition when payload weight 33P and non-lifting-gas fuel weight 33F are added to the OEW 33E. The OEW of the LZ130 dirigible is approximately 370,000 lb, as illustrated, and a Square Law Relationship trend line 182S is fitted through this point. The estimated OEW of the aforementioned nominal PASRACS 1 is 16,000,000 lb, a value above this trend line by an Empty Weight increment 184 as illustrated. This Empty Weight increment is readily understandable and can be justified by the facts that the PASRACS 1 has: (1) higher cruise and maximum speeds than the LZ130, (2) must include elements that provide hydrostatic, hydrodynamic and aerodynamic lift, and (3) must meet more stringent modern safety and certification requirements, even despite some offsetting OEW reductions attributed to lighter weight modern materials and structures. The estimated MTOW of the nominal PASRACS 1 is 45,000,000 lb., and an upper Square Law Relationship line 182S is fitted through this point. The MTOW of the LZ130 is around 476,000 lb, as shown, and corresponds to maximum aerostatic lift, not accounting for second order ballast and ballonet effects and weight and aerostatic lift as known in the prior art of airships and dirigibles. The MTOW of the LZ130 is below the upper Square Law Relationship line 182S by an MTOW decrement 185, as shown in FIG. 11A. This MTOW decrement for the LZ130 is readily understandable and can be justified by the facts that the dirigible has (1) lower design speeds and loads requirements, (2) lower stringency on safety and certification requirements and (3) no requirement or capability for running takeoffs from water using a combination of lift encompassing hydrostatic lift, hydrodynamic lift and aerodynamic lift in addition to aerostatic lift that both the LZ130 and PASRACS 1 have in common.

There are important and foundational ramifications of the Square Cube law trends in FIG. 11A with regard to how and why vehicles which use aerostatic lift for some or all of the lift needed to balance weight, optimize for several measures of merit at larger values of linear scale. Fundamentally, because the Cube Law Relationship trend line 182C is steeper than the Square Law Relationship trend line 182S, as vehicle scale increases the volume of lifting gas and the amount of aerostatic lift increase faster than the vehicle area and weight metrics increase. Thus a partially aerostatically supported air cushion ship can offer nonobvious but highly significant overall optimization opportunities relative to a fully aerostatically supported vehicle when scale is increased substantially, as shown in the comparison between the LZ130 fully aerostatically supported vehicle and the nominal PASRACS 1 in FIG. 11A. With a linear scale increase using body width of 5.4:1 as shown, the corresponding cube law lifting gas volume increase would be 157.8:1. However, with the PASRACS 1 utilizing ground-effect aerodynamic lift for 61% of needed total lift to balance vehicle weight at a vehicle takeoff condition when airspeed has increased sufficiently that hydrostatic and hydrodynamic lift can drop to zero, an aerostatic lift volume increase well under the cube law trend line is sufficient (shown in FIG. 11A at lifting gas volume ratio of about 35.4:1 for the nominal PASRACS 1 relative to the LZ130 reference vehicle with 100% aerostatic lift). The need for aerostatic lifting volume below the cube trend line implies that the PASRACS can be sized with less required wetted area increase and still have a greater percentage of internal volume available for payload, which in turn implies a larger number of passengers and amount of cargo that can be beneficially and profitably carried, as well as enhanced comfort and amenities for passengers that are enabled by large volume allocations per passenger for different fare classes of carriage. The empty weight fraction or ratio of OEW to MTOW for the PASRACS can also be lowered, as shown in FIG. 11A from 78% for the LZ130 to 36% for the nominal PASRACS 1. The PASRACS 1 uses a hybrid combination of lift sources to optimize lift at different speeds in a takeoff maneuver, starting with hydrostatic+aerostatic at zero speed, then hydrostatic+hydrodynamic+aerostatic, then hydrostatic+hydrodynamic+aerostatic+ram air cushion aerodynamic, then after lifting off from the water just aerostatic+aerodynamic.

The inventive use of hybrid lift sources minimizes required thrust from the propulsion system for the takeoff and transition to cruise flight in ground-effect, and enables the overall vehicle design size and weight and drag to cycle down from what they would have been if all the lift were aerostatic, according to principles of vehicle sizing and cycled design. It should be noted that advanced lightweight but strong materials and structures and technologies can also contribute to reduced sizing thrust and weight and cycled vehicle benefits. There are huge advantages that accrue from the Square Cube law effects and design cycling and optimization and reduced empty weight fraction. These huge advantages include advantages in terms of key vehicle measures of merit such as energy use per passenger-mile, fuel burn per passenger-mile, cash related aircraft operating cost (CAROC) per passenger-mile, and other measures of merit for transport vehicles that are denominated by passengers or payload—as the ratio of passengers from the LZ130 airship to the representative PASRACS 1 is nominally 694:1 (50,000 passengers on nominal PASRACS 1 relative to 72 passengers on the LZ130), which is well above even the Cube Law relationship! While the fundamental science-based benefit mechanisms described immediately above are incontrovertible, it is readily acknowledged that pairwise comparisons between different vehicles will be also affected by a variety of other factors including but not limited to: safety & certification; requirements & objectives for market, mission, vehicle & systems; technologies employed; and vehicle configuration & architecture details.

FIG. 11A in combination with the earlier described FIGS. 1A through 1G and FIGS. 2A through 2F, thus illustrate a preferred embodiment of a partially aerostatically supported ram air cushion ship 1, comprising in combination: a ship structure 2 incorporating a body 3 with a payload volume 4 with plural decks 5 at plural levels 6 for carrying payload 7; said ship structure 2 connected to a lifting gas enclosure 8 configured to contain a lifting gas 9 providing an aerostatic lift force 10 acting on said ship 1, said lifting gas 9 comprising at least one of helium 11, hydrogen 12 and a low-density lifting gas 13 with density lower than that of an atmosphere 14 immediately outside said ship 1; a hydrostatic floatation subsystem 15 comprising a water displacing structure 16 connected to said ship structure 2, said water displacing structure 16 configured to provide a hydrostatic lift force 17 acting on said ship 1 in a period of time when said water displacing structure 16 is displacing a water volume below a water surface 18 below said atmosphere 14; an aerodynamic lift subsystem 19 comprising a ram air cushion 20 when said ship 1 has positive airspeed 24, said ram air cushion 20 below a lower surface 1L of the ship 1 and above an Earth surface 21, wherein said aerodynamic lift subsystem 19 comprising said ram air cushion 20 is configured to contribute an aerodynamic lift force 25 acting on said ship 1 when said ship 1 has said positive airspeed 24; a propulsion system 26 capable of using energy 27 to generate a thrust force 28 acting on said ship 1; and a vehicle control and navigation system 29 configured to enable said ship 1 to move and maneuver on a travel path 24T; wherein weight 33 of said partially aerostatically supported ram air cushion ship 1 comprises operational empty weight 33E plus non-lifting-gas fuel weight plus payload weight 33P; wherein the ratio of operational empty weight 33E to weight 33 decreases with increased linear scale of the partially aerostatically supported ram air cushion ship 1 consequent to square-cube law effects, enabling an increase in the ratio of payload weight 33P to weight 33; wherein the weight 33 of said partially aerostatically supported ram air cushion ship 1 is substantially balanced by a combination of said aerostatic lift force 10 and said hydrostatic lift force 17, when said ship 1 is in a substantially stationary mode 34 on said water surface 18; and wherein the weight 33 of said partially aerostatically supported ram air cushion ship 1 is substantially balanced by a combination of said aerostatic lift force 10 and said aerodynamic lift force 25, when said partially aerostatically supported ram air cushion ship 1 is in a flight in ground-effect mode 35 [not shown] with said positive airspeed 24; and wherein the weight 33 of said partially aerostatically supported ram air cushion ship 1 is substantially balanced by a combination of said aerostatic lift force 10 and said aerodynamic lift force 25 and at least one of said hydrostatic lift force 17 and a hydrodynamic lift force 36, when said partially aerostatically supported ram air cushion ship 1 is in a transition mode 37 comprising a takeoff transition mode 37T or a landing transition mode 37L.

Figure 11B:
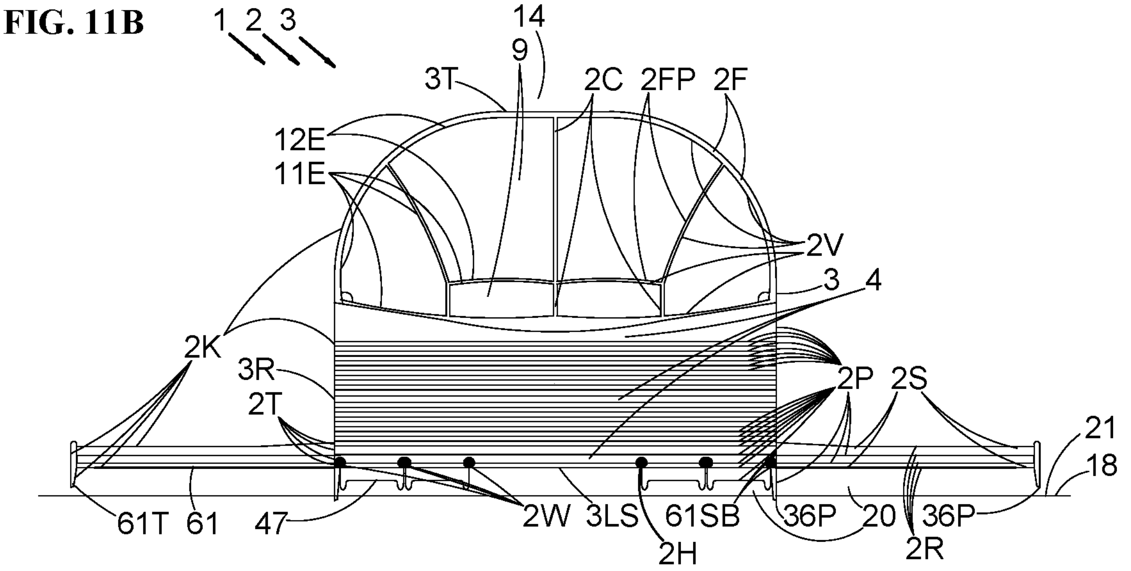

FIG. 11B illustrates some preferred structures architectures and features that can be applied on a partially aerostatically supported air cushion ship or PASRACS 1, utilizing the representative transverse cross-sectional view of a PASRACS 1 that was shown in FIG. 1E and corresponding to the longitudinal location C-C of the partially aerostatically supported ram air cushion ship as notated on FIG. 1A. The PASRACS 1 includes ship structure 2 in various parts of the vehicle including the body 3 and the wing 61. The body 3 includes a body top surface 3T, side surfaces such as the body right side surface 3R, and a body lower surface 3LS. The wing 61 includes a wing tip fence 61T and a wing side of body joint 61SB as shown. Ship structure 2 also serves to support and carry payload such as passengers, bags and cargo in a payload volume 4; and also serves to enclose and carry lifting gas 9 in lifting gas enclosures such as the illustrated helium enclosures 11E and hydrogen enclosures 12E. It should be understood that ship structure 2 can utilize a wide variety of materials and material systems including metals, metallic alloys, aluminum alloys, steels, fiber-metal laminates, composite materials, thermoplastic materials, thermoset materials, fiberglass, carbon composite materials, isotropic composites also known as "black aluminum," tailored composites, ceramic materials, plastic materials, synthetic materials, natural materials, wood, rubber, and other materials as well as structural members and assemblies known from the prior art including fastener members, elongated or near-linear structures such as rods, tubes, and extrusions, near-planar members such as panel members, three-dimensional structures such as topologically-optimized structures and additively manufactured structures and cast structures, laid-up and autoclave cured structures, woven structures, braided structures, redundant structures, fault-tolerant structures, fail-safe structures, fatigue life limited structures, damage-tolerant structures, and self-healing structures.

Ship structure 2 includes skin structure 2K which are used on surfaces of the PASRACS 1 that contact the atmosphere 14 around the vehicle, as well as portions that are designed to contact a water surface 18 beneath the vehicle, such as in a hydrodynamic planing surface 36P. Skin structure 2K can include elements and features found in prior art skin structures for aircraft, marine vehicles and land vehicles, including but not limited to: metallic structural elements, composite structural elements, supporting frame elements, rib elements, longeron elements, stringer elements, isogrid elements, orthogrid elements, sandwich elements, impact resistant elements such as a hail-proof surface for a specified category of hail risk, corrosion resisting elements or treatments, coatings, drag reducing elements such as riblets or sharkskin surface, electrically conductive elements such as a conductive grid designed for EME and lightning strike, see-through elements such as a transparency (including one or more from a window, glass window, acrylic window, polycarbonate window, craze-resistant window, dimmable window, electrochromic window and structural composite window), a surface-integrated solar panel, and a decorative element such as one or more of paint and applique film and a video display surface such as an LCD surface.

Ship structure 2 includes multiple applications of near-planar structure 2P, with several illustrated in FIG. 11B. Specifically, near-planar structure 2P is shown in floor structure for supporting payload such as passengers and cargo, fuselage perimeter structure for the fuselage 3, wing upper panel and lower panel structure for the wing 61, and side structure panels for downward-extending configuration members supporting hydrodynamic planing surfaces 36P, such as the illustrated wing tip fence 61*t*. Near-planar structure 2P can include elements and features found in prior art near-planar structures for aircraft, marine vehicles and land vehicles, including but not limited to: structural sheet, rigidized panels with a sheet and attached stiffener members such as stringer or longeron members, integral grid panels such as isogrid or orthogrid panels, topology-optimized panels, additive manufacturing panels, sandwich panels, metallic panels, composite panels, near-planar truss structure, framed membrane panels, structural panels with integrated systems or systems raceways, structural panels with integrated structural health monitoring, and other near-planar structural members.

Ship structure 2 includes multiple applications of skin structure 2K, with several illustrated in FIG. 11B. Specifically, skin structure 2K is shown on external surfaces of the PASRACS 1 including the body 3 and wing 61 without limitation. Skin structure 2K can include elements and features found in prior art skin structures for aircraft, marine vehicles and land vehicles, including but not limited to: support by underlying structure 2 that can include near-planar structure 2P as well as members such as a frame 2F or a spar 2S, insulation such as at least one of noise insulation and thermal insulation and multipurpose insulation, a smooth external surface for low skin-friction fluid dynamic drag such as air drag or water drag, surface protection layer to inhibit scratching or scoring from airborne sand or volcanic ash or particulates, drag-reducing surface such as riblet or sharkskin surface with drag-reducing small-scale surface contouring, surface applique for at least one of drag reduction and externally viewable colorized images, corrosion inhibiting surface treatment such as anodizing or primer application or inhibitor application, decorative paint, impact and penetration resistant layer for defense against external impacts from hail or debris, bird-strike resistant layer, and electrically conductive surface or mesh or wires for protection from at least one of lightning and electromagnetic environment (EME) effects and electromagnetic pulse (EMP) effects without limitation.

The ship structure 2 used in the body 3 also includes a frame 2F that provides structural rigidity and strength to carry external and internal loads, around some or all of the perimeter of the body 3; concave structure 2V for containing pressure such as in at least one of a lifting gas compartment (such as the illustrated helium enclosure 11E and hydrogen enclosure 12E that hold lifting gas 9), a pressurized cabin volume and a liquid containing volume for liquid such as water or liquid fuel without limitation; a structural column 2C that can carry loads including weight-related loads and wherein the structural column 2C can optionally embody a hollow cross-sectional shape and also serve as a pipe or duct; a fire-resistant partition 2FP that is a structural member that prevents or inhibits spread of a fire; and a tension member 2W such as a cable or rope or wire without limitation, illustrated in FIG. 11B as supporting a payload transfer transport module 47 hanging beneath the body 3 with the upper end connected to a hardpoint 2H that is part of the ship structure 2 in the body 3.

The ship structure 2 used in a wing 61 of a PASRACS 1 includes the aforementioned near-planar structure 2P and skin structure 2K, as well as at least one structural spar 2S configured to carry loads spanwise on said wing 61, redundant structure 2R with multiple load paths (such as wing bending loads through wing upper and lower panels as well as wing cargo compartment top and bottom surfaces, as shown), and in the illustrated embodiment also a truss structure 2T at the side-of-body joint 61SB where the wing 61 meets the body 3, with truss members providing load paths and stable and strong structural connection between wing structure members including said structural spar 2S and body structure members including said frame 2F. While truss structure 2T has been shown at the side-of-body joint 61SB for the illustrated preferred embodiment of a PASRACS 1, it should be understood that many other beneficial applications of truss structure 2T in other parts of the PASRACS 1 including the wing 61 and body 2 without limitation, are possible within the spirit and scope of the invention. At the outer ends of the wing 61, the structural spar 2S connects with a wing tip fence 61T that provides spanwise constraint to the outer ends of the ram air cushion 20 and preferably also has a lower hydrodynamic planing surface 36P that can contact the water surface 18 under circumstances of high waves and/or bank angle, for example and without limitation.

Figure 11C:
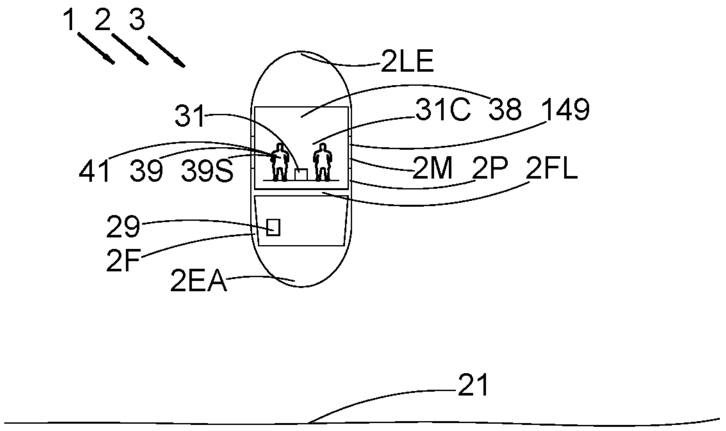

FIG. 11C illustrates some preferred structures architectures and features that can be applied on a partially aerostatically supported air cushion ship or PASRACS 1, utilizing the representative transverse cross-sectional view of a PASRACS 1 that was shown in FIG. 1C and corresponding to the longitudinal location A-A of the partially aerostatically supported ram air cushion ship as notated on FIG. 1A, with scaling up applied for clarity. The PASRACS 1 includes ship structure 2 in various parts of the vehicle including the body 3, which in turn includes a flight deck or cockpit 31C that is at a forward end of a cabin 38 and separated from passenger accessible areas by a lockable door located behind the section of this view. The flight deck 31C accommodates at least one person 39 that is a seated person 37S and a member of the crew 41, more specifically flight crew. The flight deck 31C also includes at least one crew input device 31 and the body 3 also includes a vehicle control and automatic control system 29. The ship structure 2 includes a frame 2F, near-planar structure 2P, and floor structure 2FL. The window 149 can be a structural window, and can be openable for crew emergency evacuation purposes, in which case the window 149 comprises movable structure 2M. FIG. 11C also illustrates that the ship structure 2 includes leading-edge structure 2LE such as on the leading edge of the crown of the body segment housing the flight deck 31C, which will preferably be designed to survive impacts by birdstrike or hail as known from the art of airplane cockpit structure design; and further includes energy absorbing structure 2EA that can include engineered crushable structure, shown in one representative application location in the bottom region of the body 3, so as to be able to absorb impact energy from impact with an Earth surface 21 such as a water surface or ground surface. The PASRACS 1 will preferably be designed to meet all crashworthiness requirements for personnel and goods on board.

Figure 11D:
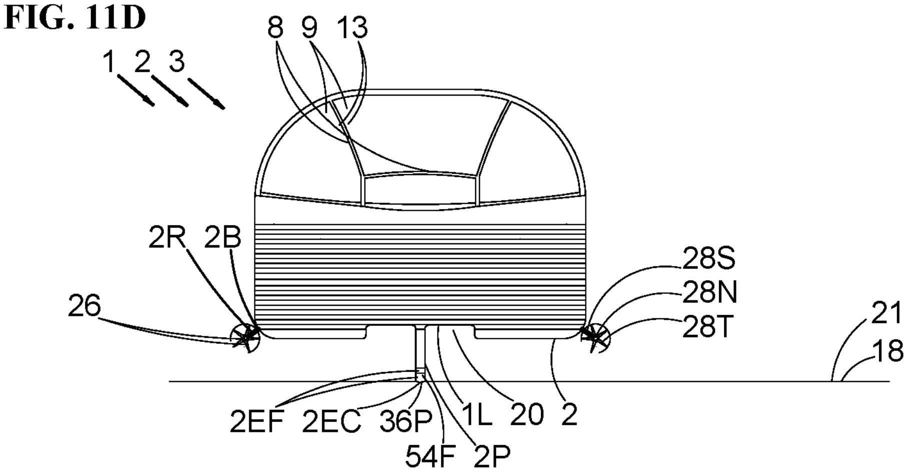

FIG. 11D illustrates some preferred structures architectures and features that can be applied on a partially aerostatically supported air cushion ship or PASRACS 1, utilizing the representative transverse cross-sectional view of a PASRACS 1 that was shown in FIG. 1D and corresponding to the longitudinal location B-B of the partially aerostatically supported ram air cushion ship as notated on FIG. 1A. In addition to structural architectures and features already described with respect to FIG. 11B, FIG. 11D shows a hull that is a forward hull 54F, that includes a hydrodynamic planing surface 36P. The illustrated hull, the forward hull 54H, is shown to include ship structure 2 that is enclosed floatation structure 2EF, such as watertight compartments known from the prior art of ship and marine vehicle hulls. The bottom region of the illustrated hull that is the forward hull 54F also includes impact contacting structure 2EC for normal operation impacts on an Earth surface 21 that is a water surface 18, and for nonnormal operation may also impact a solid surface such as an Earth surface 21 that comprises a floating ice surface or a ground surface. The sides of the illustrated forward hull 54F include near-planar structure 2P, as shown. FIG. 11D also illustrates some structural features representative of ship structure 2 that connects the body 3 to parts of the propulsion system 26 such as a nacelle 28N and thruster 28T. More specifically, the connecting structural features include a propulsor strut 28S, that includes multiple load paths and so acts as redundant structure 2R that can survive some faults and failures; and in the illustrated preferred embodiment also serves as breakaway structure 2B designed to break away at defined load conditions such as a crash condition to cite one example, without limitation. The use of breakaway structure in propulsor struts has precedence in underwing jet engine struts on commercial airliners, to allow the propulsor to break away cleanly in a crash condition without damage propagation to the main parts of vehicle structure such as wing and body structure.

Figure 11E:
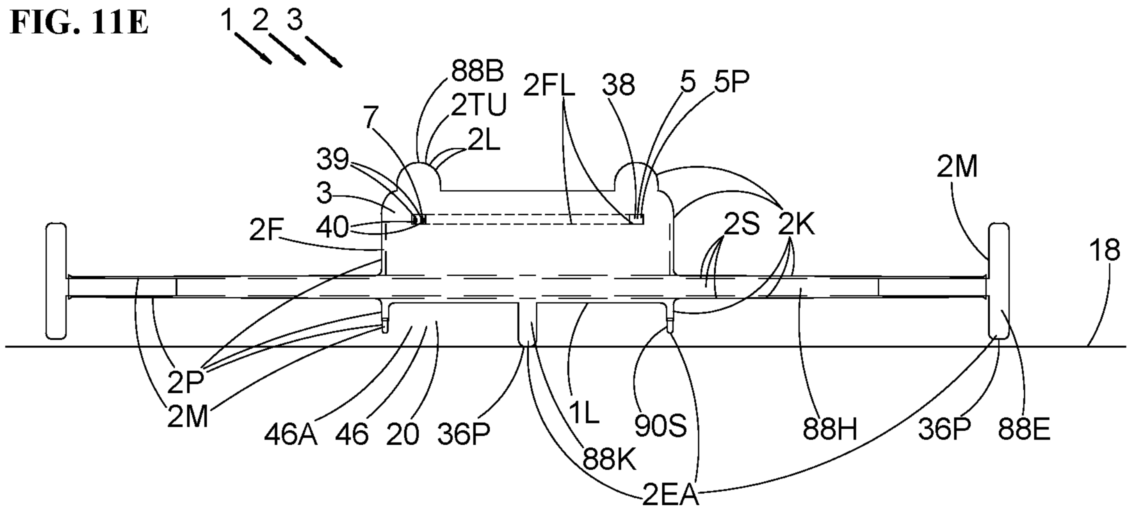

FIG. 11E illustrates some preferred structures architectures and features that can be applied on a partially aerostatically supported air cushion ship or PASRACS 1, utilizing the representative transverse cross-sectional view of a PASRACS 1 that was shown in FIG. 1G and corresponding to the longitudinal location E-E of the partially aerostatically supported ram air cushion ship as notated on FIG. 1A. The PASRACS 1 includes ship structure 2 in various parts of the vehicle including the body 3. The ship structure 2 includes a frame 2F and floor structure 2FL in the body 3, a spar 2S in the horizontal stabilizer 88H that also traverses into the body 3 and connects to the frame 2F at a tail-body joint similar to a wing-body joint, and multiple locations of applications of near-planar structure 2P and skin structure 2K. The tail boom 88B is shown to incorporate tubular structure 2TU which is partial tubular structure as shown, and utilizing longerons 2L as shown to carry longitudinal loads between the body 3 and the vertical tails located aft. The stabilizer endplates 88E serve as movable structure 2M that are rotatably movable thereby changing the angle of the hydrodynamic planing surface 36P at the bottom ends of the stabilizer endplates 88E. The rotation can be effected by a rotary actuator or a linear actuator or jackscrew with appropriate linkages and gears as known from the prior art of mechanical drive systems that also include safety stops. The side flaps 90S at the bottom sides of the body 3 are also movable structure 2M and can deploy downward to reduce the spanwise leakage flow from the ram air cushion 20. The bottom edges of the side flaps 90S may optionally be serrated with hydroski bottom ends with trailing edge of a segment lower than the corresponding leading edge. Downward movement of the side flaps 90S can be enabled by a variety of motor, actuator, drivetrain and/or track members. Energy absorbing structure 2EA will preferably be provided above the hydrodynamic planing surfaces 36P at the bottom ends of the keel 88K and stabilizer endplates 88E as well as the bottom ends of the side flaps 90S, all of which can contact the water surface 18 with resulting high loads for certain circumstances such as the PASRACS 1 flying in ground effect at a high cruise speed and suddenly encountering a very tall "rogue wave." and all of which can also contact an Earth surface that is a ground surface in emergency landing scenarios for a land overflight portion of a journey of a PASRACS 1.

Figure 11F:
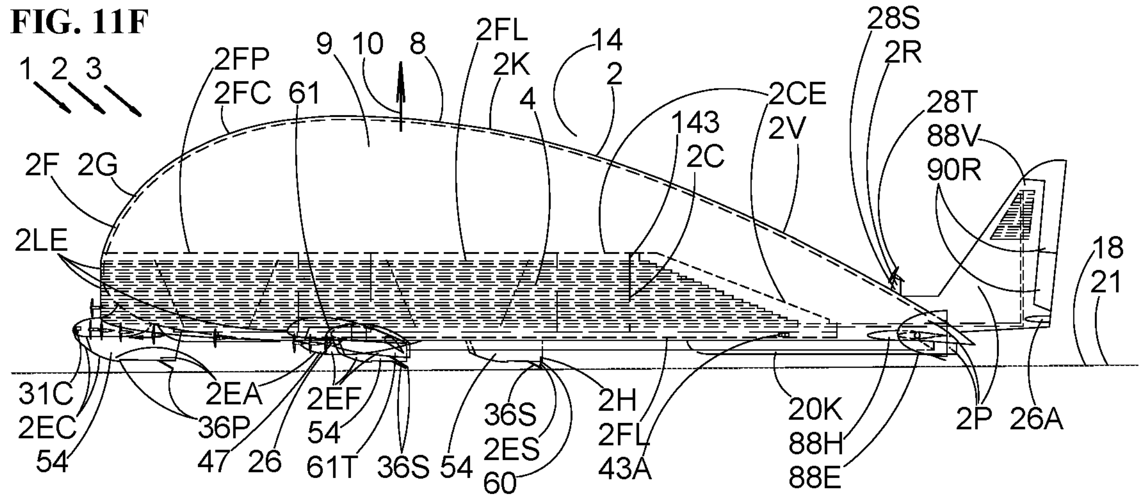

FIG. 11F illustrates some preferred structures architectures and features that can be applied on a partially aerostatically supported air cushion ship or PASRACS 1, utilizing the representative left side view of the partially aerostatically supported ram air cushion ship as notated on FIG. 1A, with scaling down. The PASRACS 1 includes ship structure 2 in various parts of the vehicle including the body 3 and the wing 61 and the propulsion system 26 and the horizontal tail 88H and vertical tail 88V, without limitation. The ship structure 2 includes planar structure 2P and skin structure 2K in plural locations shown without limitation; at least one frame 2F and grid structure 2G supporting skin 2K as an integral part of a lifting gas enclosure 8 separating lifting gas 9 from the atmosphere 14, in a manner similar to the grid structure of rigid airships of the past and optionally utilizing assembled grid, integral grid, orthogrid, isogrid, hexagonal grid, or topology-optimized grid along with associated structural architectures; leading edge structure 2LE at the front of the body 3 and wing 61; impact contacting structure 2EC in the front of a hull 54 that can be designed to withstand impacts from floating debris or logs etc.; energy absorbing structure 2EA in lower portions of the PASRACS 1 such as the illustrated hull 54 and payload transfer transport module 47; enclosed floatation structure 2EF in lower parts of the PASRACS 1 that may provide hydrostatic lift in normal or nonnormal operations, such as the hull 54 and wing tip fence 61T (serving as a tip float) and payload transfer transport module 47, wherein said enclosed floatation structure 2EF can have enclosed structural chambers and/or be filled with floatation material such as closed-cell floatation foam; a shock absorber 2ES as a type of energy absorbing structure, shown in a representative application in conjunction with an effector 60 that is configured to extend/deploy or retract/stow a hydroski 36S, with the upper end of the effector 60 attached to a hull 54 at a hardpoint 2H; column structure 2C shown with the interfloor traversal column 143; floor structure 2FL shown for floors in payload volume 4 suitable for accommodating passengers and cargo including cargo containers 43A as shown; ceiling structure 2CE shown above the payload volume 4 and preferably also serving as a fire-resistant partition 2FP; redundant structure 2R shown in the propulsor strut 28S; and concave structure 2V shown concurrent with the lifting gas enclosure 8 holding lifting gas 9.

Figure 11G:
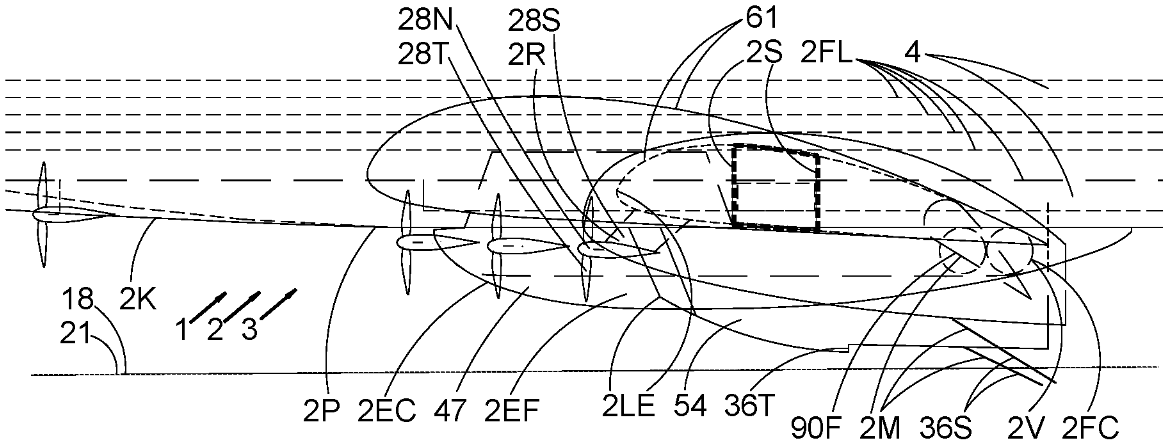

FIG. 11G illustrates some preferred structures architectures and features that can be applied on a partially aerostatically supported air cushion ship or PASRACS 1 in the region of the wing 61 and adjacent lower portions of the body 3, utilizing the representative left side view of the partially aerostatically supported ram air cushion ship as notated on FIG. 1A, with scaling up. The PASRACS 1 is in a transition mode flying in ground-effect but still having some hydrodynamic lift from hydroskis 36S in contact with an Earth surface 21 that is a water surface 18. The ship structure 2 includes planar structure 2P and skin structure 2K in plural locations with examples shown without limitation; leading edge structure 2LE at the front of the wing 61 and hull 54; structural spars 2S at the front and back sides of a wingbox in the wing 61, wherein the spars can utilize a variety of cross-sections and configurations and materials known from the art of aircraft spars, and can also optionally be truss spars; impact contacting structure 2EC in the front of a portion of a payload transfer transport module 47 that can be designed to withstand impacts from floating debris or logs etc.; enclosed floatation structure 2EF in lower parts of the PASRACS 1 that may provide hydrostatic lift in normal or nonnormal operations, wherein said enclosed floatation structure 2EF can have enclosed structural chambers and/or be filled with floatation material such as closed-cell floatation foam; floor structure 2FL shown for floors in payload volume 4 suitable for accommodating passengers and cargo; redundant structure 2R shown in a propulsor strut 28S supporting a propulsor nacelle 28N and thruster 28T; movable structure 2M associated with the flap 90F at the trailing edge of the wing 61 and also associated with the deployable hydroskis 36S; and concave structure 2V shown concurrent with a fluid containment structure 2FC in the illustrated payload transfer transport module 47.

FIGS. 12A through 12F show some alternate preferred propulsion, fuels and energy architectures and features that can be applied on a partially aerostatically supported ram air cushion ship or PASRACS 1.

Figure 12A:
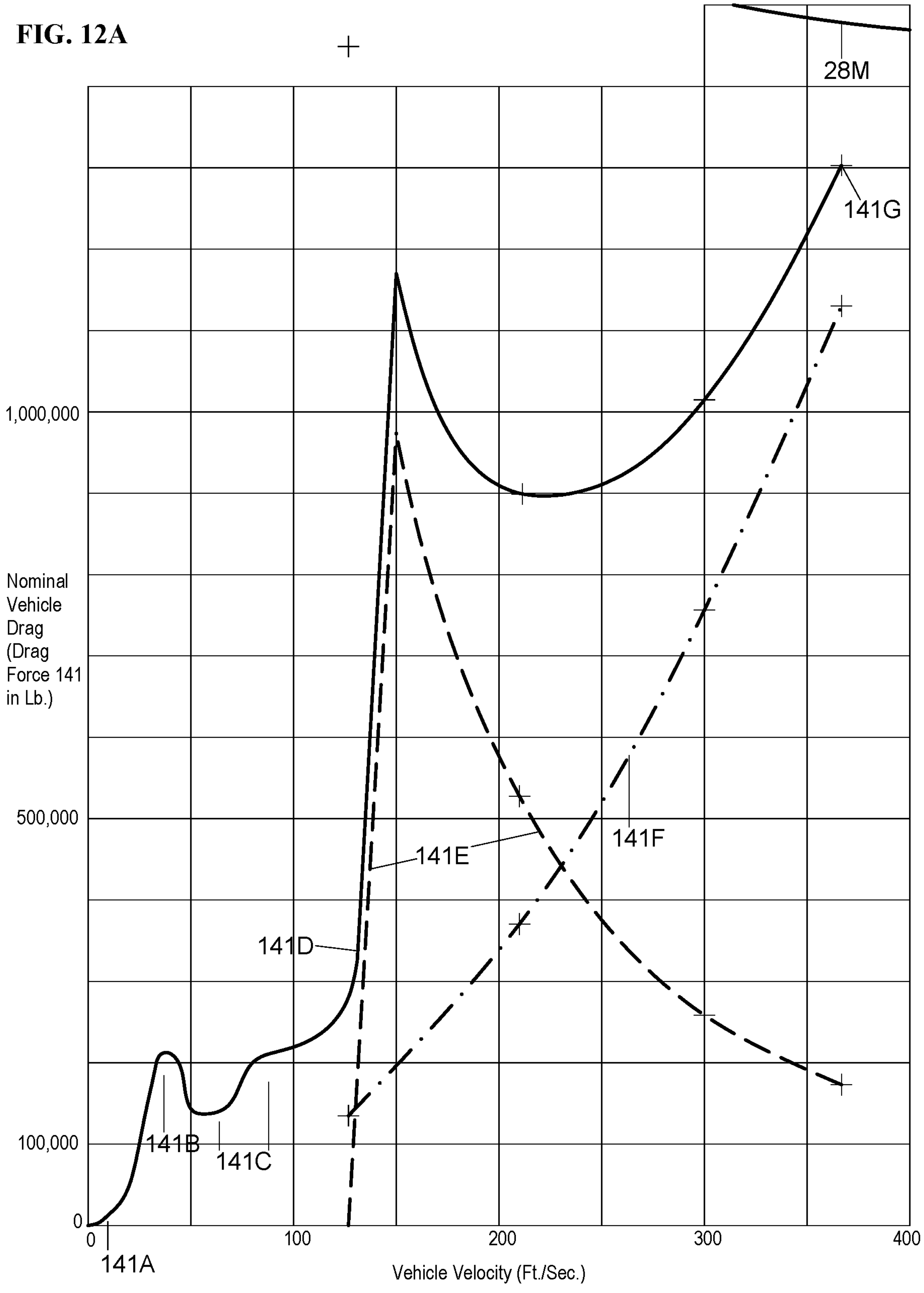
FIGS. 12A through 12F show some alternate preferred propulsion, fuels and energy architectures and features that can be applied on a partially aerostatically supported ram air cushion ship.

FIG. 12A shows a diagram of vehicle drag vs, vehicle speed, that is of key importance to propulsion sizing for a vehicle such as the PASRACS 1 described in detail earlier with reference to FIGS. 1A through 1G and FIGS. 2A through 2F. The diagram is shown with representative quantitative estimates for vehicle drag as measured with drag force 141 in pounds or lb., for the preferred embodiment PASRACS 1 described in detail earlier with reference to FIGS. 1A through 1G and FIGS. 2A through 2F; but the illustrated drag curves should be construed as illustrating key qualitative aspects of drag components and how they add up at different phases and velocities of operation for a variety of PASRACS 1 vehicle sizes and configurations as included in the invention and its various embodiments as described and claimed herein. The curve of nominal vehicle drag starts at zero drag with zero vehicle velocity, which will be exactly correct in conditions of zero wind and zero water current and zero waves. As the vehicle starts to accelerate to forward motion with increased vehicle velocity, the initial rise in drag force 141 has viscous friction water drag 141A as its largest single component. As Froude number increases but still has a value less than one, the drag force 141 next has wave making drag 141B as its largest single component, as shown and as known from the science of hydrodynamics of hulls moving in water and the well-understood phenomenon of a "drag hump" in this phase of operation. The wave making drag, as known from the science of hydrodynamics, is associated with hydrostatic lift or buoyancy on hulls moving forward while displacing water, with the amount of hydrostatic lift or water displacement lift needed being reduced to some extent by the aerostatic lift provided by lifting gas in the PASRACS 1. Note that Froude number is ratio of velocity over square root of the product of length times gravitational acceleration. Thus, for example for a PASRACS 1 going at 100 ft./sec, a hull with a length around 200 ft, would have a Froude number of $(100)/\sqrt{[(200)*(32.2)]}=1.25$. As the PASRACS 1 accelerates to still higher vehicle velocity, it is supported by a combination of hydrodynamic lift from planing surfaces of hulls as well as hydroskis and lifting hydrofoils as applicable, plus some starting aerodynamic lift from a ram air cushion beneath the vehicle. Overall drag at speeds or velocities just above the hump drag velocity, tends to drop to some extent as shown, and in this phase of operation the single largest component of drag force 141 is high-speed water drag 141C from water friction plus hydrodynamic lift induced drag acting on hydroski, planing surface and hydrofoil interactions with water flowing past these components at high speed while being deflected at an angle downwards at high speed to create hydrodynamic lift. A small amount of aerodynamic skin friction drag is also present in this phase of operation. As velocity continues to increase in a takeoff phase of operation, the PASRACS 1 slowly rises up with a combination of hydrodynamic planing surface and hydroski and hydrofoil lift and ram air cushion lift, supplementing the steady aerostatic lift from lifting gas in the vehicle. In this phase, shown at a velocity corresponding to 141D for total drag in FIG. 12A, the largest component of drag is a combination of high speed water plus aerodynamic induced drag. The aerodynamic induced drag vs, velocity is shown by the representative curve in a dashed line designated 141E in FIG. 12A. Aerodynamic induced drag from spanwise leakage flow rises rapidly as the vehicle rises from zero air cushion edge gap to a nominal edge gap height for wave clearance, then the aerodynamic induced drag drops steadily as velocity increases at constant edge gap. The height of the induced drag peak will be larger if a higher edge gap is necessitated by taller waves or other operational considerations. The illustrated drop in induced drag with velocity or speed is well understood from the science of aerodynamics of lifting wings and bodies in flight. Aerodynamic skin friction drag 141F scales as velocity squared where velocity is airspeed, as shown. The total drag at a nominal cruise velocity of 250 miles per hour (366.6 feet per second) in a flight in ground effect mode of operation is shown at 141G, and is clearly dominated by aerodynamic skin friction drag. Note that the propulsion system is configured with sizing of propulsion subsystems (such as engines/motors, propellers/fans/other thrusters, ducts, struts, structures, systems, etc) such that the resulting design curve for maximum available thrust force 28M has a value exceeding the total drag 141G at cruise speed, as shown.

Figure 12B:
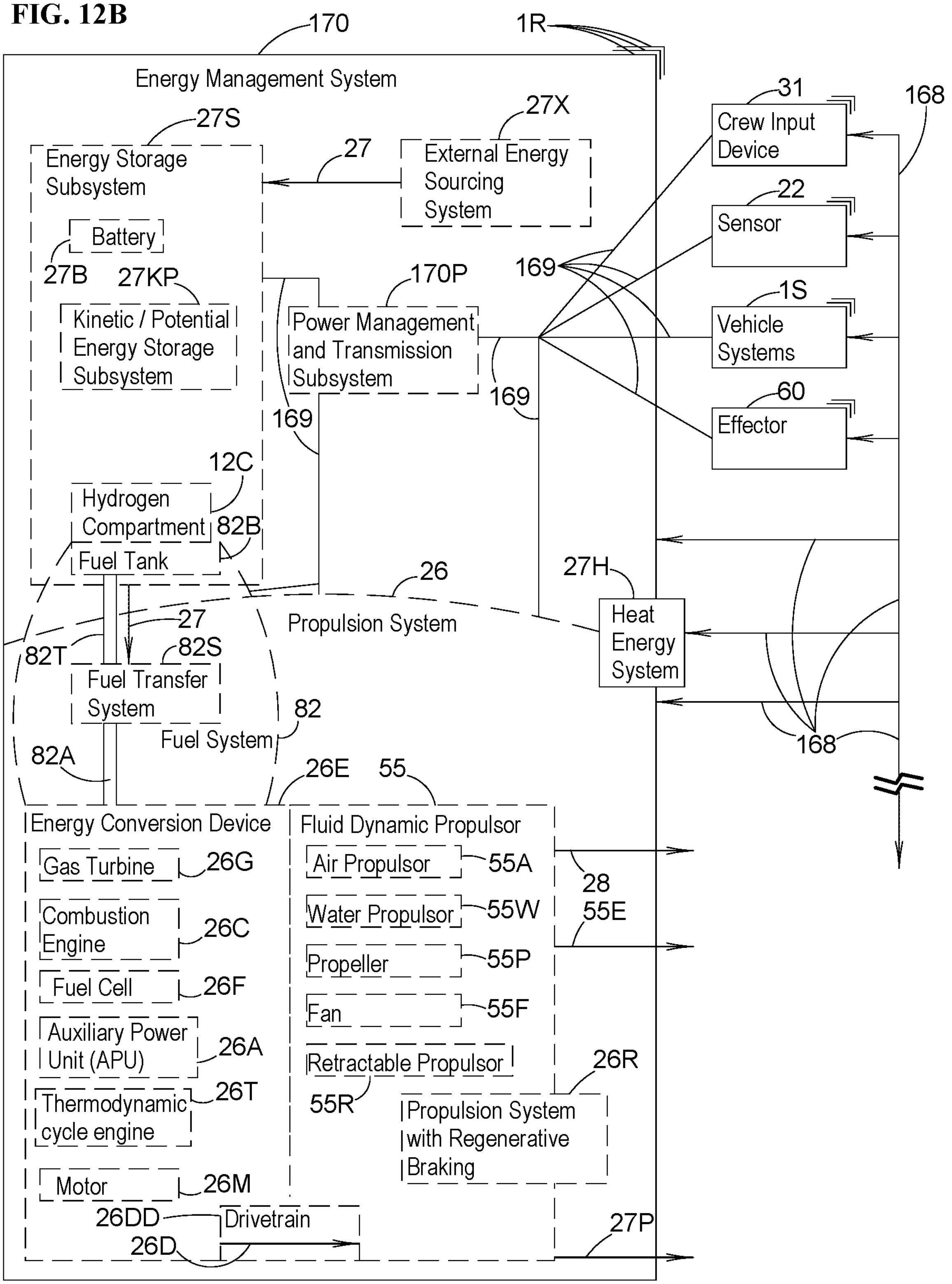

FIG. 12B shows a block diagram of an energy management system 170, similar to that first presented with reference to FIG. 10A. The energy management system 170 is shown with system redundancy 1R with a 3-level redundancy shown as representative but not to be construed as limiting the invention (note that in FIG. 10A the energy management system 170 was shown with a 5-level redundancy of system redundancy 1R, also representative and not to be construed as limiting the invention). The level of redundancy of the illustrated vehicle control and navigation system 29 and also the levels of redundancy of the other boxes shown in FIG. 12B shown with or without redundancy, are all representative and are not to be construed as limiting the invention to specific values of system redundancy (or lack of any redundancy, i.e. a nominal "1-level" redundancy) for any illustrated item. It will be understood that the art and science of redundancy and redundancy management to improve fault tolerance and the ability of a vehicle and its systems to operate normally or with some limitations, following one or more failures of various kinds, is based on well-established precedents in the design of prior art vehicles such as airliners, for example.

The energy management system 170 shown in FIG. 12B includes a propulsion system 26, an external energy sourcing system 27X, an energy storage system 27S, a power management and transmission system 170P and a heat energy system 27H. In a manner consistent to the systems architecture shown earlier in FIG. 10A. FIG. 12B also shows that the energy management system 170 has connections with one or more each of a crew input device 31, sensor 22, effector 60, and plural vehicle systems 1S. Note that the plural vehicle systems notated by 1S in FIG. 12B, should be construed to include all the systems earlier shown in FIG. 10A, including a vehicle control and automatic control system 29, a safety & security system 171, a communication & navigation system 172, a monitoring & alerting system 173, a maintenance & repair system 174 that includes a well-equipped maintenance and repair shop on board as well as trained personnel and robots, a payload services system 175, a crew services system 176, an environmental control system 177, an onboard inventory system 178, an external interfaces system 179, an integration & optimization system 180, a terminal operations system 181, as well as various subsystems. FIG. 12B shows plural connections including data transmission member 168 connections such as databus connections, as well as power transmission member 169 connections such as electrical wire/cable connections but that can also optionally comprise hydraulic connections and/or pneumatic connections. Power transmission members 169 may be run in conduits and/or raceways and/or in a secure passageway accessible for service personnel to enter to perform diagnosis, maintenance, repair and replacement of selected power transmission members 169 as and when needed.

The external energy sourcing system 27X illustrated in FIG. 12B can comprise at least one of (i) solar energy capture elements at or near the skin structure 2K of a partially aerostatically supported ram air cushion ship 1 or PASRACS 1, such as skin integrated photovoltaic members, window integrated photovoltaic members, and window facing solar panels; (ii) solar thermal energy harvesting members; (iii) wind energy harvesting members; (iv) water current energy harvesting members; (v) wave energy harvesting members including "heaving oscillators" as one example; (vi) a skin heat exchanger for getting heat into the vehicle from the surrounding fluid environment (i.e., air and/or water) when desired and for dumping waste heat from the vehicle into the surrounding fluid environment (i.e., air and/or water) when desired; and (vii) means for connecting to an external energy source such as "ground power" and/or fuel and/or hydrogen at a travel origin/destination with a detachable connection to a land supported entity such as pier and/or a water supported entity such as another floating vessel adjacent to the PASRACS 1 where both are floating on a water surface. The external energy sourcing system 27X can also convert some of the sourced energy to chemical energy in hydrogen by use of an onboard electrolyzer, that can also generate supplemental oxygen on board for medical or therapeutic or other uses on board the vehicle.

The energy storage subsystem 27S shown in FIG. 12B is configured to store energy in at least one of (i) a battery 27B capable of storing electrical energy; (ii) a kinetic/potential energy storage subsystem 27KP that can utilize one or more of a flywheel, compressed gas storage, lifted weight gravitational energy storage, and lifted fluid gravitational energy storage by lifting at least one of water, waste, and liquid fuel to a higher elevation tank; (iii) a hydrogen compartment 12C for storing hydrogen containing chemical energy, with either or both of cryogenic liquid hydrogen storage or/and gaseous hydrogen storage as in a lifting gas compartment; and (iv) a fuel tank 82B for storing a fuel containing chemical energy wherein the fuel can be one or more of a biofuel, a fossil fuel, a petroleum based fuel, jet fuel, kerosine, gasoline, diesel fuel, bunker fuel, natural gas, methane, propane, butane, hydrogen, and other fuel.

The power management and transmission subsystem 170P shown in FIG. 12B serves to manage and transmit power through power transmission member 169 connections such as electrical wire/cable connections but that can also optionally comprise hydraulic connections and/or pneumatic connections. The power management and transmission subsystem 170P can include one or more of: (i) a computer for power management control and optimization as well as interfacing with crew and operators, (ii) an electrical substation; (iii) an electric power management system; (iv) a transformer; (v) a rectifier; (vi) a voltage converter; (vii) switches; (viii) relays; (ix) circuit breakers; (x) an inverter; (xi) a charge controller; (xii) a capacitor; (xiii) a circuit switcher; (xiv) a load management and load shedding subsystem; (xv) a control room; and (xvi) a wireless power transmission subsystem. The power management and transmission subsystem 170P will be configured to enable all the various power needs of power users on the PASRACS 1 to be served with appropriate power to meet the power needs while minimizing losses and maximizing efficiencies and cost effectiveness metrics. Electrical outlets and fittings and connectors and adaptors can be provided to service electrical needs of a wide variety of passenger and crew equipment, ranging from PDAs to smartphones to tablets to laptop computers to other computers to audio equipment to video equipment to other electronic equipment to other nonelectronic equipment. Surge protection can be provided where needed. Power conversion subsystems can help deliver power AC or DC, different voltages, different phases, etc and with plugpoints for different types of plugs and USB and other connector interfaces in a modular and upgradable electrical systems architecture.

The propulsion system 26 shown in FIG. 12B includes a fuel transfer system 82S that can transfer fuel 82A (in liquid, gaseous, mixed phase and/or slurry forms) from the fuel tank 82B and/or the hydrogen compartment 12C, to an energy conversion device 26E. For the PASRACS 1 embodiment described in FIGS. 1A through 2F, the fuel transfer system 82S can include piping to transfer fuel from a liquid hydrogen tank 47H in a payload transfer transport module 47 up to either or both a liquid hydrogen tank 12L on board the PASRACS 1 or transitioning by heating and boil-off into a lifting gas enclosure 8 that is a hydrogen enclosure 12E and contains gaseous hydrogen 12 that serves both as a lifting gas and as a fuel that can be pumped via another pipe in the fuel transfer system 82S to the propulsion system and energy conversion devices 26E such as a gas turbine in a turboprop propulsor, for example and without limitation. Inlets for air can provide air from the atmosphere 14 to be used to provide oxygen to a combustor or fuel cell, and the inlets can be fitted with one or more of a birdstrike diverter, a sand separator and an ash separator as options that may be needed depending on environmental conditions that the PASRACS 1 may be anticipated to encounter. Ballonet devices can be used with the hydrogen enclosures 12E to allow hydrogen volume to reduce as some of the gaseous hydrogen is piped out to be used as fuel. The energy conversion device 26E can comprise one or more of a gas turbine 26G; a combustion engine 26C such as an internal combustion engine, external combustion engine, piston engine, wankel engine, spark-ignition engine, compression-ignition or diesel engine, and a thermodynamic cycle engine; a fuel cell 26F; an auxiliary power unit or APU 26A; and a motor 26M such as any number of types and configurations of electric motors, hydraulic motors and air motors without limitation.

The energy conversion device 26E outputs drive energy 26D that can be transmitted by a drivetrain 26DD to a fluid dynamic propulsor 55, as illustrated. The drivetrain 26DD may comprise one or more rotating shafts as well as optional gearing and clutch and control and friction-reducing and lubrication and cooling mechanisms as known from the prior art of drivetrains for transport vehicles such as aircraft and land vehicles.

The fluid-dynamic propulsor 55 shown in FIG. 12B comprises one or more of: (i) an air propulsor 55A that in turn can include one or more of rotating aerodynamic blades, variable pitch blades for performance optimization and reverse thrust, propeller assembly, turboprop assembly, propfan assembly, unducted fan assembly with swept tip blades, ducted fan, augmentor fan assembly, and jet; (ii) a water propulsor 55W that in turn can include one or more of a water propeller, a waterjet, and an azipod thruster; (iii) a propeller 55P; (iv) a fan 55F that may be a ducted fan or unducted fan; (v) a retractable propulsor 55R that can be retracted to reduce vehicle drag for flight phases when it is not needed; and a propulsion system with regenerative braking 26R. As illustrated, the fluid-dynamic propulsor 55 outputs an energized flow 55E and generates a thrust force 28 acting on the PASRACS 1.

A hybrid architecture that combines some combination of different energy conversion devices 26E and fluid dynamic propulsors 55 can be highly beneficial in meeting propulsion thrust needs for different phases of operation as well as vehicle internal energy needs, in a highly efficient and economical and environmentally friendly way. As one example, the PASRACS 1 earlier described with reference to FIGS. 1A through 2F can use some propulsor units driving air propulsors such as propellers or fans, with gas turbines that burn hydrogen as well as biofuels; plus more than one APU that use either combustion or fuel cell methods to convert hydrogen chemical energy to electrical energy for vehicle internal use as well as propulsive use; some propulsor units using electric motors driving water propulsors such as optionally retractable azipod thrusters that enable precise thrust and maneuvering control on a water surface; and some propulsor units driving air propulsors such as propellers or fans with motors that are electric motor generators, and enable regenerative braking and recapture of vehicle kinetic energy back into electric energy by putting the blade pitch of the air propulsors into a energy harvesting mode when the vehicle is decelerating and landing, and the air propulsors work effectively as wind turbines and the motors that drive them act as generators in this mode. This therefore represents an example of the illustrated propulsion system with regenerative braking 26R that is illustrated in FIG. 12B.

The heat energy system 27H illustrated in FIG. 12B is a system that spans different areas of the energy management system 170, the propulsion system 26, and also is closely connected to and integrated with heating and refrigeration elements of vehicle systems on the PASRACS 1, such as the environmental control system 177 and thermal management system 177T described earlier in the context of FIG. 10E. The heat energy system 27H can also provide useable heat energy to galleys and cooking facilities, hot water for showers, onboard water purification systems that utilize one or more of thermal desalination, distillation, condensation, and rainwater collection. The heat energy system 27H can also contribute to refrigeration, cabin air conditioning, equipment cooling, refrigerated container cooling and other cooling applications on board. The heat energy system 27H can leverage and utilize a great many heating, cooling and thermal management technologies and features that are well known in the prior art of heating, cooling and thermal management in vehicles and buildings.

FIG. 12B in conjunction with FIGS. 1A-G, further illustrate a partially aerostatically supported ram air cushion ship 1, wherein said lifting gas 9 includes hydrogen 12 in a hydrogen gas compartment 12C, and further comprising a fuel system 82 with a fuel transfer pipe 82T configured to transfer some of said hydrogen 12 from said hydrogen gas compartment 12C to said propulsion system 26, and wherein said propulsion system 26 is configured to use some of said hydrogen 12 serving as a source of at least one of chemical energy 27C and electrochemical energy 27EC feeding as energy 27 into said propulsion system 26 that is usefully converted by said propulsion system 26 to propulsive energy 27P by operating at least one of a gas turbine 26G, a combustion engine 26C, a thermodynamic cycle engine 26T and a fuel cell 26F.

FIG. 12B in conjunction with FIGS. 1A-G, also show a partially aerostatically supported ram air cushion ship 1, wherein the total volume of lifting gas on board the partially aerostatically supported ram air cushion ship, exceeds 50,000 cubic meters. FIG. 12B in conjunction with FIGS. 1A-G, also show a partially aerostatically supported ram air cushion ship 1, wherein said chemical energy is at least one of energy from liquid hydrogen, energy from boiling hydrogen, energy from gaseous hydrogen, and electrochemical energy.

Figure 12C:
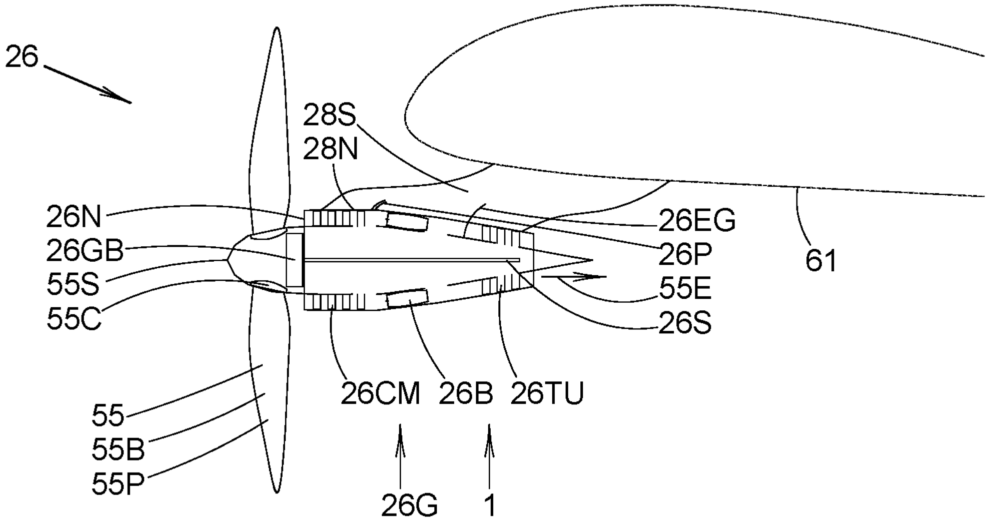

FIG. 12C shows a side sectional view of a preferred propulsion system 26 that can be applied on a partially aerostatically supported ram air cushion ship or PASRACS 1 such as the embodiment earlier described with reference to FIGS. 1A through 2F. The propulsion system 26 here comprises a gas turbine 26G in a propulsor nacelle 28N that is supported under a wing 61 by means of a structure comprising a propulsor strut 28S. The gas turbine 26G includes a compressor 26CM that receives air from a propulsor intake 26N and compresses the air, which then flows to a combustor 26B where it is combined with fuel (which may optionally be hydrogen or a hydrocarbon fuel such as a biofuel such as biodiesel or biomethane or biogas, without limitation) and ignited to create a combustion chemical reaction in said combustor 26B, and the high pressure, high temperature outflow from the combustor 26B then flows through and drives a turbine 26TU that can have multiple stages, and the power extracted from the pressurized flow by the turbine 26TU can then be sent via at least one shaft 26S to provide power to said compressor 26SM, as well as power through an optional gearbox 26GB to a fluid dynamic propulsor 55 that here comprises a propeller 55P with plural rotating shaped aerodynamic propulsor blades 55B. The propeller 55P is fitted with a central drag reducing aerodynamic fairing in front of it that serves as a spinner 55S. The pitch of the propulsor blades 55B can be changed by blade angle control 55C at the root of each blade, wherein the blade angle control can be energized by hydraulic energy or electrical energy or pneumatic energy in different variant embodiments. Power produced by the gas turbine 26G is used in major part to generate thrust through both jet thrust from energized flow 55E as shown and thrust from the fluid dynamic propulsor 55, while a portion of power produced by the gas turbine 26G can also be output to a pressurized air extraction subsystem 26P (sometimes also called a bleed subsystem) and a portion of the power produced by the gas turbine 26G can also be output to a propulsor electrical generator 26G to provide some electrical power into a vehicle electric system or electric grid on board the PASRACS 1. While the illustrated gas turbine 26G is shown installed in a nacelle connected to a wing 61, it should be understood that gas turbine(s) 26G can also be connected to and supported by other parts of the PASRACS 1, including but not limited to the body 3.

Figure 12D:
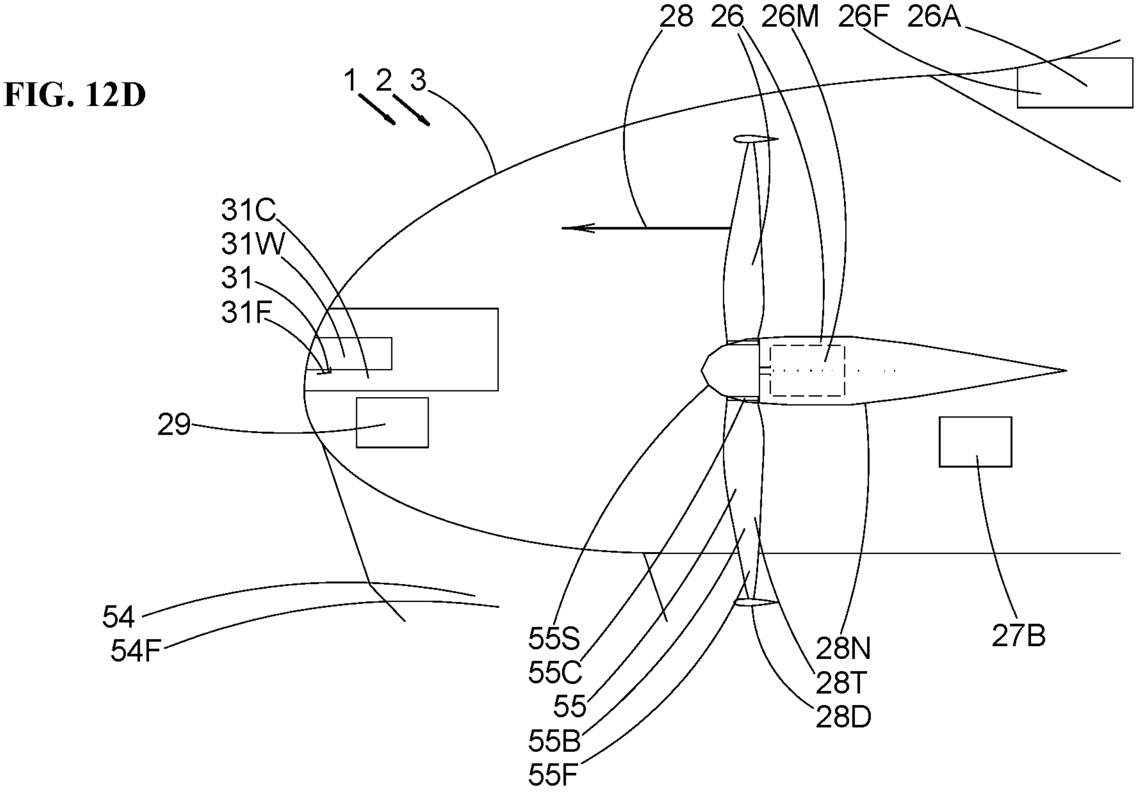

FIG. 12D shows a side view of a preferred propulsion system 26 that can be applied on a partially aerostatically supported ram air cushion ship or PASRACS 1 such as the embodiment earlier described with reference to FIGS. 1A through 2F. The propulsion system 26 here comprises a motor 26M in a propulsor nacelle 28N that is supported from the body 3 of the PASRACS 1 by means of ship structure 2 comprising a propulsor strut that is not visible in this view. The propulsion system 26 is shown in the forward part of a PASRACS 1 that here also includes a hull 54 that is a forward hull 54F, a flight deck 31C, a flight deck window 31W, a crew interface device 31F that is a crew input device 31 such as the illustrated slider wheel for pitch and roll command inputs from a pilot, and a vehicle control and automatic control system 29. Note that crew interface devices 31F can include a wide variety of devices and systems and subsystems known from the art of vehicles and their interfaces with crew, such as knobs, switches, levers, sliders, controllers, control columns, control wheels, control sticks, side sticks, displays, heads-up display, instruments, data displays, camera view display, virtual reality (VR) display, augmented vision display, synthetic vision display, tactile interface devices, visual interface devices, aural interface devices, advisory & caution & warning devices, eye-tracking and facial understanding devices and other interface devices, systems and subsystems. Note that multipurpose or multimode or multiuse controllers may be provided, that serve different control functions in different modes of operation of the PASRACS 1, such as a water taxi mode vs a flight in ground effect mode for example. The motor 26M can be a motor powered by electricity, of any of a great many types of electric motors known from the art and technology of electric motors. For example and without limitation, the motor 26M can be a DC motor, an AC motor, a synchronous motor, an asynchronous motor, a motor with a permanent magnet such as a PMDC motor, a motor with an electromagnet, a motor with an armature, a compound wound motor, an induction motor such as an asynchronous induction motor, a motor with brushes, a brushless motor, a separately excited motor or electrically excited synchronous motor, a motor with integrated cooling, a stepper motor, a direct drive motor, a gear motor, an electrostatic motor, a piezoelectric motor, a reluctance motor, a universal motor, and an ultra-light weight integrated electric motor and power electronics package. Electricity for the motor 26M can come via power wiring (not shown) from an auxiliary power unit (APU) 26A, a fuel cell 26F, and/or a battery 27B. The APU can optionally be a fuel cell APU that uses hydrogen fuel, and can optionally also charge the battery 27B. The motor 26M drives a fluid dynamic propulsor 55 that is a thruster 28T that here includes a fan 55F that is in a ring-fan configuration with plural propulsor blades 55B and a propulsor duct 28D that is a short chord spinning duct supported by the tips of the fan blades in this particular preferred embodiment. The fluid dynamic propulsor 55 is also fitted with blade angle control 55C and a spinner 55S, as shown. While the particular ducted fan shown is a ring-fan with a spinning duct, it should be understood that variant embodiments with ducted fans can use a wide variety of ducted fan configurations with fixed or spinning ducts, with varying bypass ratios and varying duct geometries and chords. Ducted fans, turbofans, geared turbofans, and augmentor fans are all possible for variant embodiments of propulsors. While no gearing is shown in FIG. 12D, it should be understood that varying embodiments can use either direct drive or drive through a gear, a gearbox or a geartrain to enable optimized rotation speeds of RPM for the fan 55F as well as for the motor 26M, with optimization for energy use, efficiency, cost and/or other objective functions as known in the art.

Figure 12E:
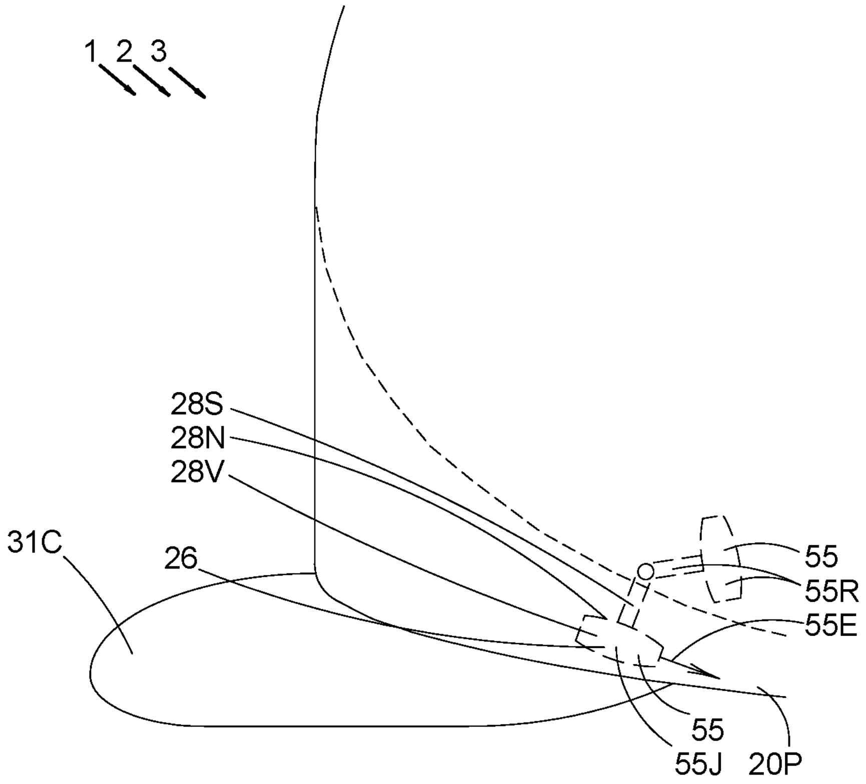

FIG. 12E shows a side view of a preferred propulsion system 26 that can be applied on a partially aerostatically supported ram air cushion ship or PASRACS 1 such as the embodiment earlier described with reference to FIGS. 1A through 2F. The propulsion system 26 here comprises a fluid dynamic propulsor 55 that is a jet propulsor 55J such as a turbojet or turbofan for example, that is also a retractable propulsor 55R as shown in the secondary or retracted configuration. A deployment and retraction system can utilize a variety of known actuation types including hydraulic and electrical actuation for deployment and retraction of the propulsor module that includes the jet propulsor 55J in a nacelle 28N on a movable propulsor strut 28S connecting to the PASRACS 1 and ship structure 2 in the body 3; as well as deployment and retraction of propulsor well cover doors (not shown, but similar to wheel well doors in prior art aircraft). When deployed, the jet propulsor 55J can act also as a vectored thrust propulsor 28V, by producing an energized flow 55E that can flow both backward and downward to generate thrust and contribute a lift increment, with this energized flow 55E also helping to pressurize a power augmented ram air cushion 20P as shown, with direct effect through the jet efflux and an optional secondary effect where hot jet exhaust converts some water from a water surface below into steam and adds further to the pressurization of the power augmented ram air cushion 20P. The propulsion system 26 is shown in the forward part of a PASRACS 1 behind the flight deck 31C and beneath a lifting portion of the body 3 that is not far from the body centerline.

Figure 12F:
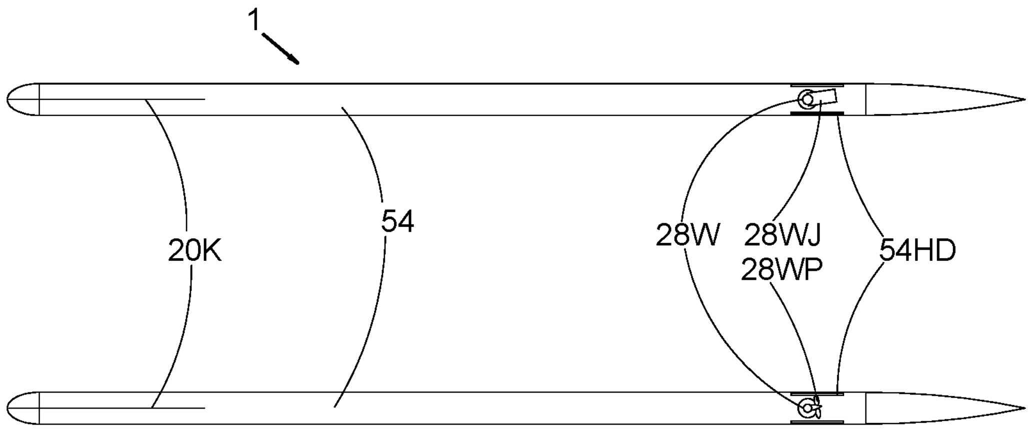

FIG. 12F shows a bottom view of hulls 54 of a PASRACS vehicle 1, with two hulls illustrated but not to be construed as limiting. Keels 20K are shown at the front ends of the hulls. FIG. 12F shows a portion of the vehicle propulsion system that utilizes propulsor subsystems that operate on water. More specifically FIG. 12F shows controllable water thrusters 28W such as azipod thrusters that can provide azimuth controllable vectored thrust using one or both of a waterjet 28WJ and a water propeller 28WP, as shown. Other classes of water propulsors can also be used. Hull doors 54HD are shown that allow the water thrusters 28W to be deployed downward as shown, or retracted upward into the hulls 54 after which the hull doors 54HD can be closed to a configuration with reduced drag, such as for a flight mode. The design and operation of the hull doors 54HD can use design and operation precedents for wheel well doors in the hulls of prior art amphibious aircraft.

While FIGS. 12A through 12F show inventive features of some preferred embodiments of the invention as pertaining to propulsion systems and interfaces, it should be understood that many variations and combinations are possible within the spirit and scope of the invention as claimed. Using propulsion architectures that combine propulsors of different classes in different numbers, integrated and optimized solutions can be crafted with high fault tolerance through redundancy and redundancy management, and optimized applications of different elements in a manner that can reduce energy consumption, increase efficiency, reduce operating cost, and maximize specified objective functions.

Figure 13A:
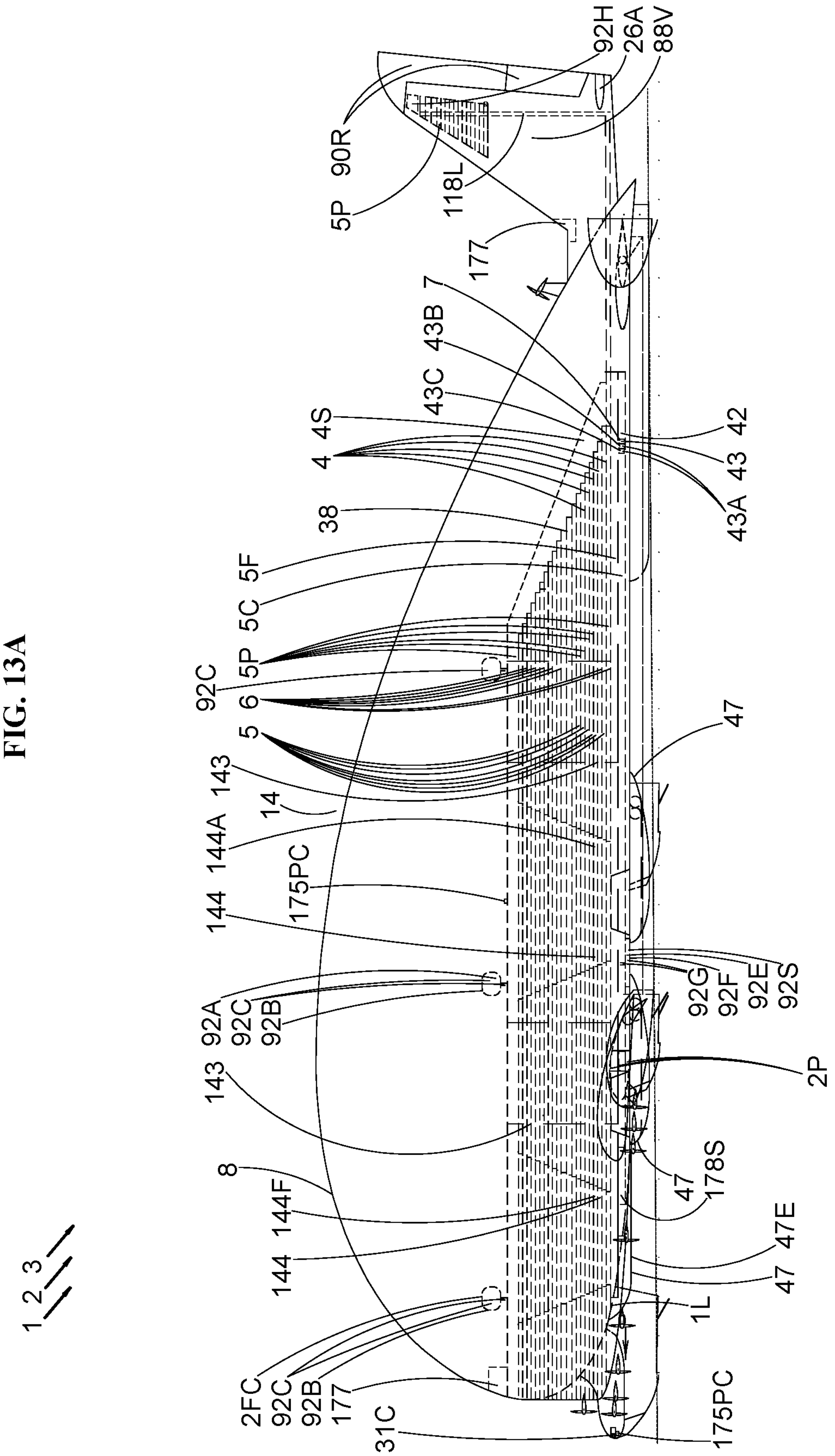
FIGS. 13A through 13C illustrate some alternate preferred payloads architectures and features that can be applied on a partially aerostatically supported air cushion ship.
Figure 13B:
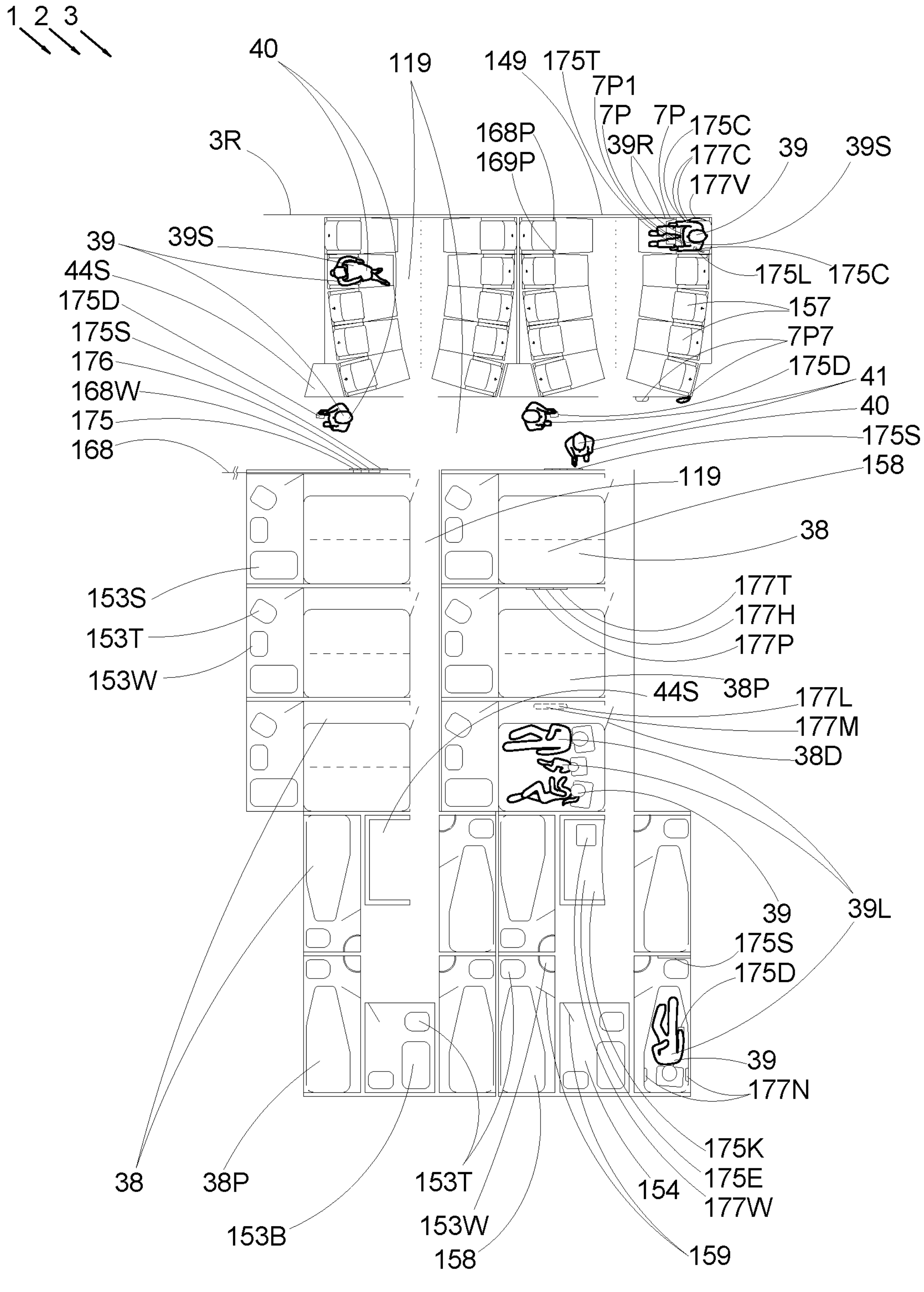
Figure 13C:
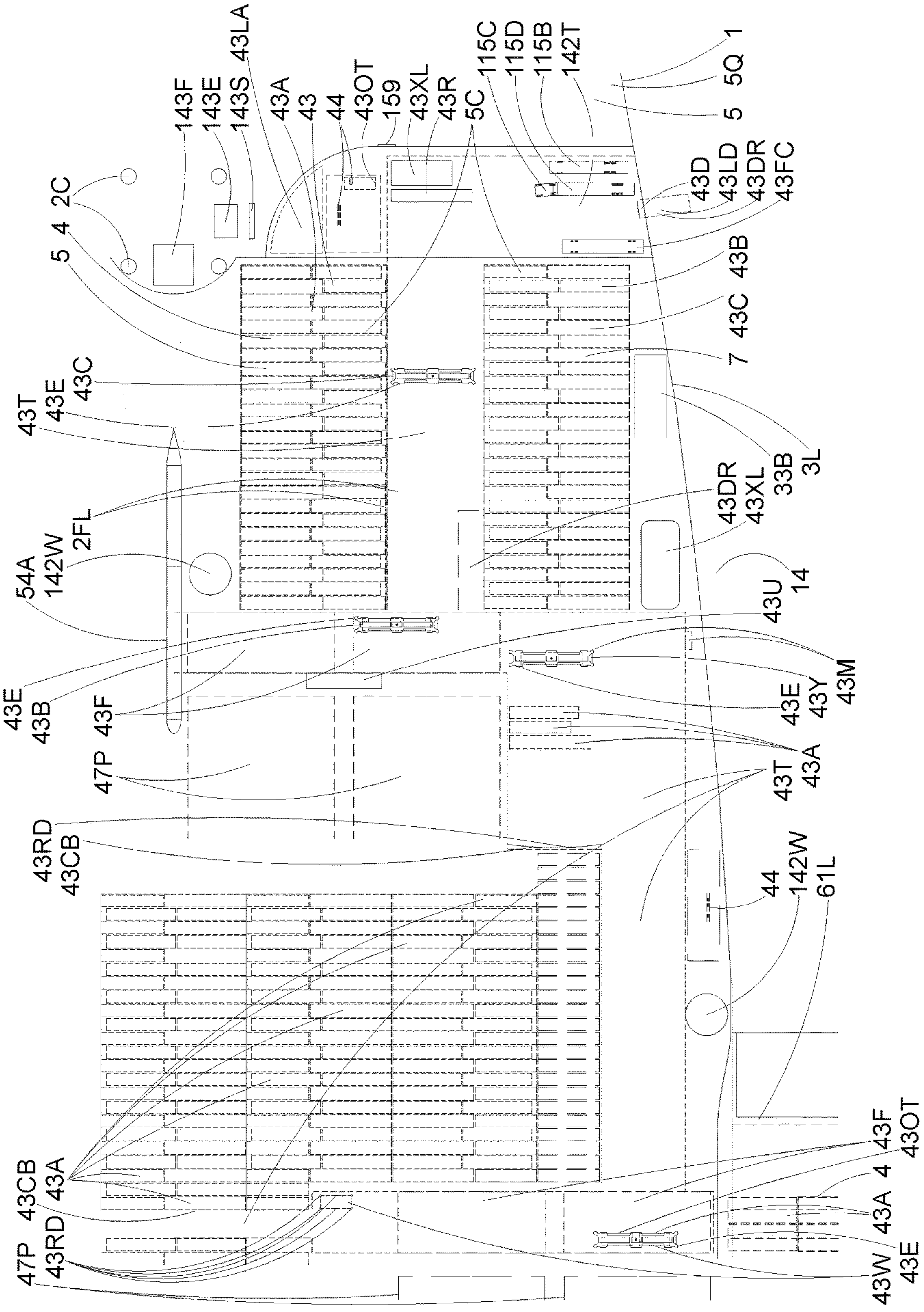

FIGS. 13A through 13C illustrate some alternate preferred payloads architectures and features that can be applied on a partially aerostatically supported air cushion ship, complementing the inventive material on a Payload Services System 175 earlier presented with reference to FIG. 10D, which Payload Services System 175 is also connected to many other systems on the PASRACS 1 through a data transmission member 168 such as a databus or system of plural databuses, such as nonessential, essential and critical databuses known in the prior art of commercial airliners. The payload services system 175 should preferably provide collective and individualized services to passengers, with services including reservations, orders, crowd and queue management, customized items delivery using robots, and other assorted services.

FIG. 13A illustrates some preferred payloads architectures and features in a preferred embodiment of the invention corresponding to that described earlier in the context of FIG. 1A.

FIG. 13A shows payload volume 4 that includes decks 5 at levels 6, with the decks 5 including a people deck 5P, flexible use deck 5F, and cargo deck 5C. The cargo volume 42 portion of the payload volume 4, includes space and provisions suitable for carriage and internal movement of cargo 43 including cargo containers 43A such as Unit Load Devices or ULDs, with specific examples without limitation including a 45 ft (optional high cube) container 43B and a 53 ft (optional high cube) container 43C. FIG. 13A also shows an onboard storage facility 178S at a bottom region level in the PASRACS 1, laterally spaced from the forward lower-level volume occupied by the emergency evacuation barges 47E. The onboard storage facility 178S can store a wide variety of goods that are tracked in an onboard inventory system 178, and can include any combination of consumables and nonconsumables and perishable and nonperishable goods, and can optionally include refrigerated and frozen and heated storage as well. While separate areas would typically be provided for pet and live animal carriage as described elsewhere, the onboard storage facility 178S can also optionally include a designated and segregated volume with HVAC, water, waste management and food facilities for the healthy, happy, and humane transport of pets and/or live animals of any kind. FIG. 13A also illustrates fluid containment structures 2FC including potable water tanks 92B of a potable water system 92C, shown at locations above the payload decks so that potable water 92A can flow by gravity feed through a piping system to amenities using water in the payload decks, including kitchens, baths, showers, toilets, sinks, humidifiers and other amenities without limitation. One or more of the potable water tanks 92B can be for hot water, with a hot water tank 92H shown above passenger or people decks 5P in a vertical stabilizer 88V as one example location, not to be construed as limiting. The hot water tank 92H in the illustrated vertical stabilizer 88V location can benefit from heat sourced from waste heat associated with the near-by auxiliary power unit (APU) 26A. An environmental control system (ECS) 177 is shown at a forward location on the PASRACS 1, as one preferred location that is not to be construed to be limiting. The ECS provides heating, ventilation and air conditioning as known from the prior art of environmental control systems in vehicles and in buildings, and can include an air intake port/valve, an outflow valve, a heater, a chiller or refrigerator, a heat pump, an internal heat exchanger, a heat transfer subsystem connected to a liquid hydrogen cryogenic cooling and boiloff control subsystem, a skin heat exchanger, a heated air reservoir, a cooled air reservoir, ducting for air including optional separate ducting for heated and cooled air, air outlet tubes feeding personal air outlets such as "gasper" outlets used on airliners and options for temperature controlled air outlets that mix air in desired proportions from heated air and cooled air sources, a recirculated air cleaning subsystem (with at least one of a filter, a HEPA filter, a membrane filter, and an UV radiation sanitizer), a fresh air and recirculated air blending and management system, and a zonal climate control subsystem for different people (passengers, crew) and cargo payload volumes 4 in the PASRACS 1. Specific cabin areas may be set a higher or lower temperatures, and/or higher or lower humidity levels, and/or higher or lower oxygen levels, for various purposes serving passenger, crew, animals, plants and/or other payload or equipment purposes, within the spirit and scope of the invention. FIG. 13A also illustrates a waste system 92G wherein waste from the payload areas can be transported by gravity feed and/or powered feed into at least one waste tank 92F suitable for collecting liquid waste 92E as well as solid waste 92S that can settle in the bottom of the tank in an manner analogous to septic tank precedents. It should be understood that separate tanks or compartments can optionally be provided for liquid waste, solid waste, and garbage (which can also optionally feed through garbage chutes, optionally following garbage volume reduction by trash compactor subsystems on board). Laundry chutes can optionally be provided as well, leading to lower deck laundry facilities such as a laundromat area and/or a self-service laundry area. A payload systems computer 175PC is shown below the illustrated flight deck/cockpit 31C. It should be noted that multiple payload systems computers and locations are possible, along with multiple interface locations and types for different categories of crew and passengers (e.g., a flight deck interface, cabin crew interface such as a purser station interface, a passenger touchscreen interface, a control device interface, and a voice recognition interface, without limitation).

FIG. 13B shows an expanded plan view of some preferred payloads architectures and features shown in a cabin area of a preferred embodiment earlier described with reference to FIG. 2D and FIG. 2C, rotated 90 degrees and scaled up from FIG. 2D to provide improved clarity. FIG. 13B shows examples of persons 39 such as a passenger 40 and a member of crew 41 using a Personal Digital Assistant (or PDA) 175D. The PDA 175D can be a smartphone, remote control for a display, tablet, laptop, or other computer and/or electronic and/or touchscreen and/or voice-actuated and/or thought-activated device that has a human user interface and computational capability as known in the prior art. The PDA 175D may incorporate data storage and/or expert system and/or artificial intelligence features, ability to interface with RFID tags or smart tags on items such as luggage and other items, as well as ability to communicate through a wireless communications subsystem 168W such as a wireless mesh router that provides wireless data & internet connectivity, encryption and cybersecurity features, Wi-Fi access to social media and apps (Facebook, LinkedIn, game apps, passengers and crew interpersonal or subgroup communications as examples without limitation), and connectivity with one or more of the payload services system 175, crew services system 176 and other computer systems connected to a databus type of data transmission member 168. FIG. 13B also shows a power connection port 169P such as a plug outlet and a data connection port 168P such as a USB interface, that can be accessed and used by persons such as passengers and crew. FIG. 13B illustrates occupant restraint 39 as an example of a payload protection member 7P, with both a safety belt 7P1 and an inflatable safety member 7P2 such as an (stowed & undeployed) airbag shown. FIG. 13B also shows the provision of hold members 7P7 such as handhold/railing/strap items that are illustrated for use by a person to steady themselves while in turbulence or maneuvering conditions. Variant embodiments of PASRACS 1 may provide one or more of: seat belts, bed belts, multi-point harnesses, and airbags. FIG. 13B also illustrates a tray table 175T that can be a fold-out tray table or passenger-usable surface of a variety of types known from the prior art of airliners and other passenger transport vehicles. A standing member of the crew 41 is also shown facing and interfacing with a surface mounted interface device 175S, with a wall mounted device shown as one example. FIG. 13B also illustrates individual comfort & services system 175C including personal control lighting 175L (such as a personal reading light) and controllable air outlet 177C with separately controllable warm air and cool air outlets shown, as connected to a ventilation subsystem 177V. FIG. 13B also illustrates a payload volume such as a private cabin 38P equipped with a thermal management subsystem 177T (for heating or cooling of the cabin to a selectable temperature or range of temperatures), a humidity management subsystem that can control humidity with humidifier and/or dehumidifier devices, and a purification subsystem 177P that can purify one or more of air and water, using technologies such as filtration, HEPA filter, UV purification, ionic purification and chemical purification without limitation. FIG. 13B also shows a cabin with a lighting subsystem 177L which optionally serves to provide mood lighting with color control 177M, that is controllable by a user using a device like a switch or knob or remote control from a remote controller or an app on a smartphone, without limitation. FIG. 13B also illustrates a noise management subsystem 177N, that can help control the noise environment experienced by a person 39 on board a PASRACS 1 by one or more of noise insulation, noise attenuation design of structure and systems and amenities, active noise cancellation such as the use of speakers fed with noise cancelling signals in a micro-environment close to the head of a person 39 such as the illustrated reclining/sleeping person. The noise management subsystem may also provide white noise or soothing sounds or sleep facilitating music in variant embodiments of the invention.

FIG. 13B also illustrates a kitchenette 175K that can include more than one selected from a refrigerator, a freezer, a microwave oven, a toaster oven, a toaster, a coffeemaker, a sink with faucet, a water dispenser, a trolley/cart, a robotic self-powered trolley, serving items, cutlery and other items. The kitchenette 175K is a part of an eating & drinking services system 175E. A water quality enhancement system 177W can comprise at least one of a filter, a UV purification device and a chemical purification subsystem.

FIG. 13C shows an expanded plan view of some preferred payloads architectures and features shown in a deck level including a cargo deck area, of a preferred embodiment of the invention earlier described with reference to FIG. 2A. The deck 5 includes a cargo deck 5C and crew quarters 5Q, with a connecting door 159 that is preferably secure and access-controlled. A cargo management system 43M is provided, that includes multiple subsystems and components. The cargo management system 43M includes one or more cargo cranes 43E that can be part of an overhead crane system, for example similar to factory overhead cranes systems that can move articles to different locations in two-axes, after lifting them from a supporting surface such as a cargo floor. FIG. 13C shows representative examples of cargo cranes 43E that carry a cargo container 43A that can optionally be a high cube cargo container, a 45 ft (optional high cube) cargo container 43B, a 53 ft (optional high cube) cargo container 43C, an open top cargo carrier 43OT (such as a bin or pallet base for supporting cargo or baggage, with optional net or cover on top), a 20 ft (optional high cube) cargo container 43W and a 40 ft (optional high cube) cargo container 43Y. At the start of a travel leg of a PASRACS 1 traveling from an origin, cargo containers can be engaged by combinations of cables, winches, robotic arms, quick-attach and quick-release fittings and other engagement components and assemblies, then picked up from payload transfer transport modules 47 suspended below the PASRACS 1 (below the illustrated deck so not seen in this view), then lifted up through a cargo transfer floor opening 43F to the illustrated deck by a cargo crane 43E, then moved in a lifted configuration through cargo transport corridor areas 43T that are also shown in FIG. 13C. The cargo containers/cargo carriers can then be deposited at designated locations in the payload volume 4 and cargo deck 5C as shown, and set down on floor structure 2FL such as a cargo floor designed to support and react cargo loads for a variety of loading conditions. The cargo containers/cargo carriers can optionally be restrained/locked in place either individually or collectively in some grouping(s). Individual container restraint is shown with cargo restraint devices 43RD such as locks and stops known in aircraft cargo restraint fittings, shown engaging a 20 ft (optionally high cube) container 43W. FIG. 13C also illustrates examples of non-individual container restraint utilizing a cargo restraint device 43RD that is a cargo barrier 43CB. Note that a cargo barrier 43CB can be at least one of a rigid barrier and a barrier with flexibility such as a cargo net and/or energy absorbing barrier. When cargo containers need to be offloaded at a destination the above-described process of transporting a cargo container from a payload transfer transport module 47 is reversed to a process of transporting a container to a payload transfer transport module by a cargo crane 43E, then winching down the container through said cargo transfer floor opening 43F. For the case of passenger's and/or crew baggage 44, some baggage can be transported in a manner similar to the cargo containers, but in open top cargo carriers 43OT such as cargo bins or wheeled cargo bins or pallet bases, that can also be transported by cargo cranes 43E.

An autonomous flatbed carrier 43FC is shown, that can be used as an option to carry cargo and/or baggage within the PASRACS 1, and can also access the payload transfer transport module 47 below through a downwardly deployed deployable ramp 43DR, and can further access a dock or vessel (not shown) outside the PASRACS 1 through another deployable ramp 43DR shown in the body left side surface 3L. The autonomous flatbed carrier 43FC can optionally be an ultra-lowrider flatbed truck with a container loading and manipulation subsystem.

The deployable ramps 43DR may be fitted powered roller, roller tray, and/or winch members to facilitate cargo loading and unloading, as known in the art of aircraft cargo handling systems. The latter deployable ramp 43DR in the body left side surface 3L may have a ramp structure integrated with a cargo door 43D or separate from the cargo door 43D; wherein the cargo door 43D may be hinged on the bottom, side or top in variant embodiments of the invention. The deployable ramp(s) 43DR serve as cargo loading device(s) 43LD, and may also be usable by at least one of a bus 115B, truck 115C and trailer 115D, that are shown in a vehicle parking area 142T in FIG. 13C.

The illustrated cargo cranes 43E can utilize a variety of lifting, locking and moving mechanisms as known in the art of crane technology. Tracks on which overhead cranes can run are not shown, but it should be understood that methods of ceiling-structure-hung tracks along with branches, curves, and switches are known from the prior art of overhead crane systems such as factory crane systems. Optional features can include one or more of: top corner lifts with spreaders, top corner lifts without spreaders, container lifting jacks, gantry cranes, straddle carriers, reach stackers, side loaders, fork-lifts and truck cranes.

In addition to standard size containers or Unit Load Devices, FIG. 13C shows that the PASRACS 1 can carry a refrigerated container 43R with fittings that can be connected to provide power and/or cooling fluid to the refrigerated container 43R from ship's systems, and oversize cargo 43XL that can either (i) be transported to a holding area (shown) by a cargo crane 43E or an autonomous flatbed carrier 43FC, or (ii) be retained on a payload transfer transport module 47 for the duration of its journey.

FIG. 13C also illustrates an umbilicals connection subsystem 43U that allows connection of a variety of umbilicals or connections with secure and quick-connect/quick-disconnect fittings for conveying a plurality selected from: electric power, signals, hydraulic power, pneumatic power, potable water, waste from a waste container 142W, hydrogen, fuel, lifting gas, and other conveyables, between the PASRACS 1 and a payload transfer transport module 47 connectedly suspended below. The umbilicals connection subsystem 43U can utilize prior technologies used for aircraft, ships and other vehicles.

FIG. 13C also illustrates a ballast subsystem 33B that can use liquid or solid ballast, as well as integrate a load management and cg control capability that involves moving cargo containers with different weights to different locations in the cargo deck.

FIG. 13C also shows a live animal accommodation area 43LA, that is also accessible by authorized personnel (crew, animal keepers who feed and serve the animals with health and comfort measures etc., and selected passengers such as pet owners as applicable). Live animal carriage should aspire to provide high standards for animal health, welfare, comfort and care. Provisions in the live animal accommodation area 43LA can include one or more from: a dog area, a cat area, a pet animals area, a pet area with access for pet owners, a passenger plus pet private cabin, a pet walking area, pet sanitation provisions for pet urine and fecal matter collection and sanitary disposition, a veterinary services area with at least one of a human an a robotic veterinary service provider and appropriate facility and equipment, pet telehealth provisions, water provisions for pets, food provision for pets, pet toys, and pet health and wellness services for physical and mental well-being of pets. Provisions for non-pet animals and marine animals and fish and flying animals and birds on board can similarly be provided for all the categories noted in the pet provisions above. Special provisions can also be provided on board a PASRACS 1 for live organ transport and other medical transport special purposes. Animal harming or killing on board should preferably be prohibited for ethical reasons. The live animal accommodation area can also optionally accommodate live plants, or alternatively separate life plant accommodation area(s) can be provided within the spirit and scope of the invention.

FIG. 13C also shows openings 47P for passenger tower portions of payload transfer transport modules 47 to project through the illustrated deck to next upper deck (that was earlier described with reference to FIG. 2B). The passenger tower portions can also allow for some baggage 44 to go up to the next upper deck, as shown and described earlier with reference to FIG. 2B.

FIGS. 14A through 14E illustrate some alternate preferred methods of operation that can be applied for normal and nonnormal operations of a partially aerostatically supported air cushion ship 1, complementing the transport method aspects already described with reference to FIGS. 8A through 8E and the vehicle aspects already described, including of the preferred embodiment of a PASRACS 1 described with reference to FIGS. 1A-1G and 2A-2F.

Figure 14A:
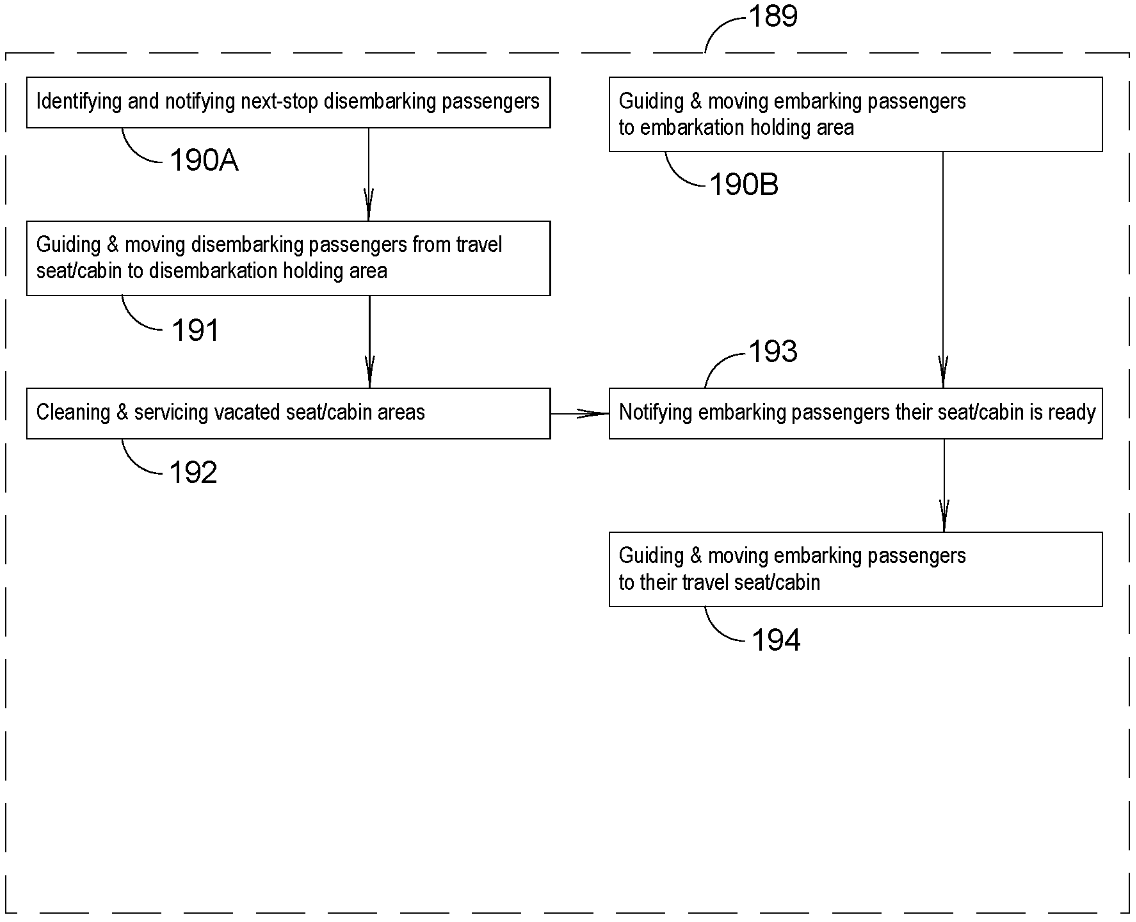

FIG. 14A illustrates a preferred method of seamlessly swapping incoming and outgoing payload 189 on a travel leg of a PASRACS 1, in normal operation.

As shown in FIG. 14A, the first steps of this method 189, that may be concurrent or at similar timings within a modest window of time, comprise the two steps of:

190A—Identifying and notifying next-stop disembarking passengers, and

190B—Guiding & moving embarking passengers to embarkation holding area.

The subsequent steps for this method 189 comprise the following steps in sequence:

191—Guiding & moving disembarking passengers from travel seat/cabin to disembarkation holding area

192—Cleaning & servicing vacated seat/cabin areas

193—Notifying embarking passengers their seat/cabin is ready, and

194—Guiding & moving embarking passengers to their travel seat/cabin.

Figure 14B:
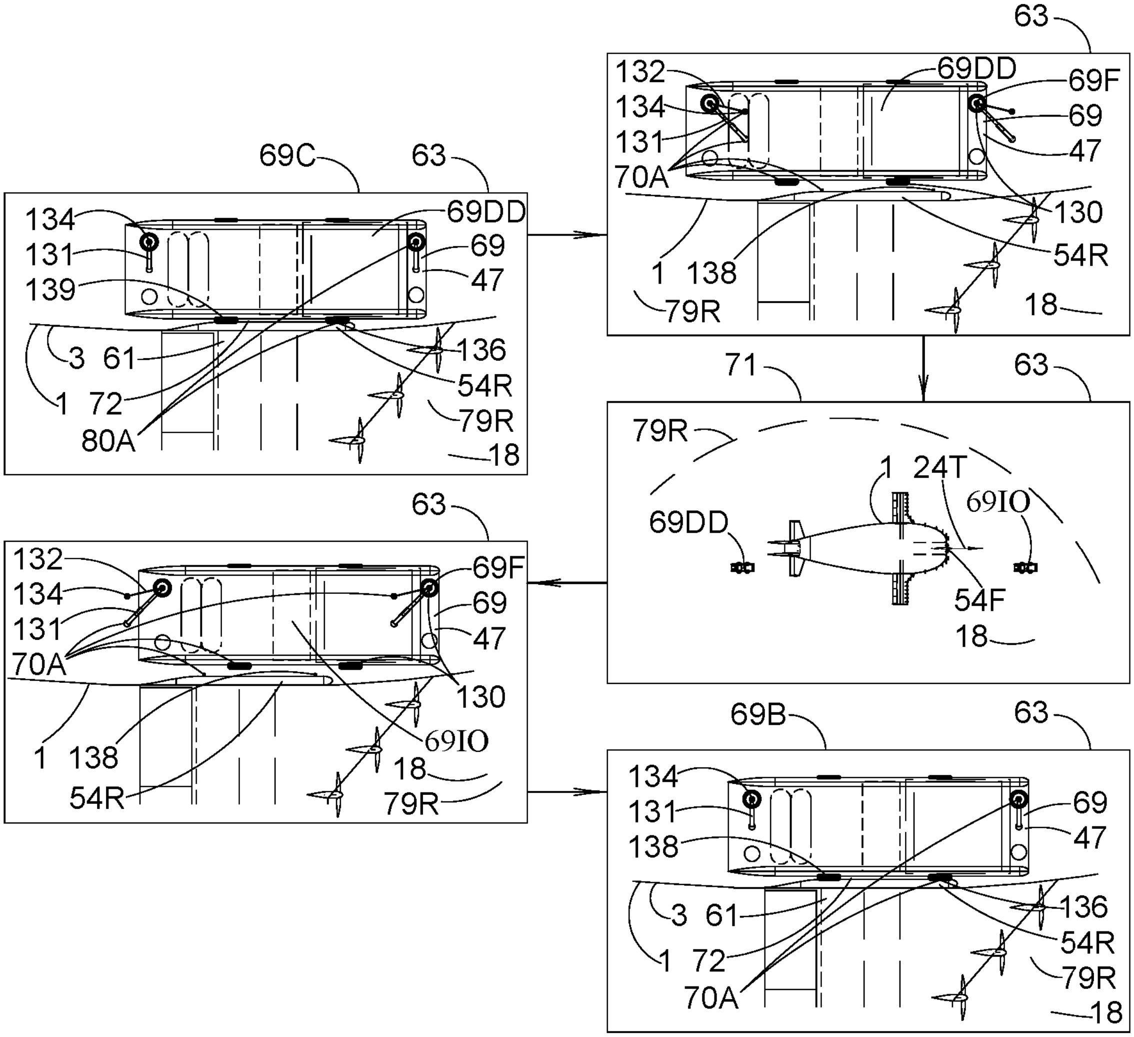

FIG. 14B illustrates a transport method 63 that includes a preferred method of operation that can be applied for normal operations of a partially aerostatically supported air cushion ship 1 or PASRACS 1, wherein the PASRACS 1 from an inbound travel leg arrives at a port region 79R with a water surface 18, and in that port region 79R a transfer vehicle 69 that is a transfer vehicle departing to destination 69DD, unmates from the PASRACS 1 and then moves to an arrival facility such as an arrival gate at a dock to enable disembarking payload from the PASRACS 1 (passengers and cargo from the inbound travel leg) to disembark to their destination; with the PASRACS 1 then moving appropriately on the water surface 18 to rendezvous with a transfer vehicle 69 that is a transfer vehicle incoming from origin 6910, which then mates with the PASRACS 1 to enable embarking payload to the PASRACS 1 (passengers and cargo starting on the outbound travel leg) to then board the PASRACS 1 for outbound travel leg from the illustrated port region 79R. Note that the port region 76R typically serves one or more particular habited areas (such as one or more of a city, urban agglomeration, county, state, country or other transportation hub or stop) as a destination & origin location. While a single inbound transfer vehicle 76 and single outbound transfer vehicle 76 are shown for illustrative purposes, it should be understood that multiple inbound transfer vehicles 76 and multiple outbound transfer vehicles 76 could be involved in an integrated method of operation, for various circumstances including but not limited to: (i) a circumstance where the number or passengers and/or number of TEUs of cargo that need to be offloaded or loaded, exceed the payload capacity of a single transfer vehicle 76; and (ii) a circumstance where a single port region 79R on a water surface 18 serves more than a single landing port/dock, such as one landing port in one country and a second landing port in another bordering country, with separate transfer vehicles serving the different jurisdictions for approximately concurrent operations (as will be shown subsequently for Enez, Turkey+Alexandroupoli, Greece in FIG. 16A; Aqaba, Jordan+Eilat, Israel+Taba, Egypt also in FIG. 16A; and Corozal, Belize+Chetumal, Mexico in FIG. 16C, for example and without limitation). Transfer vehicles 76 that comprise payload transfer transport modules 47 can also optionally be ganged together for combined mating and unmating operational steps, such as the paired payload transport modules 47 shown earlier in FIG. 1B, for example and without limitation.

The transport method 63 that includes a preferred method of operation as shown in FIG. 14B, more specifically involves five sequential steps as shown in the five connected boxes shown, starting in the top left of the Figure and ending in the bottom right. The first box, in the top left of FIG. 14B, shows a plan view showing a portion of a PASRACS 1 from an inbound travel leg as it has arrived at a port region 79R with a water surface 18. The portion of the PASRACS 1 that is visible in this view include a body 3, a right hull member 54R and wing 61. The transfer vehicle 69 that is a transfer vehicle departing to destination 69DD, starts at this configuration hanging below and mated with the underside of the PASRACS 1, connected by an unmating apparatus 80A that serves as a method to contiguously connect 72 the transfer vehicle 69 to the PASRACS 1. The unmating apparatus 80A includes a controlled drop down system 139 with a guide track member 136 and a winch 134 and a positioning system 131, all shown in an up-and-mated configuration for the transfer vehicle 69 in this first box. The transfer vehicle 69 is a payload transfer transport module 47, and it has already been explained (in FIGS. 8A and 8B) how passengers and cargo transfer from the internal decks of the PASRACS 1 to this payload transfer transport module 47, ahead of arrival at the port region 79R, as a first step for enabling disembarking transfer 69C.

The second sequential step, shown in the top right box of FIG. 14B, shows the step of the transfer vehicle 76 (that is also the payload transfer transport module 47 and the transfer vehicle departing to destination 69DD) in the process of being disconnected from the PASRACS 1 in a smooth and safe manner, wherein the positioning system 131 moves the transfer vehicle 76 laterally away from the right hull 54R, after the winch 134 and the controlled drop down system 139 have together lowered the transfer vehicle 76 still attached by cables 132, smoothly down to a position where the transfer vehicle 76 is floating by itself on the water surface 18. The positioning system 131 can utilize a variable length, variable angle member such as the illustrated dual powered and controlled arms shown, which can be controlled robotically and/or by a crew member operating controls. The use of robotic or crew operated arm or boom controls is known for example from corresponding technology applied to in-flight refueling boom control on prior tanker transport aircraft.

The third sequential step, shown in the middle right box of FIG. 14B, shows the PASRACS 1 moving forward (on the water surface 18 in the port region 79R) from the position where it dropped off the transfer vehicle departing to destination 69DD, with communication and control between the PASRACS 1 and the departing transfer vehicle to avoid any interference or collision in the process of moving apart. A baseline approach would be for the transfer vehicle departing to destination 69DD to be in a station keeping mode while the PASRACS 1 moves forward carefully in a water taxi mode with aft side flaps 90S retracted, on a path that avoids any interference. The PASRACS 1 can then move over the transfer vehicle incoming from origin 69IO, which in a baseline scenario will also be in a station keeping mode.

The fourth sequential step, shown in the lower left box of FIG. 14B, shows the positioning system 131 on the underside of the PASRACS 1, identifying and tracking and then engaging and coupling with the transfer vehicle mating fittings 69F on the transfer vehicle 69 that is the transfer vehicle incoming from origin 6910 and that is also a payload transfer transport module 47. The positioning system 131 and the mating fittings 69F and attachment fittings 130 are included as working members of the mating apparatus 70A, which utilizes common components with the earlier described unmating apparatus 80A. The positioning system 131 also pulls out the cables 132 from the winches 134 on the PASRACS 1, to establish a cable load path between the PASRACS 1 on the first hand, and the transfer vehicle 69 on the second hand. In the initial engagement position shown in this box, the transfer vehicle 69 is laterally spaced from the right hull member 54R, to avoid bumping and associated loads and discomfort to incoming passengers on board the transfer vehicle 69.

The fifth sequential step, shown in the bottom right box of FIG. 14B, shows a mated configuration wherein the positioning system 131 has moved the transfer vehicle 69 to a position adjacent to the right hull member 54R, and a combination of the winches 134 and the controlled lift up system 138 (which is integrated with the earlier cited controlled drop down system 139) with lifting members on guide track members 136, lift the transfer vehicle 69 smoothly up to a mated and locked in place configuration on the underside of the PASRACS 1.

FIG. 14B thus illustrates a transport method 63, wherein said mating apparatus 70A and said unmating apparatus 80A each comprise at least one of: (i) a disconnectable attachment fitting 130D, (ii) a positioning system 131 (shown) for an attachment fitting 130 (shown), (iii) a cable 132 (shown), (iv) a structural beam 133, (v) a winch 134 (shown), (vi) an actuator 135, (vii) a guide track member 136 (shown), (viii) a deployable ramp 137, (ix) a controlled lift up system 138 (shown), (x) a controlled drop down system 139 (shown), and (xi) a controlled guided transport system 140 connected to said vehicle control and navigation system 29.

FIG. 14C illustrates a transport method 63 including a method for managing crew allocations and duty periods 63C, comprising the steps of:

(i) Modeling the relationship 63D between the frequency and pattern of duty periods and rest periods while giving consideration to the cumulative effects of undertaking long duty hours combined with minimum rest periods;

(ii) Modeling duty patterns 63E which avoid practices that cause a serious disruption of an established sleep/work pattern such as alternating day/night duties;

(iii) Modeling rest periods 63F of sufficient time to enable crew members to overcome the effects of the previous duties and to be rested by the start of the following duty period;

(iv) Planning crew allocations and duties 63G in a manner to be completed within an allowable duty period for each crew member 41M taking into account (a) the time necessary for any applicable prior & subsequent duties and overlapping handoff periods with prior & subsequent on-duty crew 41 and (b) human factors effects related to passage of the PASRACS 1 through plural time zones;

(v) Assigning duty periods 63P for each crew member 41M that are planned in a way that enables each said crew member 41M to remain sufficiently free from fatigue so that they can operate to a satisfactory level of safety under all circumstances for a normal operational scenario 200, depending on the nature and criticality of their assigned crew role 41R and depending on the nature of redundant backup provided from at least one of human and automated backup for each assigned crew role;

(vi) Publishing duty rosters 63DR sufficiently in advance to provide the opportunity for each crew member 41M to plan adequate rest; and (vii) Changing scheduled crew allocations and duties 63GC to mitigate safety risks in the event of a specified level of exceedances 63X during a specified period of time 63T, for a non-normal operational scenario 201.

Note that a non-normal operational scenario 201 can be an emergency scenario 202 but does not necessarily have to be an emergency scenario 202.

Figure 14D:
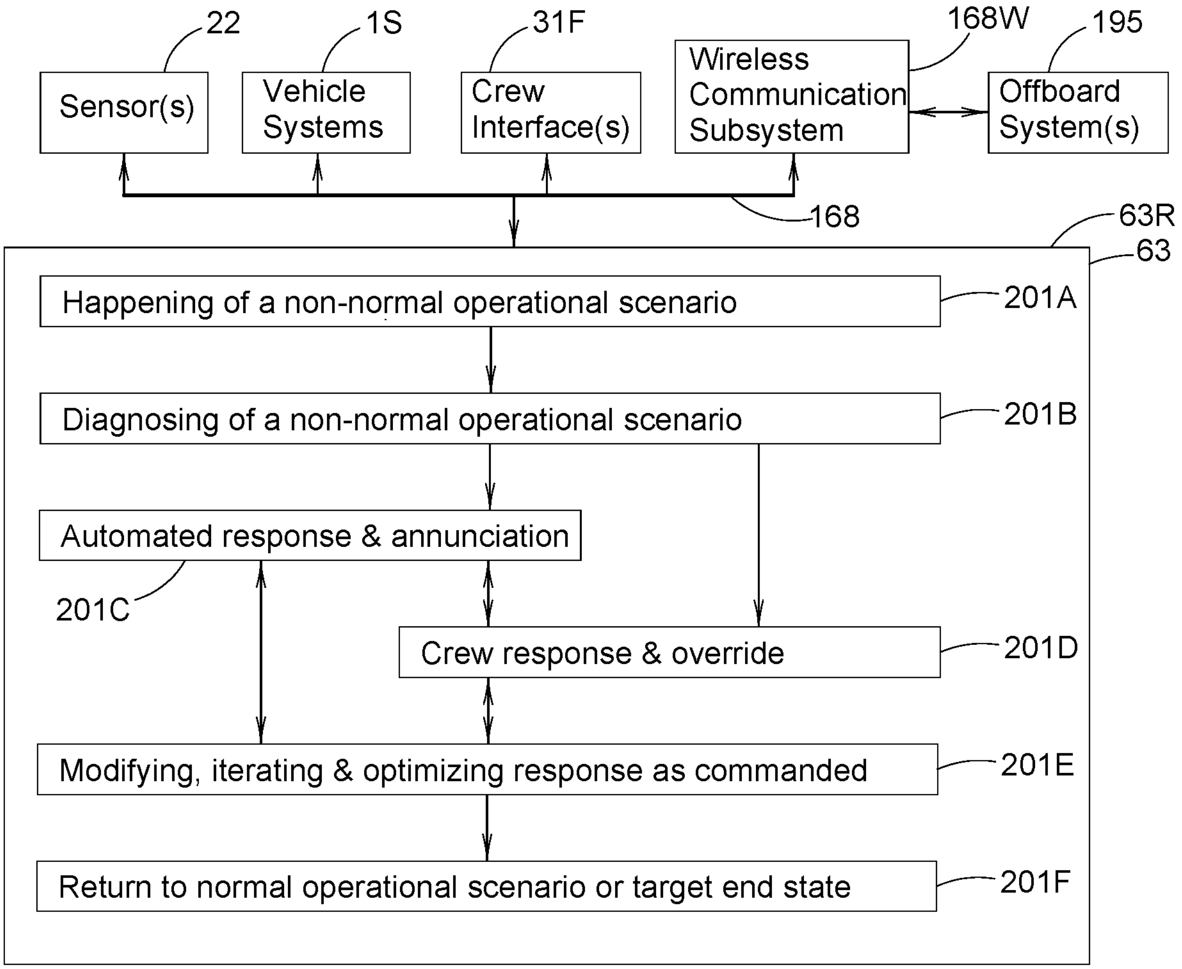

FIG. 14D illustrates a transport method 63 including a method for method for diagnosing and responding to a non-normal operational scenario 63R (wherein a non-normal operational scenario 201 can possibly also be an emergency scenario 202), comprising the steps of:

(i) Happening of a non-normal operational scenario 201A;

(ii) Diagnosing of a non-normal operational scenario 201B;

(iii) Automated response & annunciation 201C;

(iv) Crew response & override 201D;

(v) Modifying, iterating & optimizing response as needed 201E; and (vi) Return to normal operational scenario or target end state 201F.

Note that a normal operational scenario is designated 200, a non-normal operational scenario is designated 200, an emergency scenario is designated 202, and a target end state is designated 203. Note that there are bidirectional arrows though data transmission member(s) such as databuses connecting the method for diagnosing and responding to a non-normal operational scenario 63R on one hand, and all of the following on the second hand:

Sensor(s) 22;

Vehicle systems 1S;

Crew interface(s) 31F;

and offboard system(s) 195 connecting through a wireless communications subsystem 168W.

Note that vehicle systems 1S should be construed to encompass any and all systems and subsystems on board the PASRACS 1, as described in the descriptive portion of the specification and the drawings, and further including redundancy and redundancy management that allows continued safe operations following a single failure or in some cases, multiple failures. Note that offboard system(s) 195 should be construed to encompass any and all systems no on board the PASRACS 1, which may include for example and without limitation meteorological stations or systems, air traffic and surface traffic control and management systems, harbor area management systems, distributed collision avoidance systems, offboard sensors, offboard communications systems, offboard control systems such as remote pilot provisions for special circumstances, government systems, offboard security & safety systems, remote medical or health systems, and offboard advisory or consultation systems. Note that there are also bidirectional arrows between process steps (iii), (iv) and (v) above, to indicate that automated and crew responses can be modified, iterated and optimized in flexible, appropriate and iterative ways depending on the particular nature of the non-normal operational scenario or scenarios.

In the paragraphs below several examples of a method for diagnosing and responding to a non-normal operational scenario 63R, are presented but are not to be construed to be limiting. Best practices from prior art on managing non-normal and emergency scenarios for prior art air, water and land vehicles can be beneficially applied, including deployment of safety systems and personnel, redundancy and redundancy management, failure identification and annunciation systems, smart camera and expert and artificial intelligence systems, standard operating procedures, triage and emergency protocols, layered advisory and caution and warning systems, automated reconfiguration systems, passenger alerting systems, and passenger aid systems.

A first example of a non-normal operational scenario 200 is when a travel leg of a PASRACS 1 (as for example any of the travel legs on the routes that will be described in FIGS. 16A-16G following) is either delayed or cancelled for a variety of reasons ranging from environmental issues (snowstorm, hailstorm, windstorm, dust storm, volcanic ash, tornado, hurricane, cyclone, typhoon, tsunami, etc.) to technical issues (engine failure, other vehicle component or system/subsystem or computer failure, hull damage, lifting gas leak, etc). The diagnosis of a travel leg delay or stop cancellation can be by either or both of automated systems and crew monitoring and awareness, as well as based on inputs from offboard systems such as meteorological data or forecasts and inputs from traffic control entities such as air traffic control or surface traffic control entities. Candidate automated and/or crew responses to an impending delay or stop cancellation can include increasing cruise speed to maximum cruise speed, changing ground tracks to reduce travelled distance, and accommodating certain levels of delay by rebooking passengers on connecting travel legs on other PASRACS 1 vehicles and/or other transport modes and/or vehicles. A second example of a non-normal operational scenario 200 is an emergency scenario 202 wherein continued safe flight (in ground-effect) and landing at a scheduled destination is at risk and requires an intervention to maintain safety for passengers, crew, other payload and offboard people, animals and living beings. It will be understood that a very wide variety of emergency scenarios 202 are possible, without limitation ranging across: medical emergency, fire, cargo fire or explosion, fuel or hydrogen fire or explosion, chemical hazard, leakage of lifting gas, vehicle shaking or high-g motion (e.g., due to collision avoidance maneuver and/or turbulence/windshear in the air and/or big waves/strong currents in a supporting water surface layer), structure/system/mechanism/part failure on board, propulsor failure, collision of any kind, terrorist action, action by a mentally unbalanced or suicidal person (passenger or crew member), and natural hazard (e.g., volcanic eruption and ash, sandstorm, hail, severe storm, flying debris, birdstrike or marine animal strike, log or floating object strike, hurricane, cyclone, typhoon, tornado, ice storm, atmospheric icing conditions, rogue wave and tsunami, without limitation).

Figure 14E:
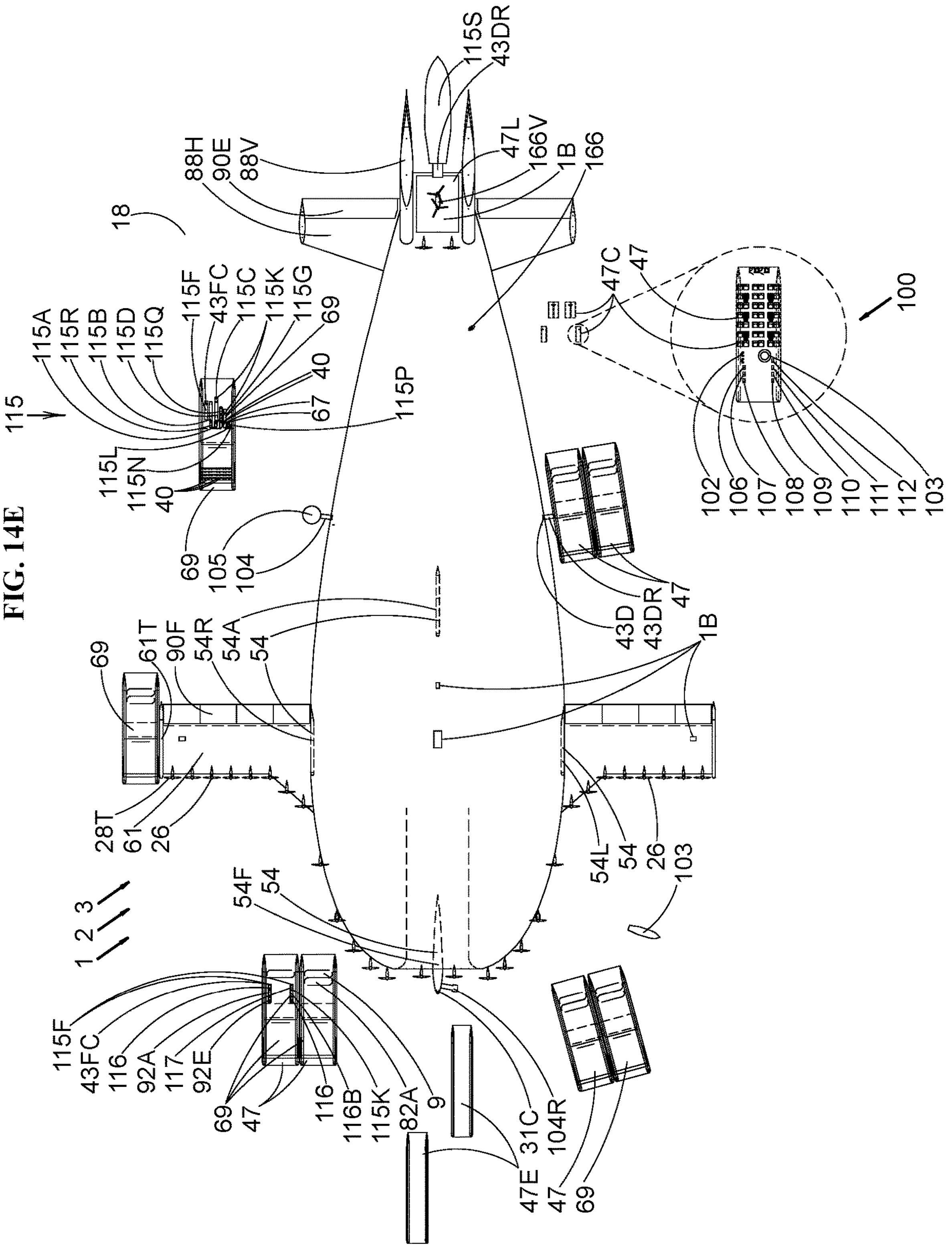

An emergency scenario 202 can be diagnosed by either or both of automated systems and crew monitoring and awareness, as well as based on inputs from offboard systems. Candidate automated and/or crew responses can include, as one example without limitation, optional diversion followed by safe landing and stop at a safe location, then followed by maintenance/repair operations where appropriate, plus shelter-in-place awaiting a rescue operation and/or evacuation of the PASRACS 1 if staying on board would be hazardous. FIG. 14E following will include further information about a nominal evacuation scenario. As regards candidate rescue operations, these can include one or more selected from (i) transferring payload from a PASRACS 1 being evacuated to a second nearby rescue PASRACS, using plural trips as needed by payload transfer transport modules 47 and triaging to rescue passengers, crew, animals and cargo in that order; (ii) using a large rescue vehicle that acts in a "tow truck" mode, such as a rescue hybrid airship that can lift an entire nonoperational PASRACS 1 (after offload of some cargo in payload transfer transport modules 47) in a hybrid vertical takeoff and landing (VTOL) mode and transport it to a safe offload destination; and (iii) having external rescue vehicles that may be aircraft (e.g., helicopters, VTOL aircraft, flying boat or seaplane aircraft, amphibian aircraft) or watercraft that connect with the nonoperational PASRACS 1 and collect people and animals to transport away to safety. While some emergency scenarios 202 may require rescue or evacuation of most or all people on board, other emergency scenarios 202 may require only one or a few persons to be evacuated, such as a medical emergency requiring a "medevac" operation to transport the affected person or persons to a land-side medical facility, if a clinic or medical facility on board the PASRACS 1 cannot provide sufficient care, even with advisory services by telemedicine from offboard medical expert(s).

In the event of a terrorist and/or hijack threat or action on board, onboard security or police personnel and robots can attempt to address the threat while the crew performs a safe landing and stop, and in a worst case scenario where crew may also be complicit in a terrorist action, an offboard security crew can remotely pilot the vehicle to a forced safe landing and stop, overriding the onboard crew (with safety provisions that no offboard system can perform any piloting action other than a quick safe landing and stop). External security or antiterrorist personnel can then arrive on external vehicles and board the PASRACS 1 through provisioned interfaces such as a door, boarding barge or landing pad, to apprehend & jail the terrorists or otherwise neutralize the threat. In the event of people with firearms or other contraband, prohibited items or weapons on board, and/or other criminal or dangerous activities on board by criminals or inebriated or drug-impaired people, or other criminal activities of various kinds (drug-dealing, gang warfare, religious or political threats or harassment, trafficking or sexual crimes, assault, fights, bullying, etc.) on board, security personnel and automated robots with nonlethal methods (such as tasers, handcuffs & zip-ties) and lethal methods where necessary and warranted, of remedying violations and arresting and jailing or otherwise stopping offenders, can be used as lines of protection for innocent passengers and crew. Security personnel and automated robots can also effectively address lesser human misbehavior issues such as drunk people, people smoking in no-smoking zones, and other rules violations; as well as any animals on board issues for pets or other animals, such as a dog biting a child, for example and without limitation.

It should be understood that a variety of offboard experts and offboard systems can be leveraged to help in nonnormal situations involving a PASRACS 1, including but not limited to offboard expert monitoring and control centers, emergency response centers, and offboard specialists and expert systems applicable to one or more of: health, injuries and deaths, infectious disease, epidemics, pandemics, triage, medevac, mental health, telemedicine, security, police, counterterrorism, SWAT teams, fire, smoke, chemicals, environmental hazards, biohazards, natural disasters (including but not limited to hurricane, typhoon, cyclone, tornado, turbulence, rogue wave, tsunami, birdstrike, obstacle strike, earthquake, volcano, ash plume, sandstorm, extreme temperature), war and weapons, damage survival and other nonnormal circumstances; with following remote control of humanoid robots on board, advice to human crew members on board, and ability to orchestrate and execute remote area rescue operations.

FIG. 14E shows a plan view of a preferred embodiment of a partially aerostatically supported ram air cushion ship 1 (PASRACS 1), similar to that shown and described earlier with reference to FIG. 1B and FIG. 13C. The PASRACS 1 is shown floating on a water surface 18 supported by four hulls 54 as shown, following a non-normal operational scenario 200 that may be an emergency scenario 202, with an at least partial evacuation of the vehicle shown in progress. The PASRACS 1 is shown with plural bay areas with external access 1B, which each have an internal volume within the PASRACS 1 called a "bay" and openable bay doors that may be hinged or sliding or otherwise openable, to allow things, people and vehicles (e.g. a robotic air vehicle or evacuation vehicle, for example and without limitation) to transit from within the PASRACS 1 to outside the PASRACS 1. Bay areas may also optionally be fitted with deployable turrets with wide angle external viewing. FIG. 14E shows this preferred embodiment of a PASRACS 1 with transfer vehicles 69 comprising payload transfer transport modules 47 winched down from the underside of the PASRACS 1 than released to move on their own floating on the water surface 18, to move gradually away from the PASRACS 1, as shown. The transfer vehicles 69 will preferably be equipped with onboard energy storage and propulsion to enable them to move in a controlled manner on the water surface 18, with crew control, remote control and/or autonomous control. Eight full-size payload transfer transport modules 47, two dedicated emergency evacuation barges 47E, and six compact payload transfer transport modules 47C, are all shown detached from the mothership PASRACS 1. An expanded inset view of one of the six compact payload transfer transport modules 47C is also shown, to enable a clearer understanding of some inventive features and amenities on said compact payload transfer transport module 47C. One of the payload transfer transport modules 47 is shown connected to the PASRACS 1 through a deployable ramp 43DR, to allow people and baggage to transfer to the payload transfer transport module through a cargo door 43D that serves as a payload door, and said deployable ramp 43DR in deployed configuration. Other optional evacuation facilitating features are illustrated, including a landing pad 47L that is shown at the aft end of the PASRACS 1 vehicle and has a substantially flat surface that is exposed by retraction of a portion of the upper skin of the PASRACS 1 aft body 3A using one or more of a roll up retractable panel, sliding retractable panel, or folding retractable panel. A VTOL aircraft 166V such as the illustrated tandem rotor helicopter shown on a landing pad 47L, without limitation, can carry people from the PASRACS 1 to destinations on the shore or on other marine vehicles, for emergency and some normal scenarios. FIG. 14E also shows a second aircraft 166 flying above the PASRACS 1, which can be a remotely controlled or autonomous drone aircraft (VTOL or non-VTOL) that is based on the PASRACS 1, and can conduct operations such as flights starting and ending from a takeoff and landing pad or fitting or openable bay on the PASRACS 1, with the aircraft 166 capable of performing video and sensor data gathering missions, security missions, rescue missions including targeted drop-off of life preserver devices, flare or chaff dispensing missions for security or safety or anti-missile tasks, and detection of threats that may range from mines to bombs to explosives to terrorists and human and robotic threats of a wide variety. The aircraft 166 may also be fitted with defense purpose weaponry suitable for protecting the PASRACS 1 from external attacks by human and machine "bad guys" on land, on water, under water, and in the air, including one or more of electronic warfare and jamming and gun and laser weapon options as needed and appropriate. A marine vehicle 115S such as ship that is a rescue ship is also shown just behind the PASRACS 1 with a connection via another deployable ramp 43D, to enable people and other payload to exit the PASRACS 1 for non-normal and some normal scenarios.

FIG. 14E shows a partially aerostatically supported ram air cushion ship 1 or PASRACS 1, further comprising life-preservation apparatus 100 configured to be employed to facilitate safe evacuation of said passengers 40 and said crew 41 from said ship 1 in the event of an emergency scenario 202 warranting evacuation, said life-preservation apparatus 100 comprising more than one from the set of: said payload transfer transport module 47, a wearable life preserver 102, a life raft 103 and an evacuation raft 105, an evacuation slide 104, an evacuation slide-raft 104R, a warmth preserving device 106, a heating device 107, a signaling device 108, a transmitting device 109, a nourishment container 110, a potable water container 111, and a medical supply container 112. A barge equipped as a lifesaver barge can be provisioned with a plurality of items from: food and water and medical supplies, heating & ventilation & air conditioning, weather protection, a locator beacon, radio and satellite communications, onboard energy storage and power generation, and human comfort and sanitation systems, for example and without limitation.

FIG. 14E also shows a transfer vehicle 69 that comprises a barge 114 configured to float on said water surface 18, and wherein said transfer vehicle 69 is further configured to carry more than one selected among the following: said first plurality 40A of passengers 40, said second plurality 40B of items 67 of at least one of cargo 43 and baggage 44, vehicles 115, cars 115A, buses 115B, trucks 115C, trailers 115D, electric vehicles 115E, autonomous vehicles 115F, recreational vehicles 115G, road vehicles 115H, rail vehicles 115J, wheeled vehicles 115K, motorcycles 115L, scooters 115M, bicycles 115N, three-wheel vehicles 115P, vehicle trains 115Q, amphibious vehicles 115R, marine vehicles 115S, potable water 92A, food 116, beverage 116B, merchandise 117, fuel 82A, lifting gas 9, cryogenically liquified lifting gas 9C, liquid waste 92E and solid waste 92S.

The PASRACS 1 and the transfer vehicle 69 will preferably both be fitted with safety and security equipment including one or more of: fire detection, smoke detection, carbon monoxide detection, fire protection, fire containment, hydrogen safety (including upward vent lines and spatial separation of any hydrogen systems from passenger, payload and crew use volumes), toxic fluids and gases protection and containment, electrical safety, temperature safety, physical security, cybersecurity, and other safety and security devices and subsystems without limitation. FIG. 14E also illustrates an autonomous vehicle 115F that is also an autonomous flatbed carrier 43FC.

FIG. 14E also shows a transfer vehicle 69 that comprises a wheeled vehicle 115K configured to carry more than one selected among the following: said first plurality 40A of passengers 40, said second plurality 40B of items 67 of at least one of cargo 43 and baggage 44, potable water 92A, food 116, beverage 116B, merchandise 117, fuel 82A, lifting gas 9, cryogenically liquified lifting gas 9C, liquid waste 92E and solid waste 92S.

Following a nonnormal landing and evacuation as shown in FIG. 14E, the PASRACS 1 vehicle can be at least partially repaired in-situ with repair personnel arriving on another PASRACS 1 or other marine or air vehicle. The repaired PASRACS 1 can then takeoff on its own power and be flown in ground effect to a destination with a repair hangar where a full repair can be completed. For the takeoff under its own power on an ice surface, the use of hydroskis and planing surfaces acting as ski or skate or runner members, and the ability of the front ends of hulls 54 to withstand ice cutting loads, will be useful enablers. If the damaged PASRACS cannot be repaired sufficiently to takeoff under its own power even for a flight in ground effect with a limited flight envelope, a "tow truck" type vehicle such as a powerful towing hovercraft of PASRACS can be used, or a powerful lift vehicle such as a heavy lift VTOL hybrid airship, to lift up the stricken PASRACS after offload of cargo in barges to reduce the weight that needs to be lifted.

FIGS. 15A through 15D illustrate some alternate preferred methods of manufacture, maintenance and repair that can be applied for a partially aerostatically supported air cushion ship 1 or PASRACS 1.

Figure 15A:
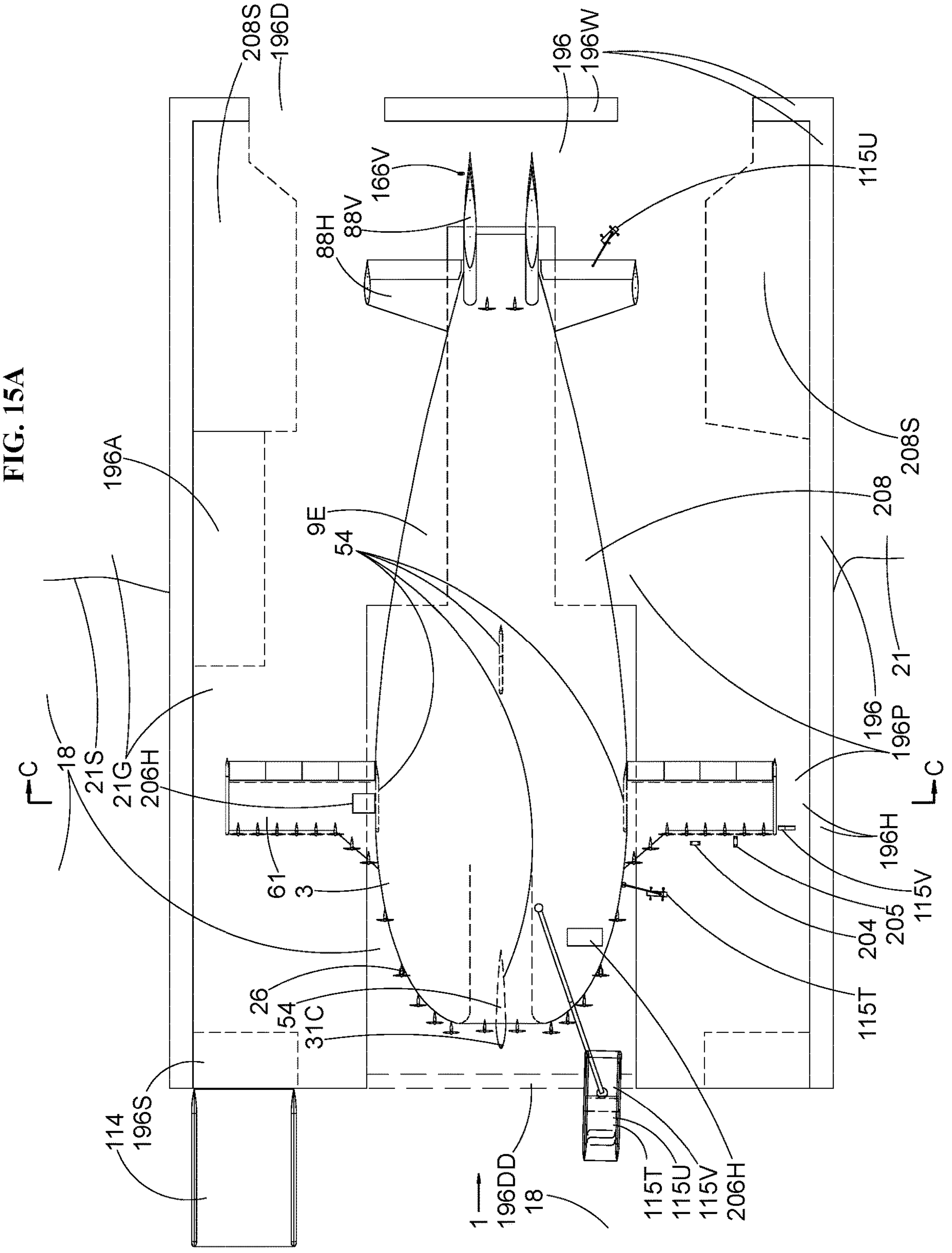
FIGS. 15A through 15D illustrate some alternate preferred methods of manufacture, maintenance and repair that can be applied for a partially aerostatically supported air cushion ship.

FIG. 15A shows a plan view of a nominal final assembly factory layout for assembly of a PASRACS 1 similar to that described earlier with reference to FIGS. 1A-G and 2 A-F, as viewing downward from a level just below the ceiling and roof of a building 196 that is a hangar 196H. The building 196 is of nominally rectangular layout with walls 196W as shown, with other geometries and layouts of the building 196 possible within the spirit and scope of the invention. Building construction can utilize a variety of materials and a variety of structural members and architectures, including beams, panels, trusses, three-dimensional members, joining members, surface members, weather protection members, decorative members and other members as known in the art and science of building design and construction. The building 196 is located in the vicinity of a shoreline 21S that separates a water body with a water surface 18 on the one hand, and a ground surface 21G of an Earth surface 21 on the other hand. A portion of the building 196 is built over the ground surface 21G, while another portion of the building projects into an area that was formerly water, in a manner similar to a pier of any type known from the prior art, including but not limited to a piling supported pier, a float supported pier, and a pier built on reclaimed land. Landside access to the interior of the building 196 is via a building doorway subsystem 196D such as a hangar door opening with optional openable hangar doors. Waterside access can be open as shown, or alternatively also be fitted with a building doorway subsystem (not shown). The building has a paved area 196P that can be a factory floor area with various subareas for different purposes, that partially encloses an area with water surface 18 on which the PASRACS 1 that is being assembled can be floated with hydrostatic support from hulls 54, in addition to aerostatic support from encompassed lifting volume 9E in the PASRACS 1. The partially enclosed water area can optionally be a dry dock area with the addition of a deployable optional dry dock door subsystem 196DD.

Areas of the building 196 are also shown for a subassembly area 208S in addition to a primary assembly area 208, a storage area 196S, and a building personnel accommodation facility 196A, that could be multi-story office space without limitation. Machines and tools and vehicles that are used in the fabrication and assembly of the PASRACS 1 can, in this assembly paradigm, include all three of (i) ground supported machines and tools and vehicles that access the construction area for the PASRACS 1 from the paved area 196P; (ii) water supported machines and tools and vehicles that access the construction area for the PASRACS 1 from areas that have a water surface 18; and (iii) machines and tools and vehicles that provide services from elevated locations, such as a vertical takeoff and landing or VTOL aircraft 166V such as an autonomous factory drone, and such as the illustrated hanging platform 206H, that is suspended from an overhead crane 206 (see FIG. 15B following) and that can move in two dimensions over the entire manufacturing space and perform a wide variety of factory deliveries and functions at various three dimensional locations with effectors and tools and machines, as known from the art of factory overhead crane systems. Some specific illustrated factory machines and tools and vehicles include a vehicle with a crane 115U such as a mobile crane without limitation, a vehicle with a boom 115T such as a bucket lift truck without limitation, and vehicle with a movable platform 115V such as a piece of ground service equipment such as a lifter-loader without limitation, a robot 204 and a manufacturing/repair machine 205. A waterside member that is illustrated comprises a barge-supported vehicle with a boom 115T that is also a vehicle with a crane 115U and is also a vehicle with a movable platform 115V, as shown, with a footprint and geometry that allows this to be carried in place of a payload transfer transport module 47 to a different location, if needed, for manufacturing and/or servicing purposes. Another waterside member that is illustrated is a barge 114 that is secured adjacent to the edge of the factory paved area 196P, to enable seamless delivery to the factory of items including large items that are too large to transport on land infrastructure such as road and rail infrastructure. The barge may be self-powered or towed to site by a tugboat, and may be crewed or uncrewed, in various preferred embodiments.

It should be understood that many variant embodiments of a manufacturing and assembly system for a PASRACS 1 vehicle are possible, with a variety of factory configurations and layouts, a variety of ground, water and air supported tools and equipment and devices, and a variety of supply chain flow paradigms for delivering components, parts, assemblies, structural members, systems, subsystems, propulsors and energy systems, payloads amenities, and other items to the final assembly. The PASRACS 1 can be assembled in layers from the bottom up, without limitation. Following assembly, the PASRACS 1 can taxi out of the building 196 under its own power or towed by tugboats, floating on the water surface 18 or floating in the air if in a nominal neutral total buoyance configuration with a combination of hydrostatic and aerostatic lift components. If floating on the water, dock bumpers (fixed and/or floating, as will be described with reference to FIG. 15C following) and/or automatic control systems can prevent any side impacts on the vehicle hulls 54.

An approximately rectangular building 196 has been illustrated in FIG. 15A, but it should be understood that different geometry buildings as well as connecting plural buildings can be utilized for manufacture of subassemblies and assemblies as well as an entire or plural entire PASRACS 1 vehicle(s), building on prior art methods of manufacturing vehicles of various kinds, ranging from automobile or aircraft assembly lines to modular shipbuilding utilizing drydock facilities. While the building 196 has been described with reference to FIG. 15A above for manufacturing purposes, the same building 196 can also be used for maintenance, repair and overhaul purposes as well, with a PASRACS 1 backing into position either under its own power or towed in by vehicles or winches, without limitation. For this maneuver as well, dock bumpers (floating and/or fixed) and/or automatic control systems can prevent any side impacts on the vehicle hulls 54.

FIG. 15A also illustrates a particular nominal relationship between the building 196 and the shoreline 21S, but it should be understood that many other relationships are also possible within the spirit and scope of the invention, including a variant with left and right building walls on different land bodies (e.g., left wall on mainland, right wall on island, and central water channel going through the building so that a PASRACS 1 can taxi in one end and out the other end, in a floating mode), and a variant where the entire building is on land (with vehicle exit in an aerostatically supported mode) and a variant where the entire building is on water in a floating mode.

Figure 15B:
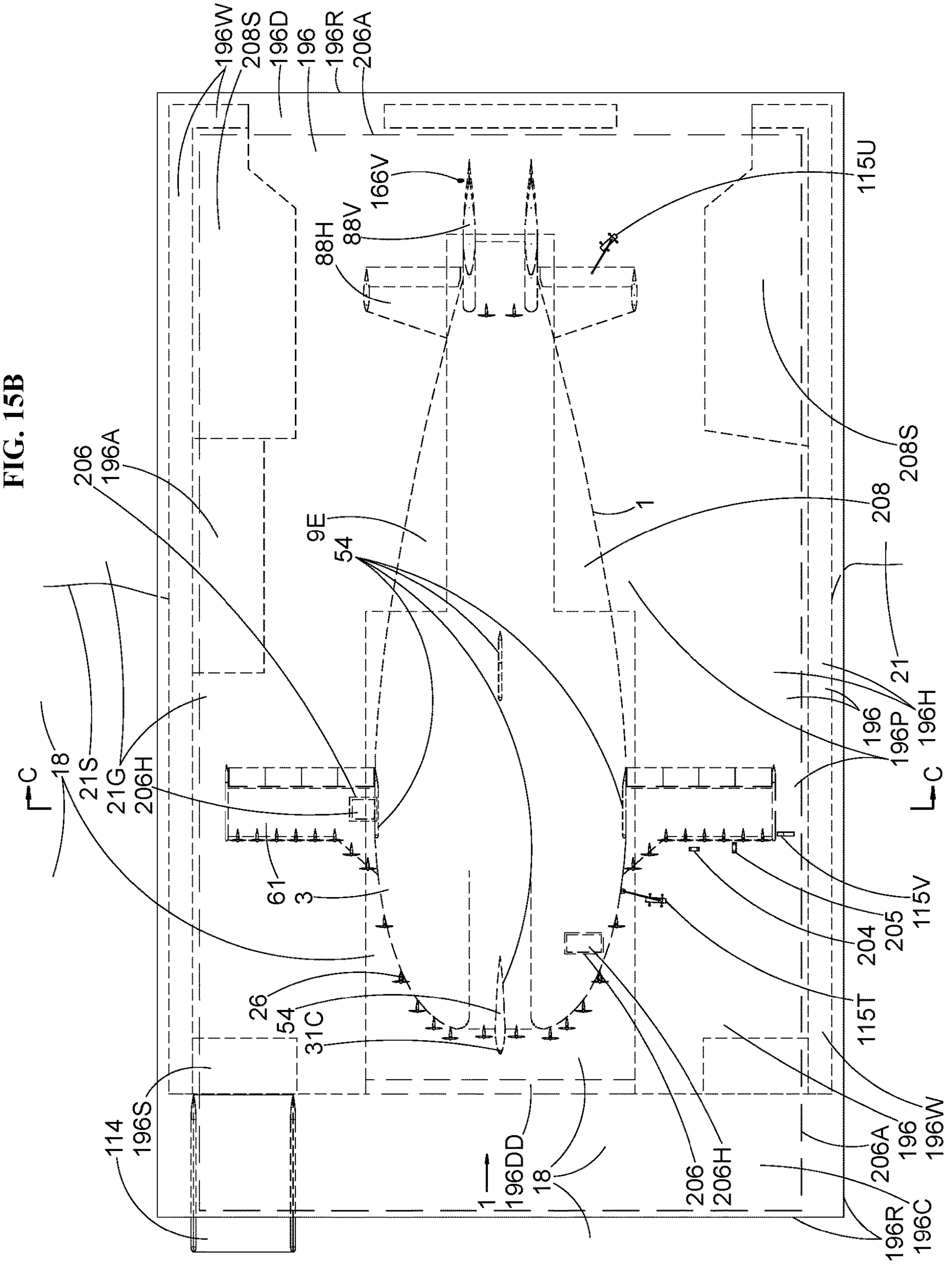

FIG. 15B shows a plan view of the same layout shown earlier in FIG. 15A, but viewed from a height above the roof level of the building 196, whether the roof of the building is of flat, sloped, or varying contour levels above ground level (AGL) or relative to a defined mean sea level (MSL) such as described by the World Geodetic System WGS84 geoid. FIG. 15B shows that the building roof 196R is supported by the building walls 196W and extends outward a little beyond the building walls 196W as illustrated, but without limitation. A portion of the building roof also has an overhang 196C over the water surface 18, towards the bottom of the view shown in FIG. 15B. FIG. 15B shows representative two overhead cranes 206 that hang on a track system suspended under the structure of the building roof 196R, such as a roof support truss structure without limitation. The overhead cranes 206 can move in two dimensions throughout the entire fabrication and/or service area, throughout an operational area 206A for the overhead crane system. Each overhead crane has a hanging platform 206H beneath it, with variable drop-down levels all the way down to ground level or water level, to enable manufacturing, repair and servicing operations at all locations in a three-dimensional space that includes the interior volume of the building 196 and also a volume under the overhang. The overhead cranes 206 can also pick up materials and parts and assemblies directly from a barge 114, by traversing to a location under the overhang 196C that is above the barge 114. The hanging platforms 206H can be fitted with equipment and machinery and subsystems for loading and offloading materials and parts and assemblies, as well as performing a variety of actions using extendable and movable manipulator arms and other features known from the arts of robots, robotics, and human operator usable tools, equipment and machinery.

Figure 15C:
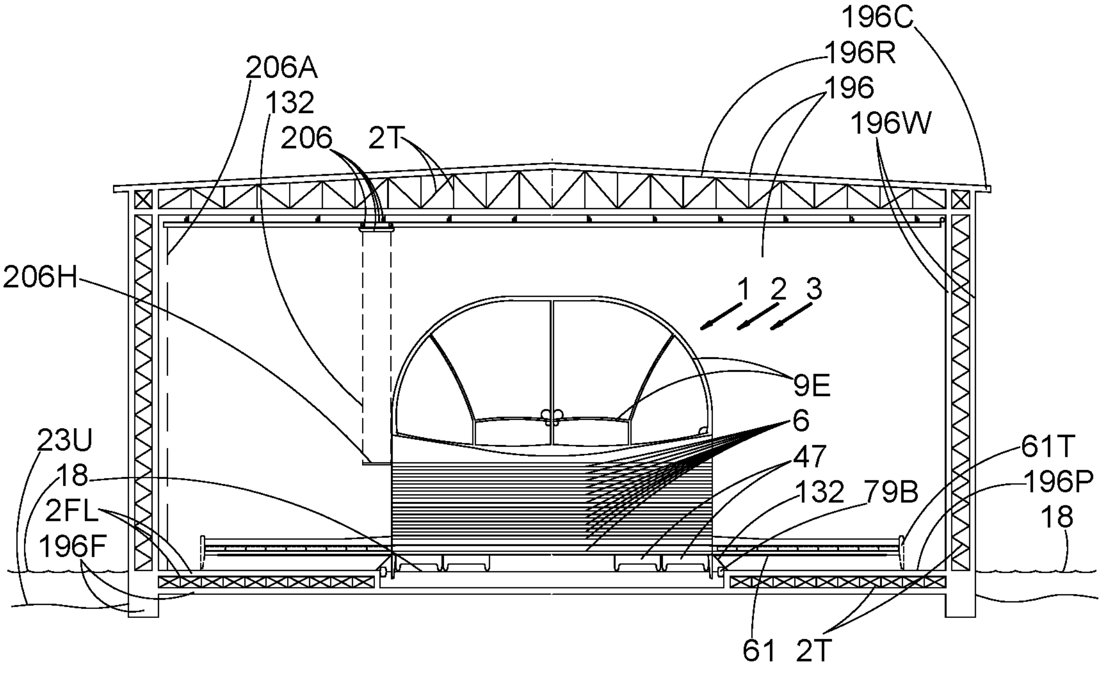

FIG. 15C shows a cross-sectional view of the building 196 that is a hangar 196H, viewed at the cut plane designated as C-C in FIG. 15A and FIG. 15B. It can be seen in FIG. 15C that the building 196 has a nominal architecture and structural design that comprises a foundation 196F, a floor structure 2FL, building walls 196W, a building roof 196R that also includes an overhang 196C and selected applications of truss structure 2T where beneficial for cost-effective construction of strong yet lightweight large-span and clear-span members. It will be understood that a wide variety of materials, structural architectures, members and connectors, can all be used in variant embodiments based on known principles of large building design, architecture and construction. The building floor 2Fl also includes a central area with a lowered floor above which there is a water surface 18, as shown, to enable a PASRACS 1 to be floated in and out of the building, with side impact protection provided by dock bumpers 79B. The PASRACS 1 includes ship structure 2, a body 3, a wing 61, plural levels 6, and encompassed lifting volume 9E that can be used for lifting gas. During the initial manufacture of a PASRACS 1, the payload transfer transport modules 47 and wind tip fences 61T will preferably not yet be present, and to illustrate this are shown in dashed lines in FIG. 15C. The particular time in a manufacturing sequence when these are installed can vary, with varying detailed manufacturing and assembly sequence plans.

When the PASRACS 1 is in a floating on water configuration, it can be held in place by cables 132, with a representative cable hold-in-place or anchoring system shown. This central area can optionally be a dry dock with a dry dock door and a pumping system to pump out water, as known in the art of dry dock design and construction. On both sides of the building in the illustrated embodiment, there is a water surface 18 above an underwater ground surface 23U, such as the water surface of an ocean, sea, bay, sound, channel or other natural or man-made water body. Variant embodiments may have water surface(s) 18 on one or more sides of the building 196, without limitation. The building 196 can be used for one or more of manufacturing, inspection, repair, service, maintenance, overhaul, upgrade and operational purposes, shows representative two overhead cranes 206 that hang on a track system suspended under the structure of the building roof 196R, such as a roof support truss structure without limitation. An overhead crane 206 can be seen to be able to move in two dimensions throughout the entire fabrication and/or service area, throughout an operational area 206A for said overhead crane system. The overhead crane has a hanging platform 206H beneath it, with variable drop-down levels all the way down to ground level or water level, to enable manufacturing, repair and servicing operations at all locations in a three-dimensional space that includes the interior volume of the building 196. The hanging platform 206H can be fitted with equipment and machinery and subsystems for loading and offloading materials and parts and assemblies, as well as performing a variety of actions using extendable and movable manipulator arms and other features known from the arts of robots, robotics, and human operator usable tools, equipment and machinery. Other ground supported equipment and machinery and systems can be supported by the illustrated paved area 196P supported by at least one of the foundation 196F and the floor structure 2FL.

Figure 15D:
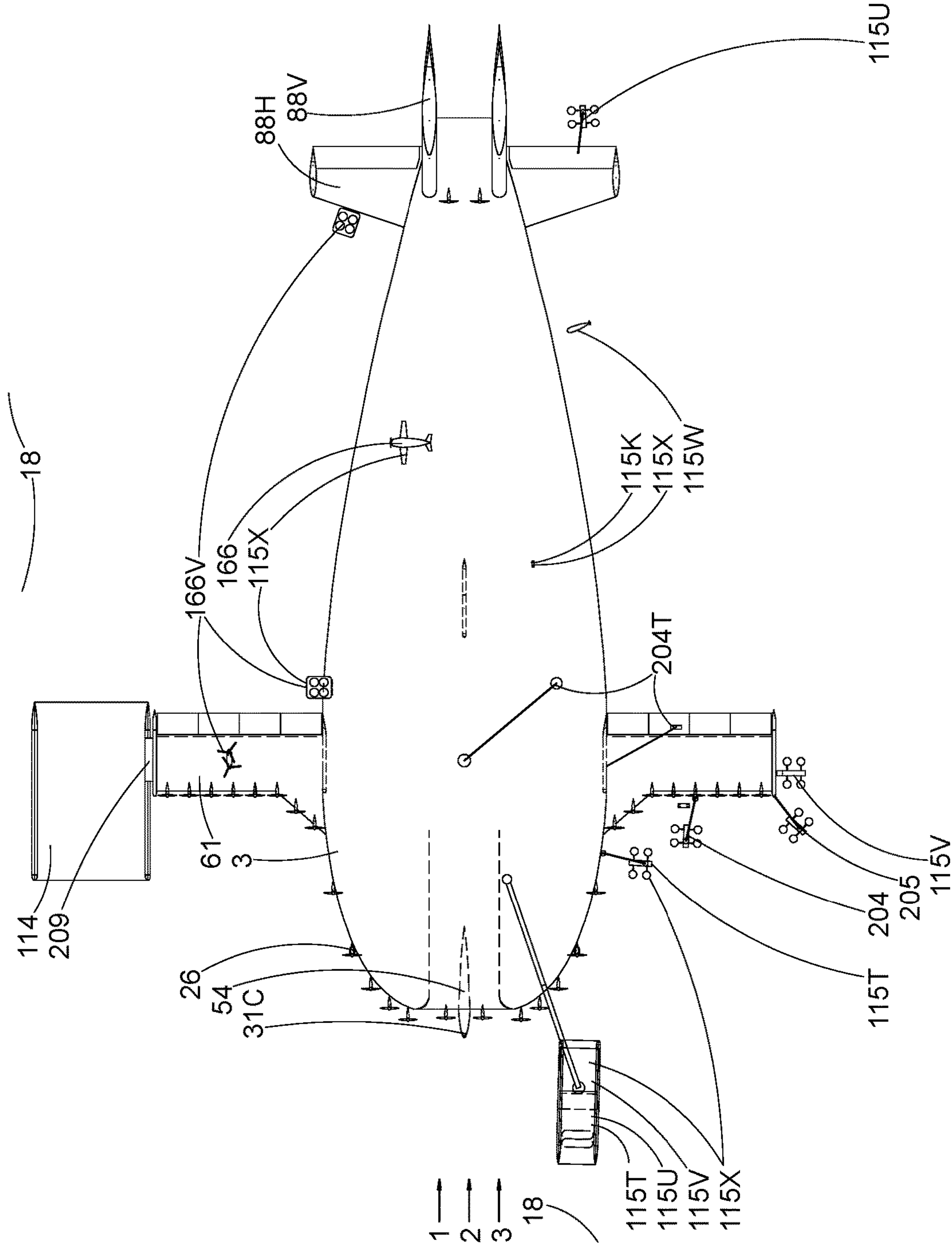

FIG. 15D shows a plan view of the same PASRACS 1 shown earlier in FIG. 15A, now floating on a water surface 18 that is preferably in a sheltered water surface area, with said PASRACS 1 in a stationary (at least one of station-keeping and anchored) mode in a configuration wherein support vehicle(s) 115X can provide support services comprising at least one of inspection, supply, service, maintenance, repair and other support, with said support vehicle(s) can be manned or remotely controlled or robotic within the spirit and scope of the invention. The support vehicles can also be fitted with a variety of equipment and tools and support devices. More specifically, FIG. 15D shows an aircraft 166 that can perform non-contact inspection on the PASRACS 1. VTOL aircraft 166V can provide non-contact inspection as well as other support activities as noted above. A wheeled vehicle 115K within the PASRACS 1 can also serve as a support vehicle 115X and provide the range of support activities noted above. Also shown are waterborne, water supported embodiments of a vehicle with crane 115U, a vehicle with boom 115T, a vehicle with movable platform 115V, a barge 114 connecting to the PASRACS 1 via a boarding bridge 209, a robot 204 and a manufacturing/repair machine 205, that can also provide one or more of said range of support activities. Also shown is a submarine 115W that can provide underwater support activities such as inspection, maintenance, surface coating and repair, wherein the submarine 115W can be robotic or remotely controlled or manned. FIG. 15D further illustrates the use of tethered robots 204T that can utilize surface crawler features and technologies known from other arts such as the art of tethered robotic building window washing machines and systems. These can also be used for a wide variety of support activities and functions, further including surface cleaning, window washing, bug removal, maintenance of riblet surfaces, de-icing and maintenance and repair of skin and support structures and electromagnetic effects (EME) protection layers close to the outer surfaces of the PASRACS 1. Further variant support functions can be provided by a wide variety of external and internal support vehicles, robots, machines, tools and equipment, within the spirit and scope of the invention.

FIGS. 16A through 16G illustrate representative termini and representative global routes such as round-the-world routes, that could be served with trans-oceanic transportation services provided by partially aerostatically supported air cushion ships (PASRACS). The specific routes shown are trans-oceanic and overwater for the most part, but do include a few land crossings in designated corridors with high ground-effect flight, one from the Red Sea to the Mediterranean Sea in the region of the Suez Canal, one in Central America from the Caribbean Sea to the Pacific Ocean over Costa Rica and Nicaragua including a portion over Lake Nicaragua, and one from the North Sea to Baltic Sea over the Jutland Peninsula. Illustrated round-the-world routes can connect a large number of origin-destination pairs both with single vehicle service, and even a much large number of origin-destination pairs with two vehicle connecting service with a connection at some port of call (origin/destination). It should be understood that other ports of call as well as other routes, round-the-world and otherwise, are all possible within the spirit and scope of the invention as described and claimed. It should also be understood that other geographic paths of travel and other land crossings and/or land corridors are also possible, within the spirit and scope of the invention as described and claimed. Without limitation, some examples of other possible land crossings and/or land corridors that could be operated by PASRACS vehicles comprise:

Crossing from Mediterranean Sea to Black Sea across portions of Turkey
Crossing from the Baltic Sea to the Black Sea across Poland and Ukraine
Crossing from the Atlantic Ocean to Chesapeake Bay across Virginia, Maryland and/or Delaware
Crossing from the Caribbean Sea to the Pacific Ocean across the Isthmus of Panama in Panama
Crossing from the Gulf of Mexico to the Pacific Ocean across the Isthmus of Tehuantepec in Mexico
Crossing from the Gulf of Mexico to the Atlantic Ocean across Florida
Crossing from the Gulf of Mexico to Galveston Bay across the Bolivar Peninsula
Crossing from the Gulf of Mexico to Bay of Chetumal across the Yucatan Peninsula
Crossing from Gulf of Alaska to Bering Sea across Aleutian Peninsula, such as near Cold Bay, Alaska
Crossing from Northumberland Strait to Bay of Fundy across New Brunswick and/or Nova Scotia
Crossing from Bo Hai to Yellow Sea across the Shantung Peninsula in China
Crossing from the East China Sea to Yangtze river/reservoir destinations in China
Crossing from the South China Sea to Mekong river/reservoir destinations in Vietnam, Cambodia, and/or Laos
Crossing the Malay Peninsula across portions of Thailand and/or Malaysia
Crossing from South China Sea to the Gulf of Thailand across the southern end of Vietnam
Crossing from the Bay of Bengal to river/reservoir destinations in Bangladesh, West Bengal and Assam
Crossing from the Gulf of Khambhat to the Gulf of Kutch across Gujarat
Crossing from the Gulf of Mexico to river/reservoir destinations in Louisiana, Mississippi, Arkansas and Tennessee
Crossing from Atlantic Ocean to river/reservoir destinations in Congo and Zaire with possible Angola crossing as well
Crossing from Atlantic Ocean to Amazon river/reservoir destinations in Brazil
Crossing from Mediterranean Sea to Nile River/reservoir destinations across Egypt

Figure 16A:
FIGS. 16A through 16G illustrate representative termini and representative global routes such as round-the-world routes, that could be served with trans-oceanic transportation services provided by partially aerostatically supported air cushion ships (PASRACS).

| FIG. 16A<br>Route 1 |
| --- |
| Saradhapur Baleshwar |
| Chennai |
| Rameswaram/Munnar |
| Kanyakumari |
| N. Mumbai |
| Pasabandar/Jiwani |
| Musqat |
| Jeddah |
| Aqaba/Eilat/Taba |
| Land: Suez Crossing |
| Enez/Alexandroupoli |
| Fiumicino/Rome |
| Nice |
| Port Guadiana |
| Cherbourg |
| Downton |
| N. Wilhelmshaven |
| Store Revlingen |
| S Reykjavik |
| E Halifax |

-continued

| FIG. 16A Route 1 |
| --- |
| N. Boston |
| New York |
| Dover |
| Galveston |
| Cancun |
| Corozal/Chetumal |
| Land: Costa Rica/Nicaragua (350 mi crossing) |
| Salinas Bay |
| Lazaro Cardenas |
| Los Angeles |
| Wilsonville |
| Grays Harbor |
| Port Williams/Prince Rupert |
| Cold Bay |
| Tokyo |
| Osaka |
| Miyazaki |
| Hsinchu |
| Xiamen |
| Hong Kong/Shenzen |
| Singapore/Batam/Pengerang |
| S. Yangon |
| Chittagong |
| Saradhapur Baleshwar |

The nominal round-the-world Route 1 has 41 stops or destinations, and a total distance of approximately 35,630 miles, or 143% of the nominal Earth (global) circumference of 24,900 miles (i.e., circuitry of 1.43). This is not out of line with typical air travel circuitry of between 1.0 and 1.5. With rapid turn time turnarounds at each destination of 35 minutes, including deboarding, boarding, fueling and servicing operations using lessons learned from "pit stop" optimization techniques, the total round-the-world full traversal on Route 1 is approximately 10,055 minutes, or 25 minutes less than one week (7 days), assuming a nominal block speed of 248 mph, a nominal cruise speed in groundspeed terms of 250 mph, and a maximum cruise speed of 280 mph or 245 knots IAS, with the margin providing safety for a round-the-world trip against prevailing headwinds, such as a westbound round-the-world trip. It should also be noted in the context of FIG. 16A that origin/destination locations (origin location 64 for upcoming travel/flight leg and destination location 68 for prior travel/flight leg) with plural ports, such as Rameswaram/Munnar, Pasabandar/Jiwani, Aqaba/Eilat/Taba, Enez/Alexandroupoli, Corozal/Chetumal, Hong Kong/Shenzen, and Singapore/Batam/Pengerang, for example and without limitation, can entail the use of separate payload transfer transport modules 47 coming from/going to respectively separate port docks 79D with separate national customs, immigration and security formalities areas under separate national jurisdictions. In other words, a single stop of a PASRACS 1 can serve multiple locations, through the inventive use of plural payload transfer transport modules 47 being concurrently employed. If one of the origin/destination locations has greater traffic volume, bigger and/or multiple payload transfer transport module(s) 47 can be used to service this greater traffic volume origin/destination location, in a modular and flexible operational paradigm.

Figure 16B:

| FIG. 16B Route 2 |
| --- |
| Saradhapur Baleshwar |
| Kanyakumari |

-continued

| FIG. 16B Route 2 |
| --- |
| Goa |
| Dubai |
| Land: Suez Crossing |
| Alexandria |
| Athens |
| Trieste/Koper |
| Reggio/Messina |
| Cagliari |
| Port Guadiana |
| Cherbourg |
| Downton |
| Land: Denmark |
| Ahlbeck/Swinoujscie |
| Klaipeda |
| Copenhagen/Malmo |
| Land: Denmark |
| Aberdeen |
| E Halifax |
| New York |
| Charleston SC |
| Ft. Lauderdale |
| Land: Costa Rica/Nicaragua |
| Salina Cruz |
| Los Angeles |
| Wilsonville |
| Grays Harbor |
| Cold Bay |
| Tomakomai |
| Vladivostok |
| Incheon |
| Tianjin |
| Shanghai |
| Hsinchu |
| W Manila |
| Singapore/Batam/Pengerang |
| Port Blair |
| Saradhapur Baleshwar |

With assumptions similar to that of Route 1 as shown in FIG. 16A. Route 2 as shown in FIG. 16B has 34 stops or destinations, a total distance of approximately 36,745 miles, or 148% of the nominal Earth (global) circumference of 24,900 miles (i.e., circuitry of 1.48), a total round-the-world full traversal time of approximately 10,080 minutes, or one week (7 days).

Figure 16C:

| FIG. 16C Route 3 |
| --- |
| Saradhapur Baleshwar |
| Kanyakumari |
| Djibouti/Lawyacado |
| Jeddah |
| Land: Suez Crossing |
| Iskenderun |
| Larnaca |
| Malta |
| Tunis |
| Genoa |
| Cerbere/Portbou |
| Tanger |
| Port Guadiana |
| Cherbourg |
| W. Rotterdam |
| Downton |
| Kinure (Cork) |
| Ponta Delgada, Azores |
| Corriverton/Nieus Nickerie |
| Port of Spain/Macuro |
| San Juan |
| Puerto Plata |
| New York |
| Dover |

-continued

| FIG. 16C Route 3 |
| --- |
| Terra Ceia, FL |
| Corozal/Chetumal |
| Land: Costa Rica/Nicaragua |
| Salinas Bay |
| Los Angeles |
| Wilsonville |
| Grays Harbor |
| Cold Bay |
| Tokyo |
| Osaka |
| Hong Kong/Shenzen |
| Phan Thiet |
| U-Tapao (Bangkok) |
| Saradhapur Baleshwar |

With assumptions similar to that of Route 1 as shown in FIG. 16A. Route 3 as shown in FIG. 16C has 35 stops or destinations, a total distance of approximately 36,535 miles, or 147% of the nominal Earth (global) circumference of 24,900 miles (i.e., circuitry of 1.47), a total round-the-world full traversal time of approximately 10,064 minutes, or 16 minutes less than one week (7 days).

Figure 16D:

| FIG. 16D Route 4 |
| --- |
| Saradhapur |
| Kanyakumari |
| Kerguelen (49 20S, 70 13E) |
| Maputo |
| Durban |
| Cape Town |
| Muanda (DRC)/Soyo (Angola) |
| Doula |
| Lagos |
| Accra |
| Abidjan |
| Conakry |
| Dakar |
| Tenerife S |
| Port Guadiana |
| Quiberon |
| Penzance |
| E Halifax |
| N Boston |
| New York |
| Ft. Lauderdale, FL |
| Land: Costa Rica/Nicaragua |
| Salinas Bay |
| Los Angeles |
| Wilsonville |
| Grays Harbor |
| Cold Bay |
| Tokyo |
| Hsinchu |
| Hong Kong/Shenzen |
| Singapore/Batam/Pengerang |
| Saradhapur |

With assumptions similar to that of Route 1 as shown in FIG. 16A. Route 4 as shown in FIG. 16D has 30 stops or destinations, a total distance of approximately 37,295 miles, or 150% of the nominal Earth (global) circumference of 24,900 miles (i.e., circuitry of 1.50), a total round-the-world full traversal time of approximately 10,073 minutes, or 7 minutes less than one week (7 days).

Figure 16E:

| FIG. 16E Route 5 |
| --- |
| Saradhapur |
| Kanyakumari |
| Mauritius |
| Antsiranana |
| Dar Es Salaam |
| Mombasa |
| Hurghada, Egypt |
| Land: Suez Crossing |
| Athens |
| Fiumicino/Rome |
| Marseille |
| Port Guadiana |
| N. Boston |
| New York |
| Ft. Lauderdale |
| Land: Costa Rica/Nicaragua |
| Salinas Bay |
| Los Angeles |
| Wilsonville |
| Grays Harbor |
| Honolulu |
| Honaira |
| Cairns |
| Port Moresby |
| Darwin |
| Dili |
| Bali |
| Singapore/Batam/Pengerang |
| Saradhapur |

With assumptions similar to that of Route 1 as shown in FIG. 16A. Route 5 as shown in FIG. 16E has 26 stops or destinations, a total distance of approximately 37,900 miles, or 152% of the nominal Earth (global) circumference of 24,900 miles (i.e., circuitry of 1.52), a total round-the-world full traversal time of approximately 10,079 minutes, or 1 minute less than one week (7 days).

Figure 16F:

| FIG. 16F Route 6 |
| --- |
| Saradhapur |
| Chennai |
| Kanyakumari |
| N. Mumbai |
| Port Kutch (@ N Salaya) |
| Land: Suez Crossing |
| Alexandria |
| Athens |
| Fiumicino/Rome |
| Marseille |
| Port Guardiana |
| Ponta Delgada, Azores |
| Recife |
| Rio de Janeiro |
| Sao Fransisco do Sul |
| Magdalena/W. Montevideo |
| Punta Dungeness (Argentina/Chile) |
| [around Cape Horn] |
| Valparaiso |
| Lima |
| San Lorenzo/San Carlos |
| Salinas Bay |
| Mazatlan |
| Los Angeles |
| Wilsonville |
| Grays Harbor |
| Cold Bay |

-continued

| FIG. 16F Route 6 |
| --- |
| Tokyo |
| Shanghai |
| Hong Kong/Shenzen |
| Singapore/Batam/Pengerang |
| Great Nicobar |
| Saradhapur |

With assumptions similar to that of Route 1 as shown in FIG. 16A. Route 6 as shown in FIG. 16F has 30 stops or destinations, a total distance of approximately 37,195 miles, or 150% of the nominal Earth (global) circumference of 24,900 miles (i.e., circuitry of 1.50), a total round-the-world full traversal time of approximately 10,049 minutes, or 31 minute less than one week (7 days).

Figure 16G:

| FIG. 16G Route 7 |
| --- |
| Saradhapur |
| Vishakapatnam |
| Kanyakumari |
| Mangalore |
| Mitsiwa |
| Port Sudan |
| Jeddah |
| Hurghada |
| Land: Suez Crossing |
| Nahariyya/Enn Naqoura |
| Enez/Alexandroupoli |
| Fiumicino/Rome |
| Port Guardiana |
| Cherbourg |
| Downton |
| W. Rotterdam |
| N. Wilhelmshaven |
| Store Revlingen |
| E. Kirkenes/W. Liinahamari |
| (Norway/Russia) |
| (route via North Pole) |
| (adds ~60 mi) |
| 3 stop equivalent extra time for deicing |
| Cold Bay |
| Esquimalt BC |
| Grays Harbor |
| Wilsonville |
| Los Angeles |
| Hawi, Hawaii |
| Honolulu |
| Apia, Samoa |
| Fiji |
| N Auckland |
| Sydney |
| Devonport, Tasmania |
| Torquay, Victoria |
| S. Adelaide |
| Perth |
| Cilagon/Bakau |
| Singapore/Batam/Pengerang |
| Phuket |
| Great Nicobar |
| Saradhapur |

With assumptions similar to that of Route 1 as shown in FIG. 16A. Route 7 as shown in FIG. 16G has 37 stops or destinations plus an extra time 105 minute time allowance for Arctic travel de-icing, a total distance of approximately 35,840 miles, or 144% of the nominal Earth (global) circumference of 24,900 miles (i.e., circuitry of 1.44), a total round-the-world full traversal time of approximately 10,078 minutes, or 2 minute less than one week (7 days).

FIGS. 16A through 16G therefore illustrate a novel method for a single large capacity partially aerostatically supported ram air cushion vehicle 1 or PASRACS 1 to provide round-the-world service starting and ending at an origin location within a one week time window, while including quick turn-time stops at a minimum of 25 destination locations excluding the origin location and thus serving at least 325 global location pairs with weekly service, wherein said large capacity enables said PASRACS 1 to accommodate travel volume (of passengers and cargo) on said at least 325 global location pairs and wherein said large capacity also enables lower per-unit-payload energy use and operating cost that arise from and are enabled by square-cube law benefits of large capacity associated with large vehicle size. More generally, if an origin is connected with a minimum of (N−1) destinations, FIGS. 16A through 16G illustrate a method for a single large capacity partially aerostatically supported ram air cushion vehicle 1 or PASRACS 1 to provide round-the-world service starting and ending at an origin location within a one week time window, while including quick turn-time stops at a minimum of N destination locations excluding the origin location and thus serving at least N*(N−1)/2 global location pairs with weekly service, wherein said large capacity enables said PASRACS 1 to accommodate travel volume on said at least N*(N−1)/2 global location pairs and wherein said large capacity also enables lower per-unit-payload energy use and operating cost that arise from and are enabled by square-cube law benefits of large capacity associated with large vehicle size. For different preferred embodiments of PASRACS vehicles N may be any number such as 8 or greater with corresponding 28 or greater city pairs connected and served weekly with a single PASRACS vehicle. Quick and efficient turn-time stops are enabled by multiple factors including at least one of: the use of payload transfer transport modules 47, the use of flight in-ground effect that eliminates prolonged times for climb to and descent from high cruising altitudes, and the use of a propulsion system with regenerative braking. Per-unit-payload metrics can be denominated by number of passengers (pax), by pax-mi or pax-km, by amount of cargo (tonnes or cu.m.) or tonne-mi or tonne-km or cu.m-km, for example and without limitation. Energy use can be measured in kWh or units of fuel consumption, for example and without limitation. Operating cost can be measured as cash aircraft-related operating cost (CAROC) or aircraft-related operating cost (AROC) or total aircraft-related operating cost (TAROC) or total operating cost (TOC), for example and without limitation. The benefit mechanisms of large size PASRACS vehicles arising from square-cube law effects have been already described in detail with reference to FIG. 11A. The orchestration and management of a global transportation system utilizing PASRACS 1 vehicles can leverage a computerized reservation system that offers a variety of tailored fare structures for different point-to-point and multi-point travel reservations with different classes of travel or suites of included or for-separate-purchase amenities and food and beverage services and classes of service. The computerized reservation system will preferably be connected to a computerized revenue management system, to help maximize win-win solutions for all stakeholders including passengers, shippers, crew, transport entities, tourism entities, nonprofit and for-profit service entities, connecting and interlining with other transport vehicles and modes, other business entities, government entities, and other entities. With a global fleet of PASRACS 1 vehicles in operation, it may be prudent to have a "hot spare" PASRACS 1 vehicle that can substitute for a fleet vehicle that becomes nonoperational—or a "hot spare" that is used solely for charter operations subject to bumping if the vehicle becomes needed as a substitute for a nonoperational scheduled operations vehicle.

It should be understood that a partially aerostatically supported ram air cushion ship 1 can perform round-the-world routes that are different from the specific example routes described with reference to FIGS. 16A through 16G above, within the spirit and scope of the invention. For example and without limitation, a third alternative routing to cross the Americas from east to west would be a "northwest passage" route that connects from an Atlantic Ocean port such as Halifax, Nova Scotia, then runs north through the Labrador Sea and Davis Straight, west through Lancaster Sound and Viscount Melville Sound and the Beaufort Sea, then south through the Bering Strait to a Pacific Ocean port such as Cold Bay, Alaska, to provide shorter circuitry connectivity from North Atlantic ports to Asia-Pacific ports. It should be understood that it is also possible for PASRACS 1 to operate in operational paradigms other than scheduled round-the-World services, including scheduled one-way and scheduled return services, unscheduled services, charter services, and cargo-only services to name some vehicle operational paradigms, without limitation. If a fleet of PASRACS 1 are operating on scheduled services and just one or a few PASRACS 1 are on a different operational paradigm such as unscheduled, charter or cargo-only, in the event of a problem scenario such as a mechanical breakdown, accident or need-for-evacuation-at-sea or other problem or issue with a scheduled PASRACS 1, a different operational paradigm PASRACS 1 can be commandeered for priority work to rescue passengers and/or replace a scheduled PASRACS 1 to minimize and mitigate the adverse impacts due to the problem scenario, where said adverse impacts may range from injury or death to schedule delay to passenger inconvenience to passenger dissatisfaction to economic losses to punitive regulatory consequences, and others.

Figure 17A:
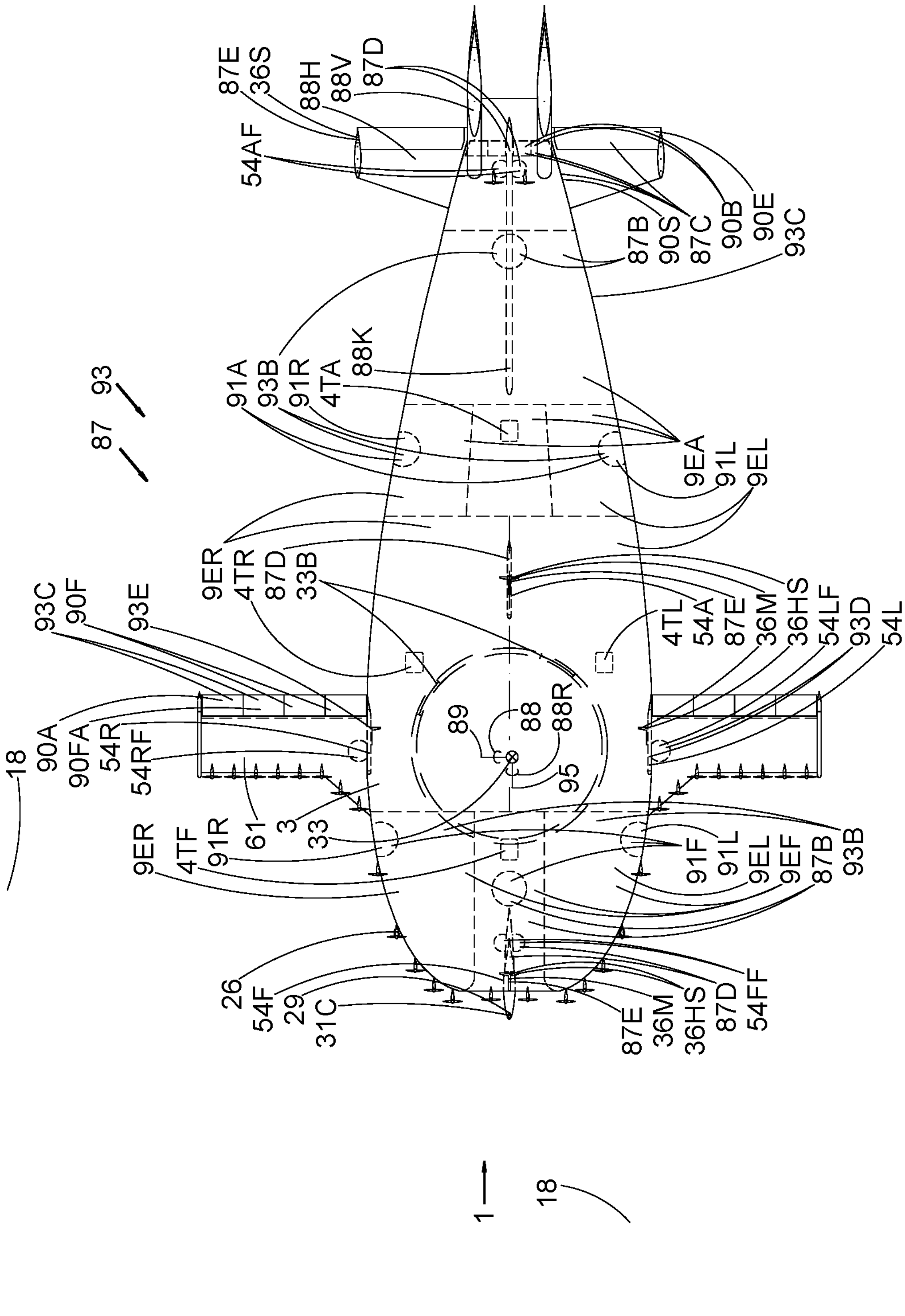
FIG. 17 illustrates inventive aspects of longitudinal and lateral trim systems.

FIG. 17 illustrates inventive aspects of a longitudinal trim system 87 and a lateral trim system 93 applicable to enable balanced trim for a partially aerostatically supported ram air cushion ship 1 or PASRACS 1. Optimal solutions for longitudinal and lateral trim can leverage different categories of trim systems for different operational phases of the vehicle, ranging without limitation from (i) a combination of aerostatic and hydrostatic trim contributions with the PASRACS 1 stationary on a water surface 18; to (ii) a combination of aerostatic and aerodynamic and hydrostatic and hydrodynamic trim contributions when the vehicle is moving at modest speeds on the water surface 18, such as during takeoff and landing operations; to (iii) a combination of aerostatic and aerodynamic trim contributions when the vehicle is flying above and not in physical contact with the water surface 18. Other scenarios that may be less frequent are also possible, such as takeoff or landing with a strong headwind, wherein a transition between a waterborne mode with hydrostatic and aerostatic lift to an airborne mode with aerodynamic and aerostatic lift may occur with no significant use of hydrodynamic lift, i.e. a circumstance where airspeed is positive but waterspeed is insignificantly small.

An aerostatic longitudinal pitching moment subsystem 87B configured to generate an aerostatic pitching moment around said vehicle longitudinal center of gravity 89 (that is the longitudinal location of the center of mass), and an aerostatic lateral rolling moment subsystem 93B configured to generate an aerostatic rolling moment around said vehicle lateral center of gravity 95 (that is the lateral location of the center of mass), can utilize differential aerostatic lift contributions from an aft encompassed lifting volume 9EA, a forward encompassed lifting volume 9EF, a left encompassed lifting volume 9EL and a right encompassed lifting volume 9ER; as well as differential ballonet inflations with air between an aft ballonet 91A, a forward ballonet 91F, a left ballonet 91L and a right ballonet 91R.

An aerodynamic longitudinal trim subsystem 87C with aerodynamic members configured to generate an aerodynamic pitching moment around said vehicle longitudinal center of gravity 89 can utilize tailored deflections of one or more of an elevator 90E, a body flap 90B, a side flap 90S, and optionally of a horizontal stabilizer 88H if said horizontal stabilizer is a trimmable horizontal stabilizer. An aerodynamic lateral trim subsystem 93C with aerodynamic members configured to generate an aerodynamic rolling moment around said vehicle lateral center of gravity 95 can utilize tailored deflections of one or more of an aileron 90A, a flaperon 90FA, and a side flap 90S.

A hydrostatic longitudinal pitching moment subsystem 87D configured to generate a hydrostatic pitching moment around said vehicle longitudinal center of gravity 89, and a hydrostatic lateral rolling moment subsystem 93D configured to generate a hydrostatic rolling moment around said vehicle lateral center of gravity 95, can utilize tailored and differential buoyancy amongst an aft hull member 54A, a forward hull member 54F, a left hull member 54L, a right hull member 54R, an aft float 54AF, a forward float 54AFF, a left float 54LF, a right float 54RF, and a keel 88K. Note that the hulls may include ballast tanks that can accommodate varying amounts of ballast water by pumping, and that the floats may be variable volume and/or inflatable float members and may also optionally be integrated with safety members such as inflatable life rafts or inflatable slide-rafts, without limitation.

A hydrodynamic longitudinal trim subsystem 87E with hydrodynamic members 36M configured to generate a hydrodynamic pitching moment around said vehicle longitudinal center of gravity 89, and a hydrostatic lateral rolling moment subsystem 93D configured to generate a hydrostatic rolling moment around said vehicle lateral center of gravity 95, can utilize one or more of: a hydrodynamic member 36M (shown), a hydroski 36S (shown), a combined hydrofoil and hydroski 36HS (shown), a hydrodynamic planing surface 36P such as on bottom side of a hull 54, a variable height hydrodynamic planing surface 36V (that can also incorporate a suspension as described elsewhere in the specification), a hydrofoil 36H that may be a subcavitating hydrofoil 36HA and/or a supercavitating hydrofoil 36HB, a step 36T, a hull chine 36C, and a hull forebody 36FB.

The longitudinal trim system 87 and a lateral trim system 93 can also utilize a ballast system 33B that employs at least one of solid ballast and liquid ballast, wherein liquid ballast can be sea water, potable water, waste water, fuel, liquid hydrogen and other liquid. A ring geometry ballast system 33B is illustrated in FIG. 17, with two ballast weights that may be solid or filled with ballast liquid, movable to different azimuthal location to appropriately affect longitudinal trim and lateral trim needed for a eg location for the vehicle weight 33 with a vehicle longitudinal center of gravity 89 and vehicle lateral center of gravity 95 as illustrated. Alternate ballast movement geometries including movability in an envelope region spanning both a longitudinal and lateral dimensional range, are possible within the spirit and scope of the invention. The use of ballast for generating longitudinal and lateral trimming moments can leverage differential filling and fluid movement between an aft tank 4TA, forward tank 4TF, left tank 4TL, and right tank 4TR, wherein spaced tanks can be provided for one or more of: potable water tanks 92A, hot water tanks 92H, waste tanks 92F, fuel tanks 82B, liquid hydrogen tanks 12L and 47H, and other tanks, within the spirit and scope of the invention.

FIG. 17 thus illustrates a partially aerostatically supported ram air cushion ship 1, further comprising:

(a) a longitudinal trim system 87 for trimming out pitching moment 88 around a vehicle longitudinal center of gravity 89 associated with said weight 33 of said partially aerostatically supported ram air cushion ship 1, said longitudinal trim system 87 connected to said vehicle control and navigation system 29 and configured to utilize at least one of (i) an aerostatic longitudinal pitching moment subsystem 87B configured to generate an aerostatic pitching moment around said vehicle longitudinal center of gravity 89; (ii) an aerodynamic longitudinal trim subsystem 87C with aerodynamic members configured to generate an aerodynamic pitching moment around said vehicle longitudinal center of gravity 89; (iii) a hydrostatic longitudinal pitching moment subsystem 87D configured to generate a hydrostatic pitching moment around said vehicle longitudinal center of gravity 89; (iv) a hydrodynamic longitudinal trim subsystem 87E with hydrodynamic members 36M configured to generate a hydrodynamic pitching moment around said vehicle longitudinal center of gravity 89; and (v) a longitudinal cg management subsystem 87F configured to longitudinally move said vehicle longitudinal center of gravity 89; and (b) a lateral trim system 93 for trimming out rolling moment 88R around a vehicle lateral center of gravity 95 associated with said weight 33 of said partially aerostatically supported ram air cushion ship 1, said lateral trim system 93 connected to said vehicle control and navigation system 29 and configured to utilize at least one of (i) an aerostatic lateral rolling moment subsystem 93B configured to generate an aerostatic rolling moment around said vehicle lateral center of gravity 95; (ii) an aerodynamic lateral trim subsystem 93C with aerodynamic members configured to generate an aerodynamic rolling moment around said vehicle lateral center of gravity 95; (iii) a hydrostatic lateral rolling moment subsystem 93D configured to generate a hydrostatic rolling moment around said vehicle lateral center of gravity 95; (iv) a hydrodynamic lateral trim subsystem 93E with hydrodynamic members configured to generate a hydrodynamic rolling moment around said vehicle lateral center of gravity 95; and (v) a lateral cg management subsystem 93F configured to laterally move said vehicle lateral center of gravity 95.

The partially aerostatically supported ram air cushion ship 1 or PASRACS 1 as described in the descriptive portion of this specification and drawings and claims, presents a unique new class of large vehicle inventive configurations that can provide global transportation with speed & safety, with extraordinary comfort, luxury and amenities, with extraordinary efficiency, and with essentially zero carbon emissions yielding extraordinary environmental responsibility. PASRACS 1 vehicles and associated transportation systems thus offer extraordinary ability to grow global travel and tourism while fostering international and cross-cultural understanding, peace & prosperity.

While certain preferred embodiments of the invention have been described in detail above with reference to the accompanying Figures, it should be understood that further variations and combinations and alternate embodiments are possible within the spirit and scope of the invention as described, illustrated and claimed herein.

REFERENCES

1. *Jane's All the World's Aircraft* 2002-2003, Jane's Information Group, Alexandria, V A, 2002
2. "Top 20 World's Largest Container Ships in 2023", Marine Insight, Apr. 11, 2023, https://www.marineinsight.com/know-more/top-10-worlds-largest-container-ships-in-2019/3.
3. "Top 20 Largest Cruise Ships In 2023," Marine Insight, Apr. 1, 2023, https://www.marineinsight.com/know-more/top-10-largest-cruise-ships-2017/4.
4. Hoerner, S., and Borst, H., "Lift of Airplane Configurations," Fluid Dynamic Lift, Hoerner Fluid Dynamics, Bricktown, NJ, 1975, pp. 20-1-20-22.
5. Berger, K., and Harris, E., Airbus A380, Mar. 2, 2006, https://archive.aoe.vt.edu/mason/Mason_f/A380Berger.pdf
6. Air France seat maps, SeatGuru, https://www.seatguru.com/airlines/Air_France/Air_France_Airbus_A380_V2.php
7. Nitske, W. Robert, *The Zeppelin Story*, A.S. Barnes and Company, New York, 1977e

What is claimed is:

1. A transport method for multimodally transporting payload from an origin location, comprising the steps of:

(i) enabling a boarding payload to be accommodated in a transfer vehicle at an origin location, wherein said boarding payload comprises at least one of (a) a first plurality of passengers and (b) a second plurality of items of at least one of cargo and baggage;

(ii) bringing together said transfer vehicle with a partially aerostatically supported ram air cushion ship that is a water-based flight in ground-effect vehicle with at least three payload decks, floating on a water body at a mating location;

(iii) mating said transfer vehicle to said partially aerostatically supported ram air cushion ship utilizing a mating apparatus configured to contiguously connect said transfer vehicle to said partially aerostatically supported ram air cushion ship;

(iv) enabling boarding transfer of at least a portion of said boarding payload from said transfer vehicle to a payload accommodating compartment in at least one of said payload decks in said partially aerostatically supported ram air cushion ship, through a boarding transfer path; and (v) transporting said boarding payload in said partially aerostatically supported ram air cushion ship on a travel path as commanded by at least one of crew and a vehicle control and navigation system, said travel path including a water takeoff phase with a positive airspeed wherein said partially aerostatically supported ram air cushion ship is said flight in ground-effect vehicle supported in part by an aerostatic lift force and in part by an aerodynamic lift force leveraging a ram air cushion between a lower surface of said partially aerostatically supported ram air cushion ship and an Earth surface.

2. The transport method for multimodally transporting payload from an origin location of claim 1, further comprising the steps of:

(vi) identifying a disembarking payload for said destination location, which disembarking payload is in on board the partially aerostatically supported ram air cushion ship in said payload accommodating compartment in said flight phase, and wherein said disembarking payload comprises at least one of (a) a third plurality of passengers and (b) a fourth plurality of items of at least one of cargo and baggage;

(vii) performing the combined arrival preparation steps within an arrival preparation time window of (a) enabling disembarking transfer of said disembarking payload from said payload accommodating compartment in said partially aerostatically supported ram air cushion ship to said transfer vehicle, through a disembarking transfer path, and (b) landing said partially aerostatically supported ram air cushion ship in a port region encompassing said destination location;

(viii) unmating said transfer vehicle from said partially aerostatically supported ram air cushion ship at an unmating location, utilizing an unmating apparatus configured to enable separation of said transfer vehicle from said partially aerostatically supported ram air cushion ship; and (ix) conveying said disembarking payload being accommodated in said transfer vehicle to said destination location.

3. The transport method of claim 1, wherein said transfer vehicle comprises a barge configured to float on said water surface, and wherein said transfer vehicle is further configured to carry more than one selected among the following: said first plurality of passengers, said second plurality of items of at least one of cargo and baggage, vehicles, cars, buses, trucks, trailers, electric vehicles, autonomous vehicles, recreational vehicles, road vehicles, rail vehicles, wheeled vehicles, motorcycles, scooters, bicycles, three-wheel vehicles, vehicle trains, amphibious vehicles, marine vehicles, potable water, food, beverage, merchandise, fuel, lifting gas, cryogenically liquified lifting gas, liquid waste and solid waste.

4. The transport method of claim 1, wherein said transfer vehicle comprises a wheeled vehicle configured to carry more than one selected among the following; said first plurality of passengers, said second plurality of items of at least one of cargo and baggage, potable water, food, beverage, merchandise, fuel, lifting gas, cryogenically liquified lifting gas, liquid waste and solid waste.

5. The transport method of claim 1, wherein said mating apparatus enables carriage of said transfer vehicle by said partially aerostatically supported ram air cushion ship in motion and wherein said mating apparatus comprises at least one of: (i) a disconnectable attachment fitting, (ii) a positioning system for an attachment fitting, (iii) a cable, (iv) a structural beam, (v) a winch, (vi) an actuator, (vii) a guide track member, (viii) a deployable ramp, (ix) a controlled lift up system, (x) a controlled drop down system, and (xi) a controlled guided transport system connected to said vehicle control and navigation system.

* * * * *